United States Patent
Ardes

(10) Patent No.: US 11,033,842 B2
(45) Date of Patent: *Jun. 15, 2021

(54) FILTER INSERT FOR A FILTER HAVING A FILTER BYPASS VALVE, AND A METHOD OF USING THE FILTER INSERT

(71) Applicant: HENGST SE, Muenster (DE)

(72) Inventor: Wilhelm Ardes, Ascheberg (DE)

(73) Assignee: HENGST SE, Muenster (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,601

(22) Filed: Jun. 12, 2019

(65) Prior Publication Data

US 2019/0366247 A1  Dec. 5, 2019

Related U.S. Application Data

(62) Division of application No. 14/917,902, filed as application No. PCT/EP2014/002400 on Sep. 6, 2014, now Pat. No. 10,357,728.

(Continued)

(30) Foreign Application Priority Data

Aug. 28, 2014  (DE) .......................... 202014104029.3

(51) Int. Cl.
*B01D 35/30* (2006.01)
*B01D 35/147* (2006.01)
(Continued)

(52) U.S. Cl.
CPC ........... *B01D 35/306* (2013.01); *B01D 29/21* (2013.01); *B01D 35/147* (2013.01);
(Continued)

(58) Field of Classification Search
CPC ...... B01D 2201/0415; B01D 2201/291; B01D 2201/305; B01D 2201/34;
(Continued)

(56) References Cited

U.S. PATENT DOCUMENTS

| 2,995,249 A | 8/1961 | Boewe et al. |
| 5,888,384 A | 3/1999 | Wiederhold et al. |

(Continued)

FOREIGN PATENT DOCUMENTS

| DE | 19644647 | 4/1998 |
| DE | 298 15 023 U1 | 1/1999 |

(Continued)

OTHER PUBLICATIONS

International Search Report, dated Jan. 16, 2016, priority document.

*Primary Examiner* — Terry K Cecil
(74) *Attorney, Agent, or Firm* — Greenblum & Bernstein, P.L.C.

(57) ABSTRACT

An exchangeable filter insert that separates an unfiltered side and a filtered side of a filter, the filter having a filter housing, an inlet for liquid to be filtered and an outlet for filtered liquid. A filter bypass valve has a valve seat and a valve body guided so as to be movable relative to the valve seat and preloaded in the closing direction. The valve seat is fixed to the filter. The valve body is guided in the filter so as to be fixed to the filter. A spring that preloads the valve body in the closing direction is guided in the filter so as to be fixed to the filter. The filter insert has a spring prestresser support that, in the state in which the insert is placed into the filter housing, supports and pre-stresses the spring at its end facing away from the valve body.

17 Claims, 88 Drawing Sheets

Related U.S. Application Data

(60) Provisional application No. 61/975,121, filed on Apr. 4, 2014, provisional application No. 61/875,834, filed on Sep. 10, 2013.

(51) Int. Cl.
  *B01D 35/153* (2006.01)
  *B01D 29/21* (2006.01)
  *F01M 11/03* (2006.01)
  *F01M 13/04* (2006.01)

(52) U.S. Cl.
  CPC .......... *B01D 35/153* (2013.01); *B01D 35/30* (2013.01); *B01D 2201/0415* (2013.01); *B01D 2201/291* (2013.01); *B01D 2201/305* (2013.01); *B01D 2201/34* (2013.01); *B01D 2201/4023* (2013.01); *B01D 2201/4046* (2013.01); *B01D 2201/4053* (2013.01); *B01D 2201/4084* (2013.01); *F01M 11/03* (2013.01); *F01M 13/04* (2013.01)

(58) Field of Classification Search
  CPC .... B01D 2201/4023; B01D 2201/4046; B01D 2201/4053; B01D 2201/4084; B01D 29/21; B01D 35/147; B01D 35/153; B01D 35/30; B01D 35/306; F01M 11/03; F01M 13/04
  See application file for complete search history.

(56) References Cited

U.S. PATENT DOCUMENTS

| | | | |
|---|---|---|---|
| 6,579,448 | B2 | 6/2003 | Dworatzek |
| 6,685,829 | B1 | 2/2004 | Baumann et al. |
| 8,123,937 | B2 | 2/2012 | Hacker |
| 9,044,698 | B2 | 6/2015 | Ardes |
| 10,357,728 | B2 * | 7/2019 | Ardes ................. B01D 29/21 |
| 2004/0112429 | A1 | 6/2004 | Mack |
| 2006/0006124 | A1 | 1/2006 | Yates et al. |
| 2009/0200221 | A1 | 8/2009 | Hacker et al. |
| 2012/0267293 | A1 | 10/2012 | Ardes |
| 2013/0327429 | A1 | 12/2013 | Ardes |
| 2014/0366494 | A1 | 12/2014 | Ardes |
| 2015/0157968 | A1 | 6/2015 | Ardes |

FOREIGN PATENT DOCUMENTS

| | | |
|---|---|---|
| DE | 198 59 960 A1 | 7/2000 |
| DE | 299 17 563 U1 | 3/2001 |
| DE | 202007008483 | 1/2008 |
| DE | 20 2007 017 980 U1 | 6/2009 |
| DE | 102009021973 | 1/2010 |
| DE | 102010043836 | 5/2012 |
| DE | 102011005106 | 8/2012 |
| EP | 1616611 | 1/2006 |
| EP | 2412417 | 2/2012 |
| WO | 2006112853 | 10/2006 |

* cited by examiner

FILTER INSERT FOR A FILTER HAVING A FILTER BYPASS VALVE, AND A METHOD OF USING THE FILTER INSERT

CROSS-REFERENCES TO RELATED APPLICATIONS

This application is a division of U.S. patent application Ser. No. 14/917,902, filed Mar. 9, 2016, which is a 371 of PCT/EP2014/002400 filed Sep. 6, 2014 and which claims the benefit of the U.S. Provisional Application No. 61/875,834, filed on Sep. 10, 2013, U.S. Provisional Application No. 61/975,121, filed on Apr. 4, 2014, and the priority of the German patent application No. 202014104029.3 filed on Aug. 28, 2014, the entire disclosures of which are incorporated herein by way of reference.

BACKGROUND OF THE INVENTION

The present invention relates to a filter having a filter housing having an inlet for liquid to be filtered and having an outlet for filtered liquid, having an exchangeable filter insert that separates an unfiltered side and a filtered side of the filter from one another, and having a filter bypass valve that is made up of a valve seat and a valve body that is guided so as to be movable relative to the valve seat and is preloaded in the closing direction. Moreover, the present invention relates to a filter insert that works together with the above-named filter.

A first filter of the type named above is known from U.S. Pat. No. 6,579,448 B2. This document discloses a filter having an exchangeable filter insert and having a filter bypass valve. A valve seat of the filter bypass valve is situated on the filter insert, specifically on its upper end plate. A valve body, a spring that preloads the valve body in the closing direction, and a spring support are fashioned so as to be fixed to the housing. Specifically, the spring support is provided on a central pipe socket or supporting element fixed to the housing.

Another filter is known from U.S. Pat. No. 6,685,829 B1. This document discloses a filter having an exchangeable filter insert and having a filter bypass valve. A valve seat is provided on the filter insert, here specifically on its lower end plate. A valve body, a spring that preloads the valve body in the closing direction, and a spring support are here realized so as to be fixed to the housing. The valve body is fashioned on a central pipe socket that is fixed to the housing but is capable of displacement in an axially limited manner. The spring is situated as a pressure spring between the pipe socket and the housing.

DE 10 2009 021 973 A1 discloses a further filter having an exchangeable filter insert and having a filter bypass valve. The valve seat, the valve body, the spring, and a first spring support of the filter bypass valve are here parts of the filter insert. On a central pipe socket fixed to the filter, a second spring support is provided that, when the filter insert is placed onto the pipe socket during installation of the filter insert in the filter housing, takes over the supporting of the spring and increases its prestressing.

From U.S. Pat. No. 8,123,937 B2, additional filters are known having an exchangeable filter insert and having a filter bypass valve. The valve seat and the valve body of the filter bypass valve are here each provided on the filter insert, specifically on its upper end plate. A pressure spring that preloads the valve body in the closing direction, and an additional actuating element that, when the filter insert is in place, transmits the spring force to the valve body, are configured so as to be fixed to the housing, specifically in a central supporting element fixed to the housing.

WO2006/112 853 A1 also discloses a filter having an exchangeable filter insert and having a filter bypass valve. Here, the valve seat is provided on the filter insert, specifically on its upper end plate. A valve body, a spring that preloads the valve body in the closing direction, and a spring support are realized so as to be fixed to the housing. Specifically, the valve body and the spring are guided in an upper end region of a central supporting element that is fixed to the housing. The spring support is also fashioned on the supporting element.

In filters of the type described above, in which the valve seat on the exchangeable filter insert and the valve body are realized so as to be fixed to the filter, after each change of filter insert there is a valve mating with interacting valve components that is not checked beforehand for tightness and is also not capable of being checked ahead of time for tightness. In practice, this results relatively frequently in filter bypass valves that are not tight in their closing position, through which, undesirably, there is a constant flow of liquid that is unfiltered and that impairs the purity necessary for the actually intended use of the filtered liquid. The solutions known from the existing art as indicated in the three last-named documents above, in which in addition to the valve seat the valve body is also provided on the exchangeable filter insert, require an additional actuating element, and in part even an additional spring, which disadvantageously increases the number of components and thus the production and assembly costs. Also, in this way the filter inserts require significantly more outlay for their construction, and are therefore more expensive, which has noticeable effects every time the filter insert is exchanged. Finally, the known filters have the disadvantage that the opening pressure of the filter bypass valve can be modified only with a relatively high outlay.

SUMMARY OF THE INVENTION

An object of the present invention is therefore to provide a filter of the type named above that avoids the disadvantages of the existing art and that in particular ensures a good and long-lasting tightness of the filter bypass valve in its closing position, requiring as few components as possible for its functioning and capable of being manufactured at low cost, and with which it is possible to modify the opening pressure of the filter bypass valve with a low technical outlay. Moreover, an object of the present invention includes the provision of a filter insert that works together with the filter, the filter insert also having for its part as simple a design as possible and being capable of being manufactured at low cost, and with which the filter can be operated reliably and with a high degree of effectiveness.

The solution of the first part of the object, relating to the filter, is achieved according to the present invention with a filter of the type named above that is characterized in that the valve seat is situated in the filter so as to be fixed to the filter, that the valve body is guided in the filter so as to be fixed to the filter, that a spring that preloads the valve body in the closing direction is guided in the filter so as to be fixed to the filter, and that the filter insert has a spring support that, when the filter insert is in place in the filter housing, supports and prestresses the spring at its end facing away from the valve body.

The present invention advantageously achieves the effect that the immediately interacting valve parts can be checked for tightness during the manufacture of the filter, because the valve seat and the valve body of the filter bypass valve are both components fixed to the filter, and these valve parts are therefore already present in the filter when the filter insert is not in place. It is additionally advantageous that the valve seat and the valve body of the filter bypass valve always remain in the filter when its filter insert is changed, thereby excluding unchecked and possibly untight valve matings.

A significant further advantage is that it requires only a low outlay to modify the opening pressure of the filter bypass valve, by simply modifying the filter insert with regard to the position or length of the spring support that supports and prestresses the springs. In this way, the springs can be more or less strongly prestressed during installation of the filter insert, which permits a problem-free setting of the desired opening pressure of the filter bypass valve, even during a running series production.

It is also advantageous that the filter bypass valve makes do with only one spring, and, besides the valve body, requires no additional movable actuating elements. Apart from the spring support, the filter insert does not have to accommodate or have any additional parts of the filter bypass valve, so that, as a consumable part, the filter insert remains technically simple and low-cost.

An advantageous embodiment of the filter provides that the filter housing has in its interior a central pipe socket, that the valve seat is fashioned on or attached to the pipe socket, and that the valve body and the spring are guided on the pipe socket. In this embodiment of the filter, the central pipe socket is used for an integrated housing of the filter bypass valve, which advantageously avoids additional required constructive space.

The present invention further proposes that the valve seat is formed by an annular body that is axially fixed on the outer circumference of the pipe socket, and is tightly situated thereon, having at least one through-opening running in its axial direction. In this way, the interior of the pipe socket remains free for the flowing through of filtered liquid.

So that on the one hand an adequately large flow cross-section can be provided for the bypassing of the filter as needed, and on the other hand the annular body can be fashioned so as to be adequately and permanently stable, it is proposed that a plurality of through-openings are made in the annular body, situated at a distance from one another in the circumferential direction thereof.

Preferably, for reasons related to flow and production, the through-openings are made so as to have a cross-section that is round or is shaped as a segment of a ring.

For the reliable and long-lasting ensuring of the desired tightness of the filter bypass valve in its closed position, it is provided that the valve seat formed by the annular body is made of an elastomeric material, or is provided with an elastomeric coating at least on its end face forming the valve seat, or that the valve body is made of an elastomeric material, or is provided with an elastomeric coating at least on its side facing the valve seat.

Corresponding to the above-described realization of the valve seat, the valve body is usefully formed by an annular valve body that is guided on the outer circumference of the pipe socket and is axially displaceable. In this way, the valve body is guided so as to be displaceable in the axial direction in a technically simple yet reliable fashion, and in this way can move between its closing position, situated on the valve seat, and an open position at a distance from the valve seat.

In order to avoid losses of tightness of the filter bypass valve in its closing position that may possibly occur over the time of use of the filter due to a relative rotation of the valve body and the valve seat, a further embodiment of the present invention provides that a guide that guides the valve body on the outer circumference of the pipe socket in axially displaceable fashion forms a lock against a rotation of the valve body in the circumferential direction relative to the pipe socket. Such a lock can for example be realized in a technically simple manner through one or more grooves running in the axial direction on one of the two components, and one or more ribs running therein on the other of the two components.

In order to ensure a tilt-free and clamping-free guiding of the valve body on the pipe socket, a secure sealing of the filter bypass valve in its closing position, and a reliable and precise seating of the valve on the valve body, it is preferably provided that the valve body is made L-shaped in cross-section, having a longer limb of the L running in the axial direction and a shorter limb of the L running in the radial direction pointing outward or inward, an end face, facing the valve seat, of the shorter L limb forming a surface of the valve body that works together with the valve seat, an end face, facing away from the valve seat, of the shorter L limb forming a seating surface and the outer circumference or inner circumference of the longer L limb forming a centering surface for the spring, and the inner circumference of the valve body forming a guide surface for guiding the valve body on the outer circumference of the pipe socket.

The spring support for the spring that preloads the valve body of the filter bypass valve in the closing direction is, according to the present invention, provided on the filter insert, and, in a concrete development, the spring support is preferably formed by a, or on a, supporting element that forms a part of the filter insert, or by an, or on an, end plate of the filter insert. Thus, for the spring support, elements that are already present on or in the filter insert are used, which avoids an additional component outlay.

In order to realize the interaction of the spring and spring support in as secure and reliable a fashion as possible, the present invention proposes that between the free end of the spring support and the end of the spring facing this free end there is situated an intermediate ring that is guided in axially displaceable fashion on the outer circumference of the pipe socket, such that when the filter insert is in place the spring abuts the side of the intermediate ring facing away from the spring support and the spring support abuts the side of the intermediate ring facing away from the spring. Advantageously, the intermediate ring can be realized and shaped differently at its two axial sides, and in particular so as to be adapted optimally to the spring on the one side and to the spring support on the other side.

So that the spring, in its provided position, is held securely even when no filter insert is situated in the filter, a stop is usefully situated on the side of the spring facing away from the valve body, on the pipe socket, such that when the filter insert is in place in the filter housing the end of the spring remote from the valve body has an axial distance from the stop, and when the filter insert is removed from the filter housing the end of the spring remote from the valve body abuts the stop immediately or indirectly.

A first development relating to this provides that the stop is formed by a stop collar situated fixedly on the pipe socket in the axial and circumferential direction, having a collar part that protrudes radially outward having one or more open intermediate spaces distributed around its circumference.

An alternative embodiment provides that the stop is formed by stop tongues situated fixedly on the pipe socket, or made in one piece therewith, in the axial and circumferential direction, each having a radially outward-protruding stop tab, open intermediate spaces existing between each two stop tabs over the circumference of the pipe socket.

In order to prevent installation of unsuitable foreign filter inserts in the filter according to the present invention, it is proposed that the spring support has one or more support arms that are shaped and configured corresponding to the shape and configuration of the open intermediate spaces, and that, when the filter insert is placed into the filter housing, run through the open intermediate spaces and form a key-lock coding with the stop. This achieves the effect that only those filter inserts can be placed into the filter that have the fitting coding, in the form of a particular shape and configuration of the arms. Foreign filter inserts that do not have the required coding either cannot be put in place, because they collide with the collar part, or cannot support the springs, because they do not have the spring support.

In addition, it is proposed that the stop has, on its side facing away from the spring, between each two adjacent intermediate spaces, a respective individual introductory bevel, or two roof-shaped introductory bevels, by which, during installation of the filter insert, the support arms situated thereon of the spring support can automatically be guided into the intermediate spaces. In this way, it is ensured that a mutual finding of support arms and intermediate spaces takes place even without particular attention or operating steps on the part of the installation or maintenance personnel.

In a particularly advantageous embodiment, the filter according to the present invention is realized as a screw-on exchangeable filter, an end face of the filter being fashioned as a connecting flange for connecting the filter to a coupling flange of a device having a circuit for liquid to be filtered, such as an internal combustion engine of a motor vehicle, and an end region of the pipe socket having, in the region of the connecting flange, a screw threading that can be screwed together with a counter-threading in or on the coupling flange. In this embodiment, the filter according to the present invention can be used as a replacement for a conventional screw-on filter cartridge that is only exchangeable as a whole, without having to make any modifications or adaptations at the side of the coupling flange. As determined by the coupling flange, the connecting flange of the filter is shaped so as to fit, for example with a central pipe socket protruding axially from the filter housing. For a coupling flange, as is also known in practice, having an outwardly protruding threaded connector, the filter according to the present invention can of course also be realized having a central pipe socket that is flush with the plane of the connecting flange or is recessed relative thereto.

For example, the screw threading on the end region of the pipe socket is an external threading, and the counter-threading is an inner threading in the coupling flange.

Alternatively, the screw threading on the end region of the pipe socket can be an inner threading, and the counter-threading can be an external threading on a threaded nipple situated on the coupling flange.

At the filter, the pipe socket can be connected fixedly and non-detachably to the filter housing, and the filter housing can, in particular for the purpose of filter maintenance, be capable of being unscrewed from the coupling flange together with the pipe socket as a unit.

Alternatively, the pipe socket can be screwed to the filter housing in detachable fashion, and, after a first screwing of the filter onto the coupling flange, the pipe socket can remain permanently connected to the coupling flange, so that subsequently the filter housing can be screwed off from the coupling flange without the pipe socket.

In an embodiment of the filter, the pipe socket is made in one part or in one piece.

Alternatively, the pipe socket can be formed from two pipe socket segments that can be detachably connected to one another, in particular screwed together.

For the two-part realization of the pipe socket, it is preferably further provided that a first, flange-side pipe socket segment has or bears the valve seat, the valve body, and the spring, and, after a first screwing of the filter onto the coupling flange, remains permanently connected thereto, and that a second pipe socket segment remote from the flange is connected fixedly and non-detachably to the filter housing.

In order to prevent the filter from running empty when there is a standstill of the liquid circuit, it is proposed that the first pipe socket segment at the flange side has or bears a return check valve covering the inlet of the filter.

Here, in a further embodiment, the return check valve can have a flexible valve membrane and a rigid membrane bearer, each surrounding the flange-side pipe socket segment, and the membrane bearer can be fashioned in one piece with the first pipe socket segment, or can be connected thereto in positionally fixed fashion, preferably locked. Alternatively, the membrane bearer can be a flange-type expansion of the valve seat, i.e., a part of the filter bypass valve. In this way, in each of the named embodiments a space-saving housing and technically simple integration of the return check valve is achieved.

In addition, when the filter insert is in place in the filter the valve membrane is usefully clamped at its radially inner edge region against the membrane bearer by the filter insert, in particular by a sealing ring situated radially inwardly thereon. In this way, particular holding means for the valve membrane are advantageously not required.

Many filters of the type considered here have a screw cover as a part of a filter housing, or have a screw-on housing. For safe operation that does not damage the environment, it is essential that the screw cover or the screw-on housing not become detached automatically during operation of the filter. For filters according to the present invention in which the filter housing is fashioned as a screw-on housing or has a screw cover, it is therefore provided that the filter is provided with an anti-rotational lock, an anti-rotational lock ring being guided in axially displaceable fashion in the filter housing on the pipe socket, such that when the filter insert is in place in the filter housing, the spring presses the anti-rotation lock ring, with its end face facing away from the spring, against a counter-surface of the filter housing or of the screw-on housing or screw cover. In this way, an additional very advantageous use of the spring is achieved, because the spring not only preloads the valve body of the filter bypass valve in its closing direction, but now additionally also loads an anti-rotational lock ring with a force required for its securing effect.

In order not to have to install a separate component in the filter for the anti-rotation lock ring, the anti-rotation lock ring is preferably connected to a supporting element forming a part of the filter insert, or is made in one piece therewith.

A development of the filter provides that the end face, facing away from the spring, of the anti-rotation lock ring and the counter-surface of the filter housing each have a contour that varies in its axial height, regarded in the circumferential direction, and that interlock. This has the effect that when the filter housing or screw cover or screwed-on housing is unscrewed, a certain specifiable resistance has to be overcome in order to rotate the interlocking contours relative to one another. By choosing a sufficiently high resistance that still however permits an intentional unscrewing, an undesired automatic unscrewing is prevented.

In addition, here it is preferably provided that an upward incline running in the unscrewing direction is steeper than a downward incline running in the screw-on direction of the interacting contours. In this way, advantageously the torque that has to be applied for loosening is greater than the torque required for tightening. Here, the degree of this difference can be influenced and determined by the difference between the mentioned upward incline and the mentioned downward incline. The interacting contours can for example be realized so as to be wave-shaped, or as a sequence of bevels, also with flat segments situated between them.

Because the spring support that prestresses the spring of the filter bypass valve is a part of the filter insert, it has to be ensured that during operation of the filter the filter insert assumes a defined position in the filter housing, seen in the axial direction, because otherwise an incorrect prestressing of the spring, and thus a wrong opening pressure of the filter bypass valve, would occur. Therefore, in this regard the present invention proposes that the filter housing has, in its circumferential wall, an inner diameter step against which the filter insert can abut with its flange-side end plate during its introduction into the filter housing, for axial positioning.

Filters of the type considered here as a rule require maintenance, because the useful life of the filter insert is limited, and the insert has to be replaced from time to time. In order to ensure that, during each filter maintenance including a change of filter insert, the seal that seals the filter against the coupling flange is also replaced, it is preferably provided that a sealing ring bearer is radially outwardly connected or made in one piece with a flange-side end plate of the filter insert, on which there is attached, or there can be attached, a sealing ring that seals the filter against the coupling flange of the device having a circuit having liquid to be filtered.

So that, when the filter is attached on the coupling flange, the sealing ring can move into its sealing position without being forced, it is provided that the sealing ring bearer has a cylindrical outer circumferential surface on which the sealing ring is attached or can be attached in an axially floating fashion.

A first configuration which is advantageous functionally and from the point of view of manufacturing results if the filter bypass valve is situated at the height of a first axial end of the filter insert.

A second configuration which is advantageous functionally and from the point of view of manufacturing results if the filter bypass valve is situated at the height of a second axial end of the filter insert.

Particularly preferably, the filter bypass valve is situated in the region of the end of the filter insert that is the upper end during operation of the filter, because there the least possible amount of disturbing deposition of dirt particles on the parts of the filter bypass valve is to be expected.

In a further preferred embodiment of the filter according to the present invention, it is provided that it is realized as a screw-on exchangeable filter, the filter being fashioned for connection with a coupling flange of a device having a circuit having liquid to be filtered, the filter having a flange-side base plate having a screw threading that can be screwed together with a counter-threading in or on the coupling flange, and the filter bypass valve being situated in a valve holder that forms a part of the base plate or is connected to the base plate. In this embodiment as well, a compact construction and advantageous manufacturability are achieved.

In a further embodiment, here it is provided that the filter housing is realized as a screw housing having a screw threading on its flange-side end region, by which the filter housing can be screwed onto a screw threading situated radially outwardly on the base plate.

It is further proposed that after a first assembly of the filter on the coupling flange the filter housing can be unscrewed from the base plate together with the filter insert for filter maintenance, and that the base plate with the valve holder and the filter bypass valve on the coupling flange are remaining parts of the filter. During filter maintenance, only the filter insert is replaced, while the filter bypass valve is fixed to the filter, i.e., is a part of the filter that is permanent over the lifespan of the filter.

A development provides that the valve holder is made closed at its circumference, and has on its end face remote from the flange at least one stop for the spring in its state relieved of stress by the spring support of the filter insert, and at least one passage for filtered liquid. In this way, the spring is secured against loss, and at the same time permits a flow of filtered liquid through the valve holder.

In order to prevent a disturbing or damaging entrance of dirt particles into the outlet for filtered liquid during filter maintenance with exchange of the filter insert, it is proposed that there be situated between the spring and the passage a covering element loaded by the spring in the direction toward the passage, such that in the assembled state of the filter the spring support situated on the filter insert supports the spring via the covering element, and the covering element closing the passage when the filter insert is removed.

In order to prevent an emptying of the filter when the liquid circuit is at a standstill in the filter embodiments having a base plate as well, at least one eccentric through-opening forming the inlet of the filter is usefully made in the base plate, and on the side of the base plate remote from the flange there is situated a return check valve that covers the inlet, the return check valve having a circular valve membrane that covers the inlet and that is clamped, at its radially inner edge region, between the base plate and the valve holder connected to the base plate. In addition, here, advantageously, no particular fastening and holding means for the valve membrane are required.

So that the filter can be manufactured at low cost in large piece counts and has as low a weight as possible, preferably both the base plate and the filter housing of the filter are parts made of plastic. Usefully, these parts are manufactured as specifically shaped injection-molded parts requiring no further cutting processing. Alternatively, the base plate and/or the filter housing can also be parts made of metal, e.g., shaped plate parts made of steel plate, or die-cast parts, preferably made of light metal.

In order to make it possible to prestress the spring of the filter bypass valve reliably and in a technically simple manner, it is preferably provided that the spring support is formed by a plurality of support arms connected to a central supporting element of the filter insert or made in one piece therewith, extending into the valve holder when the filter insert is in place in the filter. Alternatively, the spring support can also be made in annular fashion in order to provide as large a contact surface as possible to the spring of the filter bypass valve.

For the purpose of the greatest possible prevention of the use of unsuitable or lower-quality foreign filter inserts in the filter according to the present invention, the present invention proposes that the valve holder has, for each support arm, an introduction opening that is matched in its position and shape, and that the support arms and the introduction openings form with one another a key-lock coding that allows installation only of the filter insert having support arms positioned and shaped with the correct fit to the introduction openings. The support arms and the associated introduction openings can have the same design as one another. Alternatively, the support arms can be made differently from one another and the associated introduction openings can correspondingly also be made different from one another in order to achieve a key-lock coding that presents a still greater obstacle to the use of foreign filter inserts.

In order to protect the support arms of the spring support from forces that occur during the positioning of the support arms relative to the introduction openings and that could cause damage, the present invention proposes that in addition to the support arms forming the spring support the filter insert has first positioning elements, that the valve holder has second positioning elements in addition to the introduction openings, and that, when placed into the filter, the filter insert can be guided by the first and second positioning elements into a position in the circumferential direction that is ready for engagement of its support arms relative to the introduction openings of the valve holder.

According to a development in this regard, the positioning elements are preferably formed by at least one introductory bevel, having a subsequent axial introduction groove on the one hand, and at least one introduction projection or axial introduction rib on the other hand.

In order to make it possible to manufacture the valve holder advantageously with regard to technology and cost, and to secure the parts housed therein of the filter bypass valve in the valve holder, it is provided that the valve holder is fashioned in two parts, having a first holder part connected to the base plate and having the valve seat, and having a second holder part connected to the first holder part and situated remote from the valve seat. The first holder part is preferably connected fixedly to the base plate, e.g., by welding. The holder parts are preferably locked to one another, because such a locking connection requires little outlay during manufacture, and can easily be produced during assembly.

For the above-described embodiment of the filter, it is also preferably provided that the counter-threading in or on the coupling flange is situated as an outer threading on a threaded nipple that protrudes from the plane of the coupling flange and forms a part of the coupling flange.

In a different embodiment of the filter, it is provided that it is realized as a screw-on exchangeable filter, the filter being fashioned for connection to a coupling flange of a device having a circuit having liquid to be filtered, the filter housing having at the flange side a screw threading that can be screwed together with a counter-threading in or on the coupling flange, the filter bypass valve being situated in a valve holder having a hollow cylindrical end piece at the flange side, and the end piece being capable of being pressed into a filtered liquid channel of the coupling flange before or during a first assembly of the filter on the coupling flange. In this way, a very simple and rapid connection of the valve holder containing the filter bypass valve to the coupling flange is achieved, the valve holder remaining permanently on the coupling flange after this connection is produced. Only the filter housing can be screwed off from the coupling flange, together with the filter insert situated therein which here as well has the spring support for prestressing the spring of the filter bypass valve.

So that when the filter is open, i.e., the filter housing is disassembled and the filter insert is removed, the spring of the filter bypass valve cannot be lost, but at the same time filtered liquid can flow through the valve holder, it is provided that the valve holder is made closed at the circumference and has on its end face remote from the flange at least one stop for the spring, in its state in which it is not loaded by the spring support of the filter insert, and has at least one passage for filtered liquid.

In order, in this embodiment of the filter as well, to prevent dirt particles from falling into the outlet for filtered liquid when the filter insert is exchanged, a covering element, loaded by the spring in the direction toward the passage, is usefully situated between the spring and the passage, such that in the assembled state of the filter the spring support situated on the filter insert supports the spring via the covering element, and such that the covering element closes the passage when the filter insert is removed. When the filter insert is in place in the filter, its spring support holds the covering element in a position removed from the passage, so that a flow of liquid through the passage to the outlet of the filter is then enabled.

In order to achieve the second part of the object, a filter insert that works together with the filter of the type described above is proposed that is characterized in that it has a spring support, and that when the filter insert is in place in the filter housing the spring of the filter bypass valve can be supported and can be prestressed, at its end facing away from the valve body, by the spring support of the filter insert.

With such a filter insert, the filter according to the present invention can be operated in a manner corresponding to its purpose and with the advantages explained above, such that, by means of the spring support on the filter insert, the spring of the filter bypass valve in the filter can be prestressed, and thus, by means of corresponding realization of the filter insert, the desired opening pressure of the filter bypass valve can be defined without having to modify or exchange other parts of the filter for this purpose.

On the filter insert, the spring support is preferably fashioned by a, or on a, supporting element that forms a part of the filter insert. As a rule, the filter insert already has a supporting element that supports the filter material body during operation of the filter against collapsing as a result of pressure differences between its two sides. Thus, here the supporting element is beneficially additionally used for the integration of the spring support.

Alternatively, the spring support can be formed by an end plate of the filter insert, or can be provided on an end plate of the filter insert.

The filter insert can advantageously be manufactured in various embodiments, in particular having different axial length or position of its spring support, whereby a prestressing of the spring, and thus the opening pressure of the filter bypass valve of the filter equipped with the filter insert, can be set to a desired value. It is particularly advantageous that, as needed, the opening pressure of the filter bypass valve can also still be modified later by exchanging the filter insert for one having a different spring support length or spring support position, without having to make any modifications to the filter itself.

In order to prevent an installation of foreign filter inserts in the filter according to the present invention, for the filter insert it is further proposed according to the present invention that the spring support has a plurality of support arms that are shaped and configured corresponding to the shape and configuration of the open intermediate spaces in the stop or of the introduction openings in the valve holder of the associated filter, such that when the filter insert is placed into the filter housing the support arms can be guided through the open intermediate spaces or introduction openings, and the support arms forming a key-lock coding with the open intermediate spaces or with the introduction openings. In this way, only one particular matched filter insert can be put in place in a particular filter, which prevents the use of non-fitting, and often qualitatively lower-value, foreign filter inserts.

Finally, for the filter insert according to the present invention it is proposed that it has, in addition to the support arms forming the spring support, first positioning elements, and that by means of the first positioning elements and by means of second positioning elements cooperating therewith and provided on the valve holder in addition to the introduction openings, when the filter insert is placed into the filter it can be guided into a position in the circumferential direction of its support arms ready for engagement relative to the introduction openings of the valve holder. In this way, the support arms can be made relatively delicate, because they have to exert only axial forces on the spring or on the covering element. In contrast, the support arms are completely relieved of the stress of forces acting in the circumferential direction, such as those that occur during the positioning of the filter insert relative to the filter bypass valve or to its valve holder, because these forces are accepted only by the positioning elements. The support arms on the one hand and the positioning elements on the other hand can therefore each be optimally contoured and dimensioned for their respective purpose, which promotes durability and operational reliability.

BRIEF DESCRIPTION OF THE DRAWINGS

In the following, exemplary embodiments of the present invention are explained on the basis of a drawing.

DETAILED DESCRIPTION OF THE PREFERRED EMBODIMENTS

Figure 1:
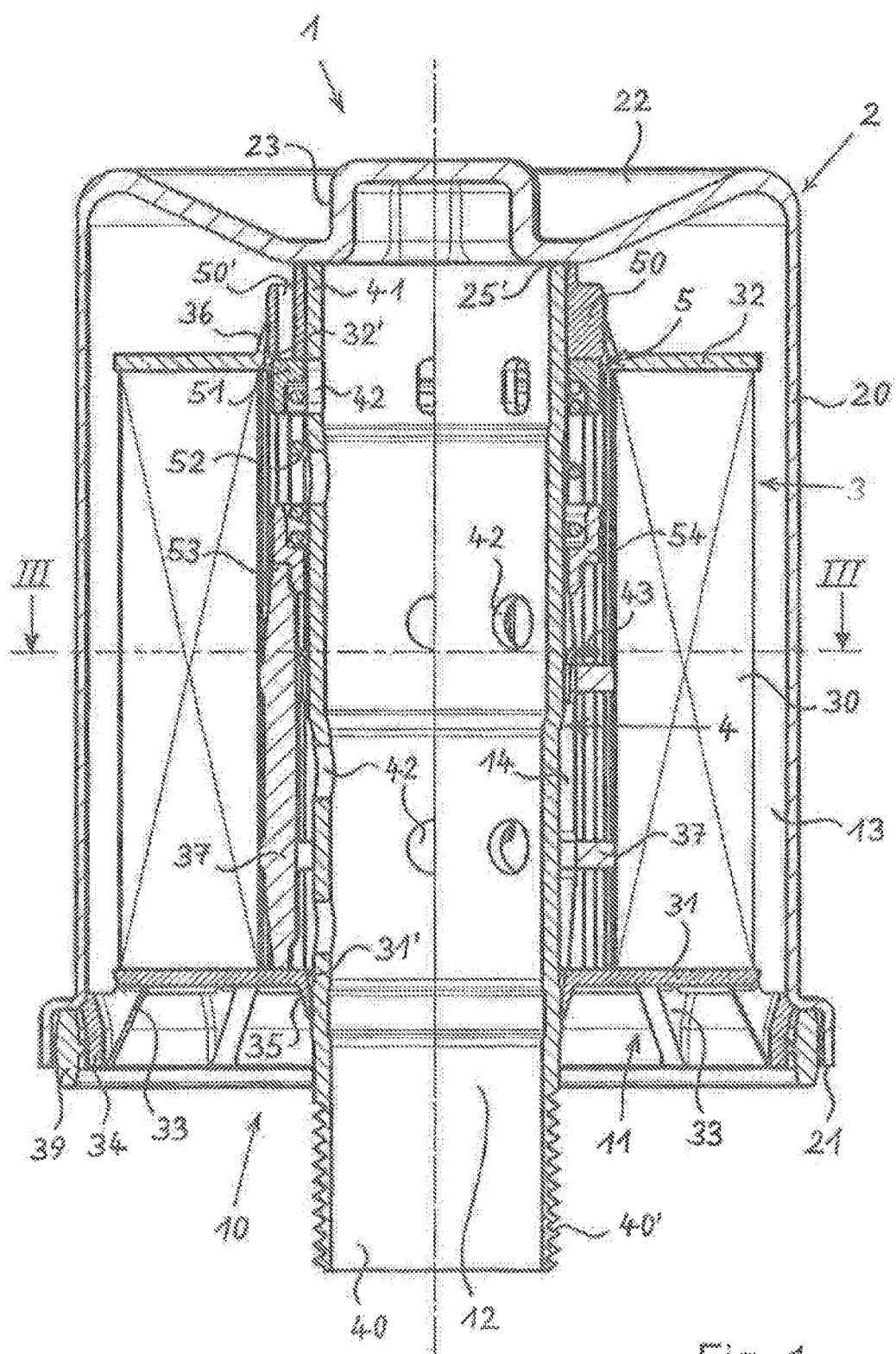
FIG. 1 shows a first filter having an exchangeable filter insert and having a filter bypass valve, in an angled longitudinal section.

In the following description of the Figures, identical parts in the various Figures of the drawing have always been provided with the same reference characters, so that not every reference character has to be explained again in every Figure.

FIG. 1 of the drawing shows an exemplary embodiment of a filter 1, realized as a screw-on exchangeable filter, and shown here in longitudinal section. Filter 1 has an essentially cup-shaped filter housing 2 having a circumferential wall 20, having an open end face 21, here pointing downward, and a closed end face 22, here pointing upward. In the center of upper end face 22 a tool mount projection 23, such as a hexagon, is integrally formed, on which a screw tool can be placed.

Through the interior of filter 1 there runs a central pipe socket 4 whose outer, here lower, end region 40 protrudes from filter housing 2 in the axial direction, and is provided there with an outer screw threading 40'. On its inner, here upper, end region 41, pipe socket 4 abuts the underside of upper end face 22 of filter housing 2. Here, in the depicted exemplary embodiment pipe socket 4 is fixedly connected to filter housing 2, for example by welding along a weld seam 25'. For this purpose, filter housing 2 and pipe socket 4 are for example made of steel plate. In its region situated inside filter housing 2, pipe socket 4 has a plurality of perforations 42 distributed in the circumferential and longitudinal direction.

In addition, in filter housing 2 of filter 1 there is situated an exchangeable filter insert 3 that is made up of a hollow cylindrical filter material body 30 and two end plates 31 and 32 enclosing said body at the ends. Each end plate 31, 32 has a central perforation 31'. 32', so that filter insert 3 can be placed onto pipe socket 4 from below, and in this way can be introduced into the interior of filter housing 2. Moreover, on the inner circumference of filter material body 30 there is situated an inner grid-type support body 37 for the radial supporting of filter material body 30 when liquid to be filtered flows through it in the radial direction from the outside to the inside.

In addition, filter 1 has an integrated filter bypass valve 5, which here is situated at the height of upper end plate 32 of filter insert 3. Filter bypass valve 5 has a valve seat 50 that is fashioned as an annular element, and is attached tightly on the outer circumference of inner and region 41 of pipe socket 4. A plurality of axial through-openings 50', of which only one is visible in FIG. 1, run through valve seat 50 fashioned as annular element.

A likewise annular valve body 51 works together with valve seat 50, said valve body being guided in axially displaceable fashion underneath valve seat 50, on the outer circumference of pipe socket 4. Valve body 51 is preloaded in the direction toward valve seat 50, and thus in the closing direction of filter bypass valve 5, by a spring 52 realized as a helical pressure spring. At its end oriented away from valve body 51, spring 52 is supported by filter insert 3. For this purpose, filter insert 3 has, in the depicted exemplary embodiment, a spring support 53 that here has the form of four protruding support arms 53' that run upward in the axial direction and that are fashioned in one piece with inner supporting element 37. This spring support 53 supports spring 52 at its lower end via an intermediate ring 54 that is guided in axially displaceable fashion on the outer circumference of pipe socket 4.

The force with which spring 52 acts on valve body 51 in the closing direction is thus determined, inter alia, by spring support 53, here specifically by its axial length or axial position. This offers the advantageous possibility of easily modifying the opening pressure of filter bypass valve 5, by installing into filter 1 a filter insert 3 having a correspondingly modified spring support 53. A larger axial length of spring support 53 results in a higher prestressing of spring 52, and thus to a higher opening pressure of filter bypass valve 5. Conversely, a shorter axial length of spring support 53 results in a reduced prestressing of spring 52, and thus to a lower opening pressure of filter bypass valve 5.

Finally, on the outer circumference of pipe socket 4, underneath spring 52, a stop 43 is also situated in axially non-displaceable fashion, and so as to be incapable of rotation in the circumferential direction, the stop here being formed by a sheet metal part and for example pressed onto pipe socket 4. Distributed around its circumference, stop 43 has a plurality of openings or open intermediate spaces (not visible in FIG. 1) 44, through each of which there runs a respective support arm 53' of spring support 53. Here, intermediate spaces 44 and support arms 53' of spring support 53 form with one another a key-lock coding that permits only the placement of a fitting filter insert 3, matched to the coding, into filter 1.

Filter insert 3 separates an unfiltered side 13 of filter 1, situated outside filter insert 3, from a filtered side 14 of filter 1, situated in the interior of filter insert 3 and of pipe socket 4. For the sealing of filter insert 3 against pipe socket 4 onto which filter insert 3 is placed, filter insert 3 has on its lower end plate 31 a sealing lip 35 that radially outwardly encloses perforation 31', and likewise has on its upper end plate 32 a sealing lip 36 that radially outward encloses perforation 32'.

Lower end face 21 of filter 1 is fashioned as connecting flange 10, which can be brought into a detachable connection with a coupling flange on a device having a circuit having liquid such as lubricant oil that is to be filtered, such as an internal combustion engine, using threading 40' of pipe socket 4. Radially external to outer end region 40 of pipe socket 4 there is situated an inlet 11 through which the liquid to be filtered can flow from below to above into unfiltered side 13 of filter 1. The interior of pipe socket 4 forms an outlet 12 for filtered liquid.

In order to seal the flange connection between filter 1 and the associated device not shown in FIG. 1, such as an internal combustion engine, a sealing ring 39 is used that is situated on lower end face 21 of filter 1. Here, sealing ring 39 is held by a sealing ring bearer 34 that is situated circumferentially radially inward from sealing ring 39. Here, sealing ring bearer 34 is made in one piece with lower end plate 31 of filter insert 3, and is connected to end plate 31 via connecting webs 33 that are situated at distances from one another, seen in the circumferential direction. Inlet 11 for liquid to be filtered runs through the intermediate spaces between connecting webs 33.

In normal operation of filter 1, the liquid to be cleaned, such as lubricant oil of an internal combustion engine, runs through inlet 11 fashioned on lower end face 21 to unfiltered side 13 of filter 1, and from there runs through filter material body 30 to filtered side 14 of filter 1, situated radially inwardly from the filter material body. From there, the filtered liquid moves through perforations 42 in pipe socket 4 into its interior, and flows out downward through the interior, through outlet 12. Here, filter bypass valve is in its closed position, as shown in FIG. 1.

The spatial orientation of filter 1 does not play a role in its operation; filter 1 can be used in any spatial position. The orientation shown in the drawing is given only as an example. Preferably, however, the filter realization according to FIG. 1 is a standing configuration in which filter bypass valve 5 is situated at the top in the filter. In this way, a deposition of dirt particles on the parts of filter bypass valve 5, which could possibly disturb the functioning, is avoided to the greatest possible extent. In this way, dirt particles that have previously settled in the lowest region of the filter on its unfiltered side 13 are also prevented from being carried along to filtered side 14 when filter bypass valve 5 is open.

If an impermissibly high pressure difference, above a specifiable boundary value, occurs between unfiltered side 13 and filtered side 14 of filter 1, this has the result that the liquid at unfiltered side 13 acts, through through-openings 50', on valve body 51 so strongly that the valve body is moved away from valve seat 50, against the force of spring 52, thus opening filter bypass valve 5. In this state, a flow path for the liquid is released that bypasses filter material body 30, going from unfiltered side 13 through through-openings 50' to filtered side 14, and through perforations 42 into the interior of pipe socket 4, i.e., to outlet 12 of filter 1. If the pressure difference decreases below the boundary value, the force of spring 52 again predominates, and filter bypass valve 5 closes.

Figure 2:
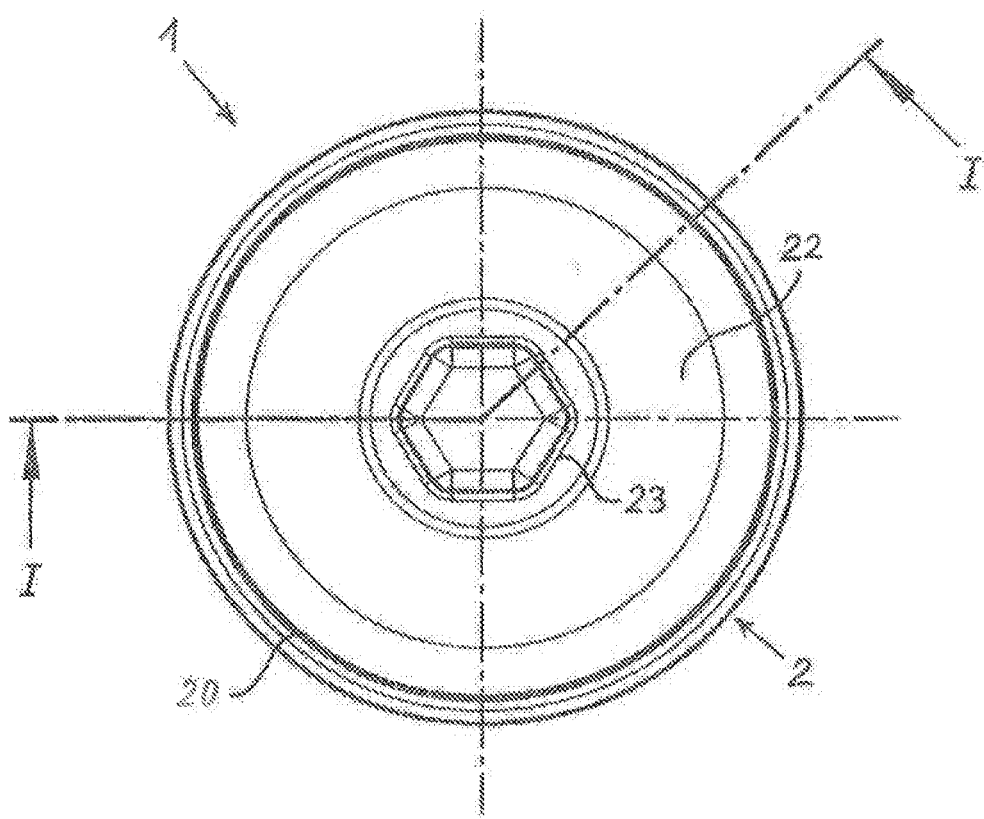
FIG. 2 shows the filter of FIG. 1 in a top view, with the sectional line I-I for FIG. 1.

FIG. 2 of the drawing shows filter 1 of FIG. 1 in a top view, and sectional line I-I of the longitudinal section shown in FIG. 1 is also shown in FIG. 2. Visible here is only filter housing 2. Facing the viewer is the upper end face 22, remote from the flange, of filter housing 2 having central tool attachment projection 23. Circumferential wall 20 of filter housing 2 runs circumferentially.

Figure 3:
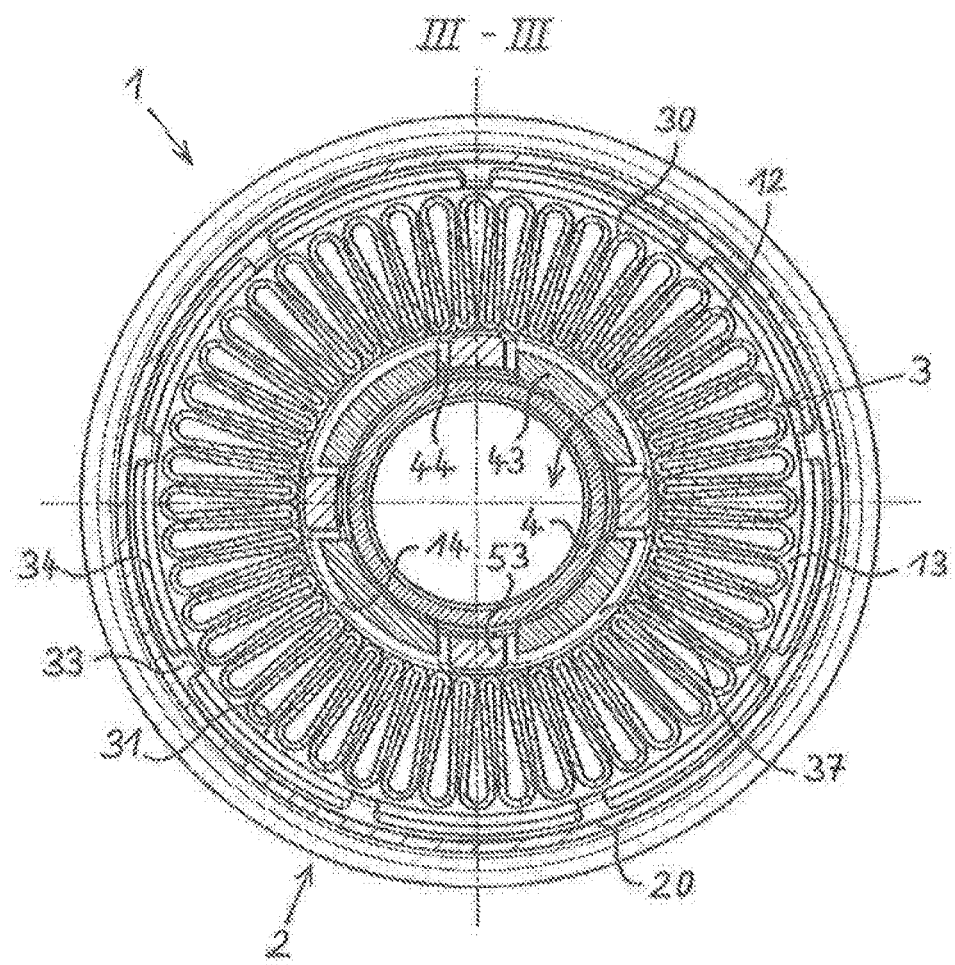
FIG. 3 shows the filter of FIG. 1 in cross-section according to the sectional line III-III in FIG. 1.

In FIG. 3, filter 1 of FIG. 1 is shown in cross-section. Circumferential wall 20 of filter housing 2 runs radially externally. In the interior of housing 2 there is situated filter insert 3 with filter material body 30, formed by a filter material strand arranged in folds. Underneath filter material body 30 is situated lower end plate 31 of filter insert 3, to which plate sealing ring bearer 34 is connected in one piece via connecting webs 33.

Radially inwardly from filter material body 30, inner supporting element 37 is situated, having spring support 53 in the form of the four support arms 53' running in the axial direction. Between support arms 53' of spring support 53, stop 43 is visible, with the open intermediate spaces 44 provided therein for support arms 53' of spring support 53. The radially innermost part is formed by central pipe socket 4, at whose lower inner end outlet 12 is situated.

Figure 4:
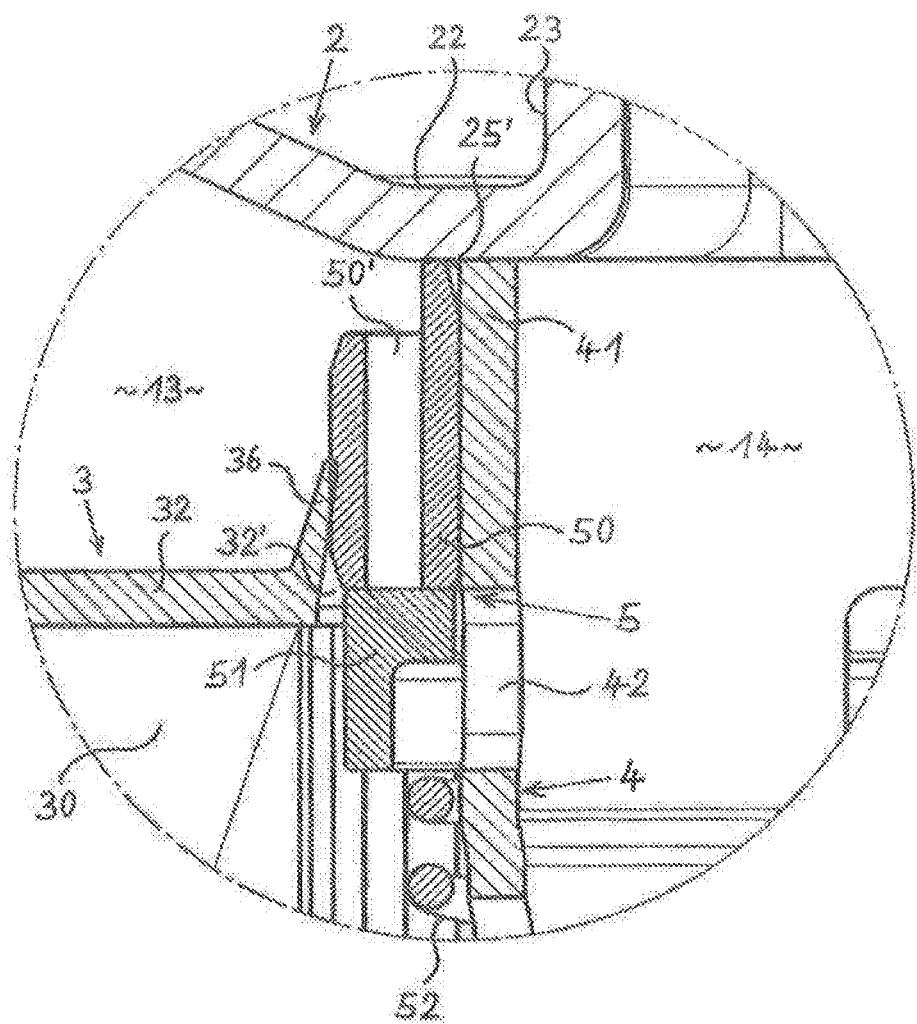
FIG. 4 shows an enlarged detail of the filter of FIG. 1 with the filter bypass valve in the closed position.
Figure 5:
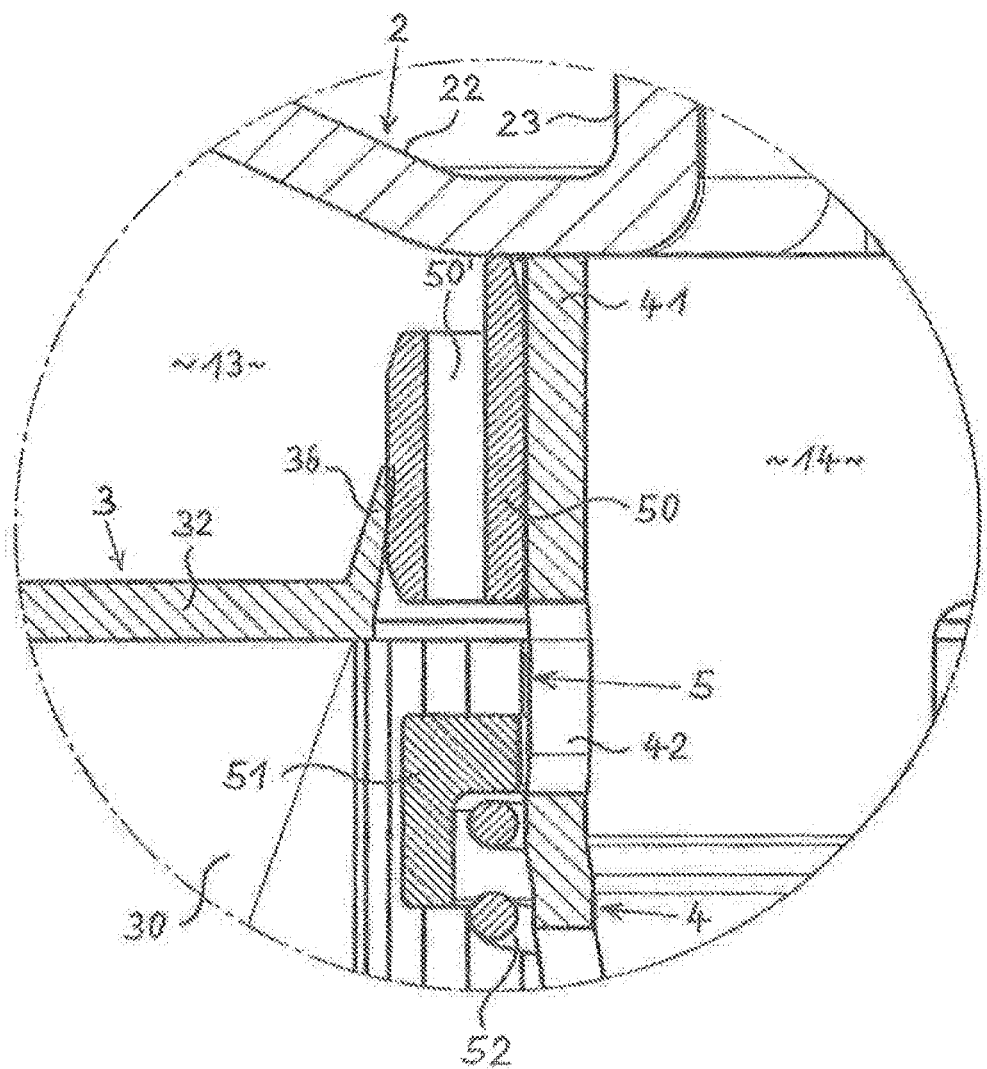
FIG. 5 shows the same detail as FIG. 4, here with the filter bypass valve in the open position.

FIGS. 4 and 5 show an enlarged detail of filter 1 with filter bypass valve 5 according to FIG. 1, shown in FIG. 4 in the closed position and in FIG. 5 in the open position.

At the top in FIGS. 4 and 5, a part of upper end face 22 of filter housing 2 having tool attachment projection 23 can be seen. Central pipe socket 4 is welded, with its inner end region 41, to the underside of end face 22, and runs downward from there.

In the left part of FIGS. 4 and 5, a small part of filter insert 3 can be seen having filter material body 30 and upper end plate 32 with its sealing lip 36, which abuts outer circumference of valve seat 50 in sealing fashion and here separates unfiltered side 13 from filtered side 14 of filter 1.

Valve seat 50, having the shape of an annular element, is fixedly and tightly attached on the outer circumference of inner end region 41 of pipe socket 4. Through-openings 50' run through valve seat 50 in the axial direction.

Axially underneath valve seat 50 is situated valve body 51, also realized in the form of an annular element, guided displaceably in the axial direction on the outer circumference of pipe socket 4. Valve body 51 is preloaded with a force acting in the closing direction by spring 52, situated underneath valve body 51. As long as the pressure difference between unfiltered side 13 and filtered side 14 does not exceed a specifiable boundary value, spring 52 holds valve body 51 in liquid-tight seating on valve seat 50, and a flow of liquid from unfiltered side 13 to filtered side 14 is possible only by flowing through filter material body 30 of filter insert 3.

FIG. 5 shows the open state of filter bypass valve 5, which occurs when the pressure difference between unfiltered side 13 and filtered side 14 exceeds the specified boundary value. In this case, the force exerted in the opening direction through through-openings 50' on valve body 51 by the liquid situated at unfiltered side 13 is greater than the force exerted in the closing direction on valve body 51 by spring 52. Valve body 51 is now removed from valve seat 50 through displacement downward in the axial direction, thus releasing a flow path for the liquid from unfiltered side 13 to filtered side 14 through through-openings 50' and perforations 42 of central pipe socket 4, bypassing filter material body 30. In this way, impermissibly large pressure differences between unfiltered side 13 and filtered side 14 can be avoided, which occur for example when the liquid to be filtered is viscous as a result of low temperature, and/or when filter material body 30 is clogged with dirt particles.

Figure 6:
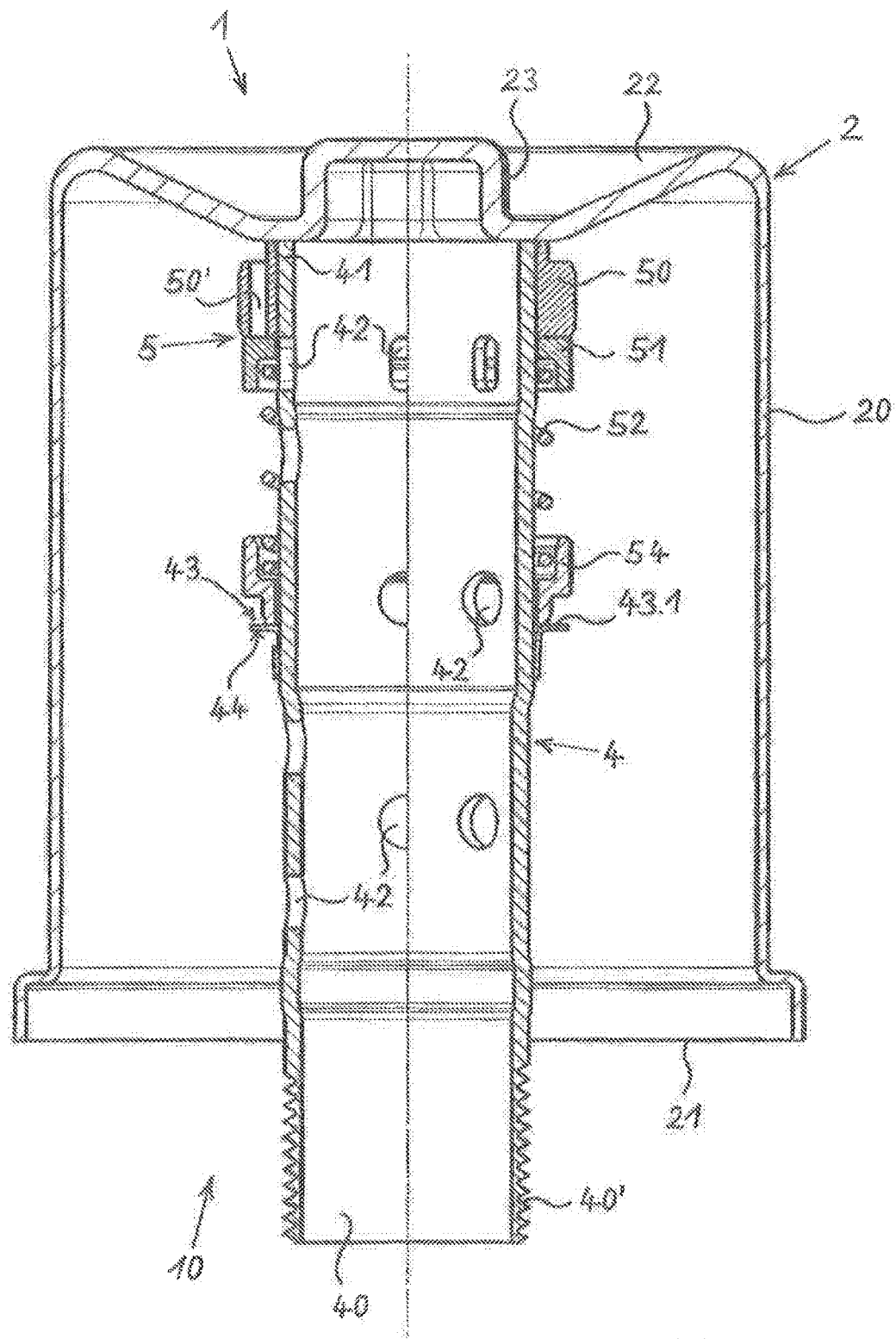
FIG. 6 shows the filter of FIG. 1 without filter insert, in longitudinal section.

FIG. 6 shows filter 1 in a state with filter insert 3 removed, again in longitudinal section as in FIG. 1. The outer cladding of filter 1 forms filter housing 2 with its circumferential wall 20 and its closed upper end face 22 on which tool attachment projection 23 is integrally formed.

In the interior of housing 2 there is situated central pipe socket 4, which is connected with its upper end region 41 fixedly and tightly to the underside of upper end face 22 of filter housing 2.

All parts of filter bypass valve 5, with the exception of spring support 53, which forms a part of filter insert 3, are situated on central pipe socket 4. At the very top on pipe socket 4, annular valve seat 50, having through-openings 50', is externally seated in positionally fixed and liquid-tight fashion. Under it is situated axially displaceable valve body 51, also annular in shape, which here is seated in sealing position on the underside of valve seat 50 and seals through-openings 50'. Valve body 51 is brought into this closing position by spring 52, whose lower end abuts axially displaceable intermediate ring 54. Here, because intermediate ring 54 is now not loaded by spring support 53 of filter insert 3, intermediate ring 54 is supported on stop 43, which is attached non-displaceably and non-rotatably on the outer circumference of pipe socket 4, for example pushed on with a press fit. In this way, all axially displaceable parts of filter bypass valve 5, namely valve body 51, spring 52, and intermediate ring 54, are held captive on pipe socket 4.

In order to install filter insert 3 into filter 1, according to FIG. 6 filter insert 3 is pushed into filter housing 2 from the open end face 21. By rotating filter insert 3 in the circumferential direction, support arms 53' of spring support 53 are brought into coincidence with open intermediate spaces 44 of stop 43, so that support arms 53' then pass through intermediate spaces 44, and, upon further pushing in of filter insert 3, move into abutment on intermediate ring 54. Filter 1 completed in this way can then be screwed, with its connecting flange 10, onto a coupling flange of an associated device. Here, during the screwing on filter insert 3 is pressed still further into filter housing 2, thereby simultaneously tensioning spring 52. At the end of this screw-on process, sealing ring 39 seals the flange connection, and spring 52 has reached its target prestressing.

Figure 7:
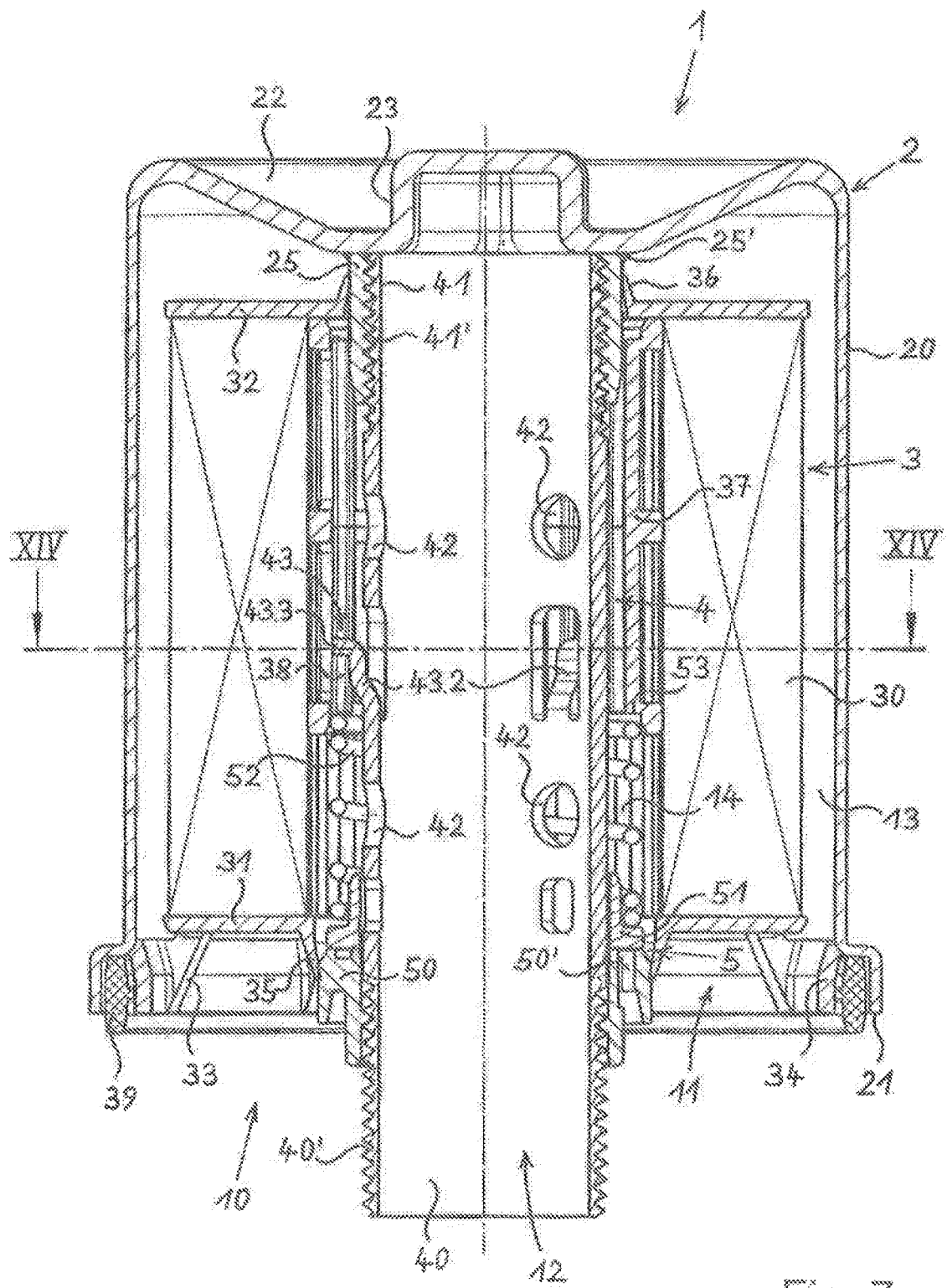
FIG. 7 shows the filter in a second embodiment, in the delivered state, in longitudinal section.

FIG. 7 shows filter 1 in a second embodiment, in the delivered state, in longitudinal section. Filter 1 here as well has a cup-shaped filter housing 2 having a circumferential wall 20 having an open (here lower) end face 21 and a closed (here upper) end face 22 in whose center a tool attachment projection 23 is integrally formed. A threaded connector 25, situated concentric to circumferential wall 20 and protruding into the interior of filter housing 2, is fixedly connected to upper end face 22 of filter housing 2, here welded by a weld seam 25'. For this purpose, filter housing 2 and threaded connector 25 are made of steel plate, housing 2 preferably being a deep-drawn part.

In addition, a central pipe socket 4 is situated concentric to circumferential wall 20 in the interior of filter housing 2, the pipe socket being provided in its inner (here upper) end region 41 with an outer threading 41' by which pipe socket 4 is screwed into threaded connector 25.

In its outer (here lower) end region 40, pipe socket 4 has an outer threading 40' by which filter 1 can be screwed onto a coupling flange of an associated device (not shown here) such as an internal combustion engine of a motor vehicle. In its region between outer end region 40 and inner end region 41, pipe socket 4 has a plurality of perforations 42 distributed in the circumferential and axial direction. Moreover, pipe socket 4 here has three stops 43, distributed approximately in its longitudinal center around its circumference. Here, each stop 43 is formed by a stop tongue 43.2 pressed in one piece from the material of pipe socket 4, having a stop tab 43.3 pointing outward in the radial direction.

A filter insert 3 is pushed from below onto the outer circumference of pipe socket 4 and threaded connector 25. Filter insert 3 is made up of a hollow cylindrical filter material body that is enclosed at the ends by a lower end plate 31 and an upper end plate 32. Each end plate 31, 32 has a central perforation 31', 32', each having an associated sealing lip 35, 36. A grid-type supporting element 37 is situated radially inwardly from filter material body 30.

A sealing ring bearer 34 is connected in one piece to lower end plate 31 via connecting webs 33, the bearer bearing a circumferential sealing ring 39. In the unloaded state, sealing ring 39 protrudes outwardly, here downward, in the axial direction, past lower end face 21 of filter housing 2, and, in the assembled state of filter 1, seals the filter against an associated coupling flange.

Finally, filter 1 according to FIG. 7 includes another filter bypass valve 5 that here is situated in the lower region of filter housing 2 at the height of lower end plate 31 of filter insert 3 on pipe socket 4. A valve seat 50 is formed by an annular body situated tightly on pipe socket 4, having through-openings 50' adjacent to one another in the circumferential direction and running in the axial direction. In the assembled state of filter 1, valve seat 50 is fixed in the axial direction and in the circumferential direction. An annular valve body 51 that can be displaced on pipe socket 4 works together with valve seat 50, the valve body being preloaded in the closing direction of filter bypass valve by a spring 52 in the form of a helical pressure spring 5. The end of spring 52 facing away from valve body 51 is supported by a spring support 53 that is fashioned on supporting element 37, more precisely on the lower end of its axial struts 38. In FIG. 7, filter bypass valve 5 is shown in its closing position. Here, valve body 51 abuts valve seat 50 in sealing fashion, and seals through-openings 50' present therein.

The side of filter 1 pointing downward in FIG. 7 forms a connecting flange 10 for connecting filter 1 to an associated coupling flange. Radially outwardly from protruding lower end region 40 of central pipe socket 4, an inlet 11 for liquid that is to be cleaned such as lubricant oil runs into the interior of filter 1 at its unfiltered side 13. Radially inward from filter material body 30 there is situated a filtered region 14 of the filter that is connected via perforations 42 to the interior of pipe socket 4, which forms a downward-leading outlet 12 for filtered liquid.

In the state shown in FIG. 7, filter 1 can be supplied as a pre-manufactured unit e.g., to an engine or vehicle manufacturer, who can then quickly and easily install filter 1. Here, for this filter embodiment a suspended configuration is preferred in which filter bypass valve 5 is then situated at the top in filter 1, in its cleanest region. In general, however, this filter 1 can also be used in any spatial position.

Figure 8:
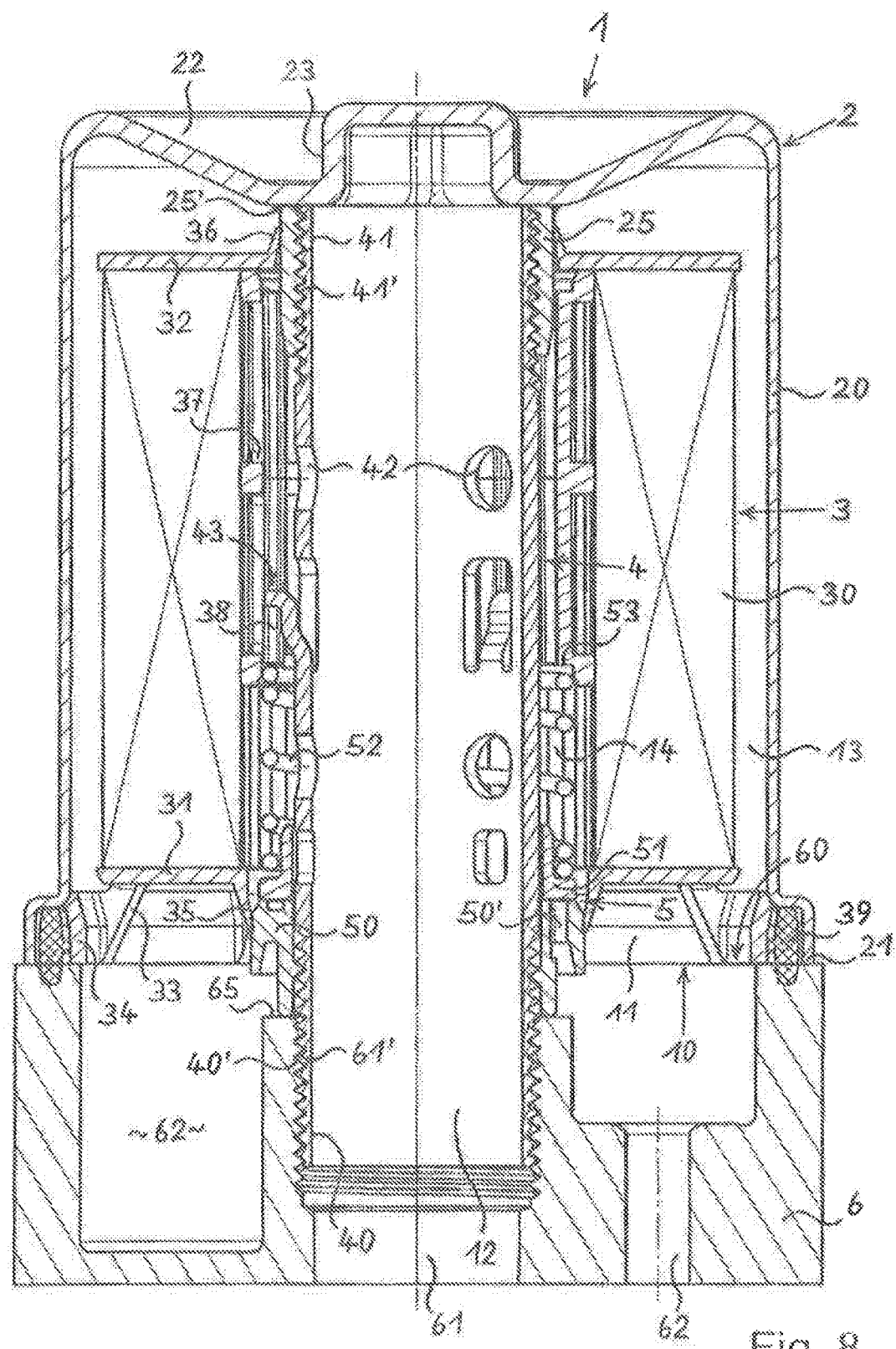
FIG. 8 shows the filter of FIG. 7 in the installed state, with closed filter bypass valve, in longitudinal section.

FIG. 8 shows filter 1 of FIG. 7 in the installed state with closed filter bypass valve 7, in longitudinal section. In the lower part of FIG. 8, a part is shown of a device 6 such as crank housing 6 of an internal combustion engine, having at the top a coupling flange 60 on which filter 1 is in place with its connecting flange 10. For this purpose, using a screw tool placed on tool attachment projection 23 filter 1 is screwed into lower end region 40, provided with threading 40', of pipe socket 4, into a counter-threading 61' of coupling flange 60, until lower end face 21 of filter housing 2 abuts the surface of coupling flange 60, or until a specifiable tightening torque is reached. Outwardly, the flange connection is sealed in liquid-tight fashion by the now-compressed sealing ring 39; in the drawing, for reasons of graphic representation sealing ring 39 is shown only in its relaxed, non-compressed state. Valve seat 50 now abuts, with its lower end face, a stop 65 fashioned in coupling flange 60, defining and securing the axial position of the valve seat 50.

In normal operation of this filter 1, liquid to be cleaned such as lubricant oil flows through an unfiltered liquid duct 62 in device 6 to inlet 11 of filter 1, and to its unfiltered side 13. The liquid then flows through filter material body 30 of filter insert 3 in the radial direction from the outside toward the inside, and moves to the filtered side 14 of filter 1, leaving behind dirt particles in filter material body 30. The filtered liquid flows downward through perforations 42, and, via outlet 12, into filtered liquid duct 61 of device 6.

In this normal state, in which a pressure difference between unfiltered side 13 and filtered side 14 remains below a specifiable boundary value, filter bypass valve 5 is closed, as shown in FIG. 8.

In its further parts, filter 1 in FIG. 8 corresponds to filter 1 in FIG. 7, to whose description reference is made.

Figure 9:
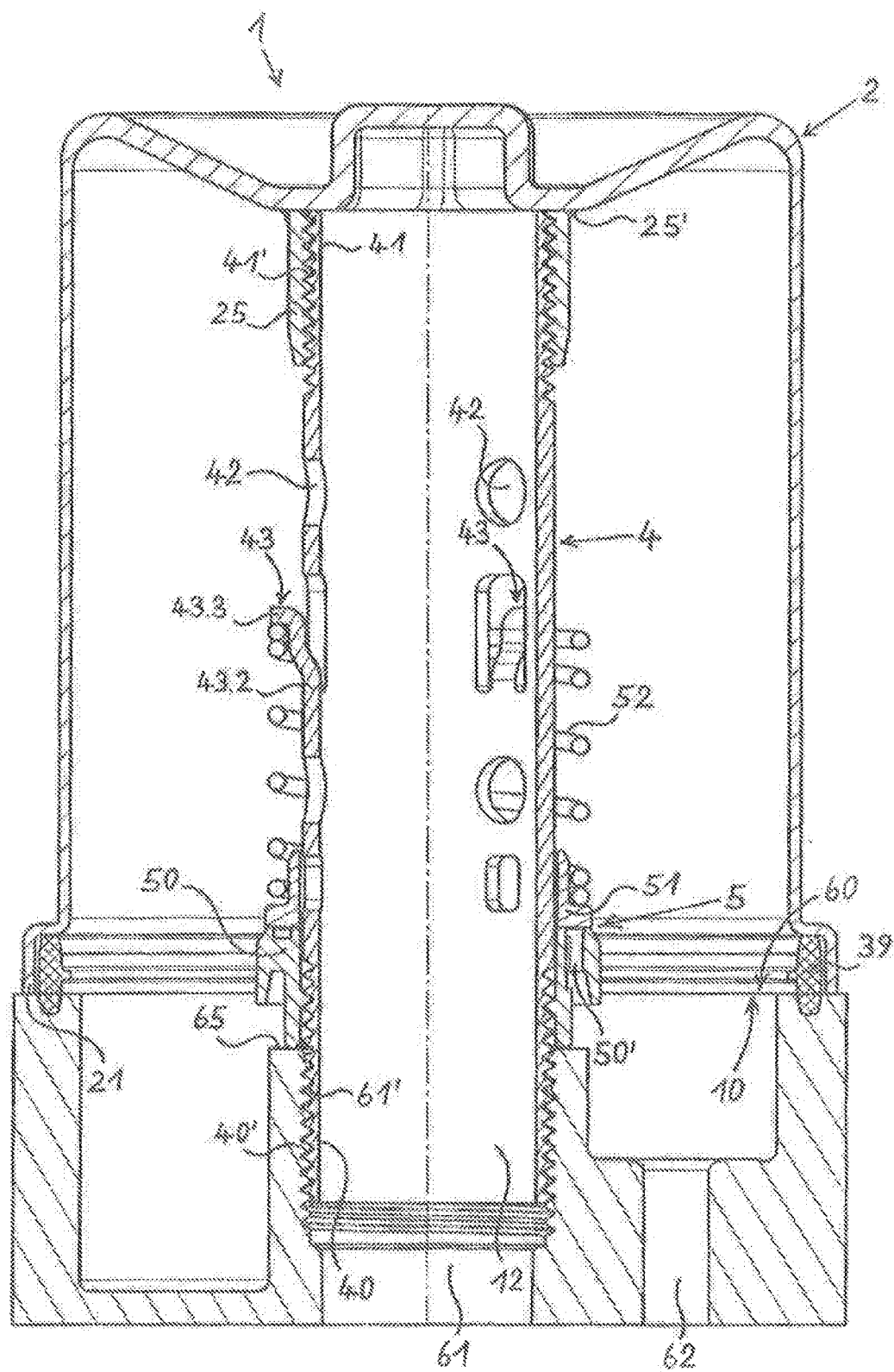
FIG. 9 shows the filter of FIG. 8 without filter insert, in longitudinal section.

FIG. 9 shows filter 1 of FIG. 8 without filter insert 3, in longitudinal section. Here, it is clear in particular that when filter insert 3 is not present spring 52 is supported with its end remote from valve body 51 on stop 43, specifically stop tab 43.3. In this way, it is ensured that spring 52 and valve body 51 are held captive on central pipe socket 4 when no filter insert 3 is present.

Figure 10:
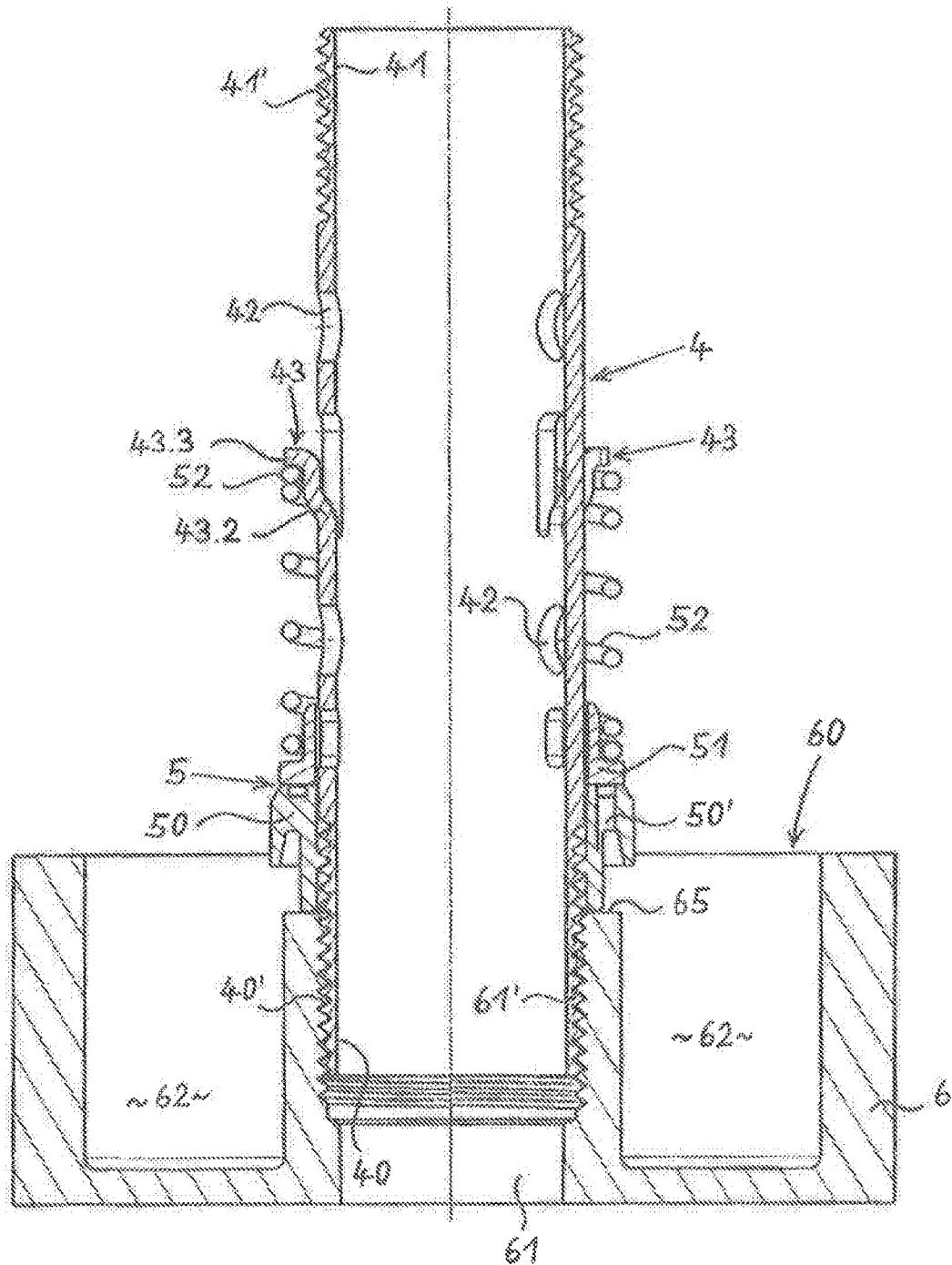
FIG. 10 shows the filter of FIGS. 8 and 9 with removed filter housing and removed filter insert, in longitudinal section.

For the placement of a filter insert 3 into filter 1, filter housing 2 is removed, here by unscrewing from central pipe socket 4, as shown in FIG. 10, also in longitudinal section. For this purpose, the screw connection of lower end region 40 of pipe socket 4 to outer threading 40' in threading 61' of coupling flange 60 is realized with a larger unscrewing resistance than is the screw connection between threaded connector 25 on filter housing 2 and threading 41' on upper end region 41 of pipe socket 4. Thus, when filter housing 2 is removed by unscrewing, pipe socket 4 remains connected to coupling flange 60. The larger unscrewing resistance of the screw connection between pipe socket 4 and coupling flange 60 can for example be achieved in that this screw connection is provided with a micro-encapsulated screw securing that deploys its securing effect when the screw connection is first produced.

When filter housing 2 is removed, here a filter insert 3 can be placed onto pipe socket 4 from above, and filter housing 2 can then be screwed on again. As soon as filter insert 3, together with filter housing 2, has been moved downward a certain distance on pipe socket 4, spring support 53 on supporting element 37 of filter insert 3 (compare FIG. 8) comes into engagement with the upper end, facing away from valve body 51, of spring 52, and prestresses this spring to a desired degree during the further movement downward. Thus, here as well filter insert 3 provides the setting of a desired prestressing of spring 52, and thus a desired opening pressure of filter bypass valve 5.

Figure 11:
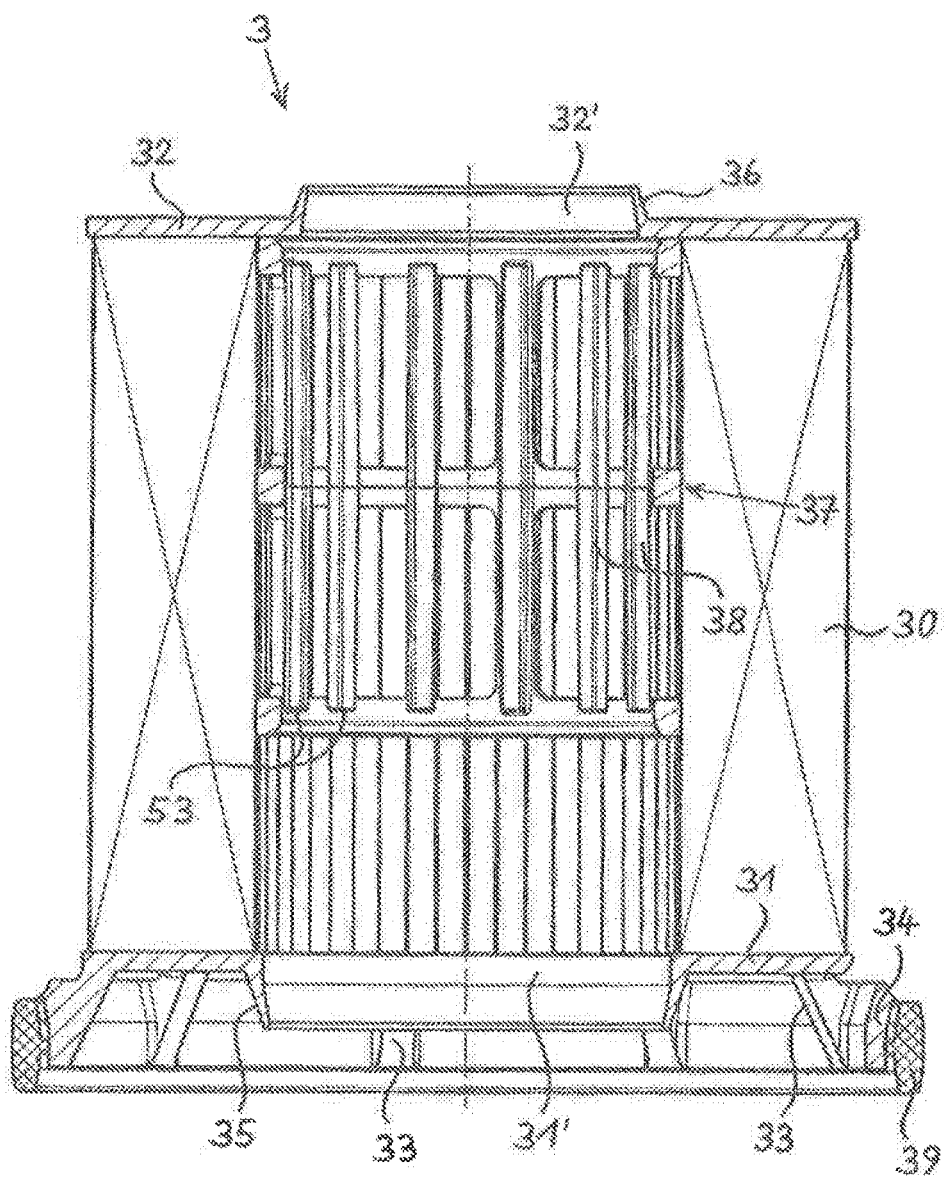
FIG. 11 shows the filter insert of the filter according to FIGS. 7 and 8 as an individual part, in longitudinal section.

FIG. 11 shows filter insert 3 of filter 1 according to FIGS. 7 and 8 as an individual part, in longitudinal section. Hollow cylindrical filter material body 30 is tightly enclosed at its two ends by end plates 31 and 32. Lower end plate 31 has central perforation 31' having circumferential sealing lip 35. Moreover, sealing ring bearer 34, with sealing ring 39 held thereon, is connected in one piece to lower end plate 31 via connecting webs 33. Upper end plate 32 has a central perforation 32' that is surrounded by sealing lip 36.

Grid-type supporting element 37 is situated inside filter material body 30, and this supporting element has a plurality of axial struts 38 situated at a distance from one another in the circumferential direction. Here, its lower end forms spring support 53 for spring 52 of filter bypass valve 5.

During a filter maintenance, a used filter insert 3 is exchanged for a fresh filter insert 3; all further parts of filter 1 continue to be used. Filter insert 3 is usefully made completely of combustible materials, so that consumed filter inserts can be easily and completely disposed of thermally.

Figure 12:
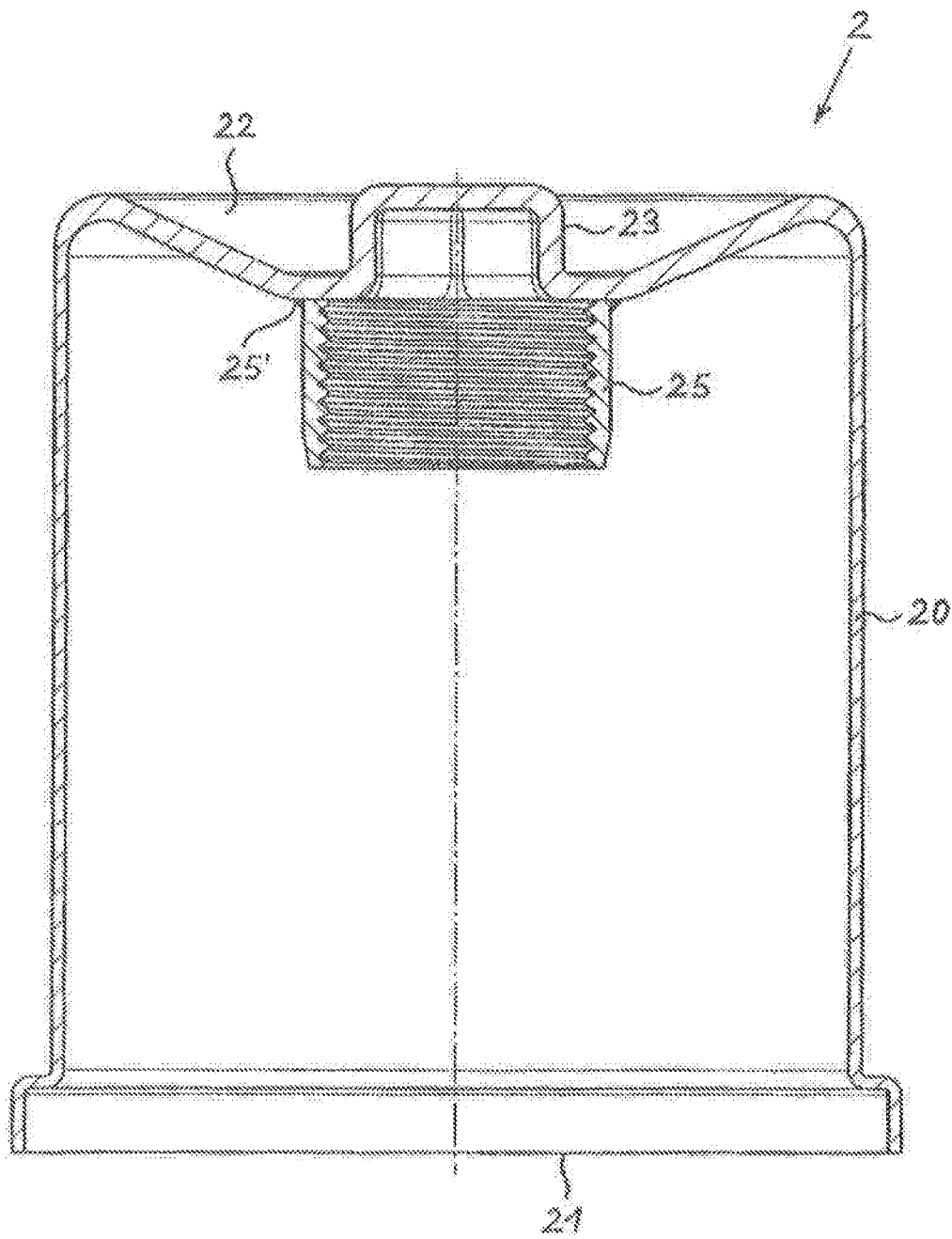
FIG. 12 shows the filter housing of the filter of FIGS. 7 through 9, in longitudinal section.

FIG. 12 shows filter housing 2 of filter 1 from FIGS. 7 through 9 as an individual part in longitudinal section. Rotationally symmetrical hollow cylindrical circumferential wall 20 runs radially externally. Open end face 21 is situated at the bottom. At the top, closed end face 22 is situated, having tool attachment projection 23. Threaded connector 25, fixedly connected to the rest of filter housing 2 by weld seam 25', is situated inside filter housing 2, concentric to circumferential wall 20.

Figure 13:
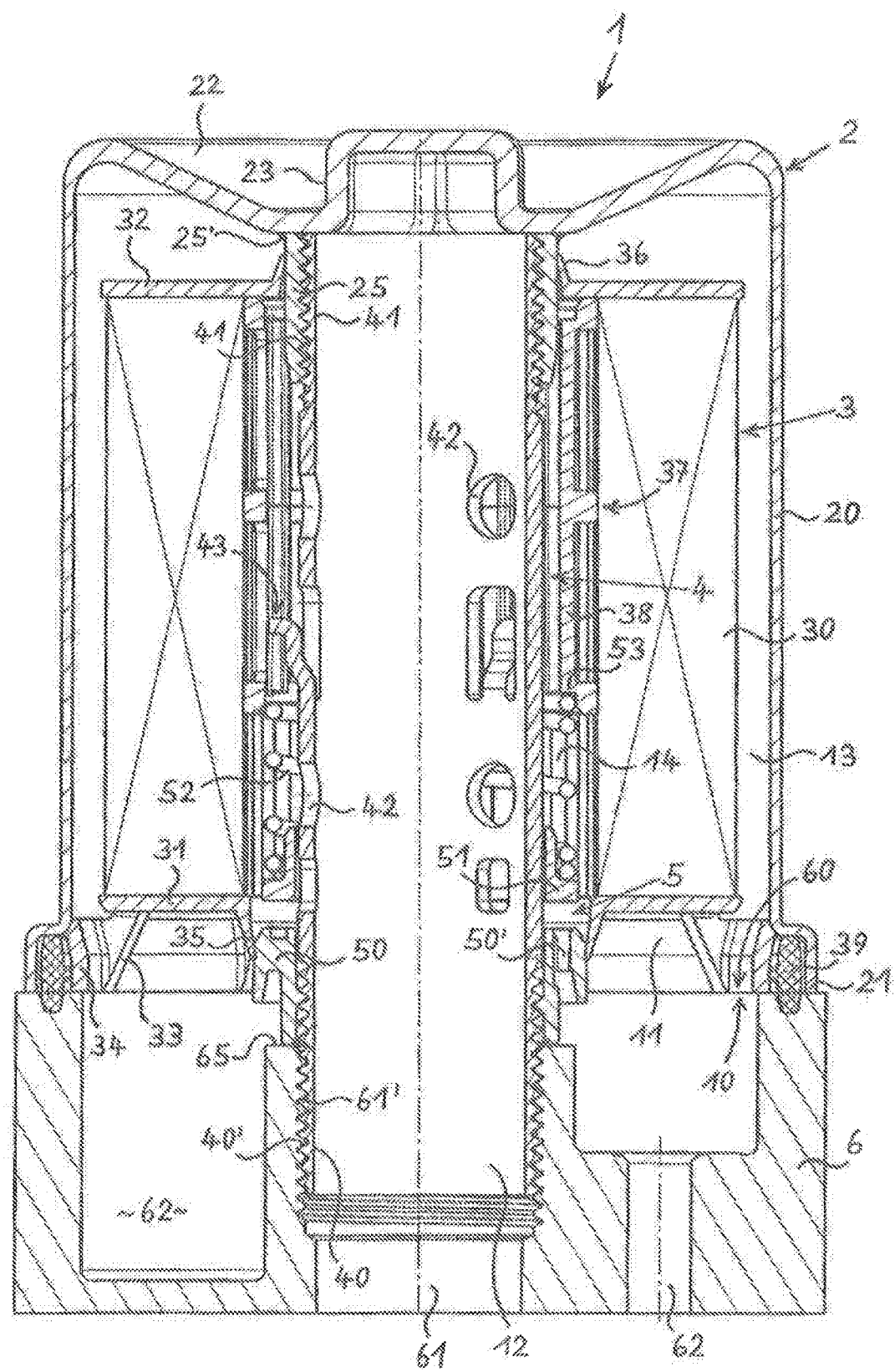
FIG. 13 shows the filter of FIG. 8, here with open filter bypass valve, in longitudinal section.

FIG. 13 shows filter 1 of FIG. 8, here in an operating state with open filter bypass valve 5, in longitudinal section. This operating state occurs when a pressure difference between unfiltered side 13 and filtered side 14 of filter 1 exceeds a specifiable boundary value, for example as a result of a high viscosity of the liquid at low temperature and/or when filter material body 30 is clogged with dirt particles. This has the result that the force exerted in the opening direction on valve body 51 by the liquid exceeds the force exerted on valve body 51 in the closing direction by spring 52. In this case, the force of the liquid ensures that valve body 51 is displaced, against the force of spring 52, in the axial direction on the outer circumference of pipe socket 4, and is lifted off from valve seat 50. In this way, an immediate flow connection is released from unfiltered side 13 through through-openings 50' of valve seat 50 to filtered side 14, and through the interior of pipe socket 4 to outlet 12 of filter 1, bypassing filter material body 30.

With regard to the further parts shown in FIG. 13, reference is made to the description of FIG. 8.

Figure 14:
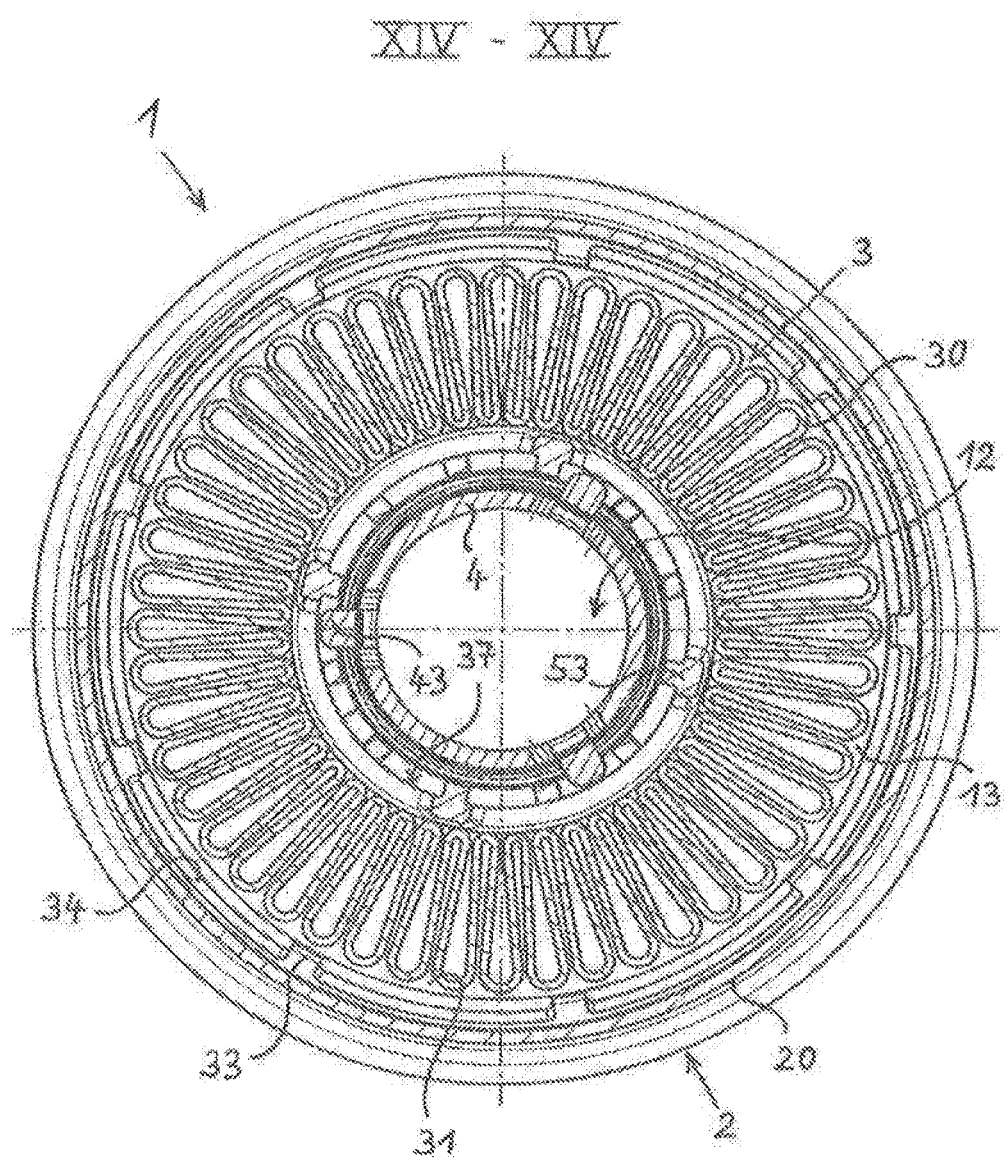
FIG. 14 shows the filter of FIG. 7 in cross-section according to the sectional line XIV-XIV in FIG. 7.

FIG. 14 shows filter 1 of FIG. 7 in cross-section along the sectional line XIV-XIV in FIG. 7. Radially externally, circumferential wall 20 of filter housing 2 is visible. Radially inwardly, there follows sealing ring bearer 34, which is connected to lower end plate 31 of filter insert 3, situated in the background, by a plurality (here nine) of connecting webs 33 situated at a distance from one another in the circumferential direction. Further radially inward there follows hollow cylindrical filter material body 30, formed by a filter material strand arranged in folds. Radially inward from filter material body 30 there is situated supporting element 37 with spring support 53 fashioned thereon. The radially innermost part is formed by central pipe socket 4 with its stop 43 fashioned in one piece therewith and protruding radially outward.

Figure 15:
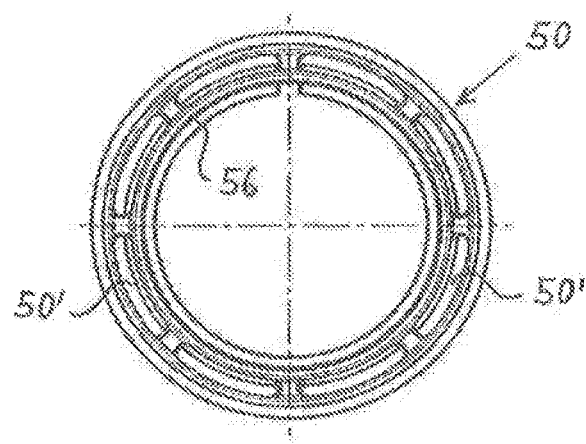
FIG. 15 shows a valve seat of the filter according to FIGS. 7 through 14, in a first embodiment, in a top view.

FIG. 15 shows a valve seat 50 of filter 1 according to FIGS. 7 through 14 in a first embodiment, in a top view. Here it is particularly clear that valve seat 50 has the form of an annular body. Through-openings 50' are here realized in the shape of annular segments in order to provide as large a through-flow cross-section as possible in the open state of filter bypass valve 5. Radially inward in valve seat 50, here an inner threading 56 can be seen that includes only one thread pitch, which is used to screw valve seat 50 onto threading 40' on outer end region 40 of central pipe socket 4, as is shown for example in FIGS. 7 through 10 and 13.

Figure 16:
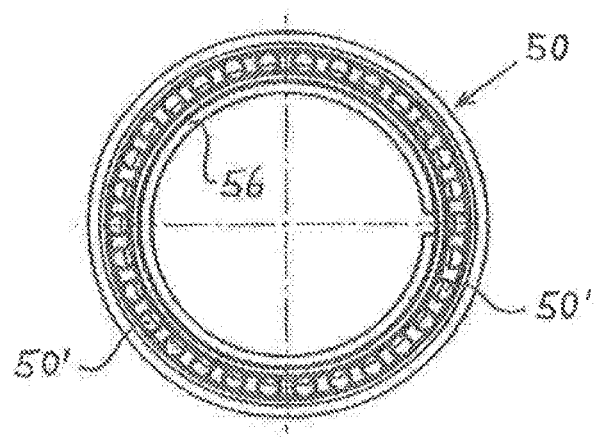
FIG. 16 shows the valve seat of the filter according to FIGS. 7 through 14, in a second embodiment, in a top view.

FIG. 16 shows valve seat 50 of filter 1 according to FIGS. 7 through 14 in a second embodiment, in a top view. Here as well, valve seat 50 has the shape of an annular element, but here through-openings 50' are realized in the form of round openings closely adjacent to one another. Inner threading 56 is provided radially inwardly here as well.

Figure 17:
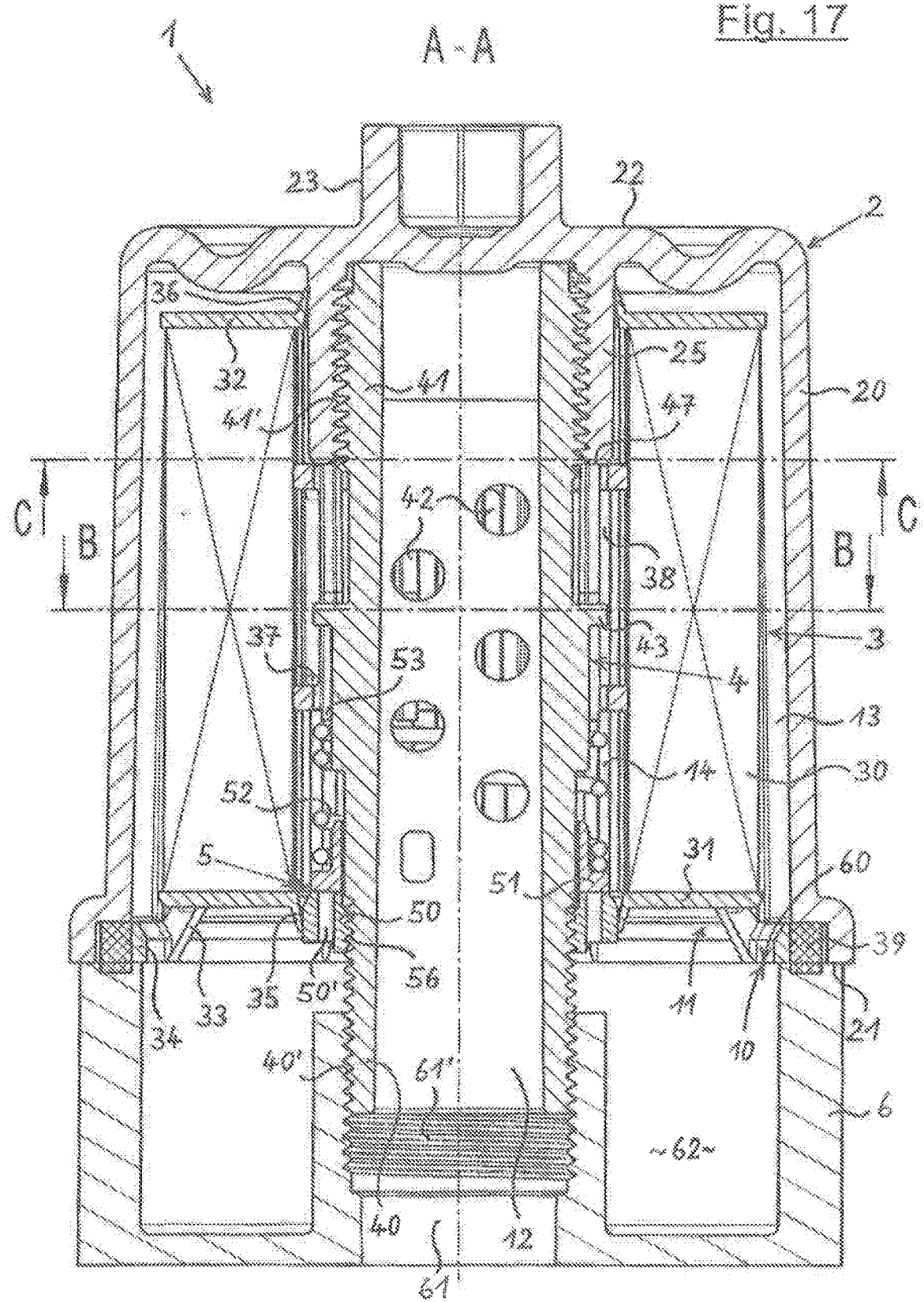
FIG. 17 shows die filter in a third embodiment, in the installed state with closed filter bypass valve and with an anti-rotation lock, in longitudinal section.

FIG. 17 of the drawing shows Filter 1 in a third embodiment, in the installed state with closed filter bypass valve 5, and in addition having an anti-rotation lock 47, in longitudinal section. For reliable functioning of the liquid filter 1 having a screw-on housing, such as filter housing 2 in filter 1 according to FIG. 17, it is essential for an automatic detachment by rotation to be reliably prevented. In the example of filter 1 according to FIG. 17, this is achieved by an integrated anti-rotation lock 47. Anti-rotation lock 47 is here fashioned between supporting element 37 of filter insert 3 on the one hand and threaded connector 25 on the inner side of filter housing 2 on the other hand. Supporting element 37 cannot be rotated in the circumferential direction relative to central pipe socket 4, or can be so rotated only to a very limited extent, but is made displaceable in the axial direction. Because, as is also the case in the exemplary embodiments described above, here spring support 53 fashioned on supporting element 37 supports spring 52 of filter bypass valve 5 at its end remote from valve body 51, spring 53 exerts a force acting in the axial direction on axially movable supporting element 37 in the direction toward threaded connector 25. In this way, an upper end face of supporting body 37 and a lower end face of threaded connector 25 are pressed against one another with a force determined by the spring force of spring 52. In addition, supporting element 37 and threaded connector 25 are fashioned with interlocking contours on their surfaces that contact one another, as is further explained below. These contours provide the desired securing of filter housing 2, fashioned as a screw housing, against undesirable automatic rotating loose from central pipe socket 4.

In this embodiment of filter 1 as well, central pipe socket 4 has in its center region on its circumference stop 43, here fashioned in the form of tabs that protrude outward in the radial direction fashioned in one piece with pipe socket 4.

In the example according to FIG. 17, it is preferably provided that filter housing 2 is fashioned in one piece with threaded connector 25, and is an injection-molded part made of plastic. Preferably, it is further provided that central pipe socket 4 is here an injection-molded part made of plastic. A suitable plastic having the required mechanical, thermal, and chemical stability is for example polyamide (PA), which can contain a certain portion of glass fibers.

As is also the case in the exemplary embodiments described above, this exemplary embodiment of filter 1 according to FIG. 17 is equipped with a filter bypass valve 5. For this purpose, here as well valve seat 50 with its through-openings 50' is screwed onto outer threading 40' of lower end region 40 of pipe socket 4. Valve element 51 is situated above valve seat 50 and here as well can be displaced in the axial direction on outer circumference of pipe socket 4. Spring 52 loads valve body 51 with a force acting in the closing direction.

With regard to the further parts in FIG. 17 and their functioning, reference is made to the above description, in particular of FIG. 8.

Figure 18:
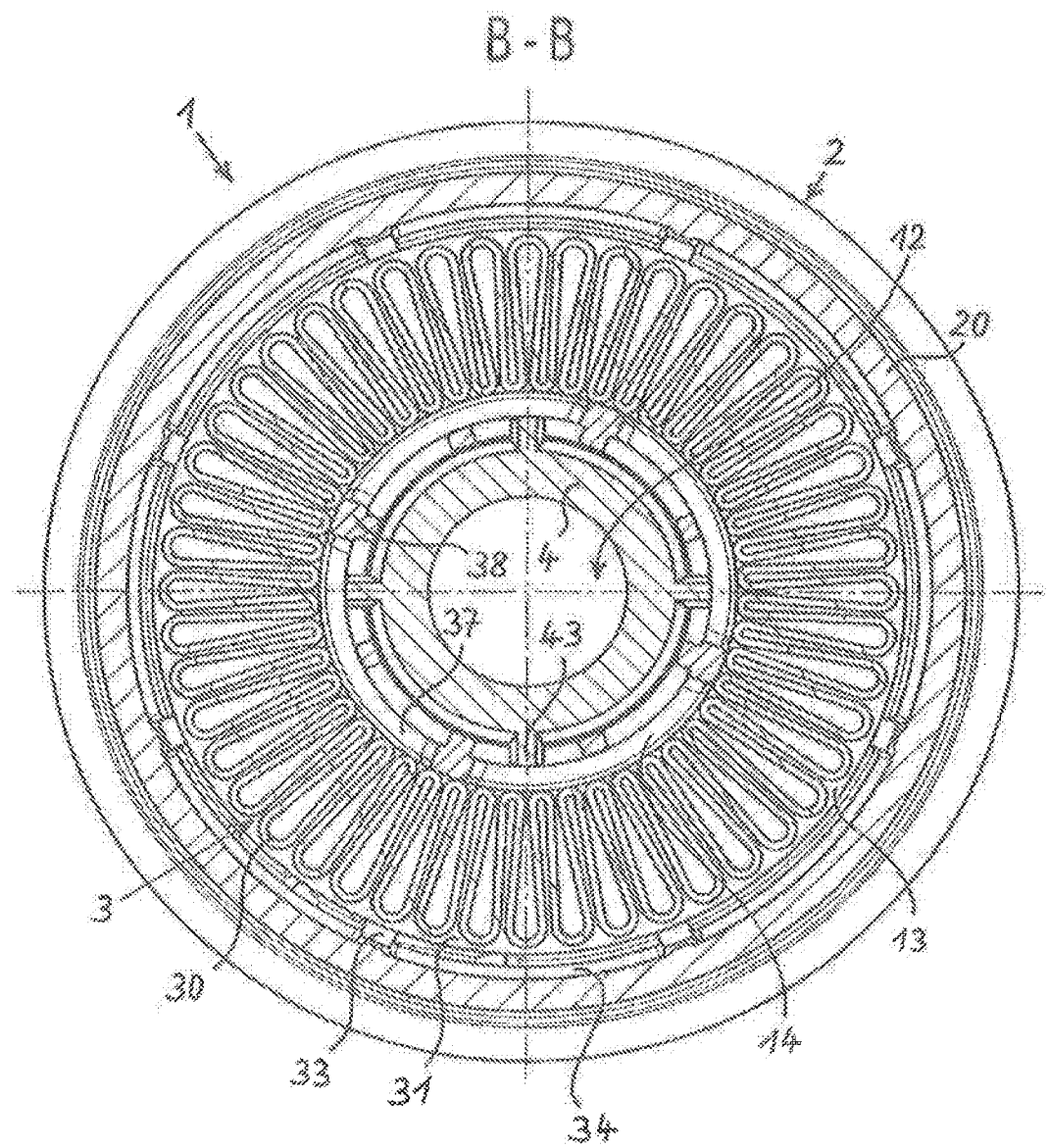
FIG. 18 shows the filter of FIG. 17 in cross-section according to the sectional line B-B in FIG. 17.

FIG. 18 shows filter 1 of FIG. 17 in cross-section along the sectional line B-B in FIG. 17. Radially externally, filter housing 2 is visible with its circumferential wall 20. Radially inwardly therefrom, in the background there is situated lower end plate 31 with connecting webs 33 for sealing ring bearer 34. Filter material body 30 is situated on lower end plate 31 in the form of the folded filter material-strand. Grid-type supporting element 37 is situated radially inward from filter material body 30. Here again, the radially innermost part of filter 1 is formed by central pipe socket 4, over whose outer circumference there protrude a total of four protruding tabs as stop 43. FIG. 18 illustrates that supporting element 37 and the tabs forming stop 43 overlap, seen in the radial direction, so that a rotation of supporting element relative to central pipe socket 4 is not possible, or is possible only to a very limited extent.

Figure 19:
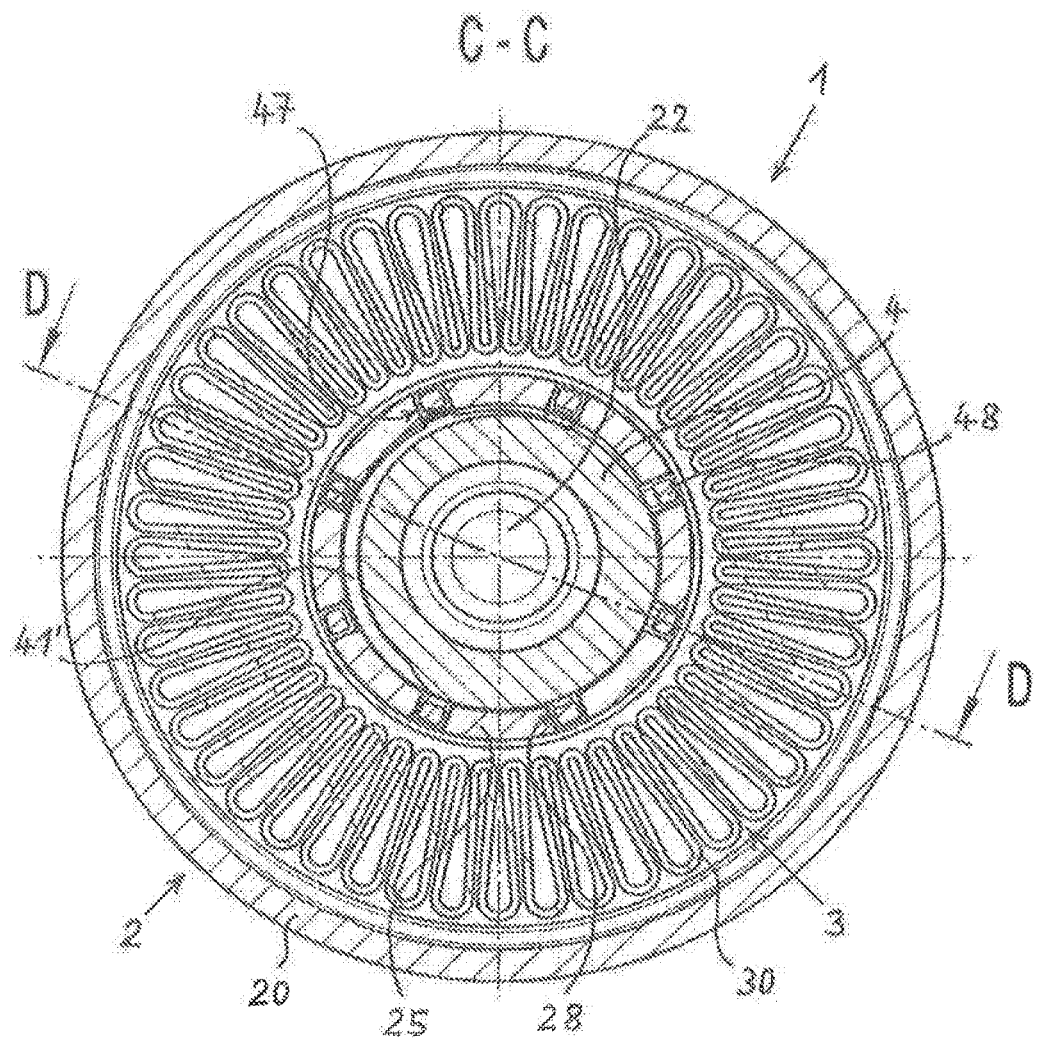
FIG. 19 shows the filter of FIG. 17 in cross-section according to the sectional line C-C in FIG. 17.

FIG. 19 shows filter 1 of FIG. 17, also in cross-section, here according to sectional line C-C in FIG. 17. The radially outer part of filter 1, up to and including filter material body 30, corresponds to that of FIG. 18, to whose description reference is made.

Radially inward from filter material body 30, here threaded connector 25 of filter housing 2 is sectioned close to its lower end face, wherein a total of eight recesses 28, regularly spaced from one another in the circumferential direction, are formed as end-face contour. Conversely, on the end face, oriented toward threaded connector 25, of anti-rotation lock ring 47', which forms a part of supporting element 37, cams 48 are integrally formed in one piece, which enter into engagement with recesses 28. Recesses 28 and cams 48 form together with spring 52 anti-rotation lock 47. Because supporting element 37, as described above, is preloaded by spring 52 in the direction toward threaded connector 25, recesses 28 and cams 48 form a kind of locking engagement that prevents undesired automatic rotation of filter housing 2 against supporting element 37. Because for its part supporting element 37 is secured against rotation relative to pipe socket 4, filter housing 2 cannot automatically rotate loose from central pipe socket 4, even when there are vibrations or pressure pulsations that occur during practical operation of filter 1.

Figure 20:
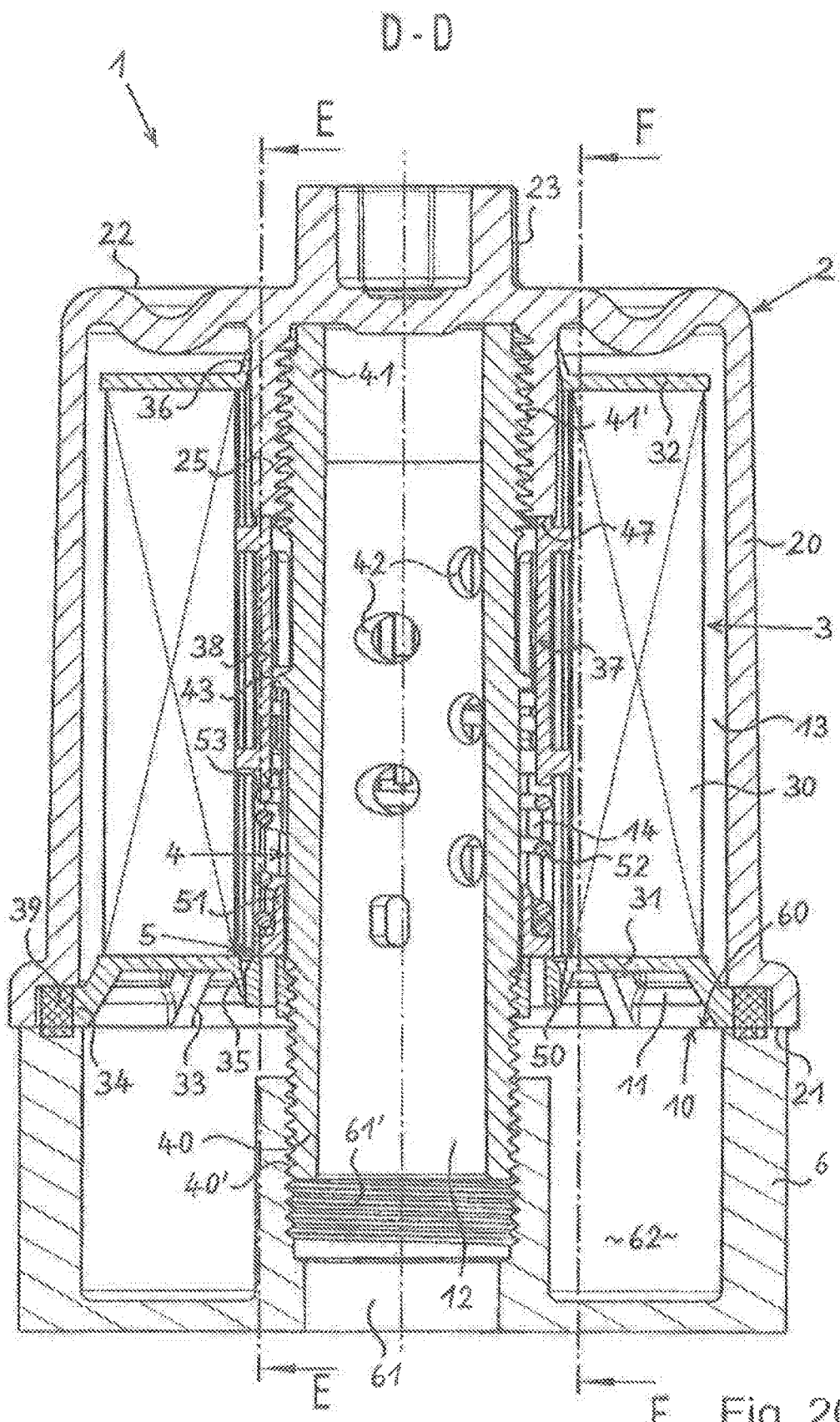
FIG. 20 shows the filter of FIGS. 17 through 19 in longitudinal section according to the sectional line D-D in FIG. 19.

FIG. 20 shows filter 1 of FIGS. 17 through 19 in longitudinal section according to sectional line D-D in FIG. 19. Underneath threaded connector 25 of filter housing 2, supporting element 37 of filter insert 3 is situated in axially displaceable fashion on the outer circumference of central pipe socket 4. The upward-oriented end face of supporting element 37, and the downward-oriented end face of threaded connector 25, together form the above-described anti-rotation lock 47.

The downward-oriented end face of supporting element 37 here again forms spring support 53, which supports the end of spring 52 facing away from valve body 51. The tabs of stop 43 integrally formed in one piece on central pipe socket 4 provide, on the one hand, the desired rotational securing of supporting element 37 relative to pipe socket 4, and on the other hand form the stop for spring 52 when no filter insert 3 is present in filter 1.

With regard to the further parts in FIG. 20 and their functioning, reference is made to the above description.

Figure 21:
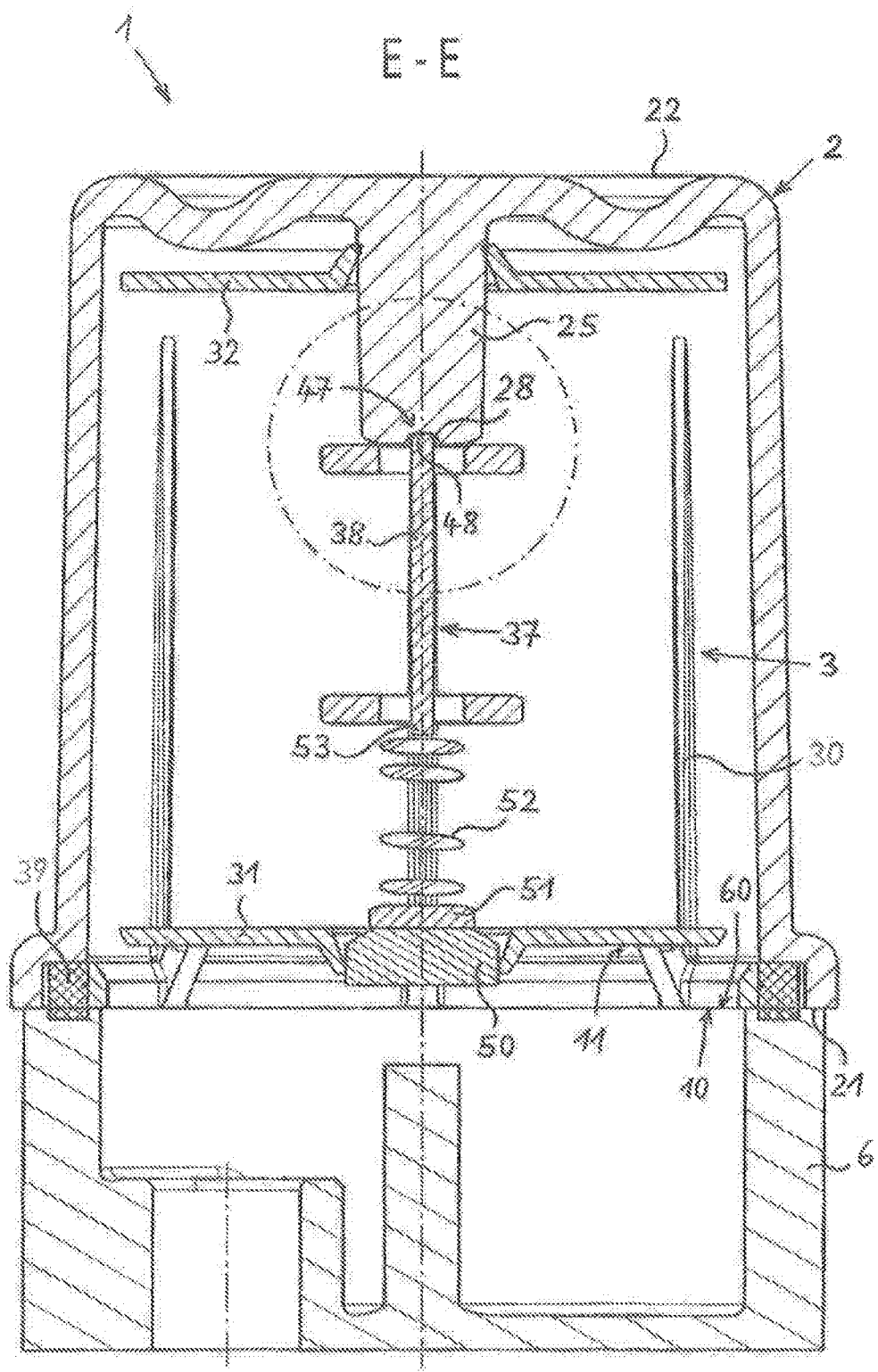
FIG. 21 shows the filter of FIGS. 17 through 20 in longitudinal section according to the sectional line E-E in FIG. 20.

FIG. 21 shows filter 1 of FIGS. 17 through 20 in longitudinal section along sectional line E-E in FIG. 20, anti-rotation lock 47 being here particularly illustrated. In the upper region of filter housing 2, threaded connector 25 is sectioned in its edge region. In the end face of threaded connector 25, here one of the recesses 28 can be seen. In recess 28 there engages one of the cams 48, which is integrally formed on the upper end face of supporting element 37, here in continuation of one of its axial struts 38.

With regard to the further details and FIG. 21, reference is made again to the above description.

Figure 22:
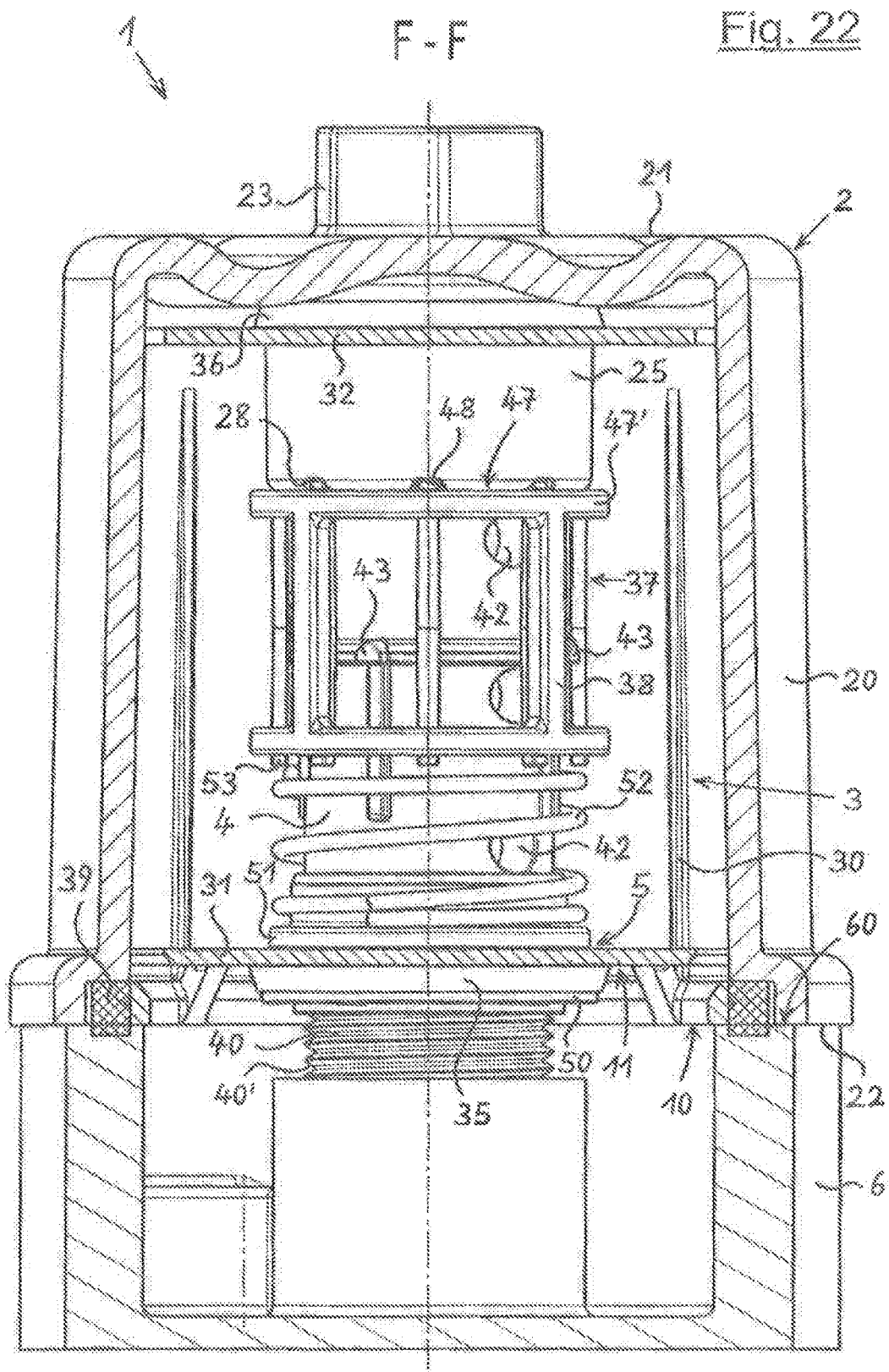
FIG. 22 shows the filter of FIGS. 17 through 21 in longitudinal section according to the sectional line F-F in FIG. 20.

FIG. 22 shows filter 1 of FIGS. 17 through 21, again in longitudinal section, here according to sectional line F-F in FIG. 20. In this section, central pipe socket 4, supporting element 37, valve seat 50, valve body 51, and spring 52 are visible in a side view. With its lower end, spring 52 loads valve body 51 with a force acting in the closing direction of filter bypass valve 5, i.e., with a force acting in the direction toward valve seat 50.

With its upper end, the same spring 52 loads supporting element 37 with a force acting upward in the direction toward threaded connector 25. The upper end of supporting element 37 is fashioned as anti-rotation lock ring 47' of anti-rotation lock 47. Cams 48 protrude past the upper side of anti-rotation lock ring 47', which cams here again stand in engagement with end-face recesses 28 of threaded connector 25, thus together forming anti-rotation lock 47.

With regard to the further parts in FIG. 22, reference is made to the preceding description.

Figure 23:
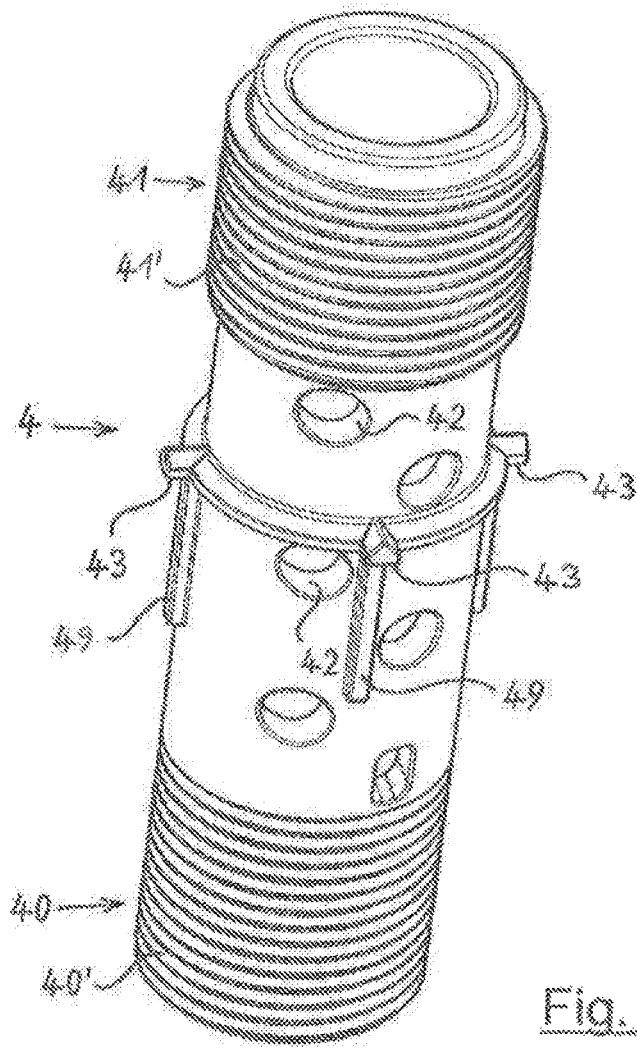
FIG. 23 shows a central pipe socket as a part of the filter according to FIG. 17 through 22, as an individual part, in an oblique view from above.

FIG. 23 shows central pipe socket 4 as part of filter 1 according to FIGS. 17 through 22 as an individual part, in an oblique view from above. In its upper end region 41, pipe socket 4 has outer threading 41', and in its lower end region 40 outer threading 40' is provided. In the region of pipe socket 4 situated between threadings 40'. 41', perforations 42 are made therein.

At an axial distance from the lower end of upper threading 41', distributed over the circumference the four tabs are integrally formed as stop 43, which protrude radially outward. In the axial direction, underneath each tab of stop 43 a rib-shaped longitudinal guide 49 extends downward, each terminating at a distance from lower threading 40'. Together with the tabs of stop 43, longitudinal guides 49 bring about the locking of supporting element 37 against rotation relative to pipe socket 4 when filter insert 3 is situated on pipe socket 4. Moreover, the tabs of stop 43 support spring 52 when filter insert 3 is removed from filter 1, as described above.

Figure 24:
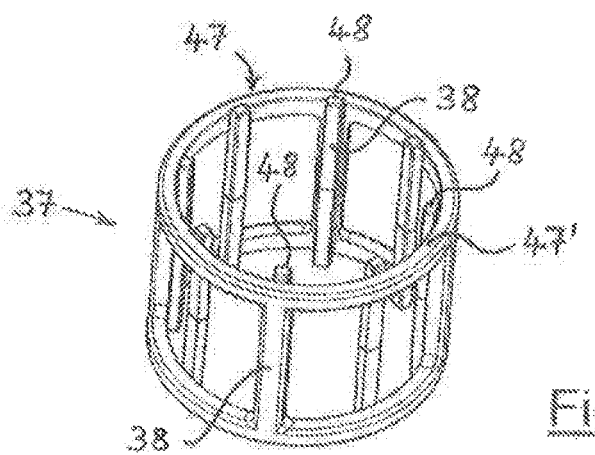
FIG. 24 shows a supporting element as a part of the filter according to FIG. 17 through 22, as an individual part, in an oblique view from above.

FIG. 24 shows supporting element 37 as part of filter 1 according to FIGS. 17 through 22, as an individual part, in an oblique view from above. In particular, here it is clear that supporting element 37 has the shape of a hollow cylindrical annular grid that has a number of axial struts 38, as well as a respective annular strut above and below. Here, the upper annular strut forms the anti-rotation lock ring 47' with cams 48 of anti-rotational lock 47. Supporting element 37 is preferably an injection-molded part made of plastic.

Figure 25:
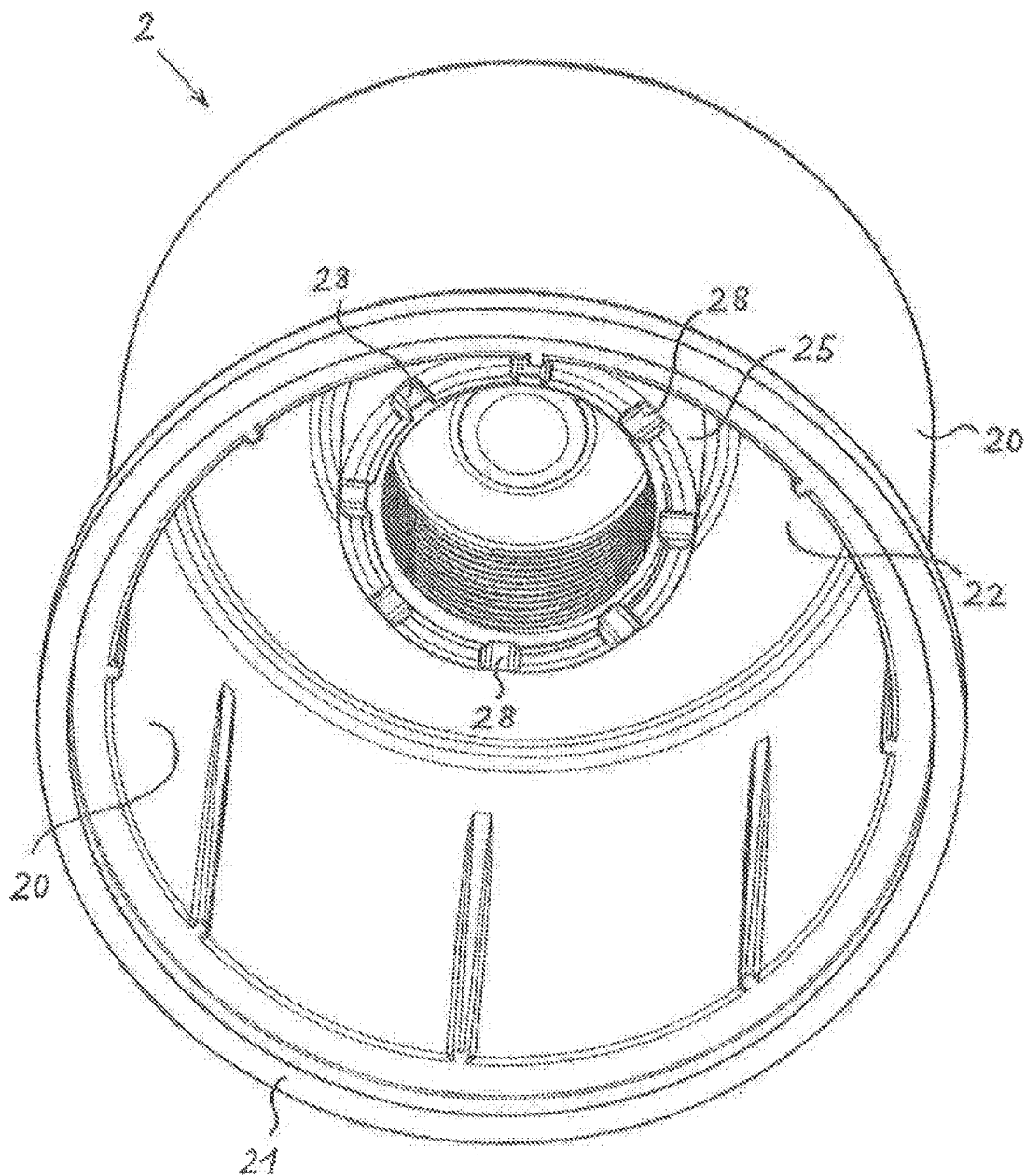
FIG. 25 shows a filter housing as a part of the filter according to FIG. 17 through 22, as an individual part, in an oblique view from below.

FIG. 25 shows filter housing 2 as part of filter 1 according to FIG. 17 through 22, as an individual part, in an oblique view from below, i.e., in a view towards its open end face 21. The radially outer part of filter housing 2 is formed by its circumferential wall 20. Inside, in the background, there is situated closed end face 22, from which threaded connector 25 protrudes into the interior of filter housing 2. The free end face, facing the observer, of threaded connector 25 is provided with recesses 28 configured at regular spacings from one another in the circumferential direction.

Figure 26:
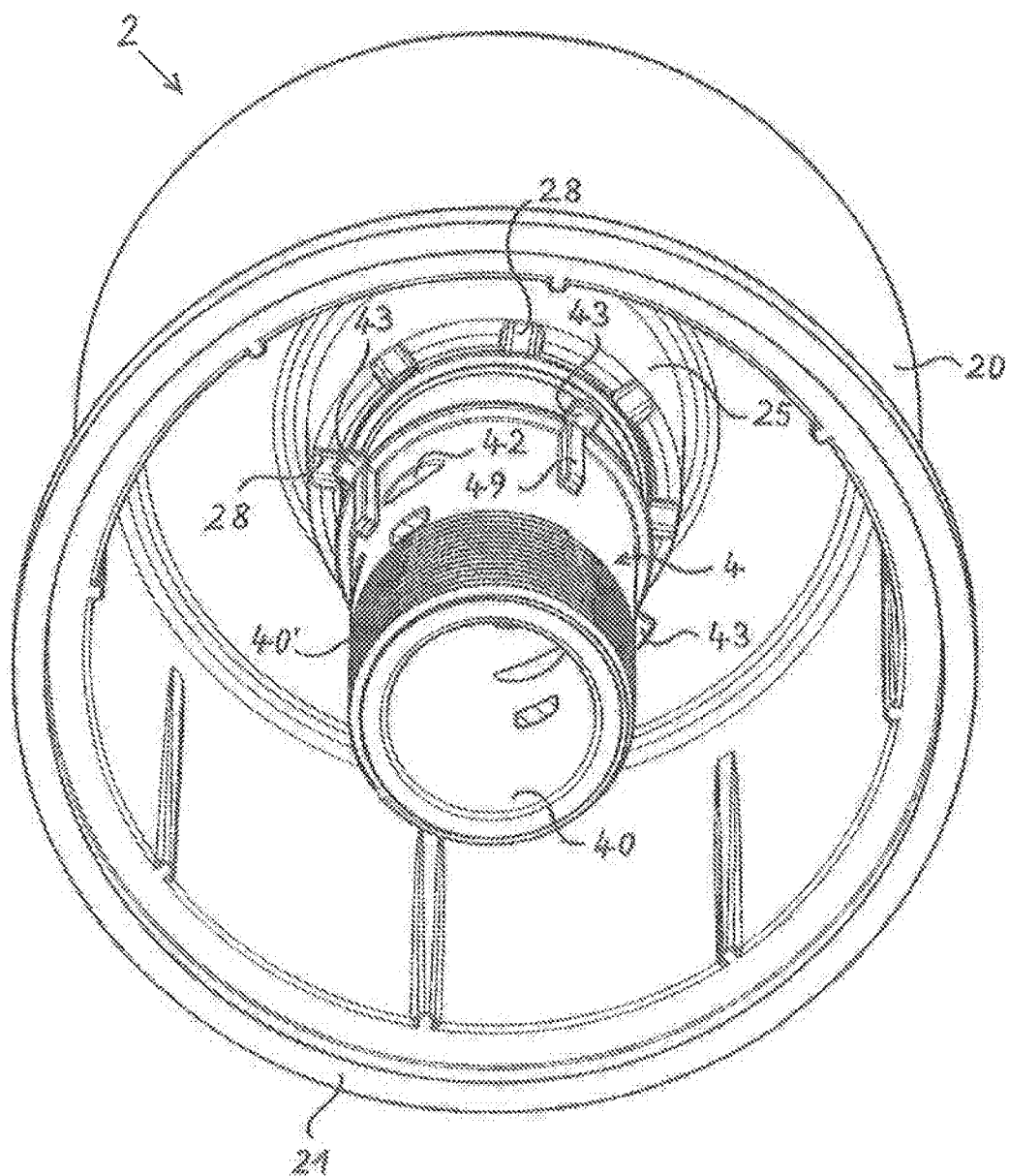
FIG. 26 shows a constructive unit of the filter housing according to FIG. 25 and of the pipe socket according to FIG. 23, in an oblique view from below.

FIG. 26 shows a constructive unit made up of filter housing 2 according to FIG. 25 and pipe socket 4 according to FIG. 23, in an oblique view from below. In order to form this constructive unit, pipe socket 4 is screwed into threaded connector 25 with its upper end region 41 and outer threading 41' made there. On pipe socket 4, perforations 42, stop 43, and longitudinal guides 49 are visible. Screw threading 40' is attached on outer end region 40, facing the observer, of pipe socket 4.

Figure 27:
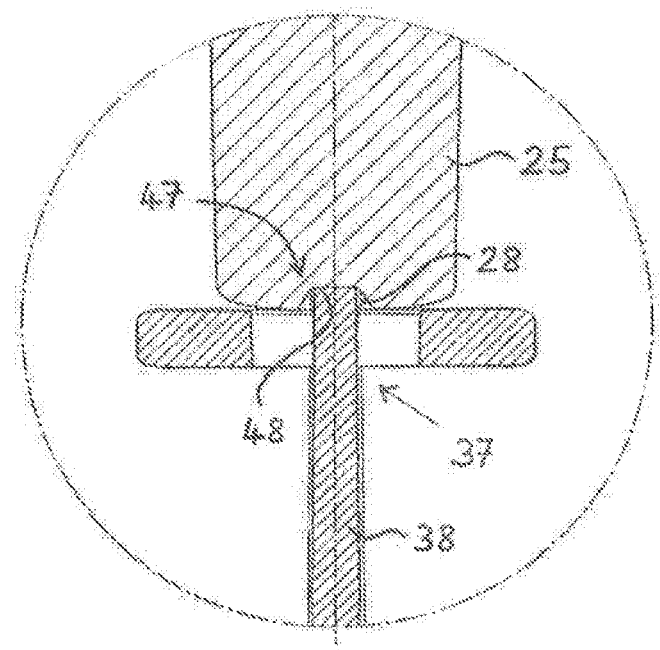
FIG. 27 shows an enlarged detail from FIG. 21 with the anti-rotation lock in a first embodiment.

FIG. 27 shows an enlarged detail of FIG. 21 with anti-rotation lock 47, in a first embodiment. At the top in FIG. 27, an edge region of threaded connector 25, with one of recesses 28 in its end face, is visible. Under this, a part can be seen of supporting element 37 with one of its axial struts 38 and one of the cams 48. Here, recess 28 and cams 48 stand in engagement with one another, in order in this way to form anti-rotation lock 47. As described above, supporting element 37, movable in the axial direction, is loaded by spring 52 (not visible here) with a force oriented in the direction toward threaded connector 25. As FIG. 27 illustrates, recess 28 here has, in both directions of rotation, i.e., to the left and to the right in FIG. 27, symmetrical bevels each having the same upward incline or the same downward incline.

Figure 28:
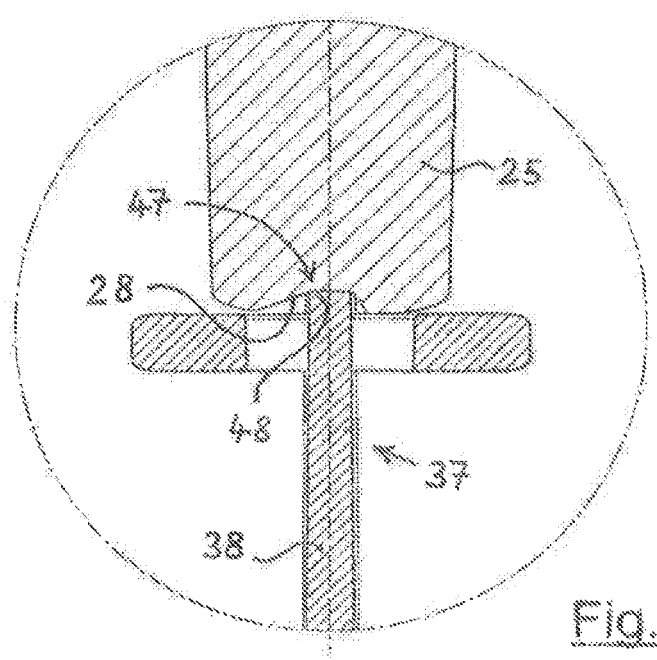
FIG. 28 shows the detail of FIG. 21 with the anti-rotation lock in a second embodiment.

FIG. 28 shows the detail of FIG. 21 with anti-rotation lock 47 in a second embodiment, for which it is characteristic that recess 28 in the end face of threaded connector 25 has, in the direction of rotation, i.e., to the left and to the right in FIG. 28, two different upward or downward inclines, i.e., is asymmetrical. In FIG. 28, the upward incline of recess 28 to the right is stronger than to the left. This brings about different rotational resistances depending on the direction of rotation of filter housing 2 relative to supporting element 37, usefully in such a way that in the tightening direction of rotation a lower resistance of anti-rotation lock 47 is produced and in the loosening direction of rotation a larger resistance thereof is produced.

Figure 29:
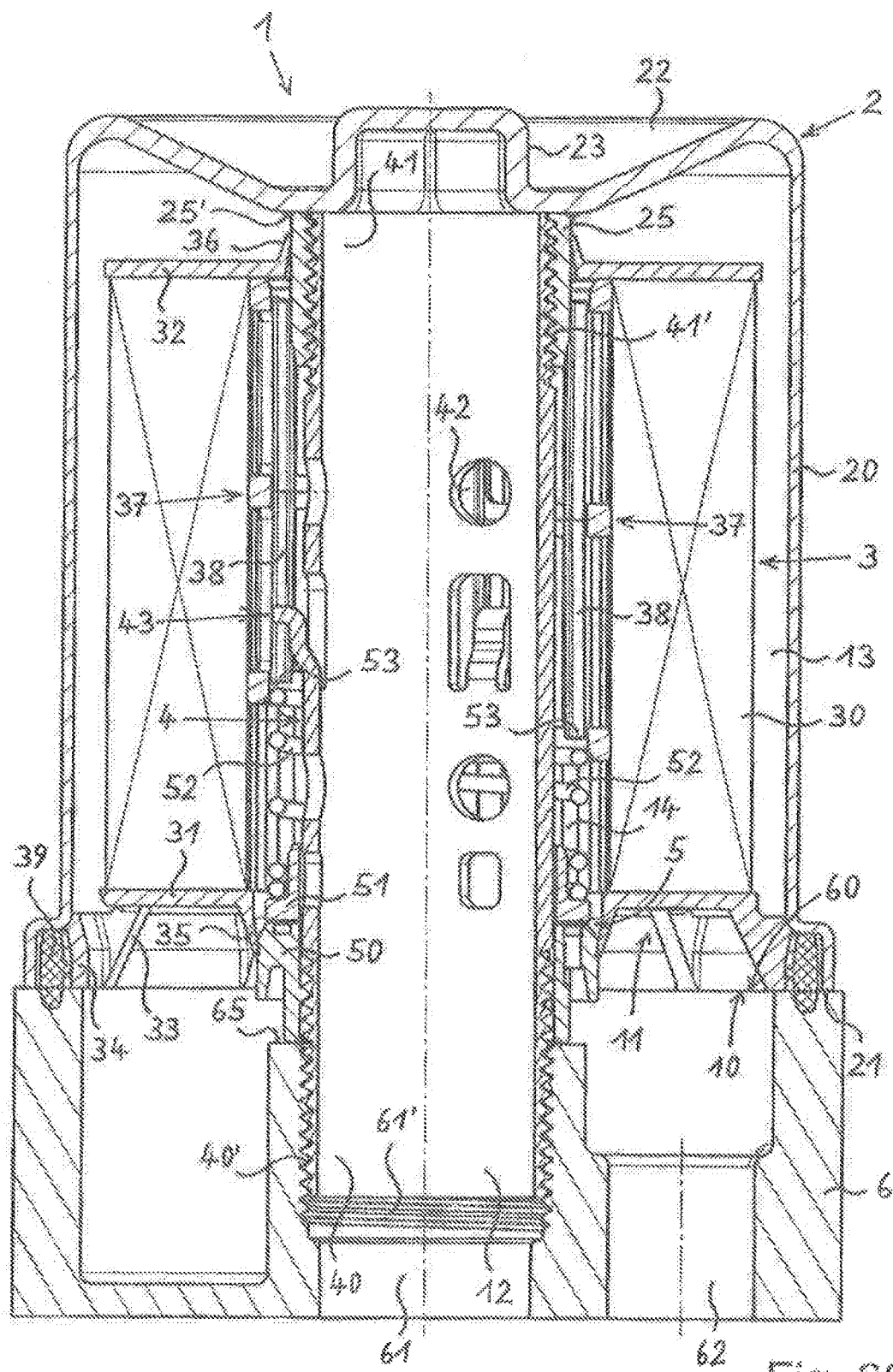
FIG. 29 shows the filter in a fourth embodiment, in the installed state with closed filter bypass valve and with a first filter insert shown in two different embodiments in the left and right halves of the Figure, in longitudinal section.

FIG. 29 of the drawing shows filter 1 in the installed state with closed filter bypass valve 5, in longitudinal section, two different embodiments of a filter insert 3 fitting filter 1 according to FIG. 29 being shown in the left and right half of FIG. 29. Here, in both embodiments, supporting element 37 of filter insert 3 is situated as a separate individual part on the inner circumference of filter material body 30, and is supported with its upper end against the lower side of upper end face 32. As described above, the lower end of supporting element 37 forms spring support 53 for spring 52 of filter bypass valve 5.

The two filter inserts 3 in FIG. 29 differ in the position of the spring support 53 fashioned thereon in each case; spring 52 is the same in both halves of the Figure. In the case of filter insert 3 shown in the left half of FIG. 29, spring support 53 is situated at a greater axial distance from valve body 51, while in the case of filter insert 3 shown in the right half of FIG. 29, its spring support 53 is situated at a smaller distance from valve body 51. Filter insert 3 in the left half of FIG. 29 thus produces a lower prestressing of spring 52 than does filter insert 3 in the right half of FIG. 29. In this way, correspondingly different opening pressures of filter bypass valve 5 are also set. In this way it is therefore advantageously possible to set the opening pressure of filter bypass valve 5 to a desired value, or to easily modify it as needed, solely by changing the position of spring support 53 inside exchangeable filter insert 3, without having to modify any other parts of filter 1.

With regard to the further parts in FIG. 29 and their function, reference is made to the above description, in particular of FIGS. 7 and 8.

Figure 30:
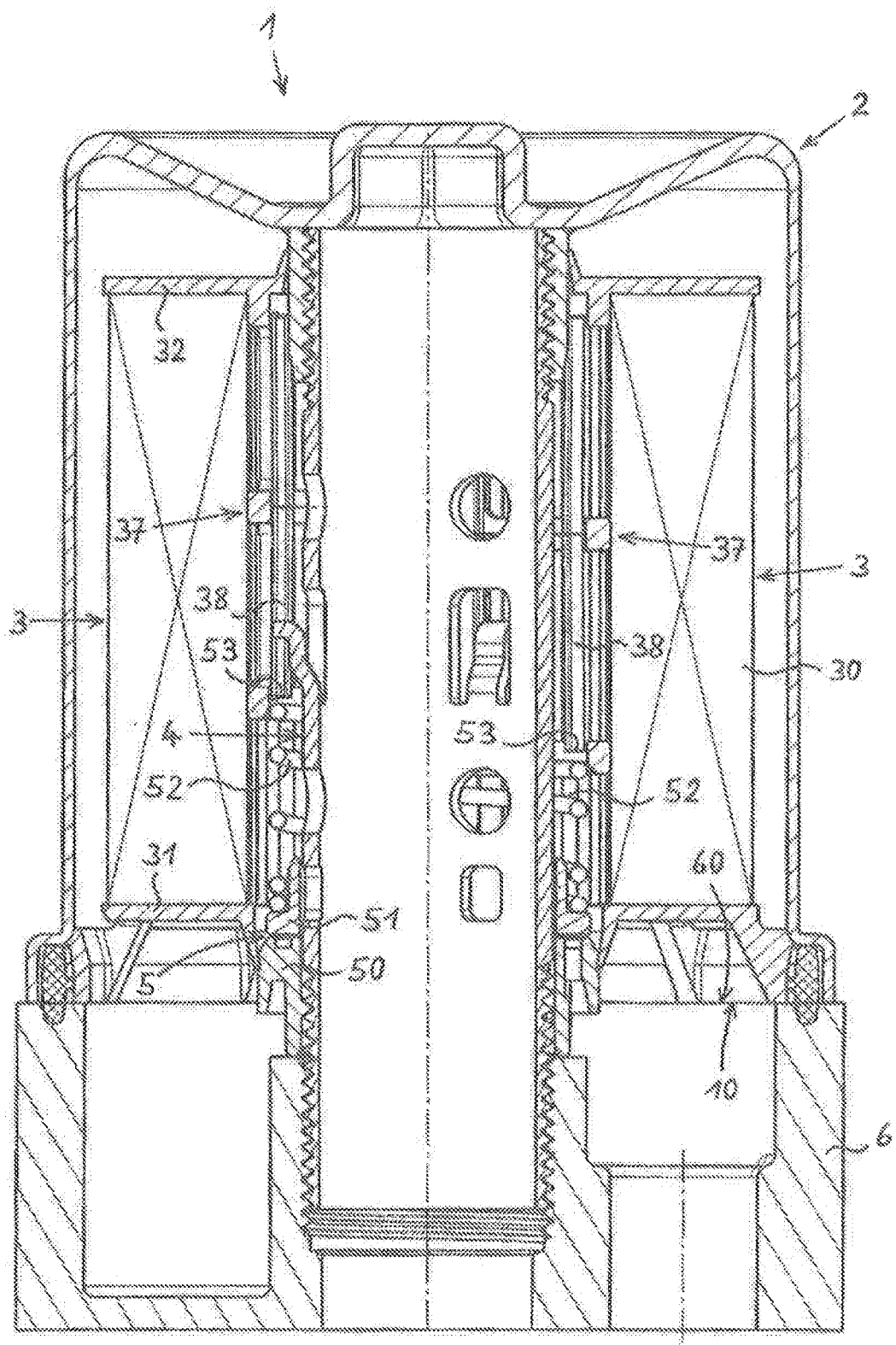
FIG. 30 shows the filter in an embodiment modified relative to FIG. 29, in the installed state with closed filter bypass valve and with a second filter insert shown in two different embodiments in the left and right halves of the Figure, in longitudinal section.

FIG. 30 shows filter 1 in an embodiment modified relative to that of FIG. 29, again in the installed state with closed filter bypass valve 5 and with a second filter insert 3 shown in two different embodiments in the left and right halves of the Figure, in longitudinal section.

Differing from FIG. 29, in the example according to FIG. 30 supporting element 37 of filter insert 3 is realized in one piece with upper end plate 32, so that here upper end plate 32, together with supporting element 37 formed in one piece therewith, is used to set the prestressing of spring 52. Here as well, the different prestressing of spring 52 takes place through different axial positioning of spring support 53 on filter insert 3, as a comparison of the left and right halves of FIG. 30 shows. Here as well, therefore, through simple exchange of filter insert 3 with different axial positioning of spring support 53, the opening pressure of filter bypass valve 5 can be set, and as needed can be set to a different value, without having to carry out modifications on the rest of filter 1.

Figure 31:
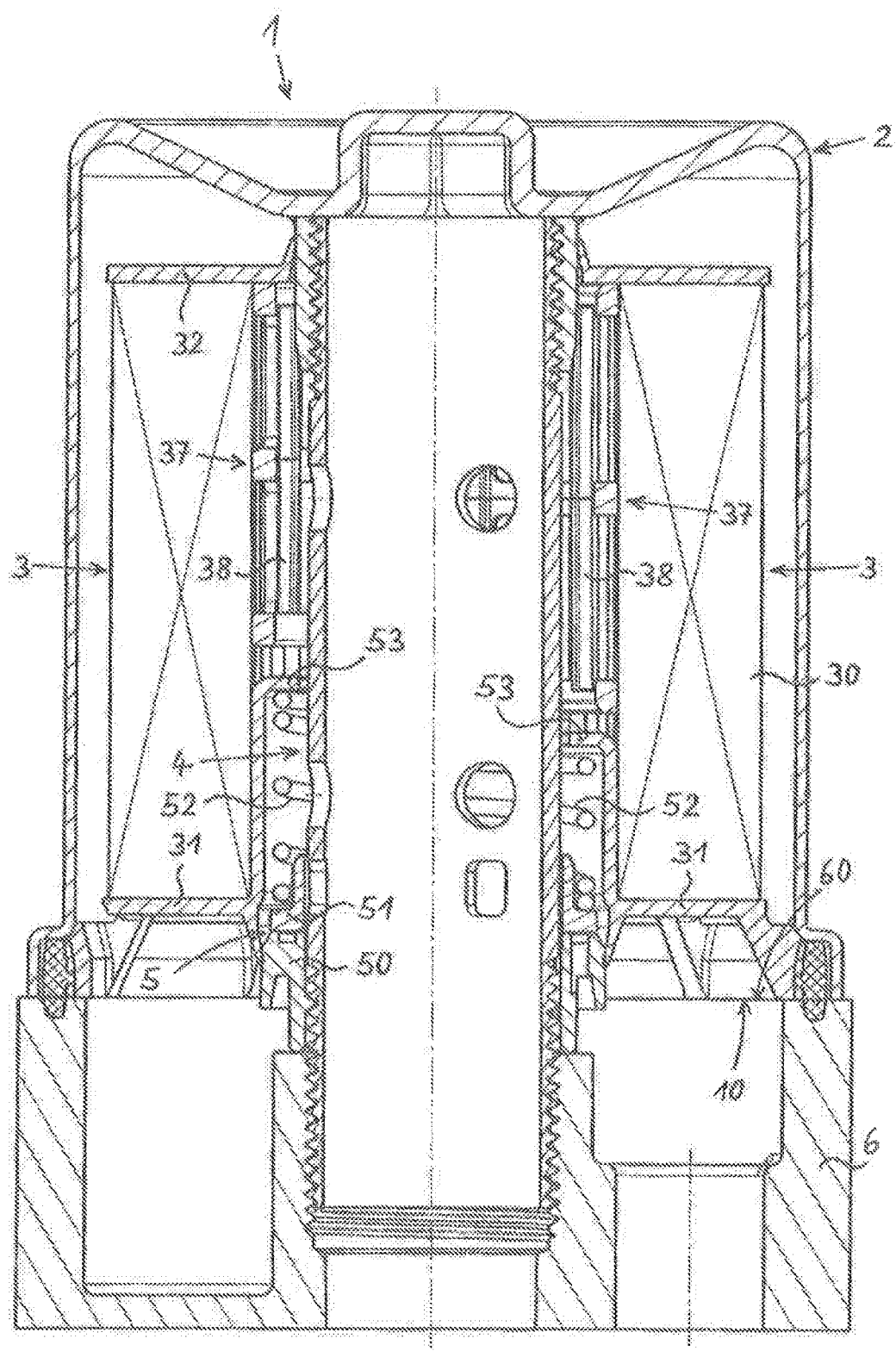
FIG. 31 shows the filter in a further embodiment modified relative to FIG. 29, in the installed state with closed filter bypass valve, and with a third filter insert shown in two different embodiments in the left and right halves of the Figure, in longitudinal section.

FIG. 31 shows filter 1 in an embodiment further modified relative to that of FIG. 29, again in the installed state with closed filter bypass valve 5 and having a third filter insert 3 shown in two different embodiments in the left and right halves of the Figure, in longitudinal section. In this example it is essential that in each case filter insert 3 is realized having a spring support 53 that is fashioned in one piece with lower end plate 31. For this purpose, lower end plate 31 has radially inwardly a hollow cylindrical projection that runs axially upward, ending in a collar that is oriented radially inward and that forms spring support 53. In filter insert 3 shown in the left half of FIG. 31, the projection running axially upward is fashioned with a greater length than in the case of filter insert 3 shown in the right half of FIG. 31, thereby producing two different prestressings of spring 52, and thus also two different opening pressures of filter bypass valve 5.

Figure 32:
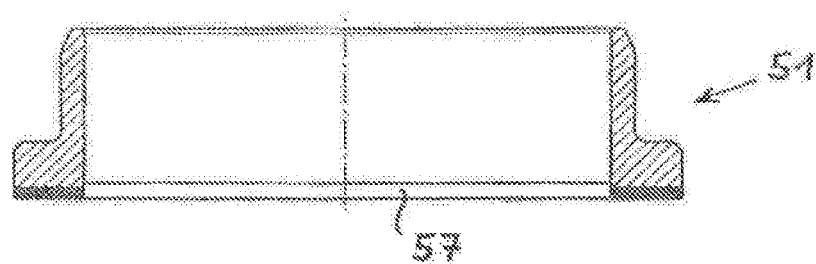
FIG. 32 shows a valve body and a modified embodiment, in longitudinal section.

FIG. 32 shows, in longitudinal section, a valve body 51 in an embodiment modified relative to the examples described above. Characteristic of this valve body 51 is that its end face that works together with valve seat 50 is provided with an elastomeric coating 57 in order to improve the sealing effect in interaction with valve seat 50.

Figure 33:
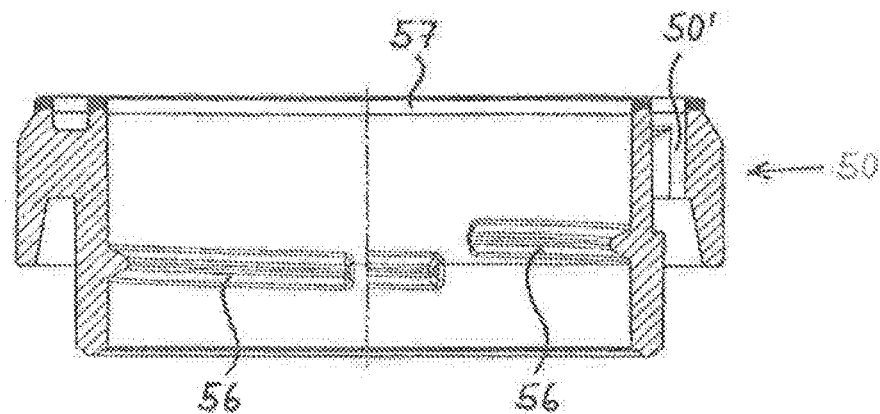
FIG. 33 shows a valve seat in a modified embodiment, in longitudinal section.

FIG. 33 shows a valve seat 50 in an embodiment modified relative to the above-described examples, in longitudinal section. Characteristic for this embodiment of valve seat 50 is that its end face that works together with valve body 51 is provided with an elastomeric coating 57, which likewise improves the sealing effect in interaction with valve body 51.

Moreover, in the right part of FIG. 33 one of the through-openings 50' is visible, through which the liquid flow runs when filter bypass valve 5 is open. Finally, on the inner circumference of annular valve seat 50, inner threading 56 situated there is visible, having a thread pitch with which valve seat 50 can be screwed onto threading 40' on outer end region 40 of central pipe socket 4.

Inside a filter 1, both valve seat 50 and valve body 51 can be provided with elastomeric coating 57; alternatively, it can also suffice to equip only valve seat 50 or only valve body 51 with elastomeric coating 57.

Figure 34:
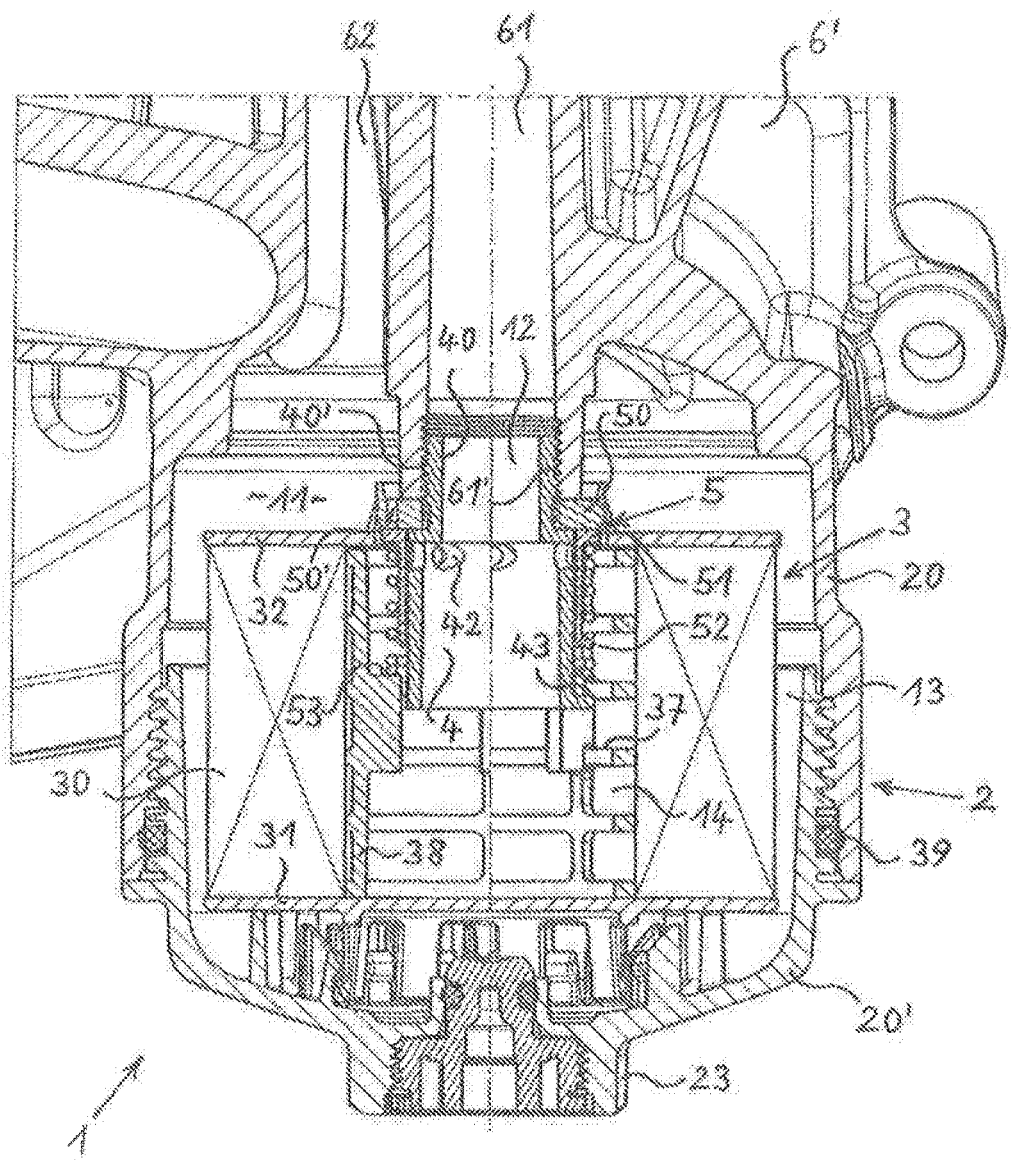
FIG. 34 shows a filter in a further embodiment, in longitudinal section.

In the above-described exemplary embodiments of filter 1, this filter is a screw-on exchangeable filter having an exchangeable filter insert 3 that can be attached on coupling flange 60 of the associated device 6, such as an internal combustion engine, instead of a screw-on exchangeable filter cartridge that can be exchanged only as a whole. Differing from this, FIG. 34 shows a filter 1 in an angled longitudinal section, having a separate base 6' with which it can be connected to an associated device 6 such as an internal combustion engine or to a functional module forming a part of the device. Moreover, filter 1 according to FIG. 34 is a so-called suspended filter 1 in which a screw cover 20', forming a detachable part of filter housing 2, can be screwed off downward and removed. Correspondingly, here filter insert 3 is also put in place from below and taken off downwardly.

Here, the non-detachable part of filter housing 2 is realized in one piece with base 6', and is for example a pressure die-cast part made of light metal such as aluminum. Screw cover 20' can also be a pressure die-cast part made of light metal, or alternatively can also be an injection-molded part made of plastic. By means of a sealing ring 39, screw cover 20', in its screwed-on state, seals against the rest of filter housing 2 in liquid-tight fashion. On its outer side, here pointing downward, screw cover 20' has a tool attachment projection 23, for example a hexagon. Inside tool attachment projection 23, here a standard known screw valve is situated as a drain valve, in order to make it possible to completely drain the interior of filter 1 of liquid before opening filter housing 2.

In the interior of filter housing 2, here as well there is situated a filter insert 3 that is made up of a hollow cylindrical filter material body 30 tightly enclosed at its two ends by end plates 31 and 32. In the interior of filter material body 30, here as well there is situated a grid-type supporting element 37 whose basic shape is hollow and cylindrical. As is known, here filter insert 3 is detachably locked to screw cover 20' using locking arms situated on its lower end plate 31.

In addition, in the interior of filter housing 2 there is situated a central pipe socket 4 that has in its upper end region 40 an external screw threading 40' with which it is screwed into a counter-threading 61' in base 6'. With its end plate 32, which is at the top in FIG. 34 and has a central perforation, filter insert 3 is placed from below onto central pipe socket 4.

A filter bypass valve 5 is situated on the outer circumference of pipe socket 4, at the height of upper end plate 32. For this purpose, immediately above upper end plate 32 an annular valve seat 50 is attached non-displaceably in the axial direction on the outer circumference of pipe socket 4, here by screwing on. Through-openings 50' run through valve seat 50, in its axial direction.

Immediately below valve seat 50 a valve body 51 is displaceably guided in the axial direction on the outer circumference of pipe socket 4. Seen in longitudinal section, valve body 51 has the shape of an upside-down L, a longer L limb forming the guide on pipe socket 4, and a shorter L limb protruding radially outward. An upper end face of the shorter L limb works together with a lower end face of the valve seat 50; a lower end face of the shorter L limb forms a seating surface for a spring 52 that loads valve body 51 with a preloading force in the closing direction.

The lower end of spring 52, facing away from valve body 51, is here supported on a spring support 53, sectioned and visible at left in FIG. 34, which is an integral and one-piece part of supporting element 37 inside filter insert 3.

It can be seen that in this embodiment of filter 1 as well, the prestressing of spring 52, and thus the opening pressure of filter bypass valve 5, is determined and defined, or can be modified as needed, through the axial position of spring support 53 on filter insert 3.

During operation of filter 1 according to FIG. 34, a liquid to be cleaned such as lubricant oil of an internal combustion engine flows through an unfiltered liquid duct 62 in base 6' to inlet 11 of filter 1, and to its unfiltered side 13. Flowing through filter material body 30 of filter insert 3, the liquid moves to filtered side 14 of filter 1, leaving behind dirt particles, and flows through supporting element 37 into central pipe socket 4, and flows through this socket to outlet 12, which goes into a filtered liquid duct 61 in base 6'.

As long as a pressure difference between unfiltered side 13 and filtered side 14 remains below a specifiable boundary value, filter bypass valve 5 remains closed. If the pressure difference exceeds the specifiable boundary value, the force of the liquid acting through through-openings 50' on valve body 51 opens filter bypass valve 5, and a flow path is released from unfiltered side 13 through through-openings 50' and perforations 42 in pipe socket 4, going immediately to filtered side 14, bypassing filter material body 30.

Here, valve body 51 is displaced against the force of spring 52 on the outer circumference of central pipe socket 4, in the axial direction thereof. For the purpose of establishing a good, tilt-free guiding of valve body 51 on central pipe socket 4, the axial length of valve body 51 should usefully be at least as large as its inner diameter.

For the maintenance of filter 1 according to FIG. 34, the filter is first drained of fluid by opening the drain valve. Subsequently, screw cover 20' is unscrewed, whereby simultaneously filter insert 3 locked thereto is moved out from filter housing 2, moving downward, and is pulled off from central pipe socket 4. In this way, spring support 53, as part of filter insert 3, is also removed from the downward-pointing end of spring 52. To prevent spring 52 from falling out of filter housing 2 and becoming lost, on the inner end (here pointing downward) of pipe socket 4, distributed around its circumference, a plurality of radially outward-protruding tabs are integrally formed as stop 43, on which spring 52 abuts when filter insert 3 is removed. In this way, spring 52 and valve body 51 are secured in captive fashion on central pipe socket 4.

During the manufacture and first installation of filter 1 according to FIG. 34, central pipe socket 4, with valve seat 50 and a valve body 51 situated thereon, as well as spring 52, are screwed into threading 61' of filtered liquid duct 61, using threading 40' on upper end region 40, and then remain there. During filter maintenance, only screw cover 20' then has to be unscrewed, and filter insert 3 is exchanged together with spring support 53 integrated therein.

As mentioned above, filter 1 is capable of operation in any spatial position; thus, instead of as a suspended filter as in FIG. 34 filter 1 can also be used as a lying or standing filter, or in any intermediate or oblique position. Here, filter bypass valve 5 is usefully situated in a position that during operation is situated as high up as possible, in order to keep contamination of the valve seat 50 and valve body 51 by dirt particles deposited from the liquid as low as possible.

Figure 35:
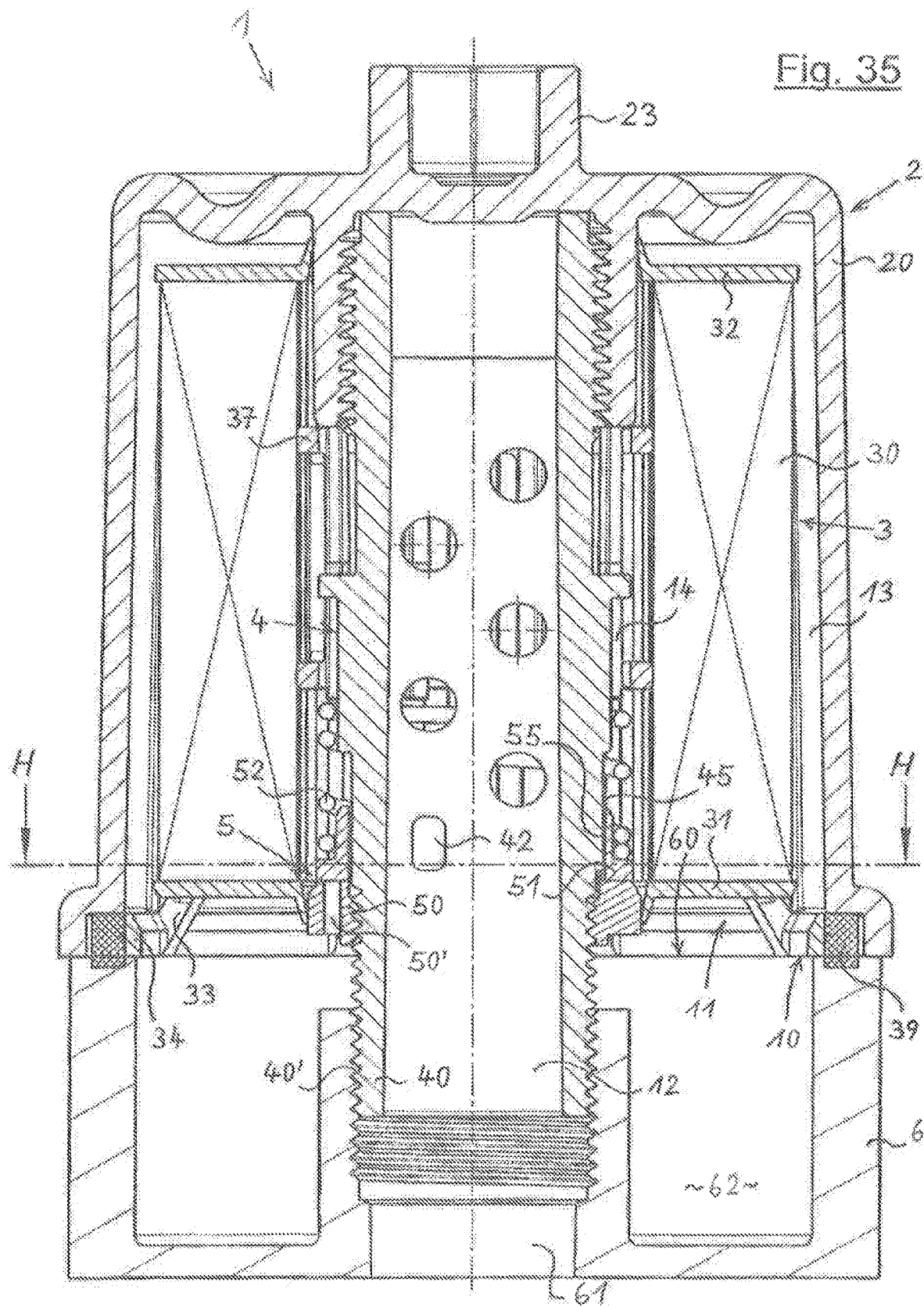
FIG. 35 shows the filter of FIG. 17 in a modified embodiment, having an anti-rotation lock for the valve body of the filter bypass valve, in longitudinal section.

FIG. 35 of the drawing shows filter 1 of FIG. 17 in a modified embodiment, namely having a rotational securing for valve body 51 of filter bypass 5, in longitudinal section. Like the exemplary embodiments described above, this exemplary embodiment of filter 1 according to FIG. 5 is also, equipped with a filter bypass valve 5. For this purpose, here as well valve seat 50 with its through-openings 50' is screwed onto outer screw threading 40' of lower end region 40 of pipe socket 4. Valve body 51 is situated above valve seat 50, and here as well is displaceable in the axial direction on the outer circumference of pipe socket 4. Spring 52 loads valve body 51 with a force acting in the closing direction.

Differing from the exemplary embodiment according to FIG. 17, in the exemplary embodiment according to FIG. 35 valve body 51 is secured against rotation relative to pipe socket 4 and relative to valve seat 50. For this purpose, on the outer circumference of pipe socket 4, on its side pointing to the right in FIG. 35, there is situated a protruding longitudinal rib 45 that runs in the longitudinal direction of pipe socket 4, and is for example integrally formed in one piece. Fitting thereto, on the inner circumference of valve body 50 a longitudinal groove 55 running in the axial direction of the valve body is formed which accommodates longitudinal rib 45 with a necessary degree of movement play. Together, longitudinal rib 45 and longitudinal groove 55 form a valve body guide that permits axial displacement of valve body 51 on pipe socket 4, and at the same time form a lock against a rotation of valve body 51 in the circumferential direction relative to pipe socket 4 and relative to valve seat 50. In this way, during the time of use of filter 1, leaks of filter bypass valve 5 in its closed position that may occur due to a relative rotation of valve body. 51 and valve seat 50 are reliably prevented.

With regard to the further parts in FIG. 35 and their function, reference is made to the above description, in particular of FIGS. 8 and 17.

Figure 36:
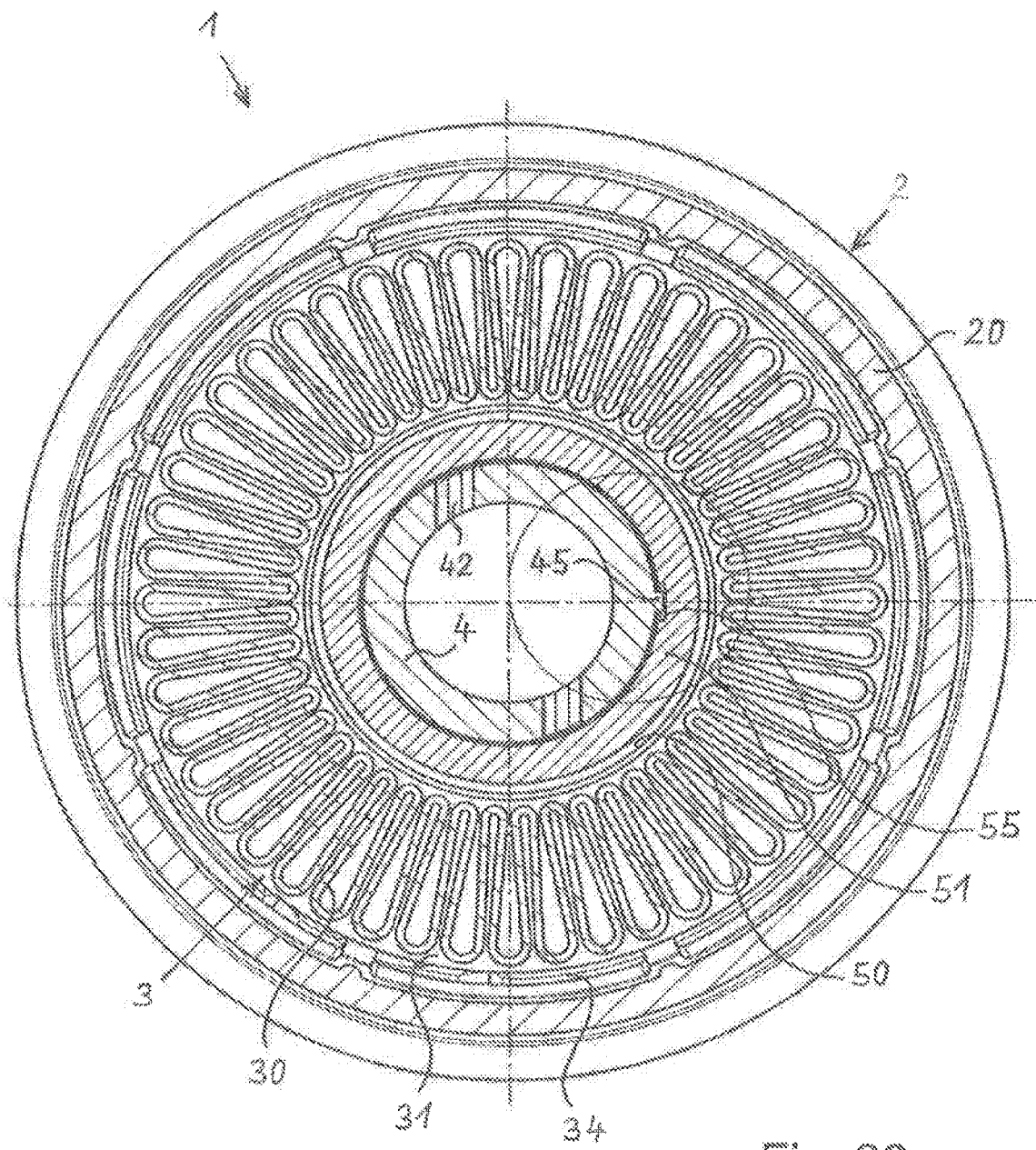
FIG. 36 shows the filter of FIG. 35 in cross-section according to the sectional line H-H in FIG. 35.

FIG. 36 shows filter 1 of FIG. 35 in cross-section along the sectional line H-H in FIG. 35. Radially outwardly, filter housing 2 with its circumferential wall 20 is visible. Radially inward therefrom, in the background there is lower end plate 31 with a sealing ring bearer 34. The filter material body 30, in the form of the folded filter material strand, is situated on lower end plate 31. Here, annular valve body 51 is situated radially inwardly from filter material body 30. Between the inner circumference of lower end plate 31 and the outer circumference of valve body 51, a small radially external part of valve seat 50, otherwise covered by valve body 51, can be seen.

Here again, the radially innermost part of filter 1 is formed by central pipe socket 4 with perforations 42, of which two are visible here in section. On the outer circumference of pipe socket 4, on its side pointing here to the right, longitudinal rib 45 protruding in the radial direction and running in the axial direction of pipe socket 4 can be seen. Fitting longitudinal rib 45, on the inner circumference of annular valve body 51 longitudinal groove 55 is formed, which accommodates longitudinal rib 45. FIG. 36 illustrates that a rotation of valve body 51 relative to central pipe socket 4 and relative to the valve seat 50 attached non-rotatably on pipe socket 4 is not possible.

Figure 37:
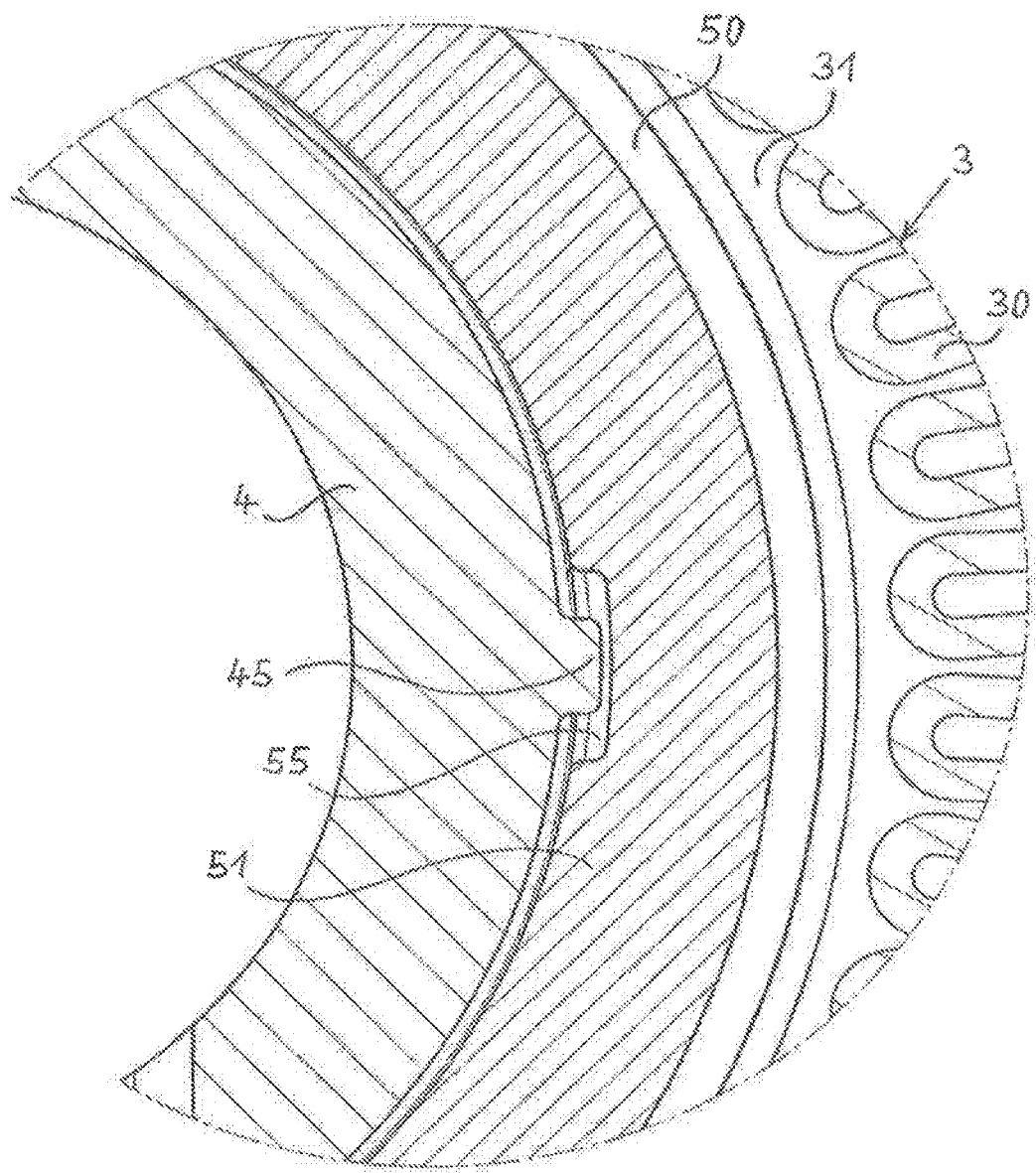
FIG. 37 shows the detail circled in FIG. 36 in an enlarged representation.

FIG. 37 shows the detail circled in FIG. 36 in an enlarged representation. At left in FIG. 37, a part of central pipe socket 4 can be seen with its longitudinal rib 45 situated on the outer circumference. Radially outwardly, i.e., here to the right, there follows valve body 51 having longitudinal groove 55, which accommodates longitudinal rib 45, in its inner circumference. In order not to hinder the axial mobility of valve body 51 necessary for the valve function, longitudinal rib 45 and longitudinal groove 55 have adequate movement play relative to one another.

Radially outwardly from valve body 51, a small part of lower end plate 31 with filter material body 30 can also be seen.

Figure 38:
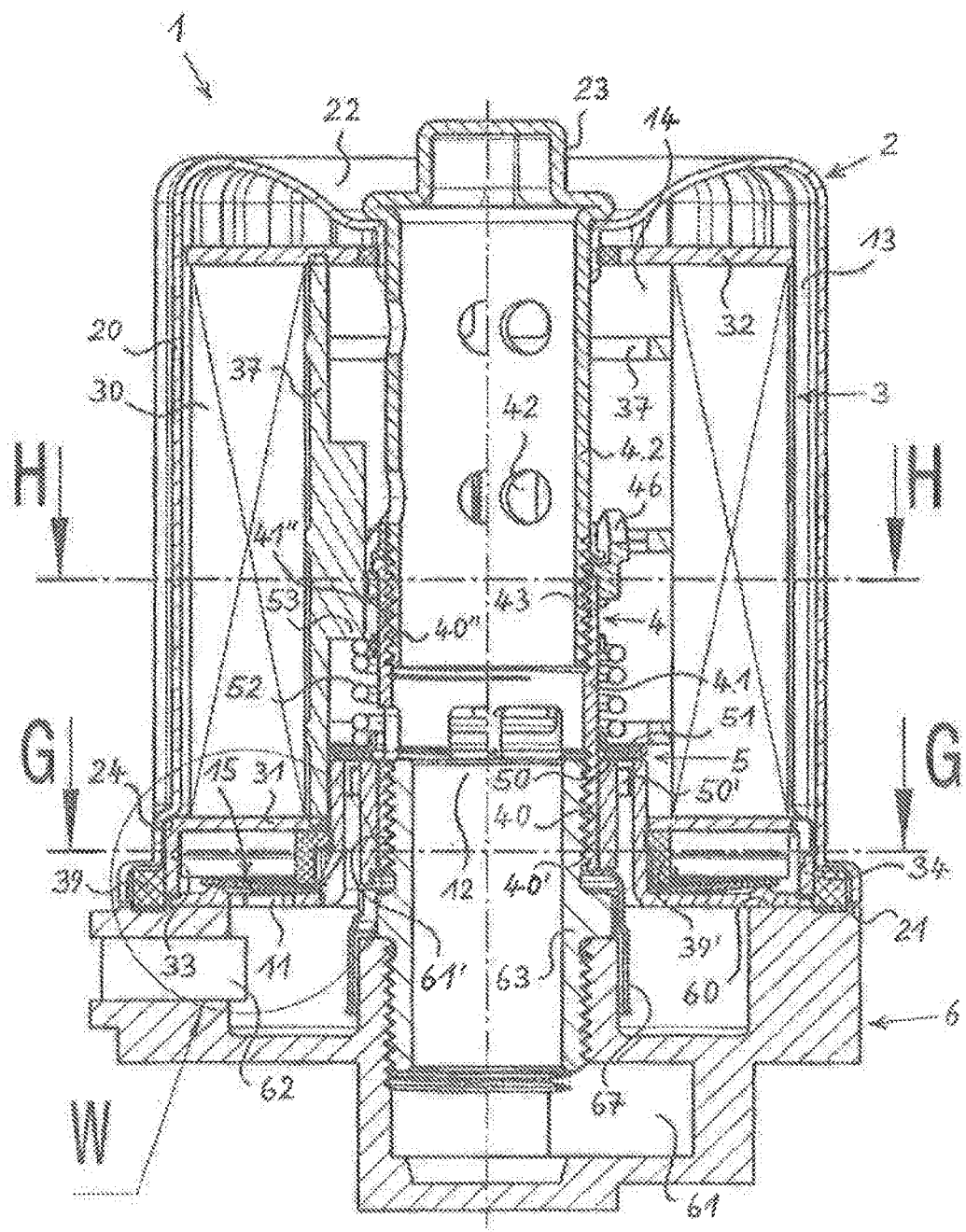
FIG. 38 shows the filter in a further embodiment, in longitudinal section.

FIG. 38 shows filter 1 in a further embodiment in longitudinal section, in a state in which it is installed on a coupling flange 60 of a device 6. Filter 1 again has a cup-shaped filter housing 2 that is open at its flange-side end face 21. Inside filter housing 2 there is situated a central pipe socket 4 that is made up of a first flange-side pipe socket segment 4.1 and a second pipe socket segment 4.2 that is remote from the flange and is tightly connected to end face 22 of filter housing 2 remote from the flange, the two pipe socket segments 4.1 and 4.2 being screwed together.

On flange-side pipe socket segment 4.1, there are situated the parts of filter bypass valve 5, namely, at bottom, first valve seat 50, above this the axially displaceable valve body 51, and above this spring 52, which preloads the valve body 51 in the closing direction of filter bypass valve 5. On its end facing away from valve body 51, in the operation-ready state shown in FIG. 38 spring 52 is supported and prestressed by spring support 53. Here as well, spring support 53 is part of filter insert 3, more precisely of its central supporting element 37.

On the upper end of flange-side pipe socket segment 4.1 there is situated a stop 43 on which the upper end of spring 52 abuts when filter housing 2, and together with it filter insert 3, are separated from the rest of filter 1. In this way, spring 52 and valve body 51 are secured against loss. At the upper side, stop 43 is realized with roof-shaped introductory bevels 46 over which support arms 53' are guided when filter 1 is assembled.

In addition to filter bypass valve 5, filter 1 according to FIG. 38 also has a return check valve 15 that covers inlet 11 and that prevents filter 1 from running empty when there is a standstill of the liquid circuit.

Figure 39:
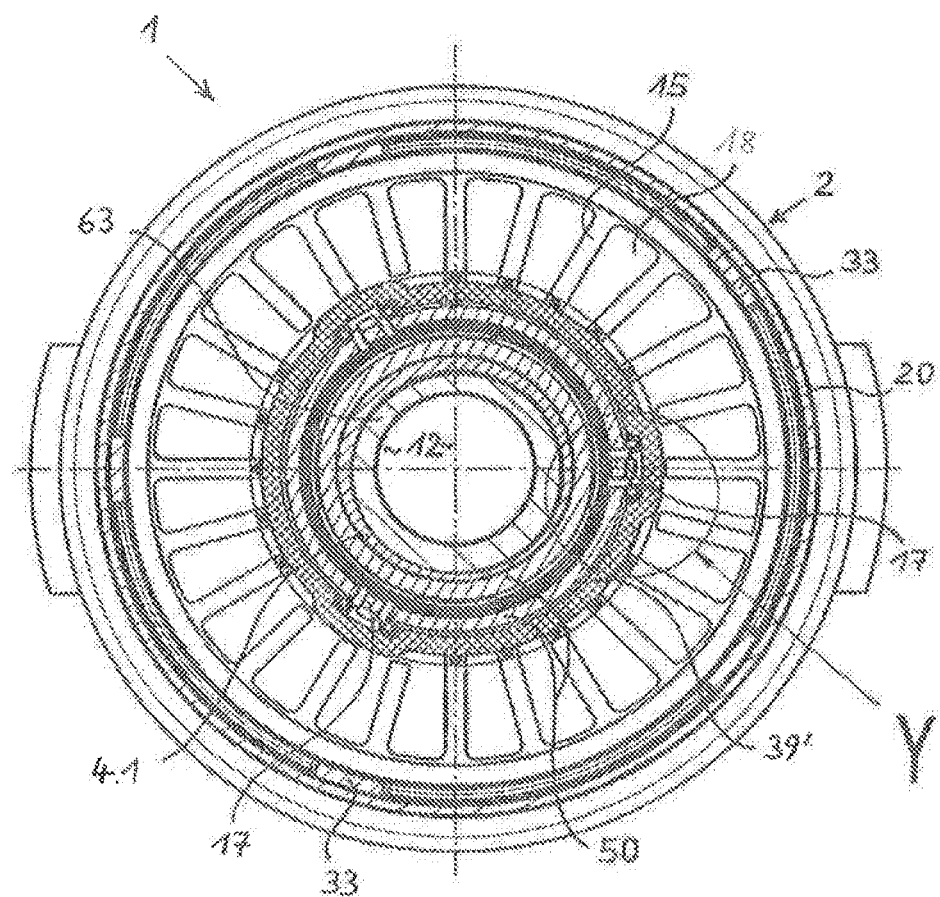
FIG. 39 shows the filter of FIG. 38 in cross-section according to the sectional line G-G in FIG. 38.

FIG. 39 shows filter 1 of FIG. 38 in a cross section along the sectional line G-G in FIG. 38. Circumferential wall 20 of filter housing 2 runs radially externally. Radially inward therefrom, return check valve 15 with spring tongue plate 18 is visible. Next, further radially inward there follows sealing ring 39', then followed by valve seat 50. Still further radially inward, flange-side pipe socket segment 4.1 is sectioned, followed still further radially inwardly by threaded nipple 63 of associated coupling flange 60. Outlet 12 of filter 1 is situated in the center of FIG. 39.

Figure 40:
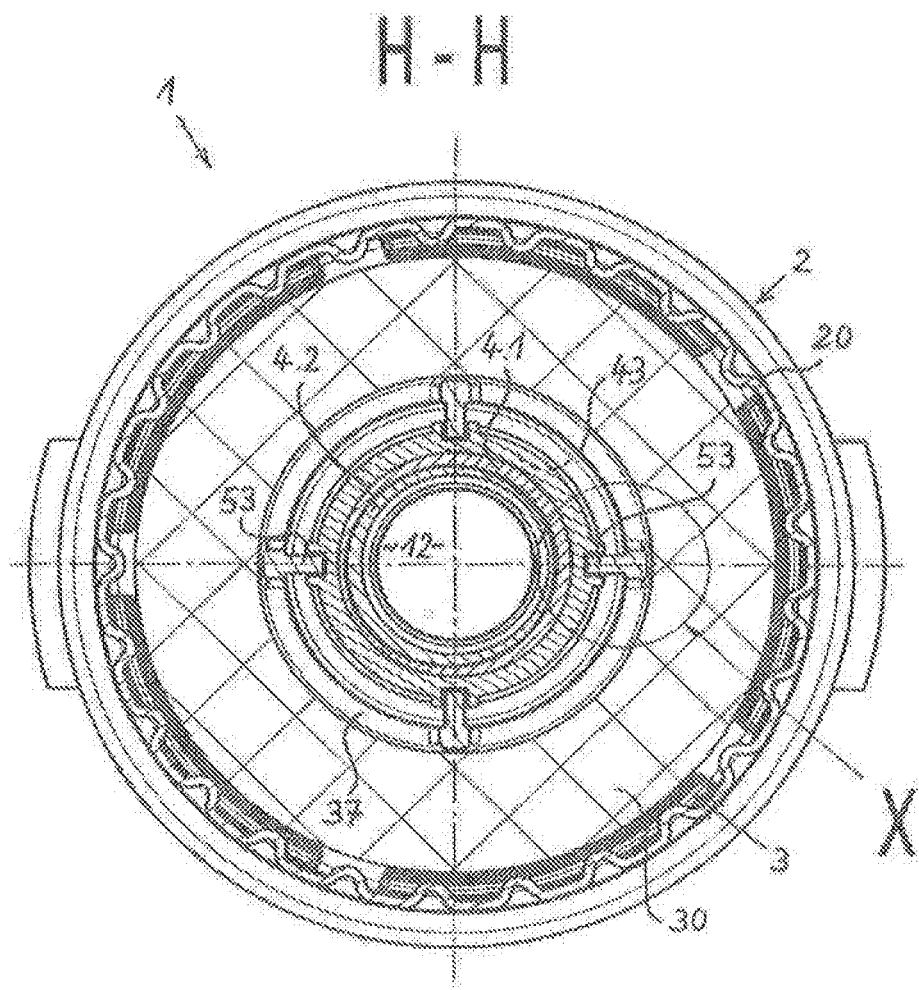
FIG. 40 shows the filter of FIG. 38 in cross-section according to the sectional line H-H in FIG. 38.

FIG. 40 shows filter 1 of FIG. 38 in cross-section along the sectional line H-H in FIG. 38. Here as well, radially externally first circumferential wall 20 of filter housing 2 is sectioned. Radially inward therefrom there is situated filter material body 30 of filter insert 3 with central supporting element 37. At four points on supporting element 37, uniformly spaced from one another in the circumferential direction, spring supports 53 are integrally formed on supporting element 37, and protrude radially inward. Radially inward from supporting element 37 there then follow stop 43 and pipe socket segments 4.1 and 4.2.

Figure 41:
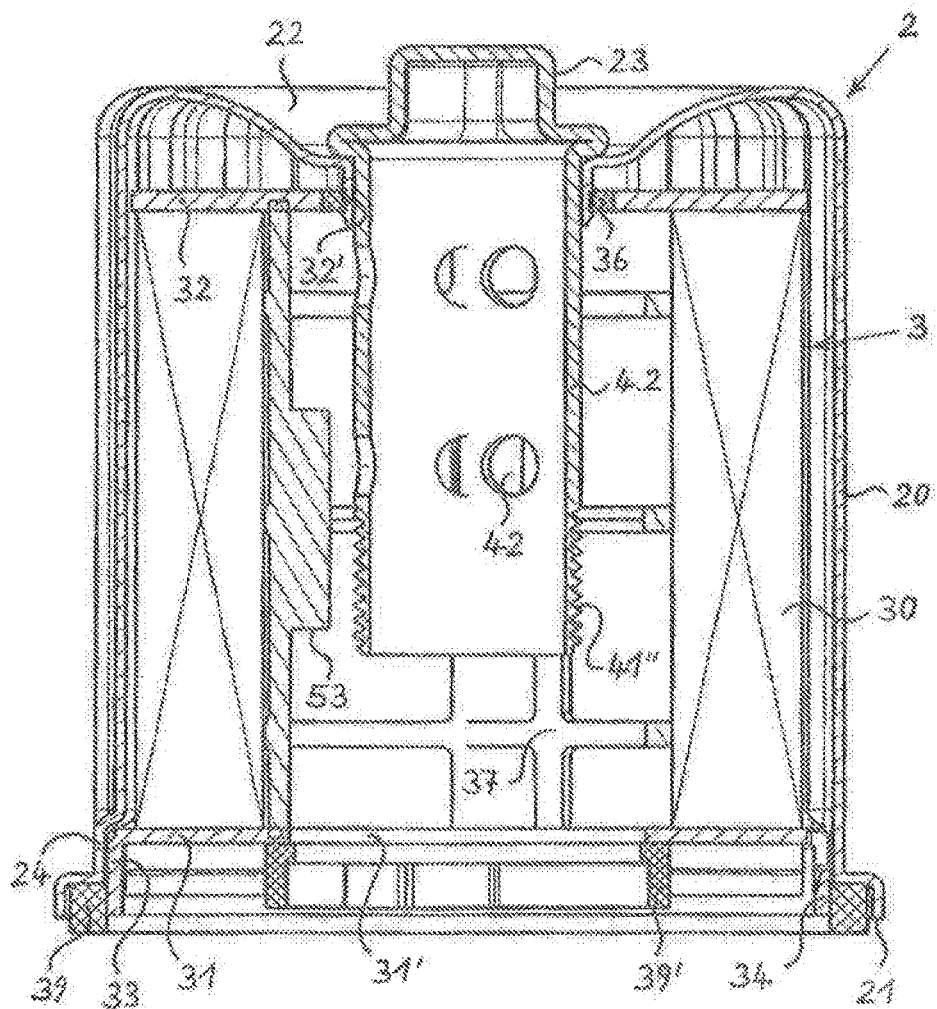
FIG. 41 shows the filter housing and the filter insert of the filter situated therein of FIG. 38, in longitudinal section.

FIG. 41 shows filter housing 2 and filter insert 3 situated therein of filter 1 of FIG. 38 in longitudinal section, together forming the constructive unit that is removed during maintenance of filter 1. For this purpose, by rotating filter housing 2 the flange-remote pipe socket segment 4.2, with its lower outer threading 41", is screwed out of flange-side pipe socket segment 4.1, filter insert 3 being carried along due to its frictional connection to filter housing 2. When filter housing 2 has been completely unscrewed, filter insert 3 can be pulled out through the open underside of filter housing 2, and can be replaced by a fresh filter insert 3, including supporting element 37 with spring support 53.

Seal 39 is here also part of filter insert 3, and is borne by a sealing ring bearer 34 that is connected to lower flange-side end plate 31 of filter insert 3 via connecting webs 33, or is realized in one piece therewith.

Figure 42:
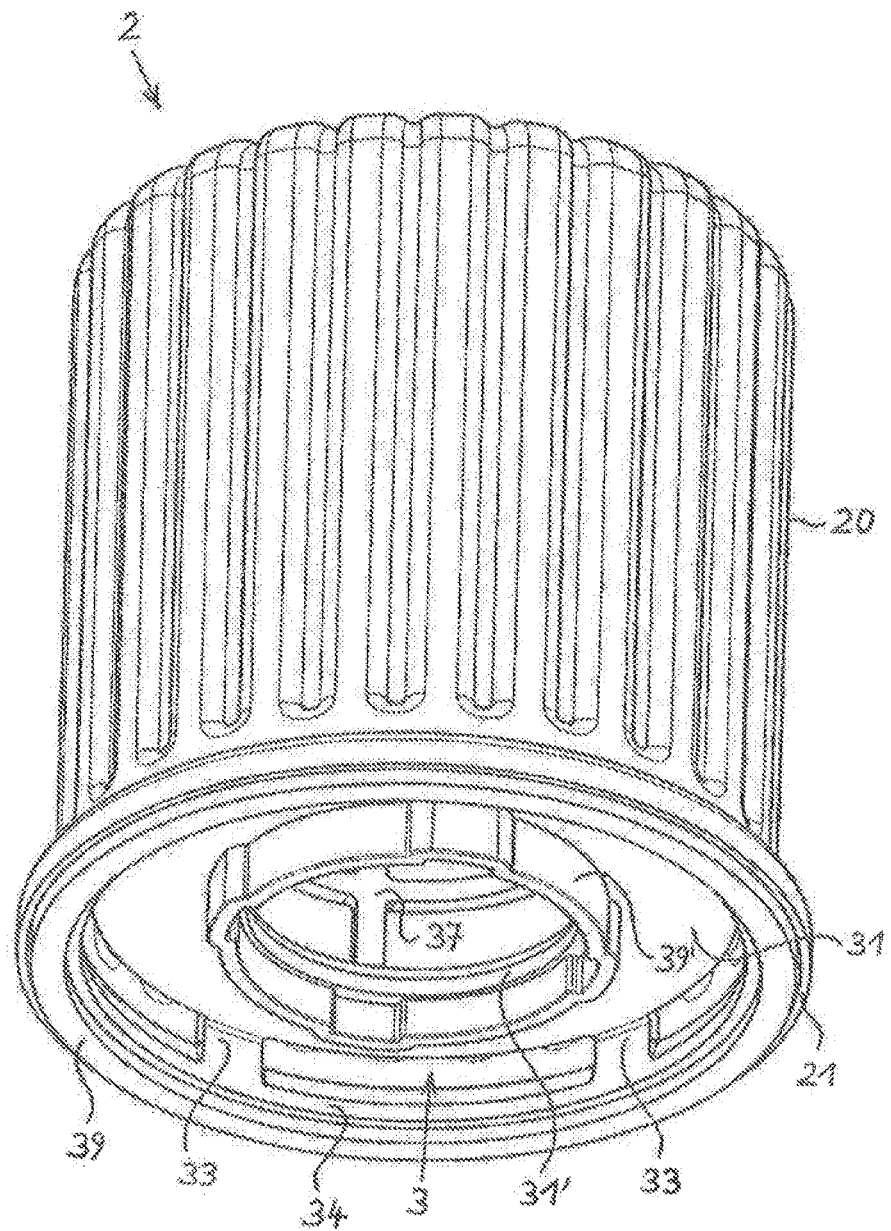
FIG. 42 shows the filter housing having the filter insert of FIG. 41, in an oblique view from below.

FIG. 42 shows filter housing 2 with filter insert 3 of FIG. 41, in an oblique view from below. Of filter insert 3, here its lower, flange-side end plate 31, connecting webs 33, sealing ring bearer 34, and radially outer sealing ring 39 are visible. Radially inner sealing ring 39' runs around central perforation 31' of end plate 31. Through perforation 31', a part of inner supporting element 37 of filter insert 3 is visible.

Figure 43:
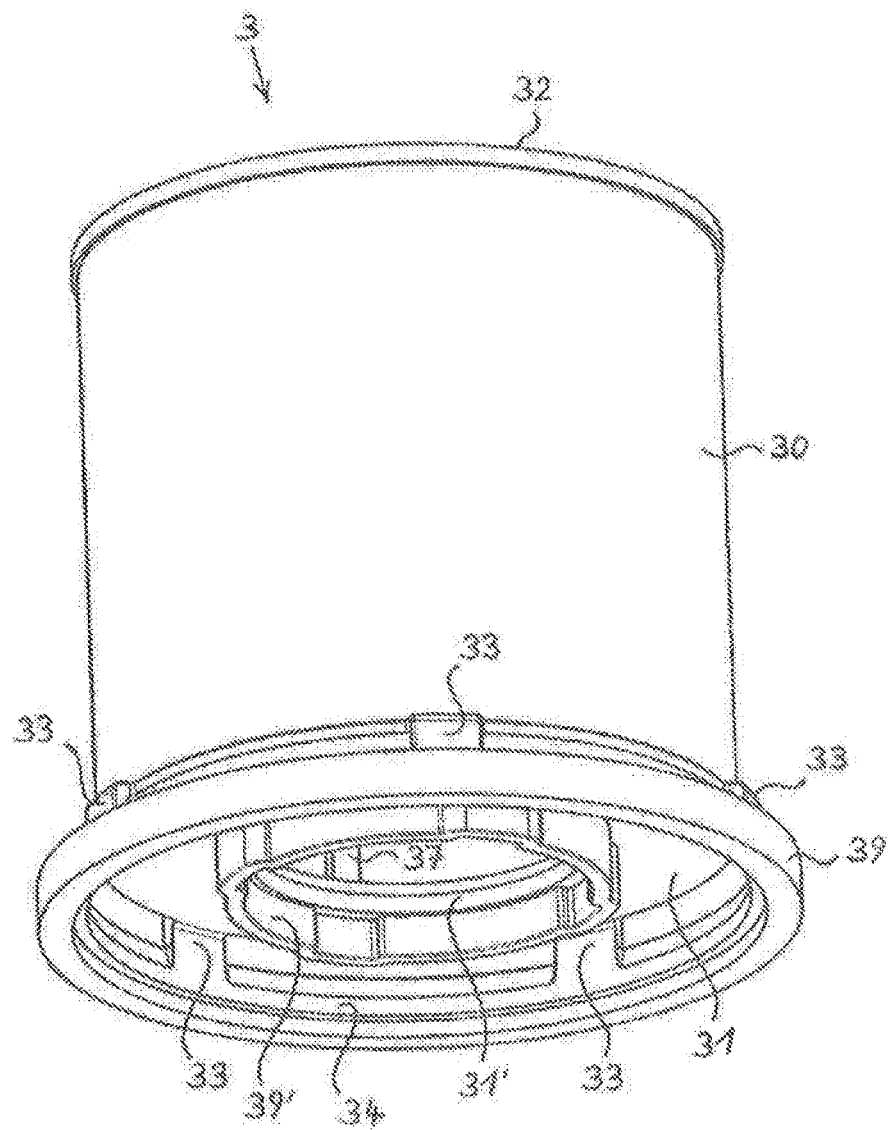
FIG. 43 shows the filter insert of the filter of FIG. 38 in an oblique view from below.

FIG. 43 shows filter insert 3 of filter 1 of FIG. 38, in an oblique view from below. The essential part of filter insert 3 is formed by its hollow cylindrical filter material body 30, covered at the underside by end plate 31 and at the upper side by end plate 32. From the radially external edge of lower end plate 31, a plurality (here five) of connecting webs 33, distributed uniformly around the circumference, extend downward in the axial direction, which bear sealing ring bearer 34 on which outer sealing ring 39 is externally situated. Going around central perforation 31' of lower end plate 31, radially inner seal 39' is again visible. Through perforation 31', a small part of grid-shaped inner supporting element 37 is visible. Here, it is particularly clear that the two sealing rings 39 and 39' are parts of filter insert 3 that are each replaced, without special measures, with filter insert 3 during each filter maintenance.

Figure 44:
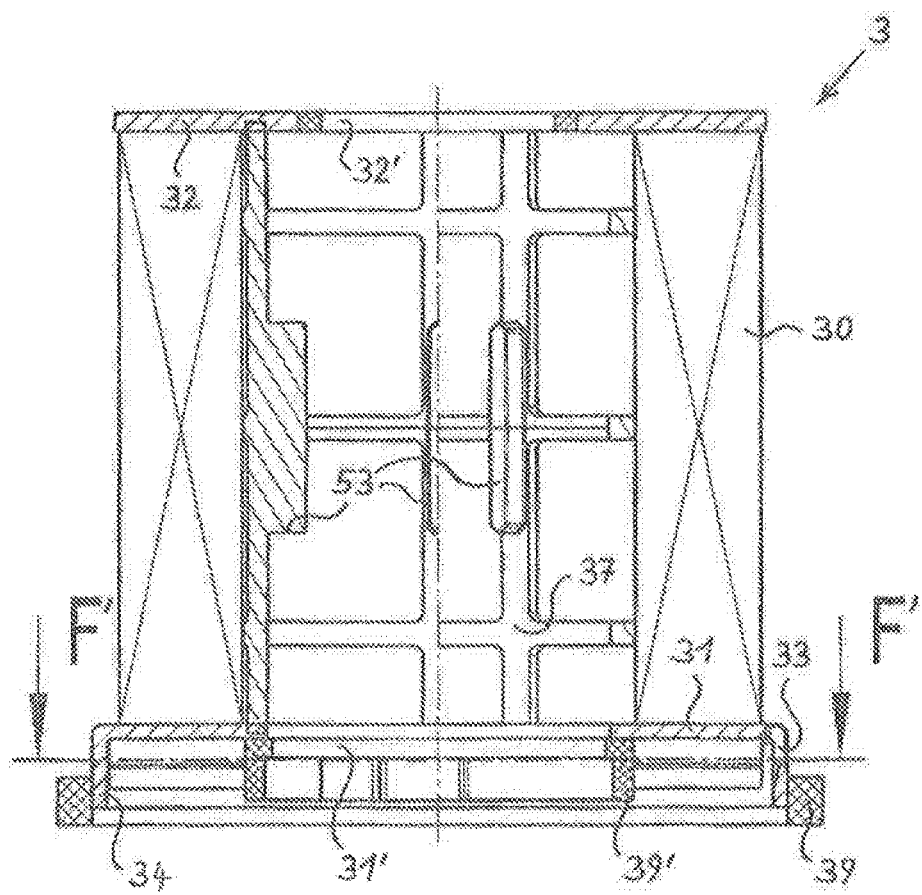
FIG. 44 shows the filter insert of FIG. 43 in longitudinal section.

FIG. 44 shows filter insert 3 of FIG. 43 in an angled longitudinal section. In the interior of filter material body 30, there is situated supporting element 37 with spring supports 53, distributed around the inner circumference of supporting element 37. On the lower side of filter insert 3, radially inner sealing ring 39' runs around perforation 31' of lower end plate 31. Radially outer sealing ring 39 is situated on the outer circumference of sealing ring bearer 34.

Figure 45:
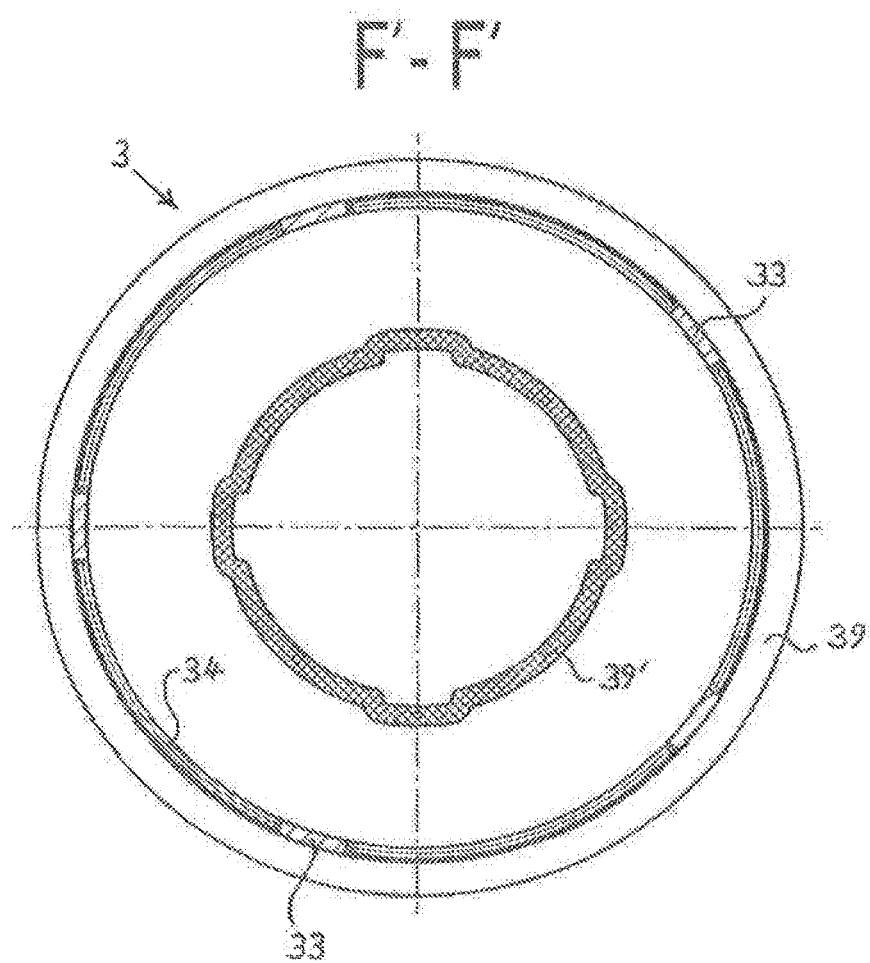
FIG. 45 shows the filter insert of FIG. 44 in cross-section according to the sectional line F'-F' in FIG. 44.

FIG. 45 shows filter insert 3 of FIG. 44 in cross-section according to the sectional line F'-F' in FIG. 44. Sealing ring 39 is radially outwardly visible, borne by sealing ring bearer 34 running radially inward therefrom. Connecting webs 33 extend upward from sealing ring bearer 34. Further radially inward, second sealing ring 39' is sectioned.

Figure 46:
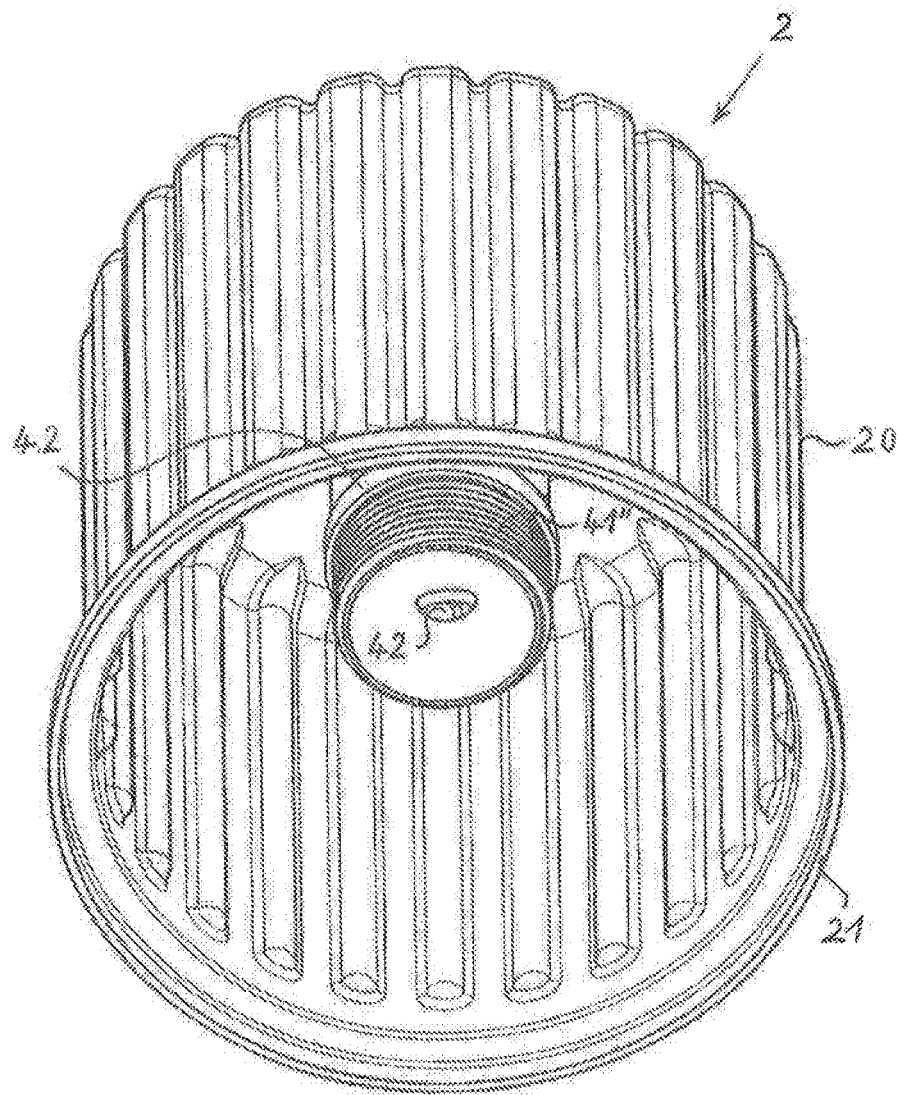
FIG. 46 shows the filter housing of the filter of FIG. 38 in an oblique view from below.

FIG. 46 shows filter housing 2 of filter 1 of FIG. 38 in an oblique view from below. In the interior of filter housing 2, flange-remote pipe socket segment 4.2 runs concentric to circumferential wall 20, with its threading 41" for connection to second, flange-side pipe socket segment 4.1, which remains on coupling flange 60 after a first assembly of filter 1 when filter housing 2 is unscrewed, as described above. In pipe socket segment 4.2, one of the perforations 42 provided therein is visible, through which during operation of filter 1 filtered liquid moves into the interior of central pipe socket 4.

Figure 47:
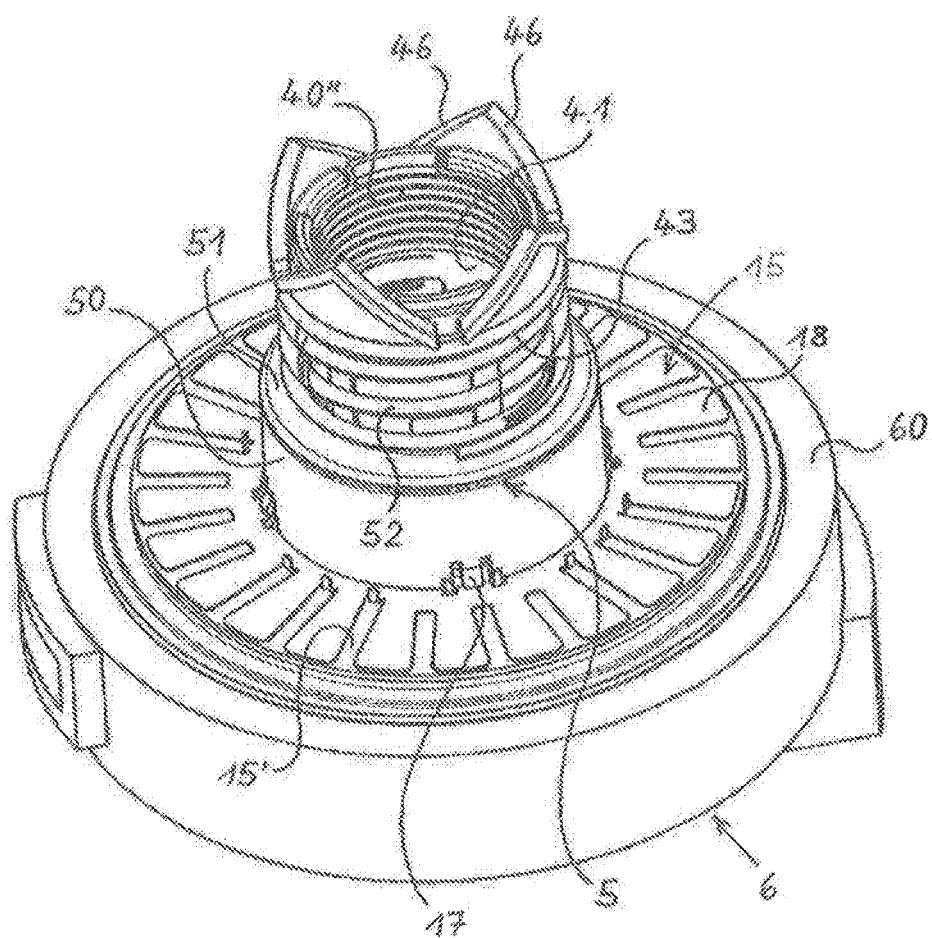
FIG. 47 shows a coupling flange of the filter with filter parts remaining thereon after removal of filter housing and filter insert.

FIG. 47 shows a coupling flange 60 of filter 1 having filter parts remaining thereon after removal of filter housing 2 and filter insert 3. The filter parts remaining on coupling flange 60 are flange-side pipe socket segment 4.1, with filter bypass valve 5 situated thereon, and return check valve 15 also situated thereon.

At the top in FIG. 47, stop 43, situated on the upper end of pipe socket segment 4.1, is visible with top-side introductory bevels 46, and in the interior of the upper end of pipe socket segment 4.1 its inner threading 40" is visible with which threading 41" of flange-remote pipe socket segment 4.2 (not present here) can be screwed together. Under stop 43, spring 52 of filter bypass valve 5 is visible, which preloads the valve body 51 in the closing direction and presses it against valve seat 50.

Return check valve 15 includes a circular flexible valve membrane 15' and a spring tongue plate 18 situated above it, connected to the outer circumference of valve seat 50 via a plurality of locking connections 17 distributed in the circumferential direction. Going around return check valve 15, coupling flange 60 of device 6 can be seen.

Figure 48:
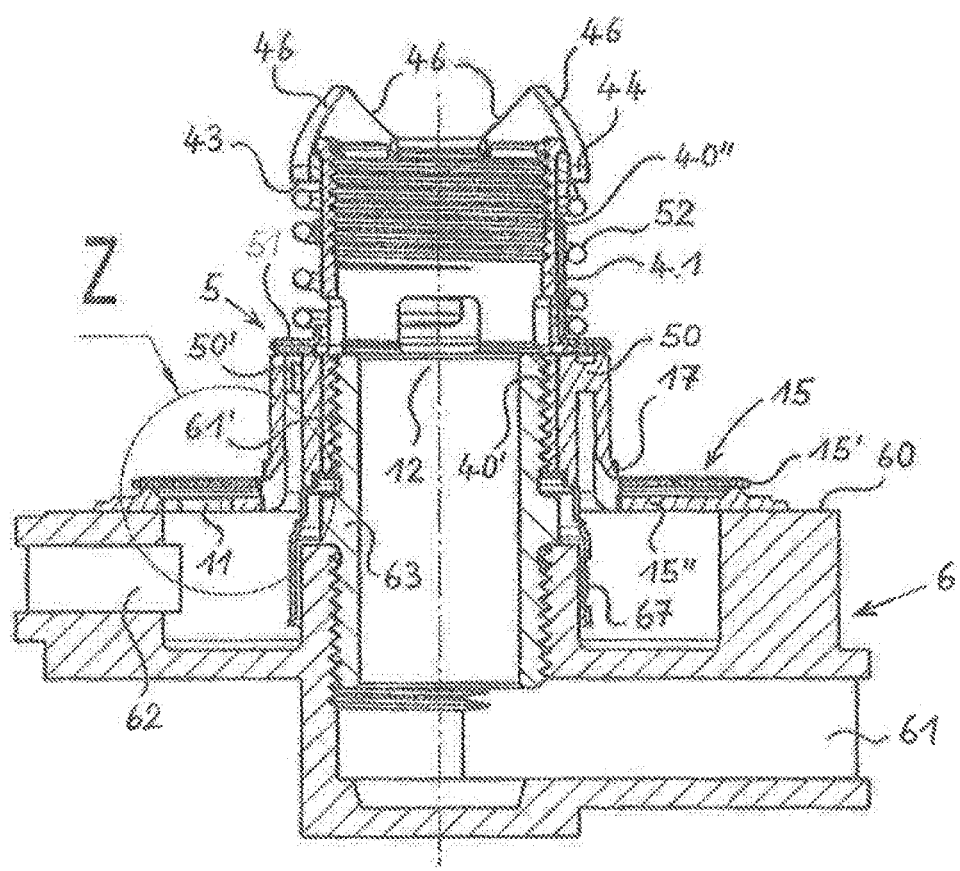
FIG. 48 shows the subject matter of FIG. 47 in longitudinal section.

FIG. 48 shows the subject matter of FIG. 47 in longitudinal section; here it is particularly clear that flange-side pipe socket segment 4.1 is screwed, with screw threading 40' made on its outer region, i.e., here its lower end region 40, onto a threaded nipple 63 situated centrally in coupling flange 60 and having a counter-threading 61'. Threaded nipple 63 is in turn permanently screwed to device 6 in the center of coupling flange 60 via a further screwed connection. The screw connection of pipe socket segment 4.1 to threaded nipple 63 takes place during a first assembly of filter 1 and is secured against detachment by an anti-rotation lock 67 when filter housing 2 (not shown in FIG. 48) is unscrewed, together with flange-remote pipe socket segment 4.2, from flange-side pipe socket segment 4.1.

On the outer circumference of flange-side pipe socket segment 4.1, the parts of filter bypass valve 5 are provided in the configuration described above. At the top on pipe socket segment 4.1 there sits stop 43 with top-side introductory bevels 46, which, during assembly of filter 1, guide spring support 53, or support arms 53', situated in filter insert 3 into intermediate spaces 44 at the lower end of the introductory bevels 46. In this way, only one filter insert 3 can be used having spring supports 53, or support arms 53', in the number, shape, and distribution matching intermediate spaces 44.

Radially outward from valve seat 50, there is situated return check valve 15 which covers inlet 11, and which here has a separate membrane bearer 15".

Figure 49:
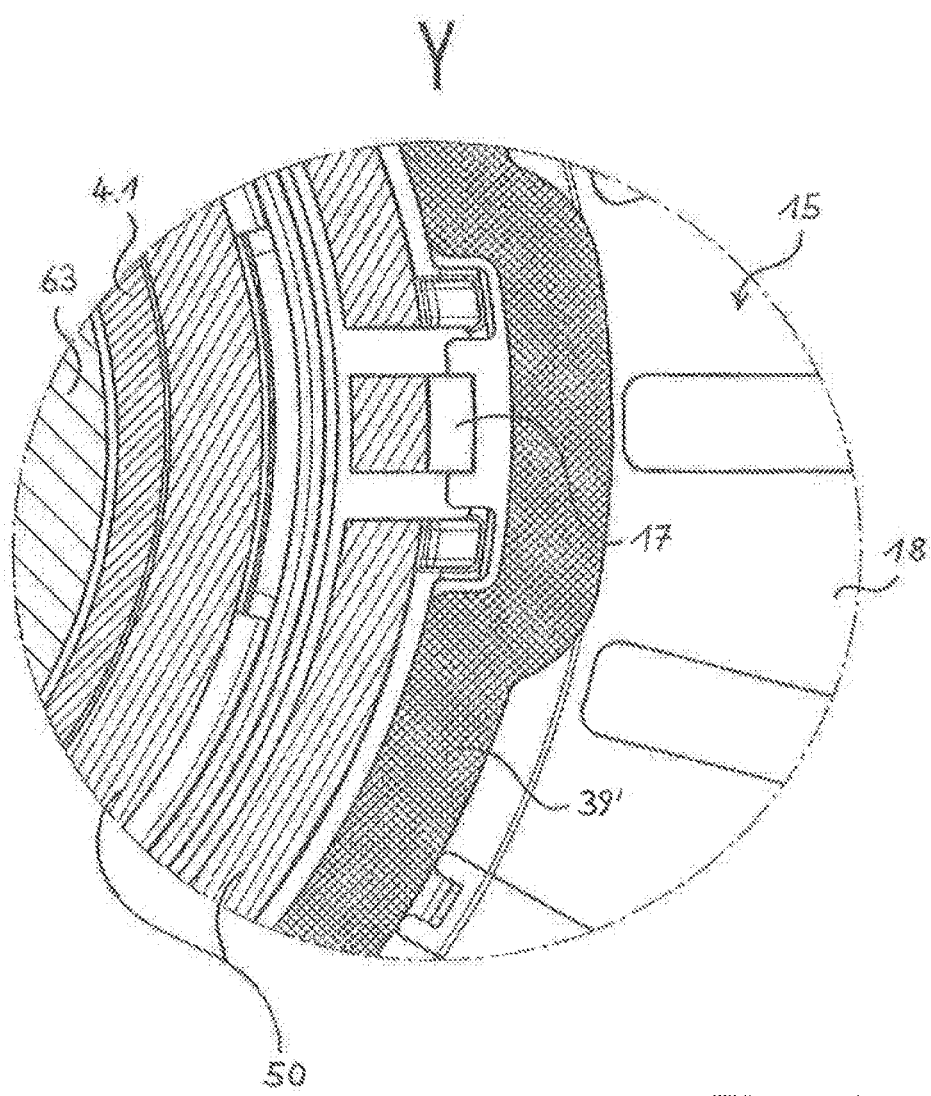
FIG. 49 shows detail Y of FIG. 39 in an enlarged representation.

FIG. 49 shows detail Y of FIG. 39 in an enlarged representation. At the far left, a small part of threaded nipple 63 is visible, surrounded radially outwardly, i.e., to the right, by flange-side pipe socket segment 4.1. Further outward, i.e., here to the right, follow valve seat 50 and radially inner sealing ring 39'. At the right, i.e., radially outward therefrom, a part of return check valve 15 with spring tongue plate 18 is still visible. The parts of return check valve 15 are connected to valve seat 50 via locking connections 17; FIG. 49 shows one of these locking connections 17. FIG. 49 further illustrates that sealing ring 39' is adapted in its course to the configuration and position of locking connections 17, and here deviates radially outwardly in each case. This curve of sealing ling 39' adapted to the position of locking connections 17 is also visible in FIGS. 42, 43, and 45.

Figure 50:
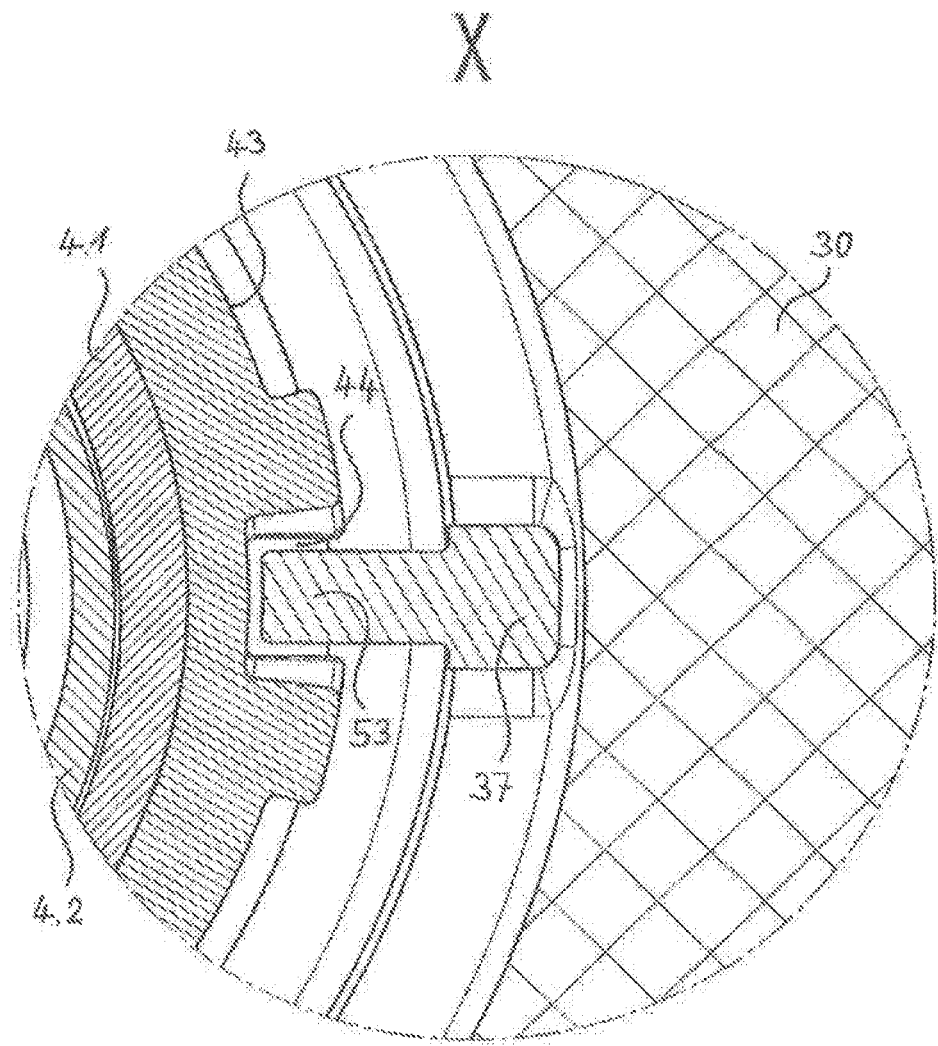
FIG. 50 shows detail X of FIG. 40 in an enlarged representation.

FIG. 50 shows detail X of FIG. 40 in an enlarged representation, filter material body 30 being visible here in the right part of FIG. 50, which body is supported radially inwardly, i.e., at left in the Figure, by inner supporting element 37. Made in one piece with supporting element 37, here one of the spring supports 53 is visible, which engages in one of the intermediate spaces 44 in stop 43. Radially inward from stop 43, i.e., to the left thereof in this Figure, small parts of pipe socket segments 4.1 and 4.2 can be seen.

Figure 51:
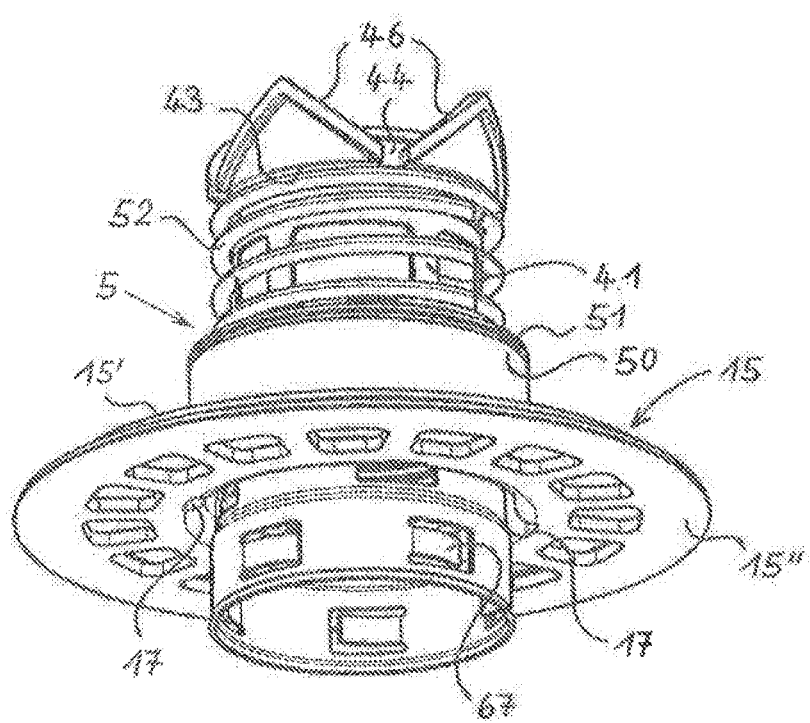
FIG. 51 shows a constructive unit including a filter bypass valve and a return check valve as parts of the filter of FIG. 38, in an oblique view from below.

FIG. 51 shows a constructive unit including filter bypass valve 5 and return check valve 15 as parts of filter 1 of FIG. 38, in an oblique view from below. At the upper end of flange-side pipe socket segment 4.1, stop 43 is visible with introductory bevels 46 and intermediate spaces 44 between them. Under these is situated spring 52 of filter bypass valve 5, which preloads valve body 51 thereof in the closing direction against valve seat 50.

In the lower part of FIG. 51, return check valve 15 is visible; here the view from below is directed to membrane bearer 15" having perforations for inflowing liquid to be filtered. At the upper side, flexible valve membrane 15' is situated on membrane bearer 15". Underneath membrane bearer 15", anti-rotation lock 67 is visible.

Figure 52:
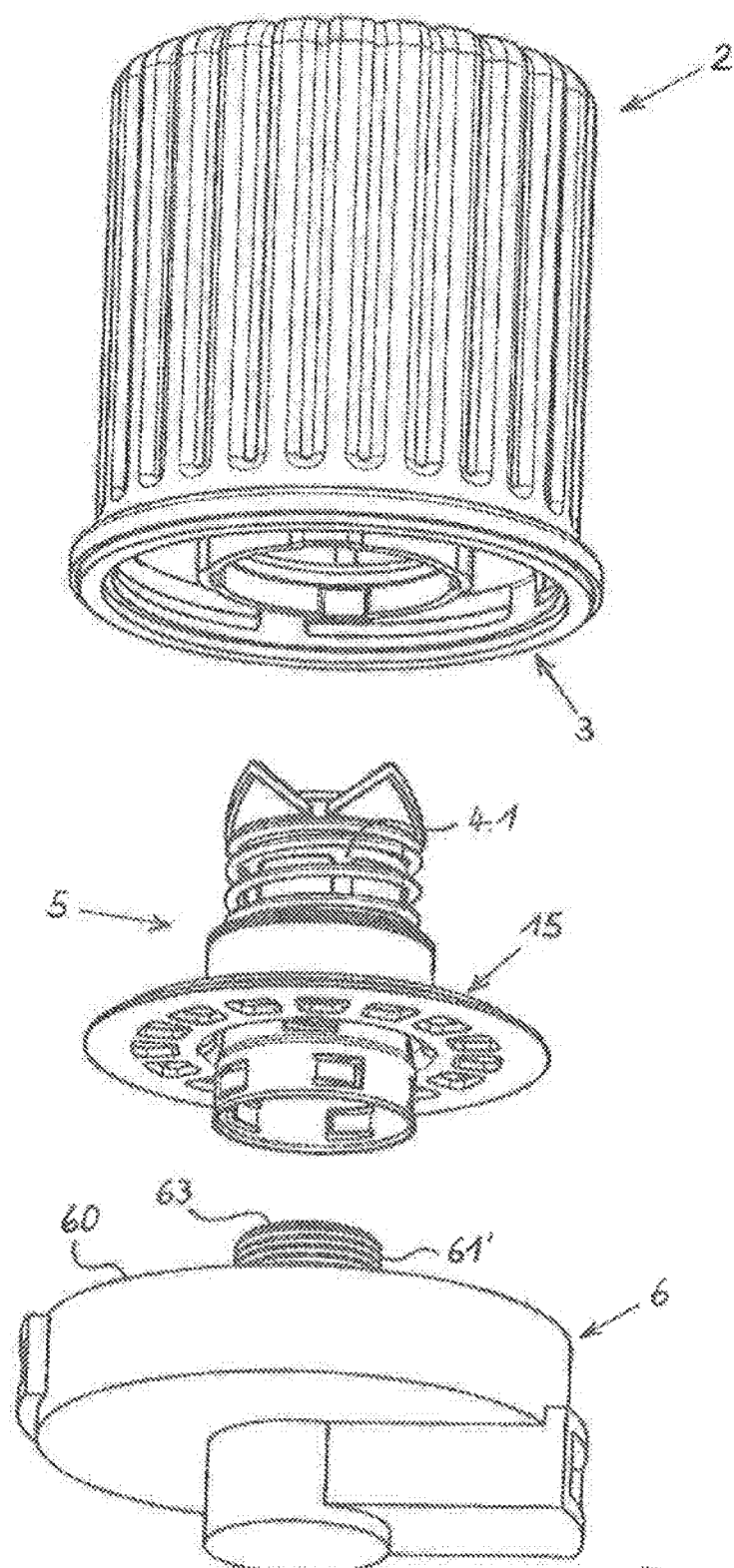
FIG. 52 shows the constructive unit of FIG. 51 together with a coupling flange and a filter housing with filter insert, in an exploded view, obliquely from below.

FIG. 52 shows the constructive unit of FIG. 51 together with coupling flange 60 and filter housing 2 having a filter insert 3, in an exploded view from below. At top in FIG. 52, filter housing 2 is visible, with filter insert 3 situated therein. In the center part of the Figure, the constructive unit of pipe socket segment 4.1 with filter bypass valve 5 and return check valve 15 is visible. At the bottom in FIG. 52, coupling flange 60 of device 6 is visible, having threaded nipple 63 situated in its center having counter-threading 61' for the threading (not visible here) provided in the lower end region of pipe socket segment 4.1.

Figure 53:
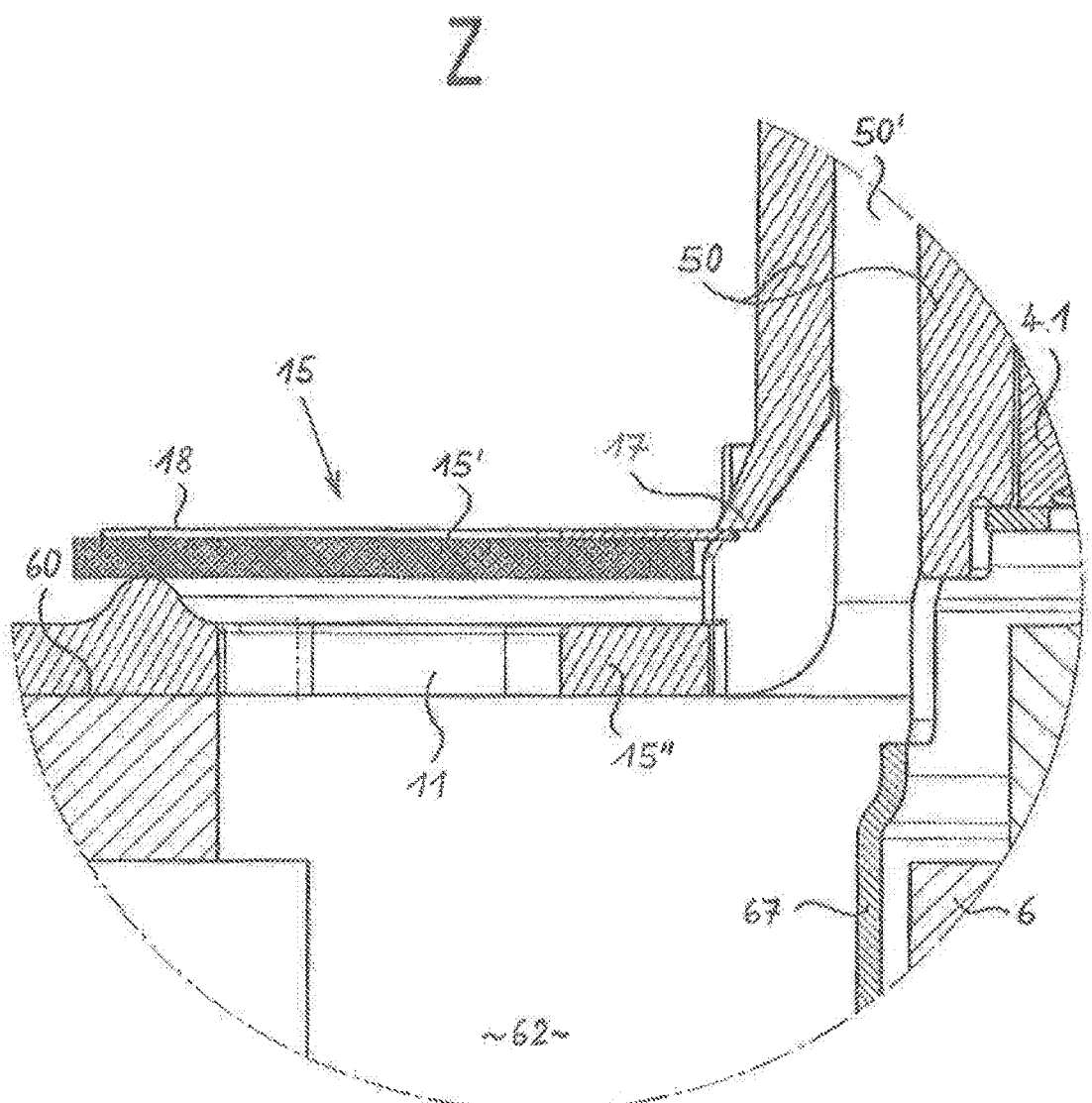
FIG. 53 shows detail Z of FIG. 48 in an enlarged representation.

FIG. 53 shows detail Z of FIG. 48 in an enlarged representation, in order to illustrate the embodiment of return check valve 15 used here. At bottom in FIG. 53, a part of coupling flange 60 of device 6 is visible, having unfiltered liquid duct 62 that leads to inlet 11 of filter 1. Here, inlet 11 is fashioned in the form of a plurality of perforations, distributed in the circumferential direction, in membrane bearer 15". On the upper side of membrane bearer 15" there is situated flexible valve membrane 15', loaded at the top by spring tongue plate 18 which exerts a resetting force, acting in the closing direction, on valve membrane 15'. The unit made up of membrane bearer 15", valve membrane 15', and spring tongue plate 18 is connected to valve seat 50 of filter bypass valve 5 by locking connections 17 mentioned above.

Figure 54:
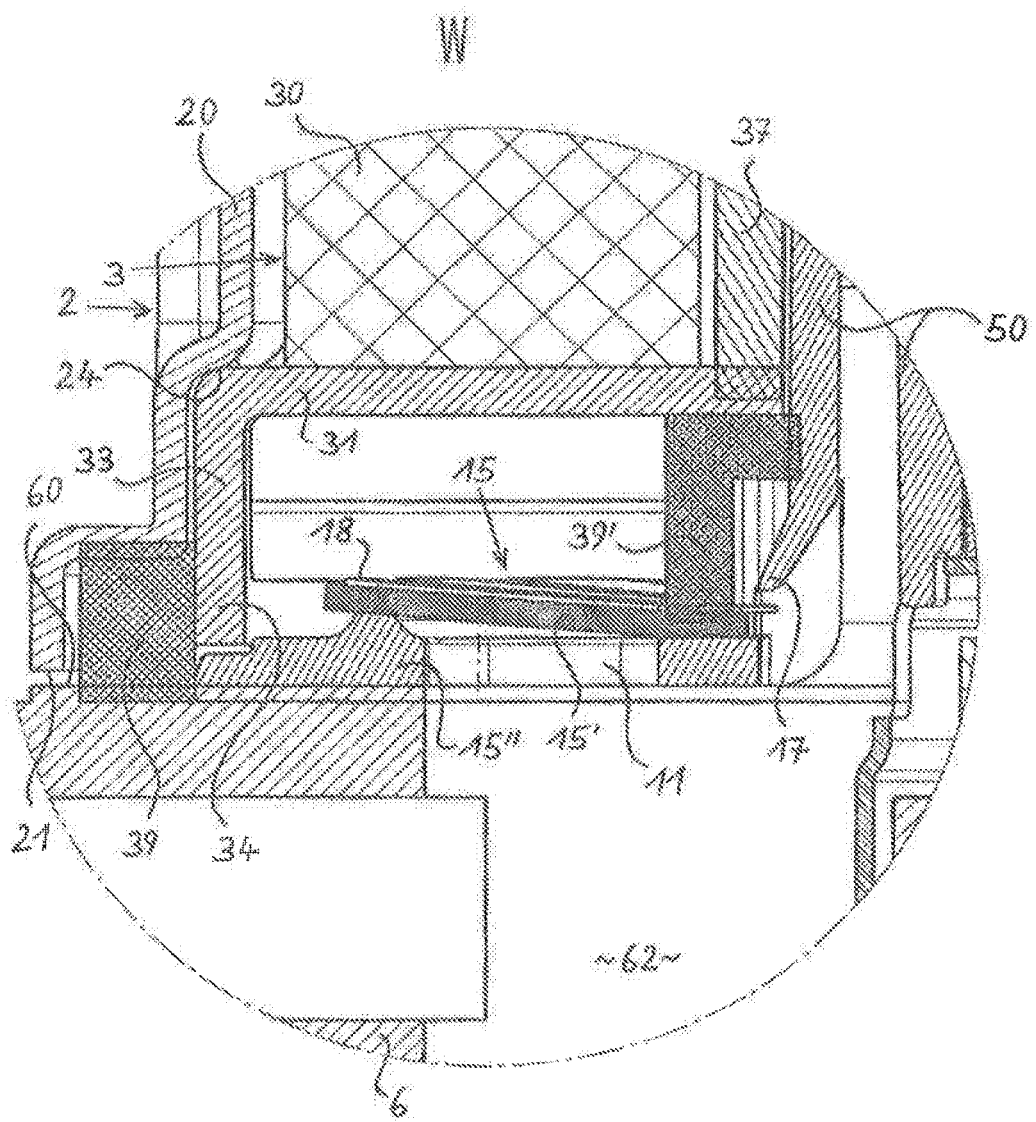
FIG. 54 shows detail W of FIG. 38 in an enlarged representation.

FIG. 54 shows detail W of FIG. 38 in an enlarged representation, here with installed filter insert 3 and filter housing 2 put into place. As this Figure illustrates, in this assembled state radially inner sealing ring 39' presses valve membrane 15' and the associated spring tongue plate 18 against membrane bearer 15", and in this way provides a secure holding together and liquid-tight termination in this region. Outwardly, filter housing 2 is sealed in liquid-tight fashion by radially external sealing ring 39, which is situated between filter housing 2 and coupling flange 60.

Figure 55:
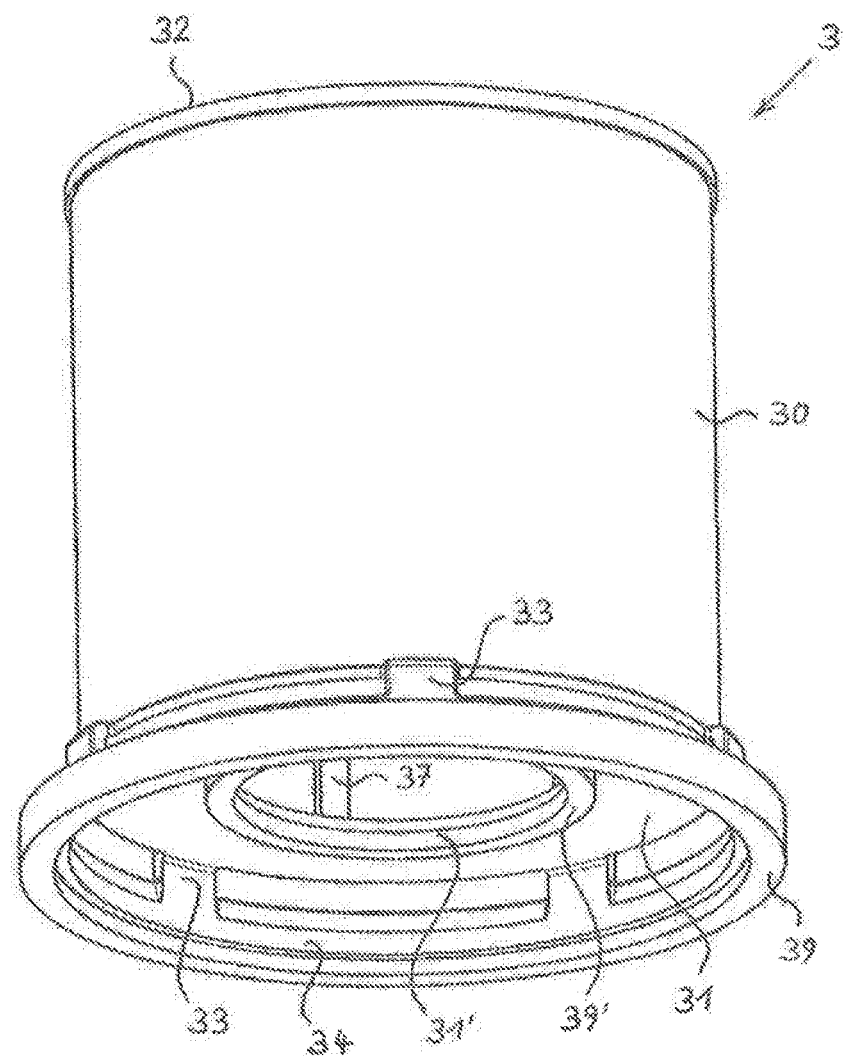
FIG. 55 shows the filter insert of the filter in a modified embodiment for a filter without return check valve, in an oblique view from below.

FIG. 55 shows filter insert 3 of filter 1 in a modified embodiment for a filter 1 without return check valve 15, in an oblique view from below. Differing from filter insert 3 for the previously described filter 1 having return check valve 15, in filter insert 3 according to FIG. 55 radially inner sealing ring 39' is made circular, because here it does not require the particular shaping in order to take into account the position of locking connections 17. In its remaining parts, filter insert 3 according to FIG. 55 corresponds to the previously explained exemplary embodiment.

Figure 56:
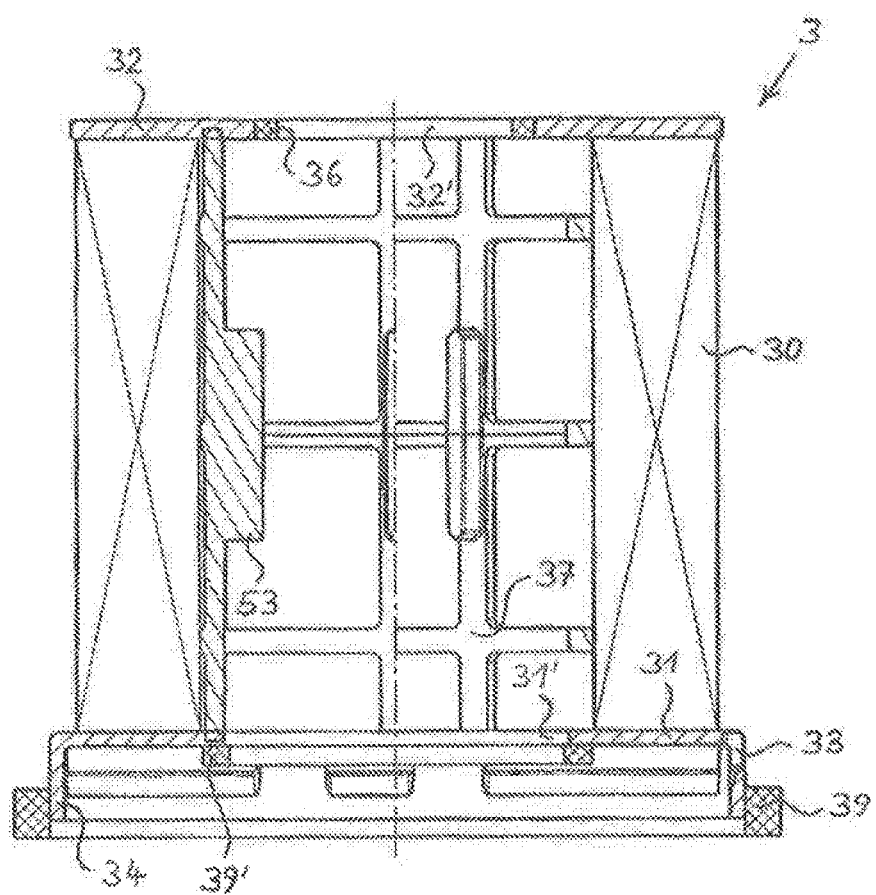
FIG. 56 shows the filter insert of FIG. 55 in longitudinal section.

FIG. 56 shows filter insert 3 of FIG. 55 in longitudinal section; here as well the continuous circular curve of radially inner sealing ring 39' is visible. With regard to the further elements of filter insert 3 according to FIG. 56, reference is made to the preceding description.

Figure 57:
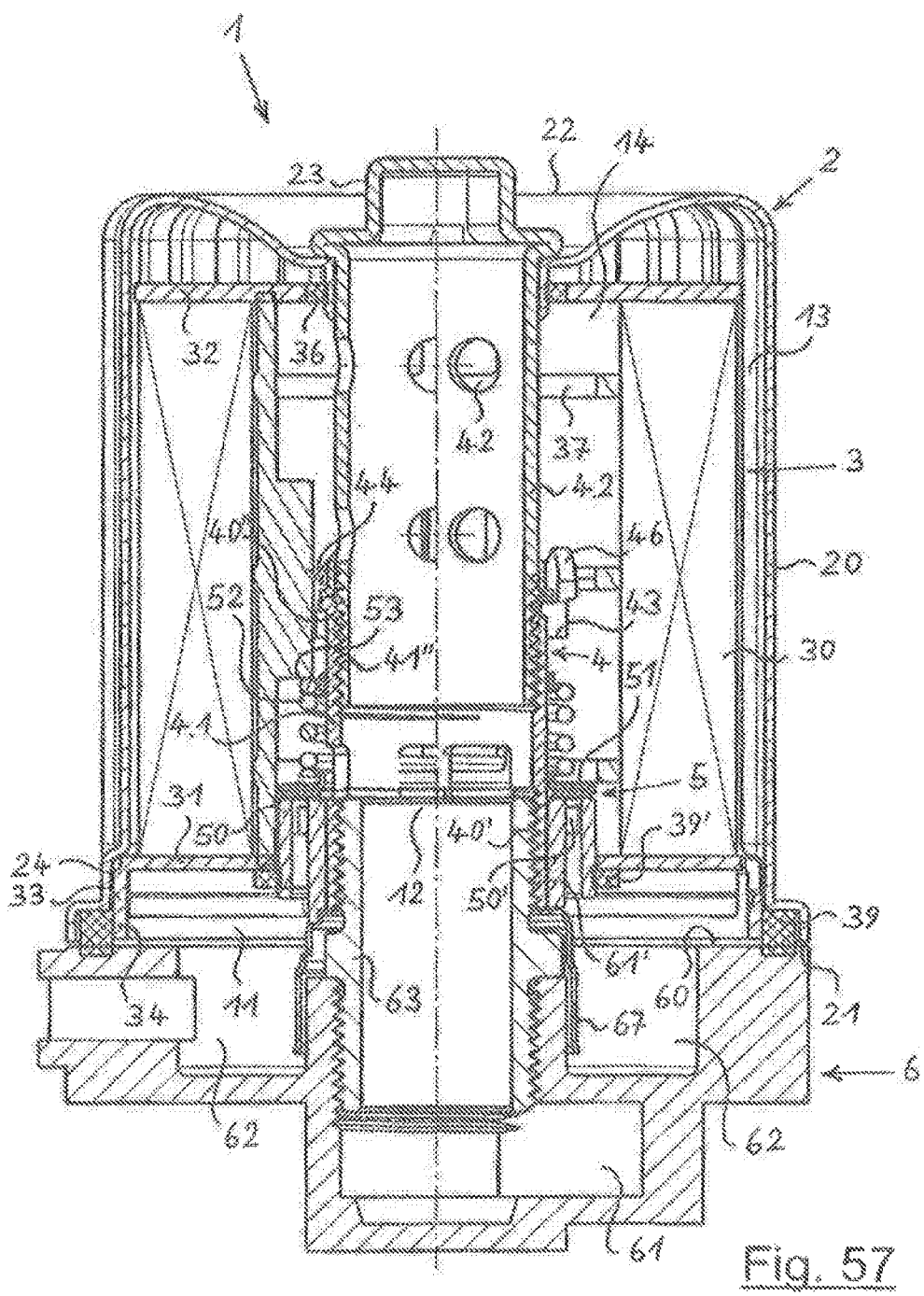
FIG. 57 shows the filter in a further embodiment in longitudinal section.

FIG. 57 shows filter 1 in a further embodiment in longitudinal section; for this embodiment, differing from the example according to FIG. 38, it is characteristic that no return check valve 15 is present. Inlet 11, which conducts liquid to be filtered from unfiltered liquid duct 62 to unfiltered side 13 of filter 1, is here always open. In other respects, filter 1 corresponds to the exemplary embodiment described on the basis of FIG. 38. Filter 1 according to FIG. 57 is suitable in particular for applications in which it is not disturbing if the liquid flows out of filter 1 when there is a standstill of the liquid circuit.

Figure 58:
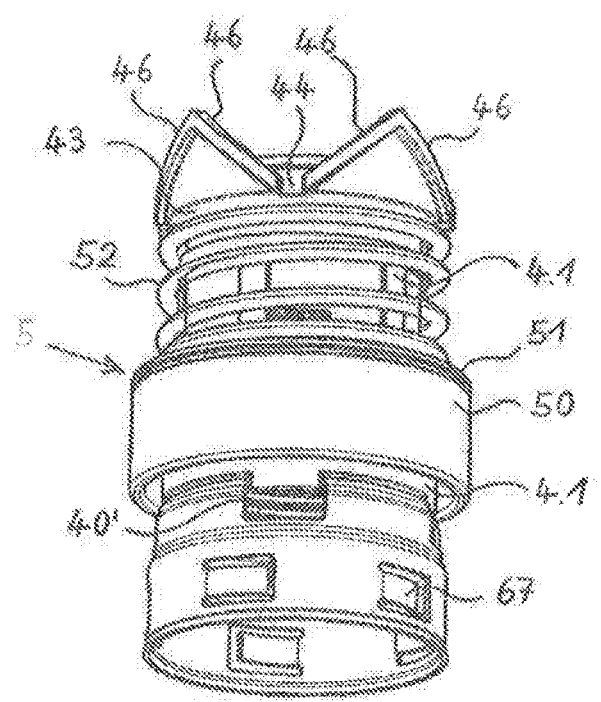
FIG. 58 shows a constructive unit with filter bypass valve as a part of the filter of FIG. 57, in a front view.

FIG. 58 shows a constructive unit having filter bypass valve 5 as part of filter 1 of FIG. 57. Here, filter bypass valve 5 is again borne by flange-side pipe socket segment 4.1, on whose outer circumference there are situated, going from bottom to top, valve seat 50, valve body 51, spring 52, and stop 43 having introductory bevels 46, and intermediate spaces 44 situated between them. Screw threading 40' is attached inwardly in the lower end region of pipe socket segment 4.1. In the lower part of FIG. 58, anti-rotation lock 67 is visible. Due to the absence of the return check valve, in FIG. 58, compared to FIG. 51, no membrane bearer having the other parts of the return check valve is present.

Figure 59:
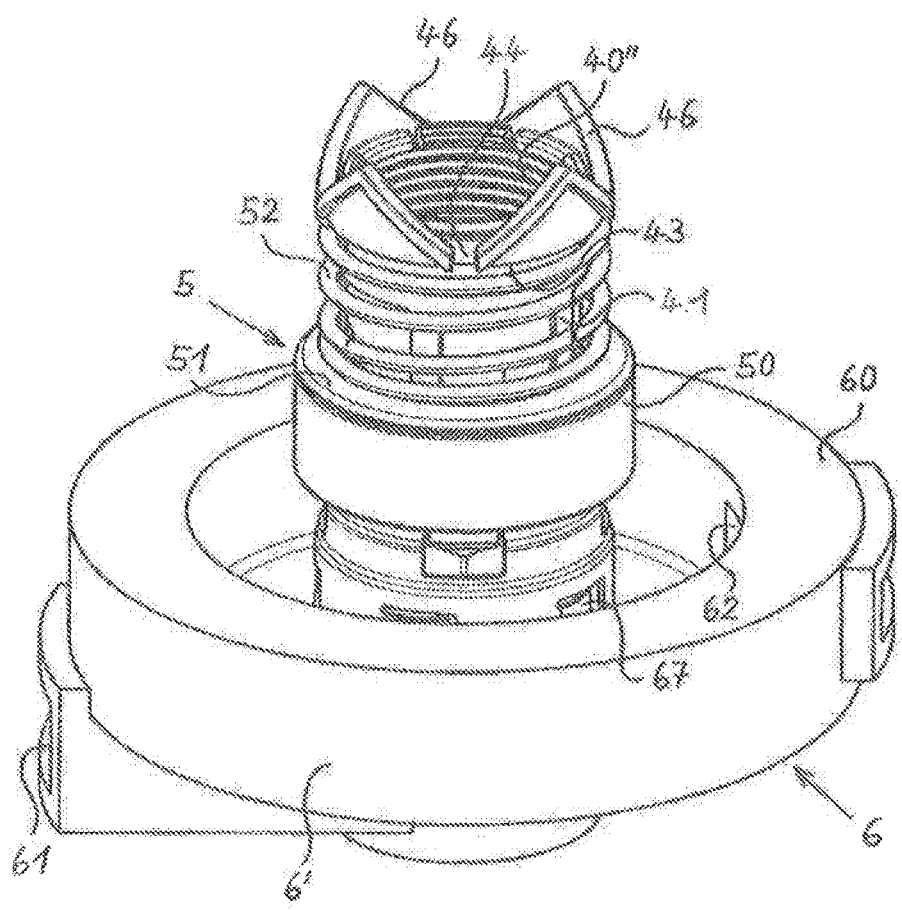
FIG. 59 shows the constructive unit of FIG. 58 in a state assembled to a coupling flange, in an oblique view from above.

FIG. 59 shows the constructive unit of FIG. 58 in a state assembled to coupling flange 60, in an oblique view from above. The state visible here results when filter housing 2 is removed, together with filter insert 3, from coupling flange 60 for filter maintenance. When filter housing 2 is unscrewed, the two pipe socket segments 4.1 and 4.2 are separated from one another, because, due to anti-rotation lock 67, flange-side pipe socket segment 4.1 is secured against unscrewing from coupling flange 60. Running around anti-rotation lock 67 is annular unfiltered liquid duct 62, which leads to inlet 11 of filter 1. At bottom left in FIG. 59, filtered liquid duct 61 is visible, through which the filtered liquid is led off during operation of filter 1. In the example according to FIG. 59, coupling flange 60 is fashioned on a base 6' that can be connected, via lines that lead further, to the rest of device 6 having the liquid circuit with filter 1.

Figure 60:
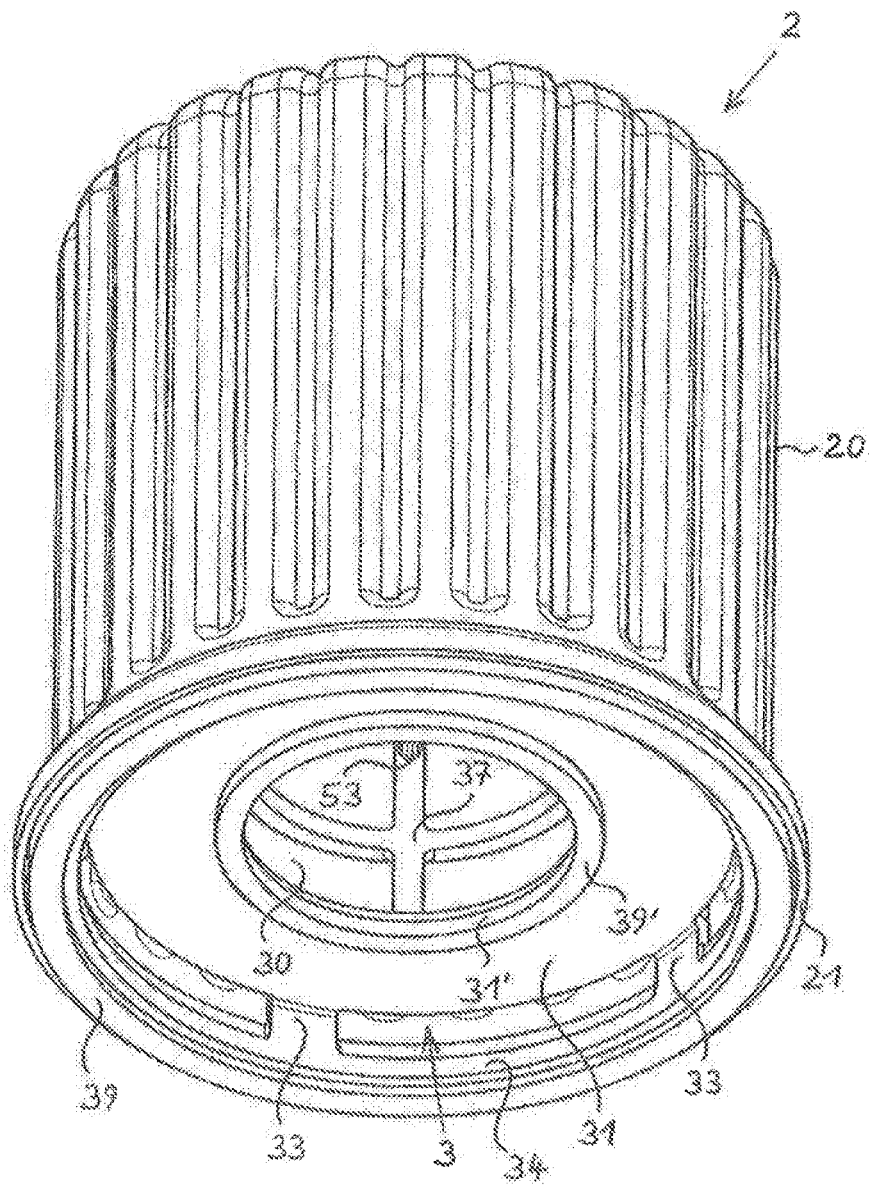
FIG. 60 shows the filter housing with filter insert of the filter situated therein of FIG. 57, in an oblique view from below.

FIG. 60 shows filter housing 2 with filter insert 3 of filter 1 situated therein, of FIG. 57, in an oblique view from below. Radially inward from downward-pointing open end face 21 of circumferential wall 20 of filter housing 2, there runs sealing ring 39, borne by sealing ring bearer 34. Sealing ring bearer 34 is connected to lower end plate 31 of filter insert 3 by connecting webs 33. Circular inner sealing ring 39' runs around central perforation 31' in lower end plate 31. Through perforation 31', a part of inner supporting element 37, with a short segment of one of the spring support 53, is visible. Filter material body 30 is situated radially outward from supporting element 37.

Figure 61:
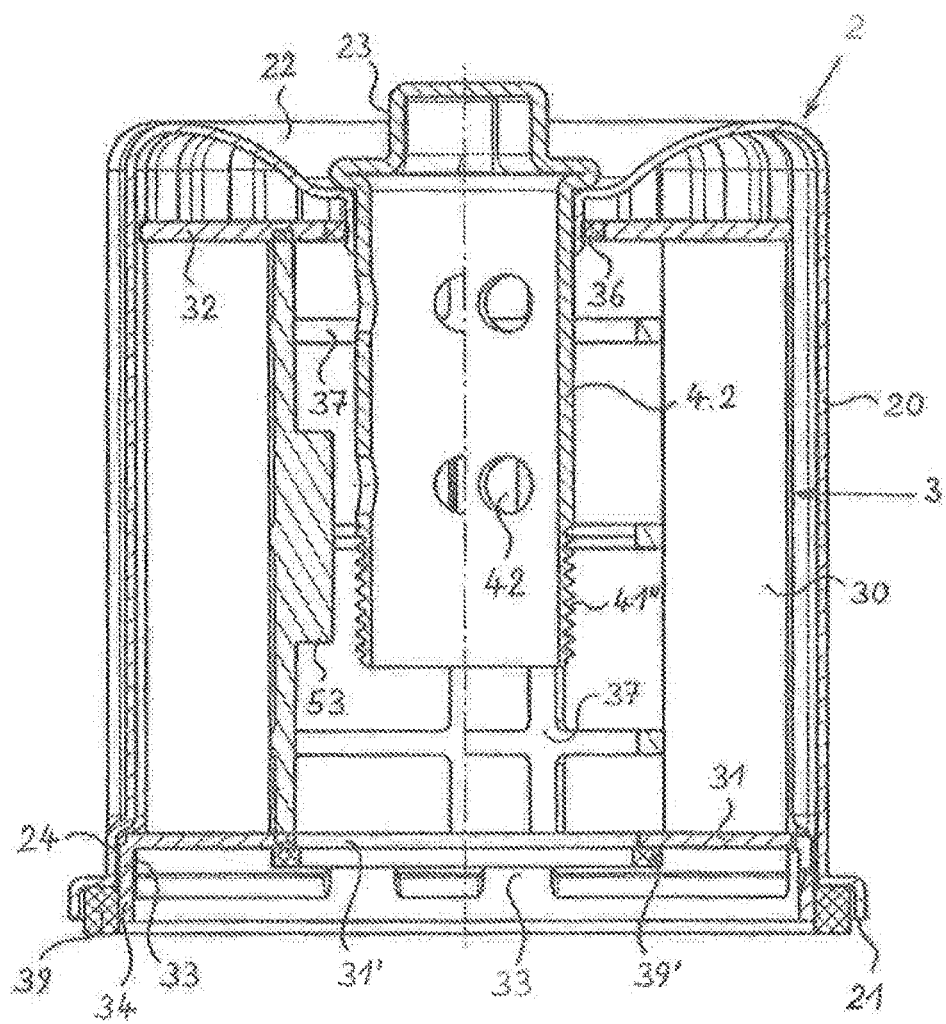
FIG. 61 shows the filter housing with filter insert of FIG. 60, in longitudinal section.

FIG. 61 shows filter housing 2 with filter insert 3 of FIG. 60, in longitudinal section. Pipe socket segment 4.2 remote from the flange is placed in sealing fashion into upper end face 22; here both filter housing 2 and also pipe socket segment 4.2 are parts made of metal such as steel plate. For mutual fixing and sealing, usefully filter housing 2 and pipe socket segment 4.2 are welded to one another in the region in which they abut one another. At the lower end region of pipe socket segment 4.2, threading 41" is visible, used for screw connection to flange-side pipe socket segment 4.1.

At the height of lower end plate 31 of filter insert 3, circumferential wall 20 has an inner diameter step 24 on which lower end plate 31 abuts with its upper side, whereby filter insert 3 is given a defined position relative to filter housing 2 in the axial direction. Moreover, filter insert 3 is centered in the radial direction relative to filter housing 2 by connecting webs present on lower end plate 31 on the one hand and by seal 36 on the inner circumference of upper end plate 32 on the other hand. Radially outwardly situated sealing ring 39 is supported on an axially downward-oriented circumferential surface of circumferential wall 20. Radial inner sealing ring 39' runs around central perforation 31' in lower end plate 31.

In the interior of filter material body 30, grid-type supporting element 37 is situated, with which, here, spring supports 53 are realized in one piece as radially inward-protuding ribs. Due to the angled course of the section, here only one of the spring supports 53 is visible in the left half of FIG. 61. Here, supporting element 37 is connected both to lower end plate 31 and to upper end plate 32, for example by gluing or welding.

Figure 62:
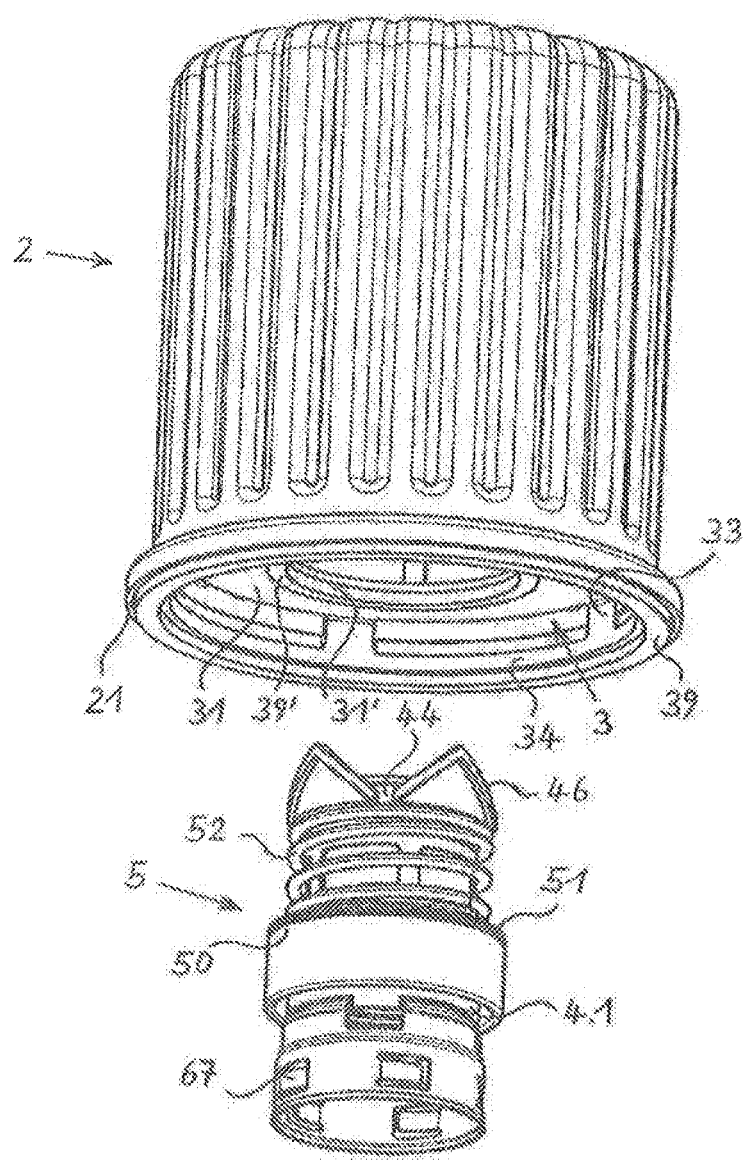
FIG. 62 shows the constructive unit of FIG. 58 together with a coupling flange and a filter housing with filter insert situated therein, in an exploded view.
Figure 62:
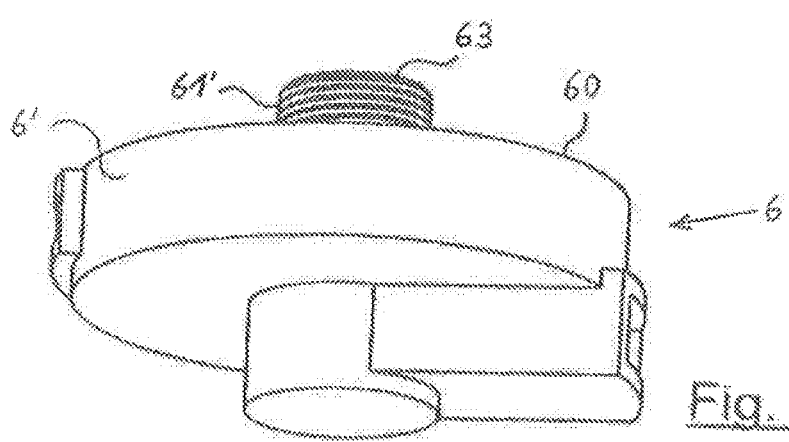

FIG. 62 shows the constructive unit of FIG. 58, together with a coupling flange 60 and a filter housing 2 with filter insert 3 situated therein, in an exploded view. Filter insert 3 is pushed into filter housing 2 from the open flange-side end face 21 of filter housing 2, and is held in filter housing 2 by mutual friction or by a locking connection. The constructive unit visible below it includes the parts explained above on the basis of FIG. 58, in particular filter bypass valve 5. At bottom in FIG. 62, coupling flange 60 is visible, here as part of a base 6' that is part of a device 6 that has a liquid circuit having liquid to be filtered. Threaded nipple 63 with its threading 61' protrudes centrally from coupling flange 60.

Figure 63:
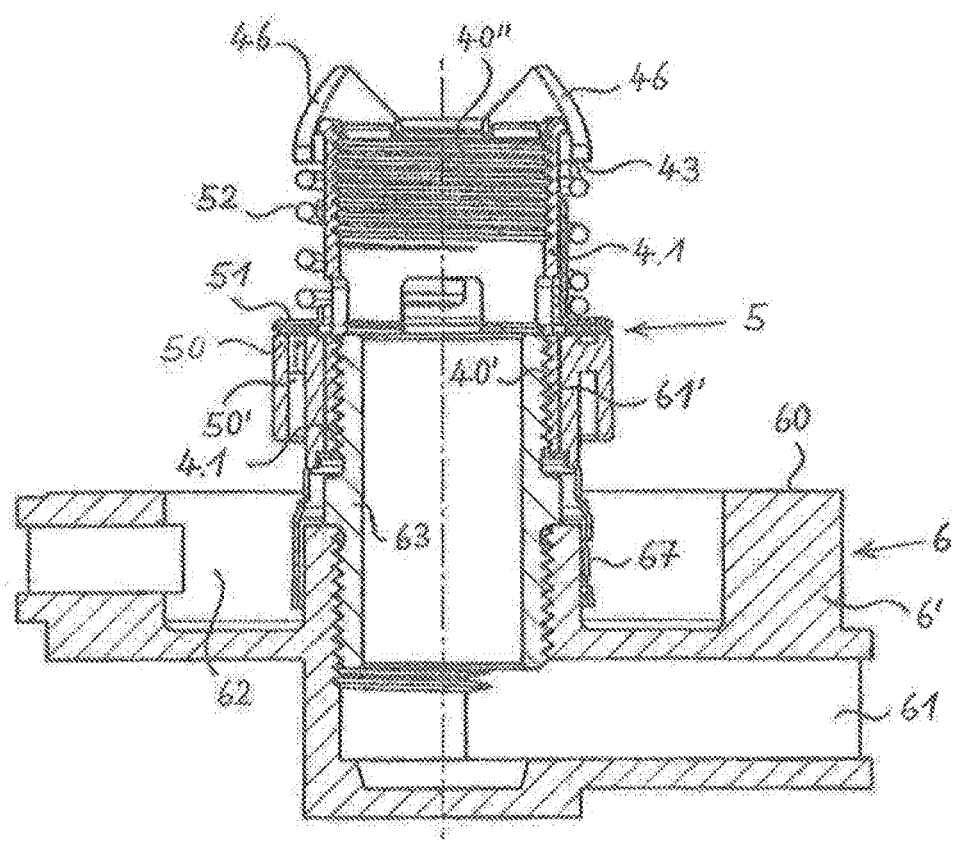
FIG. 63 shows the subject matter of FIG. 59 in longitudinal section.

FIG. 63 shows the subject matter of FIG. 59 in longitudinal section. In coupling flange 60, threaded nipple 63 is permanently and non-detachably screwed together with a lower threaded segment. Flange-side pipe socket segment 4.1 is screwed to upper threading segment 61' by means of its lower threading 40', and is secured against detachment by anti-rotation lock 67. The parts of filter bypass valve 5, as explained above, are situated on pipe socket segment 4.1. Because in the state shown in FIG. 63, in which filter housing 2 and filter insert 3 are removed, spring supports 53 do not act on spring 52, here the spring is now expanded to its maximum length and abuts stop 43 with its upper end. In this way, loss of spring 52 and of valve body 5.1 is prevented.

Figure 64:
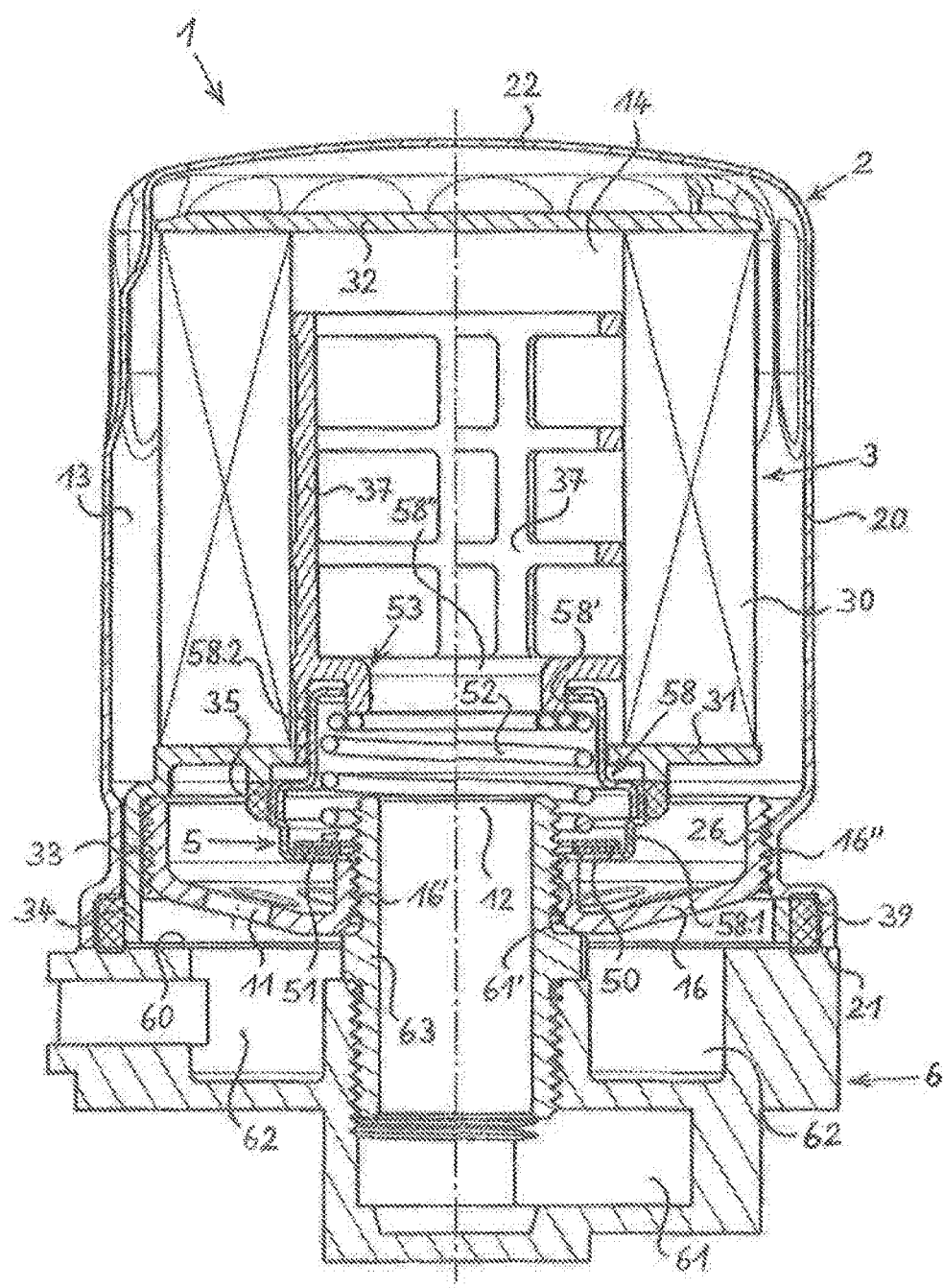
FIG. 64 shows the filter in a further embodiment, in longitudinal section.

FIG. 64 shows filter 1 in a further embodiment, in longitudinal section. This filter 1 is again a screw-on filter that is screwed onto a coupling flange 60 of a device 6 having a liquid circuit. Here, coupling flange 60 again has a central threaded nipple 63 having a threading 61' that protrudes from the plane of coupling flange 60. In addition to its filter housing 2 and filter insert 3, filter 1 has a base plate 16 that has, radially inwardly, an inner threading 16', and has radially outwardly an outer threading 16", and that has, in its region between the two named threadings 16', 16", a plurality of perforations distributed in the circumferential direction as inlet 11 for liquid to be filtered. Base plate 16 is screwed to threaded nipple 63 by threading 16'. Filter housing 2 is screwed to outer threading 16", which has for this purpose screw threading 26 on the inside of the lower end region of its circumferential wall 20.

In addition, a valve holder 58 is attached on threaded nipple 63 over base plate 16, on or in which holder the parts of filter bypass valve 5 are situated. Here, valve holder 58 is realized in two parts, having a lower holder part 58.1 and an upper holder part 58.2 fixedly connected therewith. Here, valve seat 50 is fashioned in a base of lower holder part 58.1. Valve body 51 is realized as a flat circular plate, and, in its closing position shown in FIG. 64, lies in sealing fashion on valve seat 50. By means of a helical pressure spring 52 situated in the valve holder 58, valve body 51 is preloaded with a force acting in the closing direction. Here as well, spring 52 is again prestressed by a filter insert 3, in that a spring support 53, realized as a ring-shaped element in one piece with central supporting element 37 in filter material body 30, presses from above on spring 52 with an annular support collar that is oriented radially inward and then axially downward. Here, supporting element 37 is connected only to lower end plate 31. The upper end of supporting element 37 is situated at a distance from the underside of upper end plate 32.

Here, filter insert 3 has a lower end plate 31 that has on its underside a circumferential seal 35 with which lower end plate 31 is placed in sealing fashion onto the outer circumference of valve holder 58. From the radially outer edge of lower end plate 31, connecting webs 33 again extend downward in the axial direction, which webs bear a circumferential sealing ring bearer 34 on whose outer circumference there is situated a radially external sealing ring 39 that seals filter housing 2 against coupling flange 60. At the upper side, filter insert 3 has a closed end plate 32.

Figure 65:
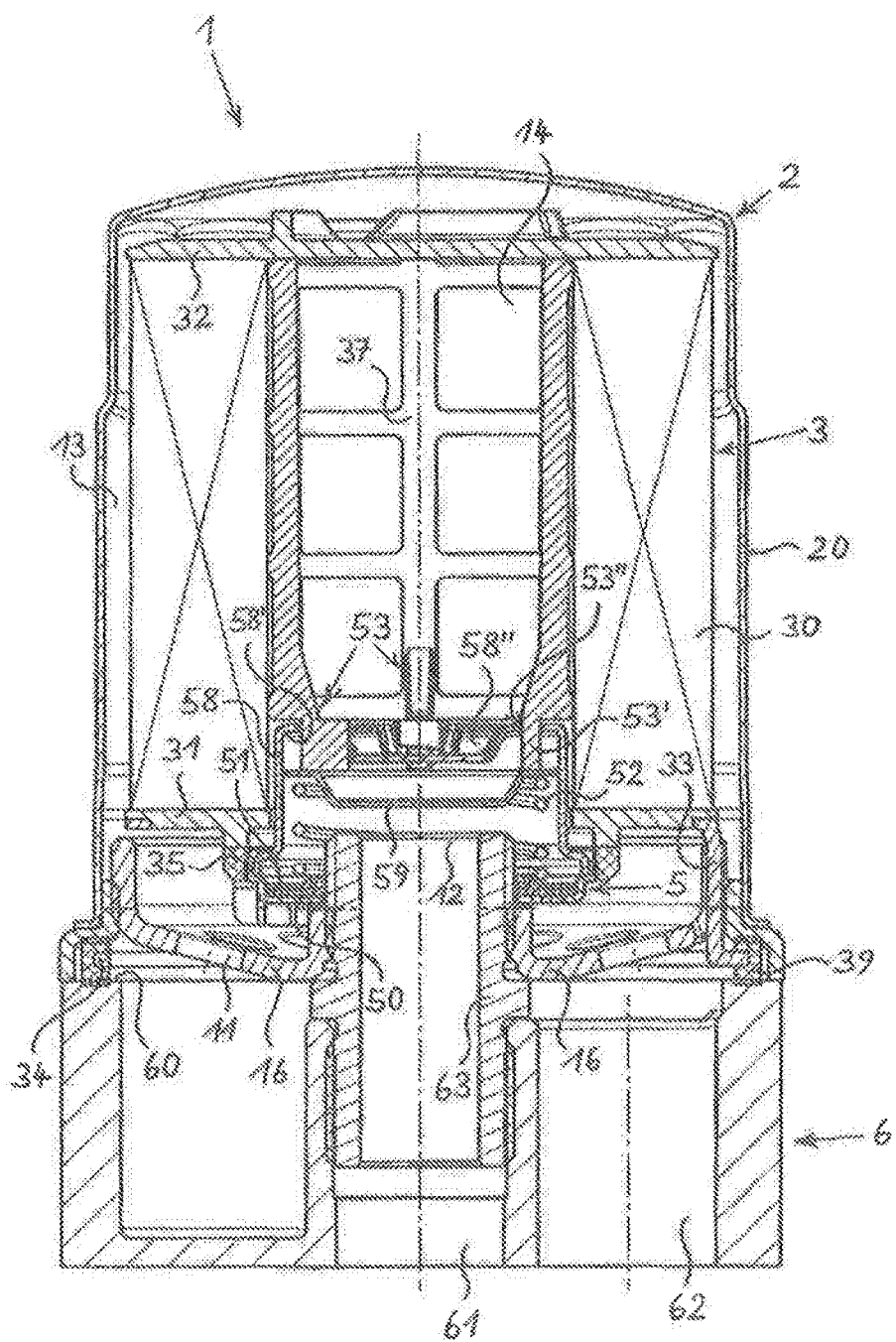
FIG. 65 shows the filter in a further embodiment, in longitudinal section.

FIG. 65 shows filter 1 in a further embodiment, in longitudinal section. In many parts, filter 1 corresponds to the example according to FIG. 64. Differing here is that filter bypass valve 5, in the example according to FIG. 65, has a covering body 59 assigned to it that ensures that during a filter maintenance with removal of filter housing 2 and of filter insert 3, filtered liquid outlet 12 is closed in order to prevent dirt particles from moving from filter insert 3 or from filter housing 2 into outlet 12 and from there into filtered liquid duct 61 of device 6. For this purpose, covering body 59 is situated on the upper side of spring 52, and is preloaded by spring 52 with a force oriented upward, i.e., oriented away from valve body 51. In the assembled state of filter 1 shown in FIG. 65, support arms 53' of spring support 53 press, through introduction openings 53" provided in the upper side of valve holder 58, onto the upper side of covering body 59, which in turn presses with its lower side on the upper end of spring 52, thus prestressing spring 52.

When filter housing 2 is removed from coupling flange 60 together with filter insert 3, base plate 16 and a valve holder 58 with filter bypass valve 5 remain on coupling flange 60. Here, support arms 53' are removed upwardly from covering body 59, causing the covering body, under the action of the force of spring 52, to come to lie against the underside of the upper end wall of valve holder 58, with passages 58" provided there for filtered liquid. In this way, passages 58" are closed, and no dirt particles can move into filtered liquid outlet 12.

So that support arms 53' of spring supports 53 situated on supporting element 37 can exert the required force on covering body 59, and, via this, on spring 52 of filter bypass valve 5, here supporting element 37 is supported with its upper end face, remote from the flange, on the inside of the upper end plate 32, remote from the flange, of filter insert 3. Filter insert 3 is in turn supported on the inside of filter housing 2 with its upper end plate 32 remote from the flange.

In addition, in this filter 1 supporting element 37 is situated in the interior of filter material body 30 so as to be capable of rotation relative to the rest of filter insert 3. For this purpose, supporting element 37 lies with its upper end against the underside of upper end plate 32 of filter insert 3, but is not connected to this end plate 32. Supporting element 37 here does not have immediate contact with flange-side lower end plate 31 of filter insert 3. This capacity for rotation of supporting element 37 is required here because supporting arms 53' of spring support 53 prevent supporting element 37 from rotating as soon as supporting arms 53' have entered into the associated introduction openings 53" of valve holder 58, because valve holder 58 is seated in rotationally fixed fashion on threaded nipple 63. However, for the further screwing of filter housing 2 onto base plate 16, filter housing 2 must be further rotated together with filter insert 3 situated therein, which is enabled by the configuration of supporting element 37 in filter insert 3 so as to be capable of rotation relative to the rest of filter insert 3.

Figure 66:
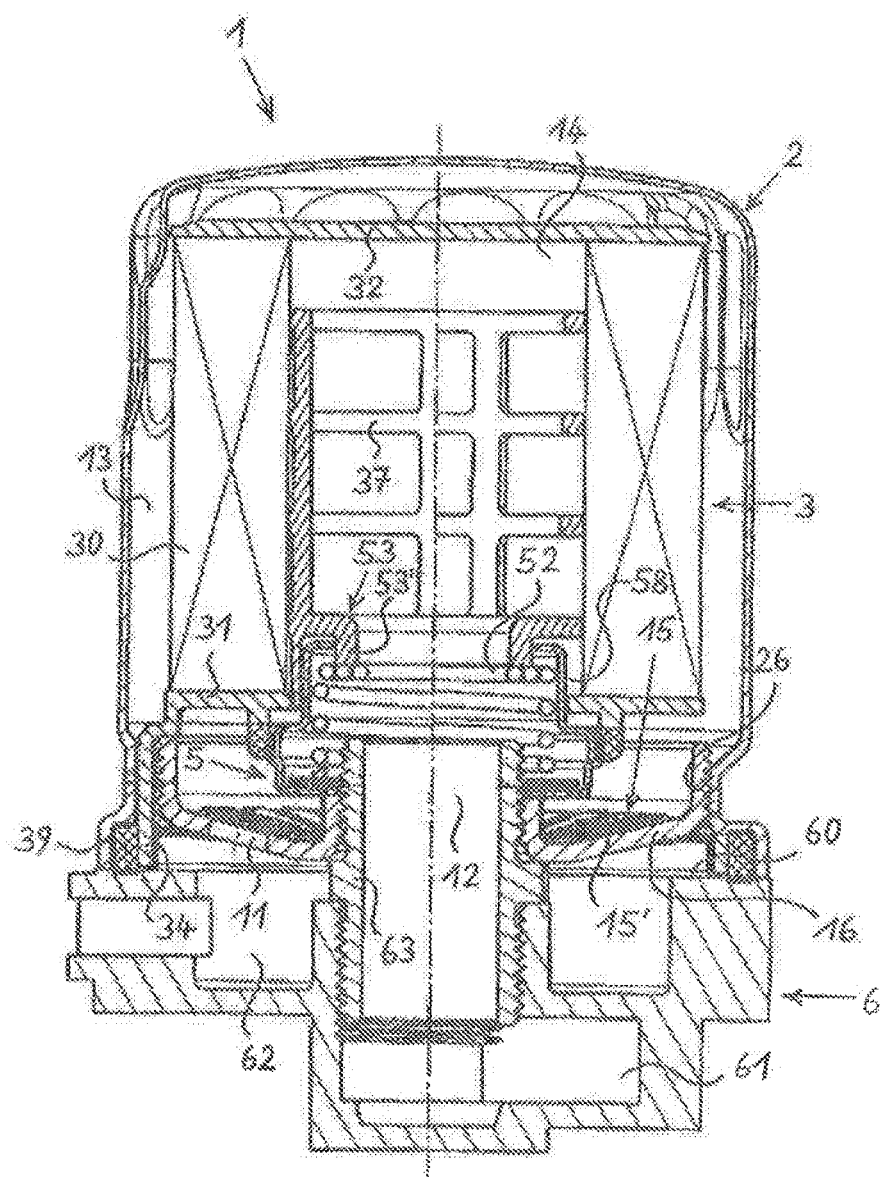
FIG. 66 shows the filter in a further embodiment, in longitudinal section.

FIG. 66 shows filter 1 in a further embodiment, in longitudinal section. Filter 1 according to FIG. 66 corresponds in most of its parts to the example according to FIG. 64. Different here is that in the example according to FIG. 66 a return check valve 15 is allocated to inlet 11. Return check valve 15 lies on the upper side of base plate 16 in the form of a flexible valve membrane 15', and in this way covers the openings in base plate 16 forming inlet 11. Return check valve 15 is automatically opened by liquid to be filtered coming from unfiltered liquid duct 62. When there is a standstill of the liquid circuit, return check valve 15 ensures that filter 1 does not run empty.

Figure 67:
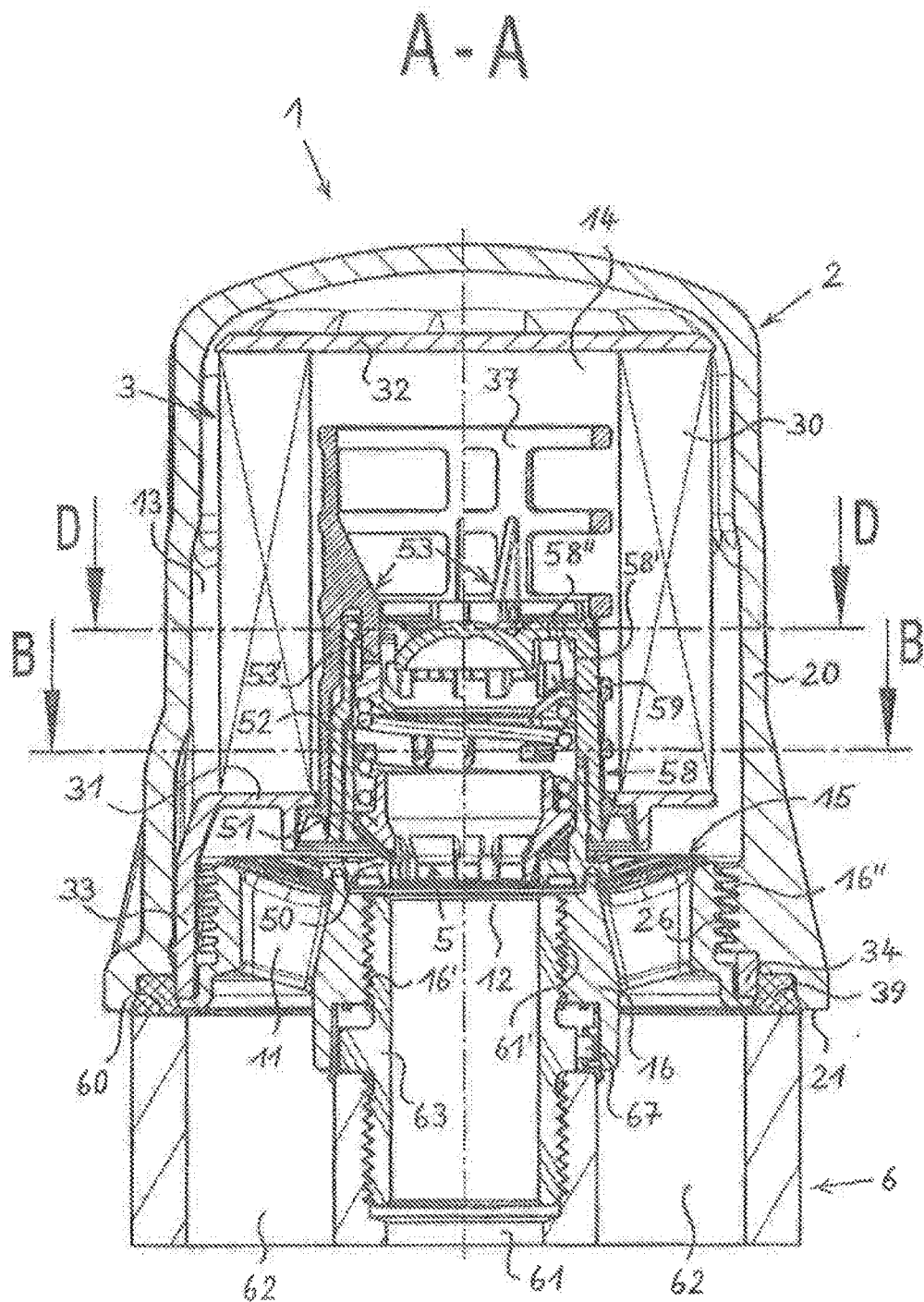
FIG. 67 shows the filter in a further embodiment, in longitudinal section.
Figure 68:
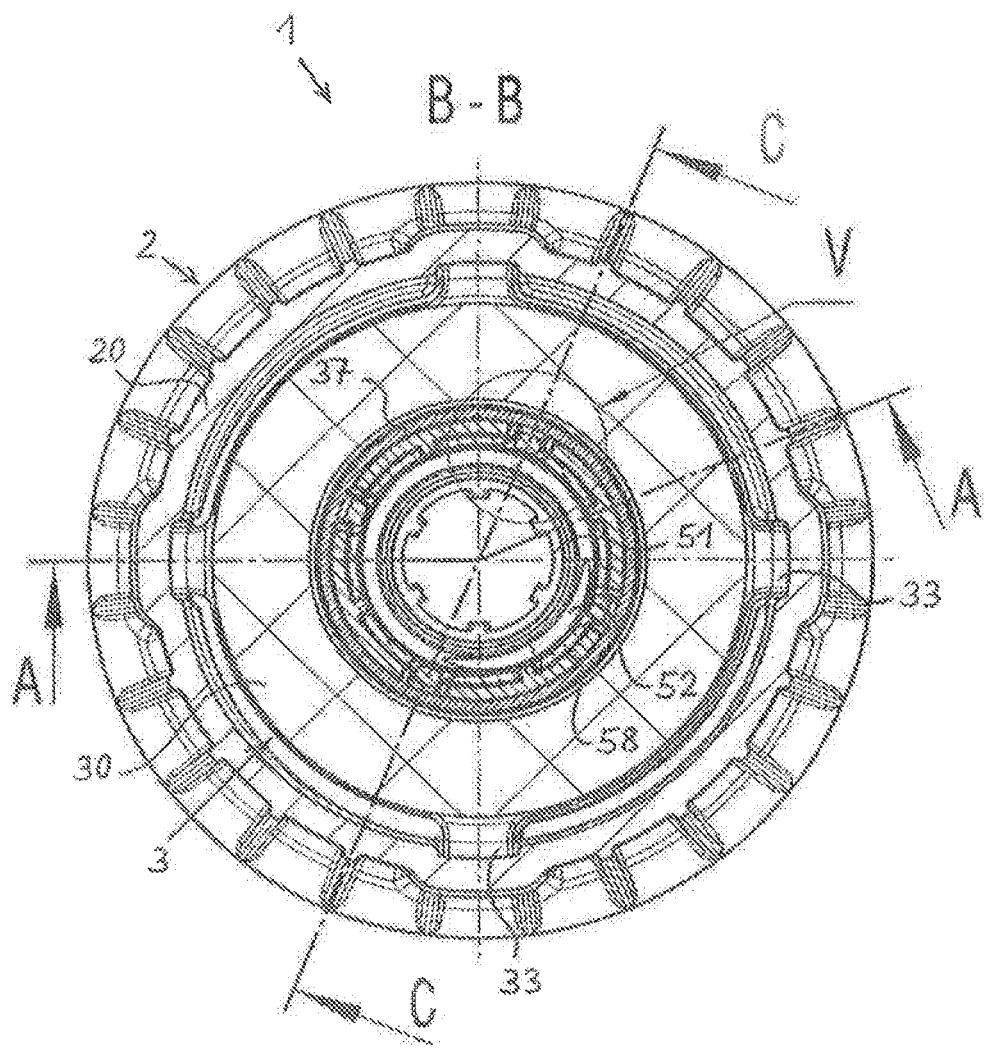
FIG. 68 shows the filter of FIG. 67 in cross-section according to the sectional line B-B in FIG. 67.

FIG. 67 shows filter 1 in a further embodiment, in a first, angled longitudinal section along the sectional line A-A in FIG. 68; here filter 1 is shown in a state assembled to a coupling flange 60 of device 6 such as an internal combustion engine. A threaded nipple 63 having an outer threading 61' situated above the flange plane is part of coupling flange 60, threaded nipple 63 here being realized as a double nipple and being permanently screwed into device 6 with a lower outer threading.

Via an inner threading 16', the base plate 16 of filter 1 is screwed together with upper outer threading 61' of threaded nipple 63, this screw connection taking place during a first assembly of filter 1 on coupling flange 60. A later detachment of this screw connection is prevented by an anti-rotation lock 67.

In addition, filter 1 has a filter housing 2, which here has the shape of a downwardly open cup. In the lower edge part of its circumferential wall 20, housing 2 has an inner threading 26, which here stands in screwed engagement with outer threading 16" of base plate 16. Both base plate 16 and housing 2 are here parts made of plastic. The plastic parts are usefully manufactured as injection-molded parts, permitting manufacture with a specific shape without subsequent cutting processing. Alternatively, base plate 16 and housing 2 can be parts made of metal, in particular pressure die-cast parts made of light metal such as aluminum.

In the interior of housing 2 there is situated a filter insert 3 that is made up of a hollow cylindrical filter material body 30 having two end plates 31 and 32 enclosing it at its ends. In filter material body 30, there is situated a grid-type supporting element 37 that supports this body during operation. Via a central opening in lower end plate 32, filter insert 3 is placed into filter 1 with a sealing by a sealing collar.

From the radially outer edge of lower end plate 32, distributed around its circumference, a plurality of connecting webs 33 extends downward in the axial direction. Due to the angled course of the sectional plane of FIG. 67, here only one of connecting webs 33 is visible in the left half of FIG. 67.

At their lower ends, connecting webs 33 go into a circumferential sealing ring bearer 34 having a cylindrical outer surface, on which a circumferential seal 39 is situated in the form of an elastic sealing ring that is approximately square in its cross-section in the unloaded state.

Filter insert 4 is set in a defined desired position relative to filter housing 2 via its connecting webs 33.

In its radially lower outer edge region, base plate 2 extends radially outward with an outer edge projection, under sealing ring bearer 34.

In the lower edge part of filter housing 2, there is fashioned a support surface that points downward in the axial direction, on which seal 39 abuts with its upper side. When filter 1 is in place on coupling flange 60, as shown in FIG. 67, seal 39 is pressed in the axial direction far enough that it expands radially outward and inward, and seals both axially and radially.

A plurality of openings, distributed in the circumferential direction of base plate 16, run through the radially outer part of base plate 16 between its inner threading 16' and its outer threading 16", as inlet 11 for liquid to be filtered. At the upper side, inlet 11 is covered by a return check valve 15. Outlet 12 for filtered liquid runs centrally through base plate 16 and through threaded nipple 63.

In the center on the upper side of base plate 16, there is situated a filter bypass valve 5 that extends into supporting element 37. A valve holder 58 that forms a part of filter bypass valve 5 and whose basic shape is hollow-cylindrical, is fixedly connected, e.g., friction-welded, at its lower end to base plate 16. Valve holder 58 is here made up of two parts, namely a first, lower holder part 58.1, which is fixedly connected to base plate 16, and a second, upper holder part 58.2, connected to first holder part 58.1, here by a locking connection. Here, holder parts 58.1 and 58.2 are made of plastic.

In valve holder 58, at the bottom a valve seat 50 is fashioned that works together with a valve body 51 guided above it in axially movable fashion in valve holder 58. Above valve body 51, there is situated in valve holder 58 a spring 52 that exerts a force acting on valve body 51 in its closing direction when filter insert 3 is placed into filter 1.

Above spring 52, here there is further situated in the valve holder 58 an axially movable covering body 59 on whose underside the upper end of spring 52 abuts and on whose upper side, as long as filter insert 3 is in place in the filter, spring support 53 abuts with its support arms 53', which hold covering body 59 in a position at a distance from the underside of the upper end of the valve holder. In this position, covering body 59 releases a liquid passage 58" in an upper end wall of the valve holder 58 for filtered liquid in the direction toward outlet 12. In the depicted example, liquid passage 58" is formed by a plurality of smaller openings distributed in the circumferential direction, which together provide the required flow cross-section.

When filter insert 3 is removed from filter 1, spring 52 presses covering body 59 against the end wall of valve holder 58 and against liquid passage 58" situated there, and closes this passage. This prevents dirt particles from being able to fall into filtered liquid outlet 12 during a filter maintenance.

Moreover, covering body 59 ensures an advantageous distribution of the forces acting between valve spring 52 and spring support 53.

Covering body 59 can also be omitted if, for the provided use of filter 1, the protective function against dirt falling in and the function of distribution of forces can be done without.

Finally, at the upper end region of valve holder 58 another radially inward-pointing stop 58' is integrally formed, which ensures a limitation of the movement upward, i.e., away from valve seat 50, of covering body 59 and of the upper end of spring 52.

Supporting element 37 again has spring support 53, here in the form of a plurality of supporting arms 53' pointing downward in the axial direction and distributed around the inner circumference of supporting element 37. Due to the angled course of the sectional plane, in FIG. 67 only one of supporting arms 53' is visible in the left half of FIG. 67. Guided by positioning means described below, when filter 1 is assembled each support arm 53' extends from above through a fittingly positioned and dimensioned introduction opening 53" in the upper side of valve holder 58, into the valve holder, thus coming to abut covering body 59, or, if this covering body is not present, immediately on the upper end of spring 52. In this way, support arms 53' and introduction openings 53" form a key-lock coding that permits only the installation of a fitting filter insert 3 in filter 1.

When filter housing 2, in which filter insert 3 has previously been placed, is screwed onto base plate 16, filter insert 3 moves, together with housing 2, in the direction toward base plate 16, causing support arms 53' of spring support 53 to gradually prestress spring 52 more and more strongly, until housing 2 has reached its end position, and spring 52 has thereby reached its final prestressing. Spring 52 now presses valve body 51 in the closing direction against valve seat 50 with a specifiable force. All parts of filter bypass valve 5 are configured so as to be fixed to the filter, i.e., are not parts of exchangeable filter insert 3. Only spring support 53 is part of exchangeable filter insert 3.

The valve membrane of return check valve 15 is clamped at its radially inner edge region between base plate 16 and lower holder part 58.1 of valve holder 58, which makes separate holding means for return check valve 15 dispensable.

During operation of filter 1, liquid to be filtered flows through an unfiltered liquid duct 62 in the radially outer part of the coupling flange 60, and through inlet 11, as well as through return check valve 15, to an unfiltered side 13, external to filter insert 3, of filter 1. From there, the liquid flows, while depositing solid particles, through filter material body 30 of filter insert 3, in the radial direction inward to filtered side 14 of filter 1. From there, the filtered liquid flows through the interior of supporting element 37, through liquid passage 58''' in valve holder 58, and then through central outlet 12 and through the interior of threaded nipple 63, into a filtered liquid duct 61 in coupling flange 60.

If the pressure difference between unfiltered side 13 and filtered side 14 of filter 1 exceeds a specifiable boundary value, valve body 51 is lifted off from its valve seat 50, against the force of valve spring 52, and an immediate flow path is released for the liquid from unfiltered side 13 to filtered side 14, bypassing filter material body 30 of filter insert 3.

When there is a standstill of the liquid circuit, return check valve 15 ensures that no liquid flows out from the interior of filter 1, so that, when there is a restart of the liquid circuit, an immediate supply of filtered liquid to downstream consumers is ensured.

FIG. 68 shows filter 1 of FIG. 67 in cross-section along sectional line B-B in FIG. 67. Externally, in FIG. 68 filter housing 2 is visible, whose circumferential wall 20 is here sectioned. Radially inward therefrom is situated filter insert 3, through whose filter material body 30 the section runs. Distributed around the circumference of filter insert 3, the four connecting webs 33 are visible from above, extending further downward in the axial direction. In the interior of filter material body 30, there is situated grid-type supporting element 37, which supports the filter material body during operation. Further radially inward therefrom is situated valve holder 58, in which the parts of filter bypass valve 5 are situated, of which here only a part of valve spring 52 and, in the center, a part of valve body 51 are visible. In FIG. 68, sectional line A-A illustrates how the longitudinal section shown in FIG. 67 runs through filter 1.

Figure 69:
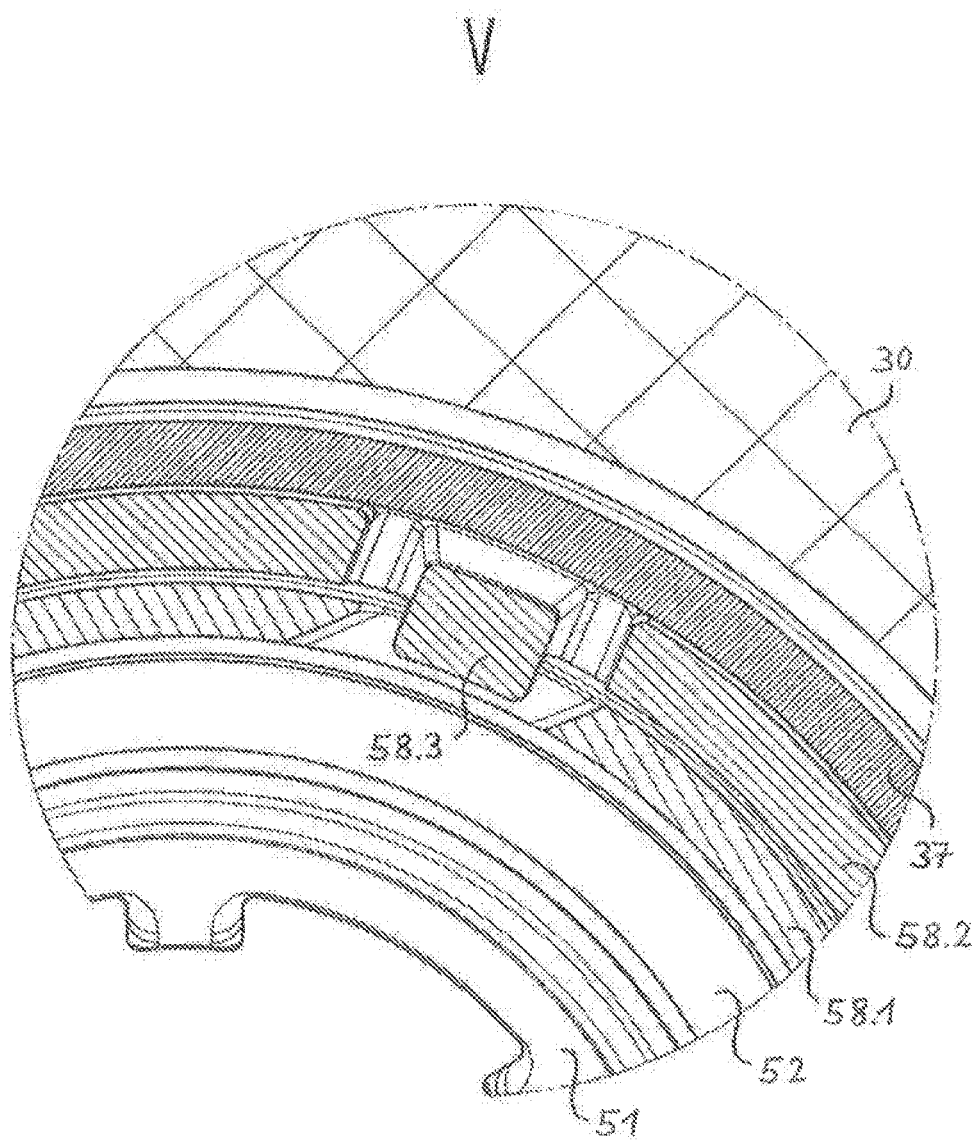
FIG. 69 shows detail V of FIG. 68 in an enlarged representation.

FIG. 69 shows detail V of filter 1 of FIG. 68 in an enlarged representation. At the upper right in FIG. 69, a part of filter material body 30 of filter insert 3 can be seen. Under it, a segment of supporting element 37 is visible. Further downward, a segment of valve holder 58 is then visible; here it can be seen that the valve holder 58 is made up of a first holder part 58.1 and a second holder part 58.2 which are plugged into one another over a part of their height. The two holder parts 58.1 and 58.2 are connected to one another by locking connections 58.3, of which one is visible in section in FIG. 69. Further downward, finally, a part of valve body 51 is visible.

Figure 70:
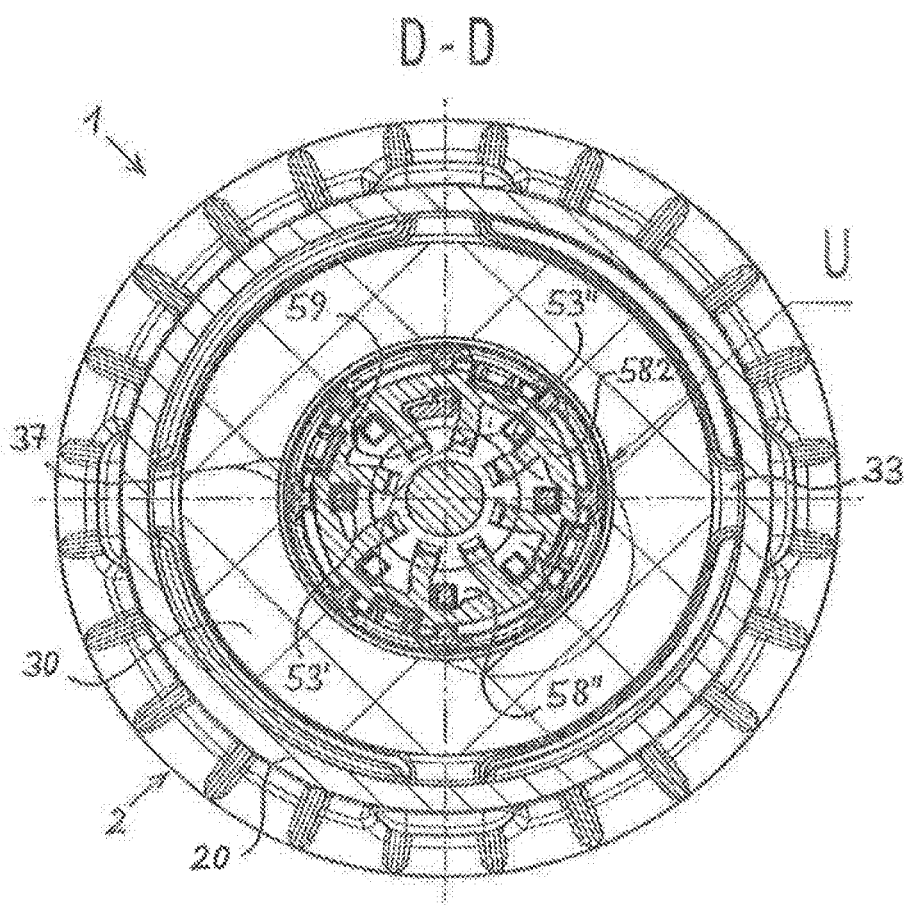
FIG. 70 shows the filter of FIG. 67 in a cross-section according to the sectional line D-D in FIG. 67.

FIG. 70 shows filter 1 of FIG. 67 in cross-section according to sectional line D-D in FIG. 67. Here as well, radially outwardly filter housing 2 is again visible, whose circumferential wall 20 is sectioned. Radially inwardly therefrom there is again situated filter insert 3 with filter material body 30, and connecting webs 33 extending axially downward. Radially inward from filter material body 30 there is situated the associated supporting element 37. Radially inwardly therefrom in turn there is situated valve holder 58. As FIG. 7 illustrates, valve holder 58 has, on its upper side visible here, a number of introduction openings 53" through which support arms 53' of spring support 53 of filter insert 3 extend into the interior of valve holder 58. Moreover, in addition to introduction openings 53" in the upper side of valve holder 58 there is present a liquid passage 58''' in the form of a plurality of openings distributed in the circumferential direction, through which filtered liquid flows during operation of filter 1.

Figure 71:
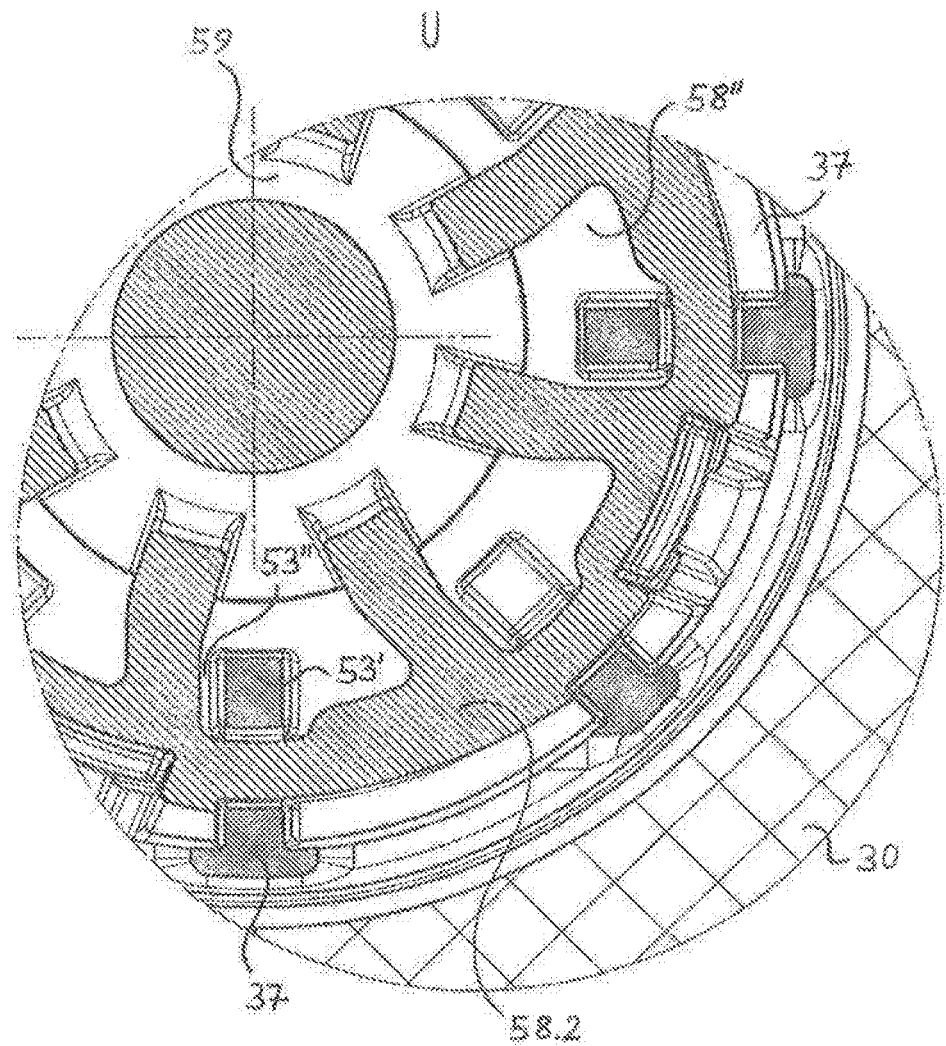
FIG. 71 shows detail U of FIG. 70 in an enlarged representation.

FIG. 71 shows detail U of filter 1 of FIG. 70, in an enlarged representation. At bottom right, a part of filter material body 30 can be seen. Radially inwardly, i.e., in FIG. 71 above this at the left, a part of supporting element 37 is visible. Radially inwardly therefrom, upper part 58.2 of the valve holder 58 is visible, in whose upper side introduction openings 53" for support arms 53' and the openings forming liquid passage 58''' can be seen. Here, introduction openings 53" and support arms 53' form a key-lock coding that permits only the installation of a particular filter insert 3, having support arms 53' in a fitting configuration, number, and shape, into filter 1.

Figure 72:
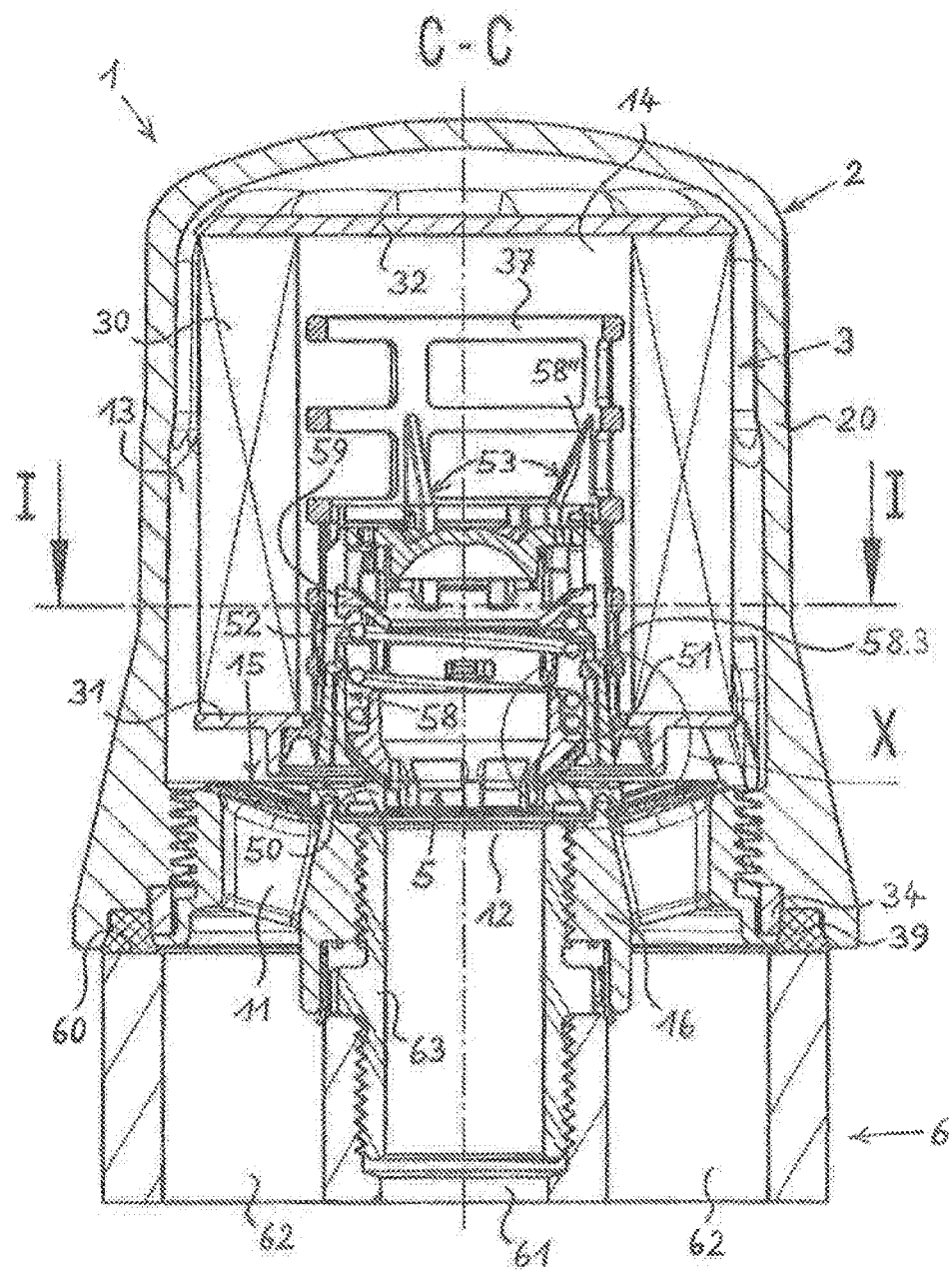
FIG. 72 shows the filter of FIG. 67 in longitudinal section according to the sectional line C-C in FIG. 68.

FIG. 72 shows filter 1 of FIG. 67 in a second longitudinal section, rotated relative to FIG. 67, along sectional line C-C in FIG. 68. In the interior of the valve holder 58, here valve body 51, valve spring 52, and covering body 59 can be seen. Support arms 53' of spring support 53 of filter insert 3 abut the upper side of covering body 59, and via this upper side compress spring 52. As a result, spring 52 exerts a specifiable force acting in the closing direction on valve body 51 of filter bypass valve 5. At the upper right on valve holder 58, an opening of liquid passage 58''' is visible through which filtered liquid flows during operation of filter 1.

With regard to the further individual parts and reference characters appearing in FIG. 72, reference is made to the preceding description.

Figure 73:
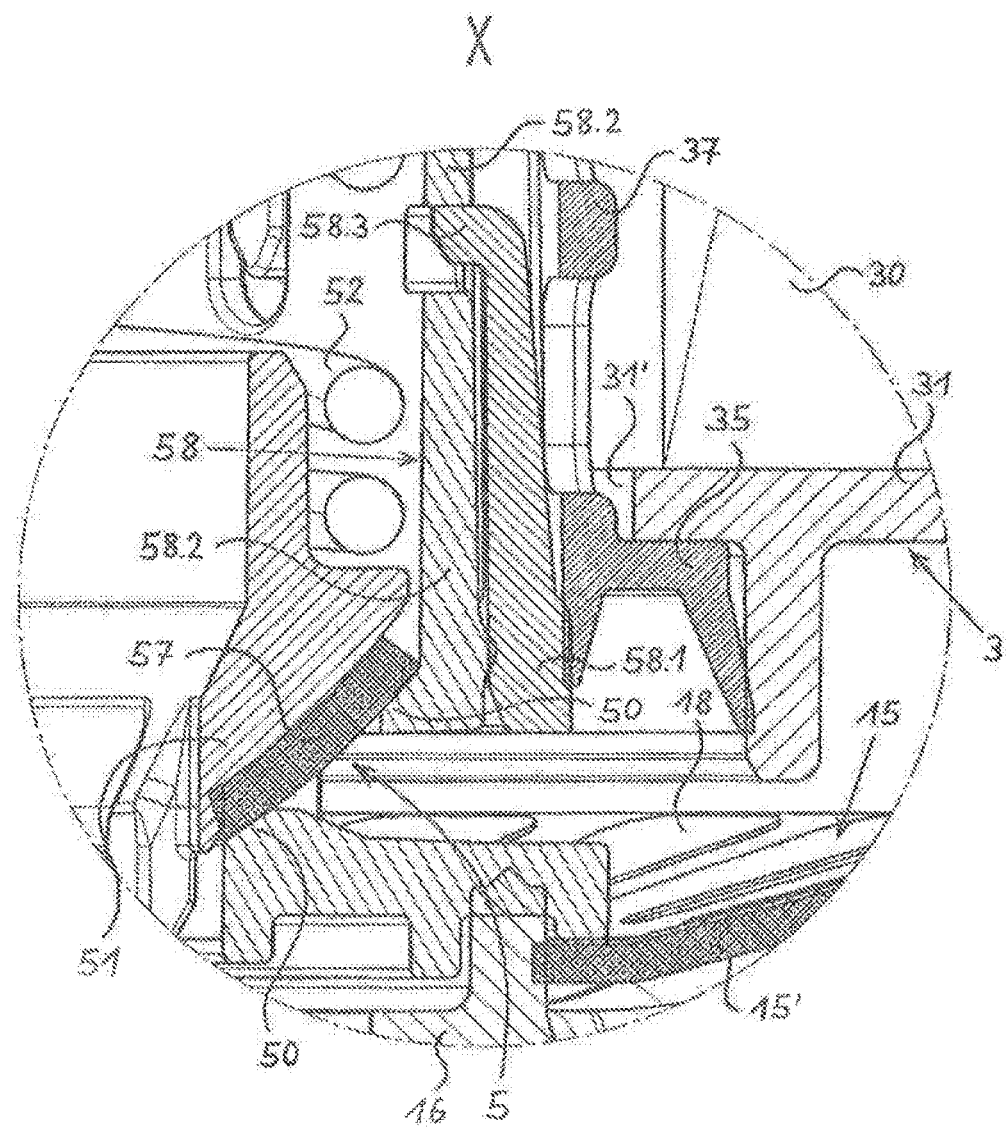
FIG. 73 shows detail X in FIG. 72 in an enlarged representation.

FIG. 73 shows detail X of filter 1 of FIG. 72 in an enlarged representation. At the bottom, a small part of base plate 16 can be seen, to whose upper side first holder part 58.1 of valve holder 58 is fixedly connected, e.g., welded. At lower left in FIG. 73, valve seat 50 is visible, fashioned as part of first holder part 58.1. Valve body 51, in its closed position, here abuts valve seat 50, valve body 51 having on its surface facing the valve seat 50 an elastomeric coating 57 in order to improve the sealing effect in the closed position. Spring 52, in the form of a helical pressure spring, runs around an upper part of valve body 51. Radially externally, i.e., here to the right of first holder part 58.1, a part of second holder part 58.2 can be seen, holder parts 58.1 and 58.2 being connected to one another by locking connections 58.3, of which one is visible in FIG. 73.

Radially outwardly from valve body 53, i.e., to the right thereof in FIG. 73, a small part of filter insert 3 is visible with filter material body, lower end plate 31, sealing collar 35, and grid-type supporting element 37. Opening 31', by which filter insert 3 is placed in sealing fashion onto second holder part 58.2 of valve holder 58, is situated centrally in lower end plate 31.

At lower right in FIG. 73, finally, a part of return check valve 15 is visible, whose valve membrane 15' is clamped, at its radially inner edge region, in sealing fashion between base plate 16 and holder part 58.1 of valve holder 58.

Figure 74:
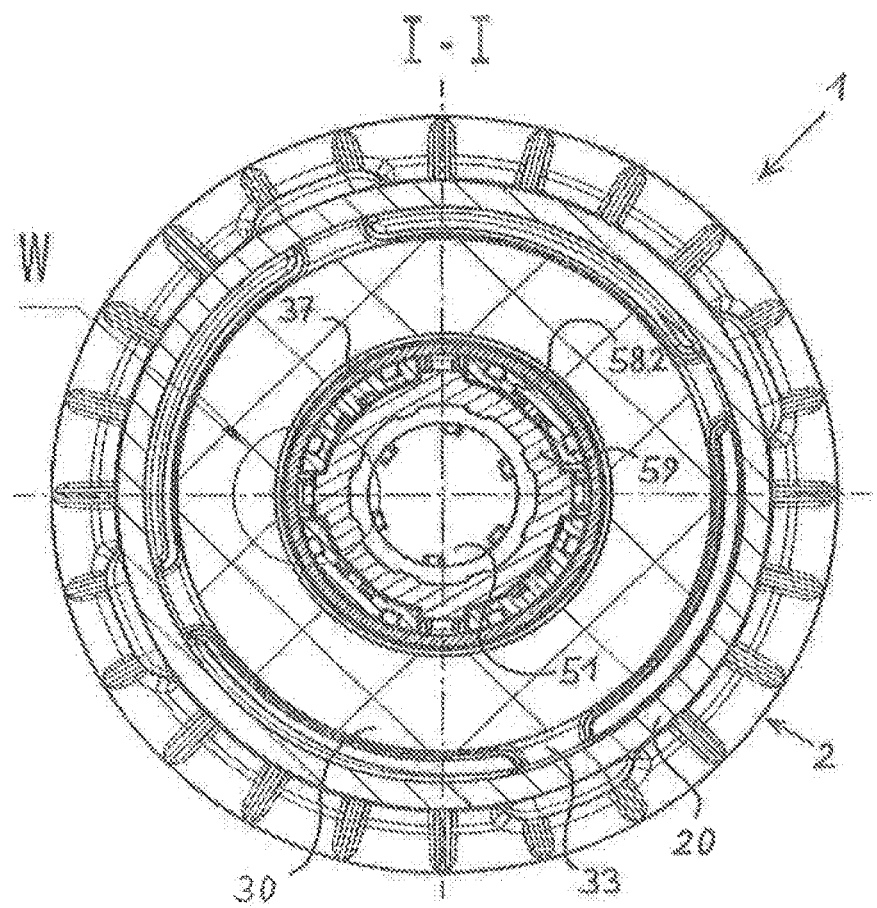
FIG. 74 shows the filter of FIG. 72 in cross-section according to the sectional line I-I in FIG. 72.

FIG. 74 shows filter 1 of FIG. 72 in cross-section along sectional line I-I in FIG. 72. Radially outwardly, filter housing 2 of filter 1 is situated, circumferential wall 20 of housing 3 here again being sectioned. Further radially inward, filter insert 3 is visible with filter material body 30, here sectioned, supported radially inwardly by supporting element 37. Radially inward from supporting element 37, valve holder 58 is visible, in which covering body 59 is situated. In the exact center of FIG. 74, finally, valve body 51 is partially visible from above.

Figure 75:
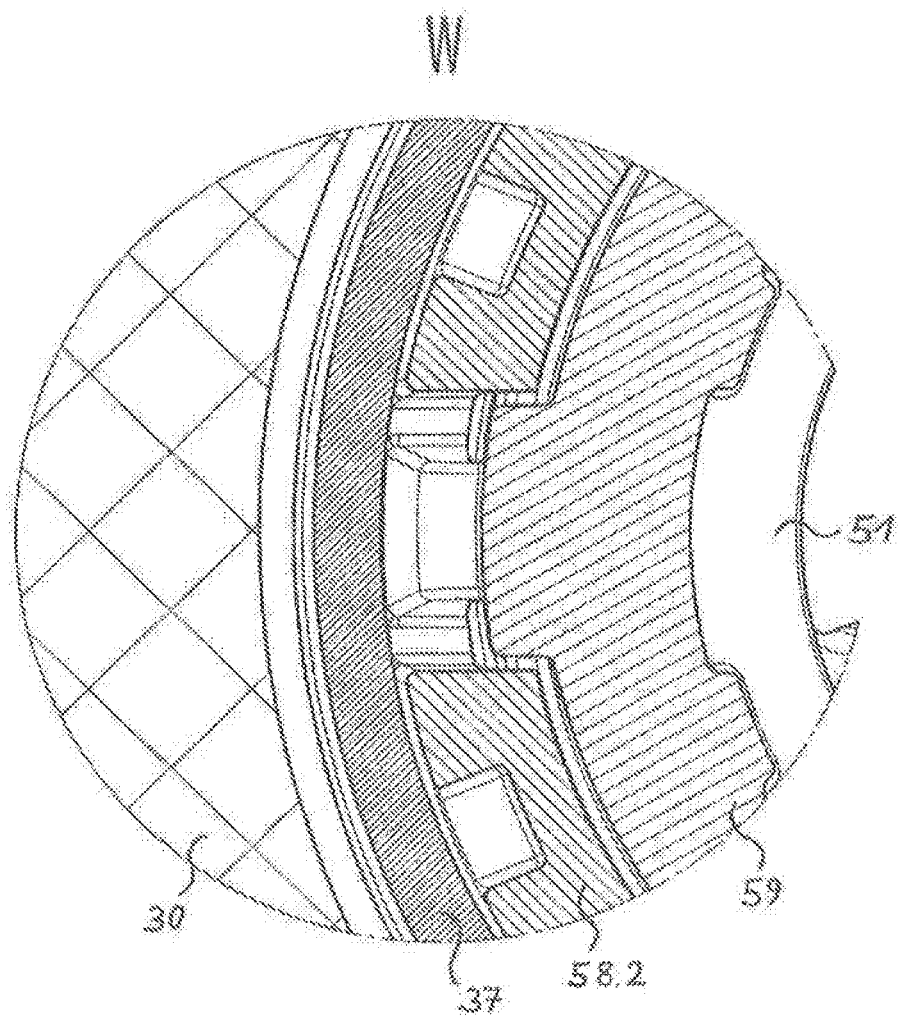
FIG. 75 shows detail W in FIG. 74 in an enlarged representation.

FIG. 75 shows detail W of filter 1 of FIG. 74 in an enlarged representation. At left, a part of filter material body 30 of filter insert 3 is visible. To the right thereof runs supporting element 37. Further to the right, there then follow segments of valve holder 58 and of covering body 59, which is displaceably guided in the valve holder 58 axially, i.e., perpendicular to the plane of the drawing of FIG. 75, but is secured against rotation in the circumferential direction by interlocking contours.

Figure 76:
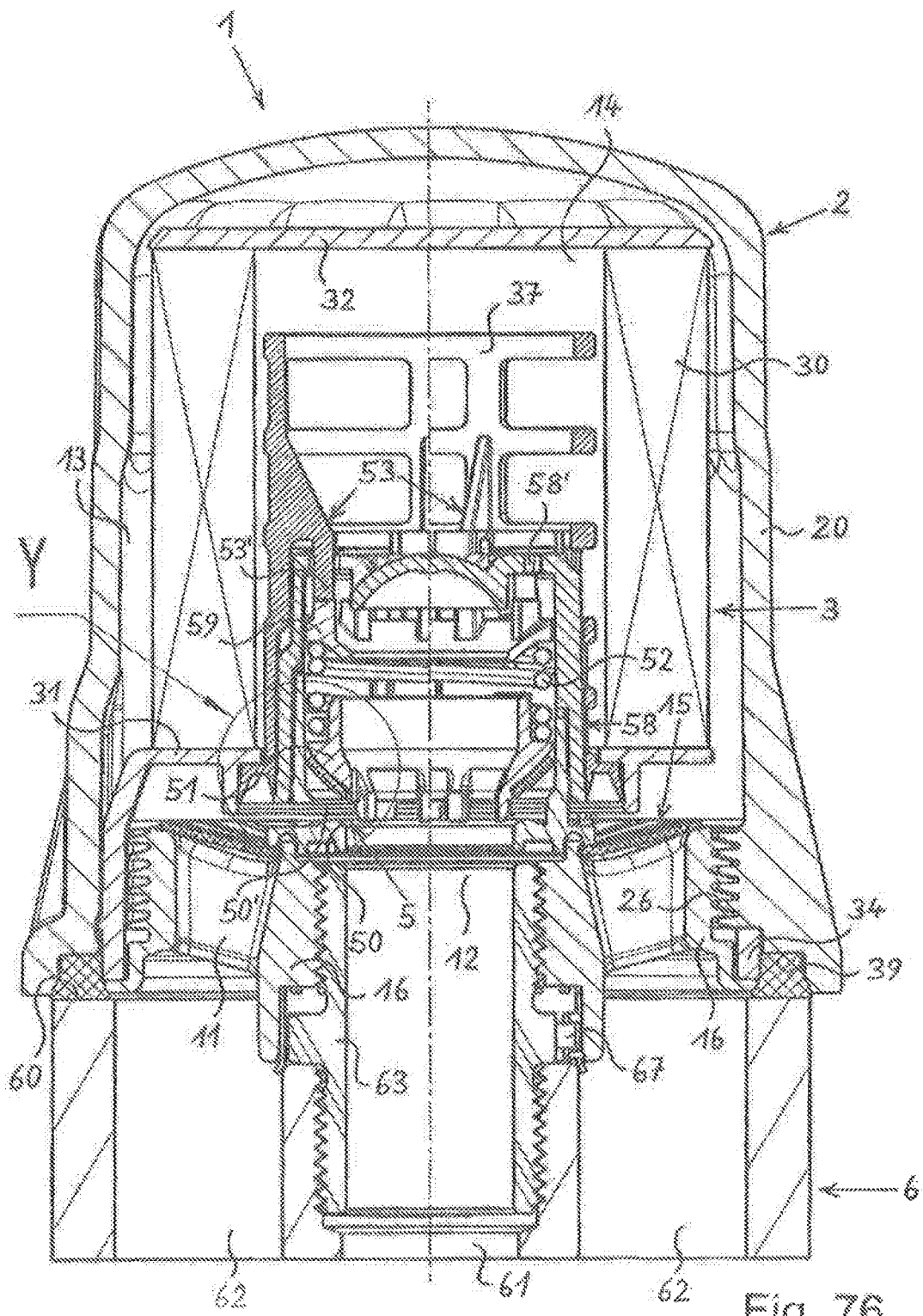
FIG. 76 shows the filter in a further embodiment, in longitudinal section.

FIG. 76 shows filter 1 in the same representation as in FIG. 67, but here with filter bypass valve 5 in the open position. The state of filter bypass valve 5 shown in FIG. 76 results when in filter 1 a pressure difference prevails between the unfiltered side 13 and filtered side 14 that exceeds a specifiable boundary value, for example when filter material body 30 of filter insert 3 is clogged with previously filtered-out dirt particles. In this case, the liquid at the unfiltered side 13 of filter 1 exerts on valve body 51 of filter bypass valve 5 a force acting in the opening direction that is greater than the force exerted in the closing direction by valve spring 52. The force acting in the opening direction displaces valve body 51 in the direction away from its valve seat 50, thus releasing an immediate flow connection from unfiltered side 13 to filtered side 14 of filter 1, through a valve through-opening 50', bypassing filter material body 30. As soon as the pressure difference between unfiltered side 13 and filtered side 14 falls below the specifiable threshold value, the force of valve spring 52 again predominates, so that valve body 51 is then moved back into its closing position, in which it is seated in sealing fashion on valve seat 50.

With regard to the further individual parts and reference characters in FIG. 76, reference is made to the preceding description.

Figure 77:
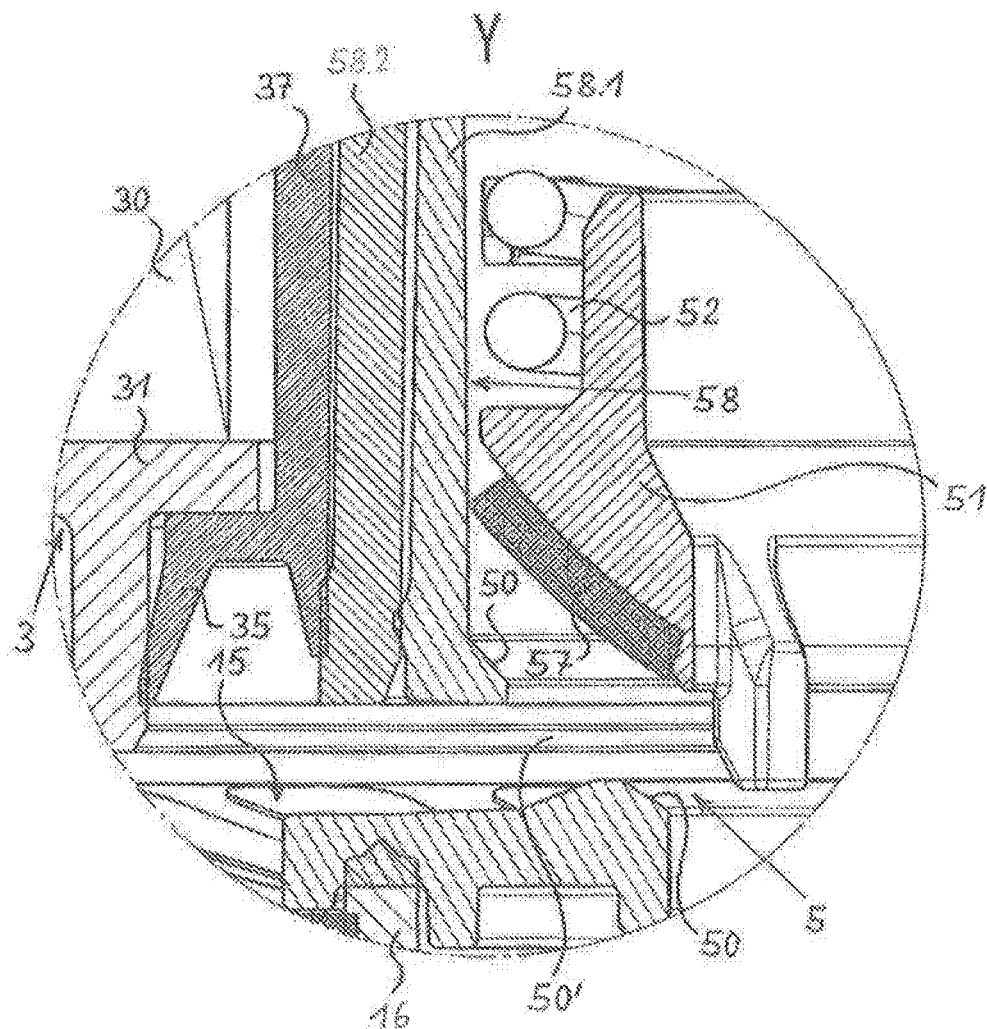
FIG. 77 shows detail Y of FIG. 76, in an enlarged representation.

FIG. 77 shows detail Y of filter 1 of FIG. 76 in an enlarged representation. At the right in FIG. 77, valve body 51 with elastomeric coating 57 is partly visible, having a distance from its valve seat 50, so that valve through-opening 50' of filter bypass valve 5 is released. Thus, here there is an immediate flow connection from unfiltered side 13 to filtered side 14 of filter 1. At the top in FIG. 77, a part of valve spring 52 is visible, here compressed by the force produced by the pressure difference between unfiltered side 13 and filtered side 14. To the left of valve body 51 and spring 52, holder parts 58.1 and 58.2 of valve holder 58 are visible. Further to the left thereof, a small part of filter insert 3 is also visible. Finally, at bottom in FIG. 77 a small part of base plate 16 is visible, bearing at its upper side valve holder 58 with filter bypass valve 5 and return check valve 15, here visible only in small part.

FIGS. 78 through 81 show filter coupling flange 60 with base plate 16 attached thereon together with valve holder 58, and having a filter insert 3, shown only partially for reasons of clarity, in various phases of the installation of filter insert 3. Here, of filter insert 3, only its lower end plate 31, with connecting webs 33, sealing bearer 34, and seal 39; are shown in a front view, as well as grid-type supporting element 37 in longitudinal section.

Figure 78:
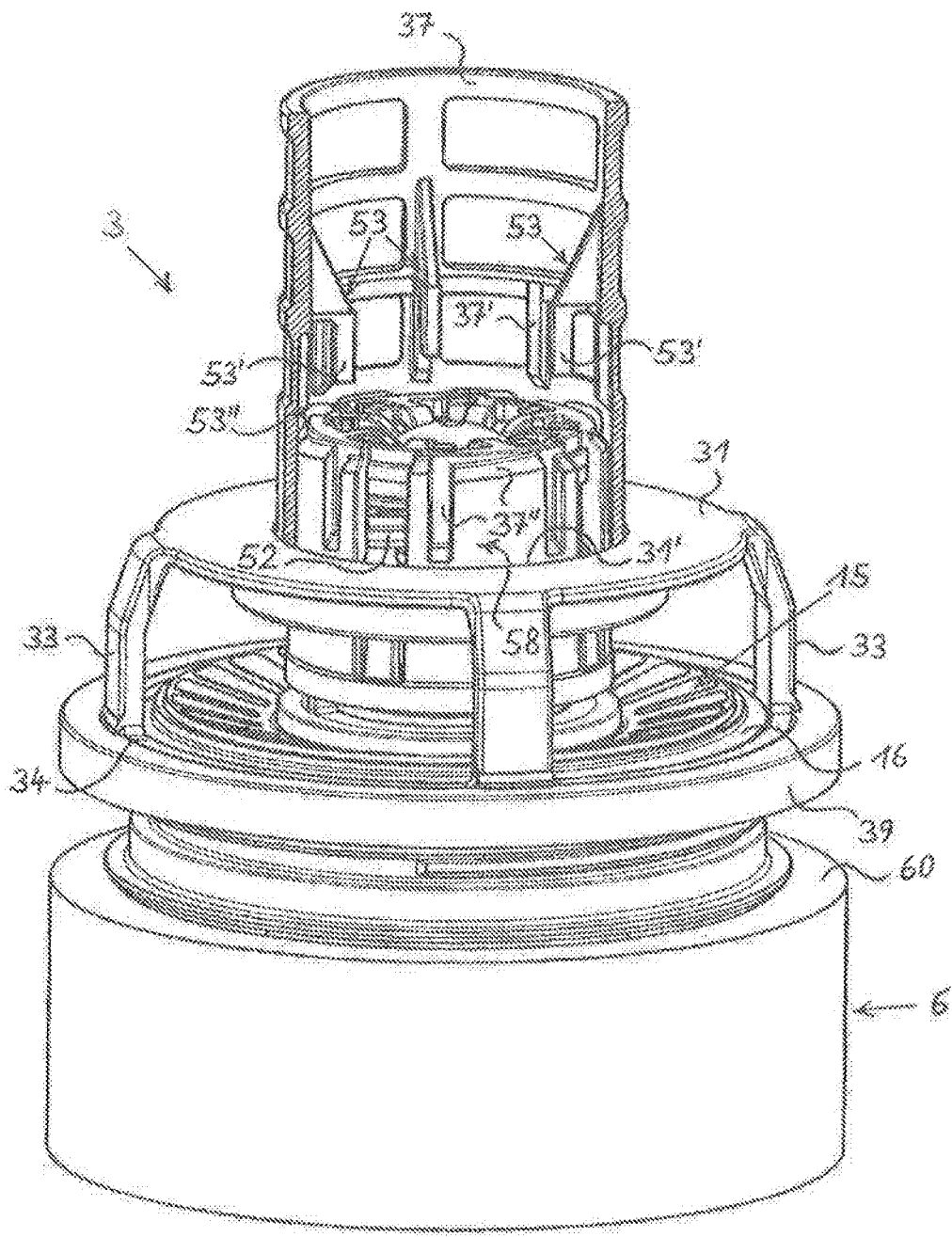
FIG. 78 shows the filter according to FIG. 76 without filter housing, with filter insert shown only partly, in a first phase of the assembly on the coupling flange, in a front view, partially in longitudinal section.

FIG. 78 shows filter coupling flange 60 with base plate 16 of filter 1 screwed thereon in a front view, and with filter insert 3 in a first phase of the installation of filter insert 3 during a filter maintenance. As described above, filter insert 3 has a spring support 53 having a plurality of support arms 53' that enter through introduction openings 53" in valve holder 58 into the interior thereof. So that support arms 53' reliably reach the fitting position for this purpose, seen in the circumferential direction, on filter insert 3 there are provided, in addition to support arms 53', first positioning elements 37' that work together with second positioning elements 37" on valve holder 58. Here, first positioning elements 37' are situated on the inner circumference of supporting element 37, between support arms 53', and have the form of oblong ribs or webs running in the axial direction and protruding radially inward. Second positioning elements 37" are formed by a respective declining bevel running in the circumferential direction of the valve holder 58 on the upper end of its outer circumference, going over into an axial groove on the outer circumference of valve holder 58. In FIG. 78, filter insert 3 is just being placed, by means of central opening 31' of its lower end plate 31, into an arbitrary position, regarded in the circumferential direction, from above onto the valve holder 58; here support arms 53' and first positioning elements 37' have not yet come into contact with the valve holder 58.

Figure 79:
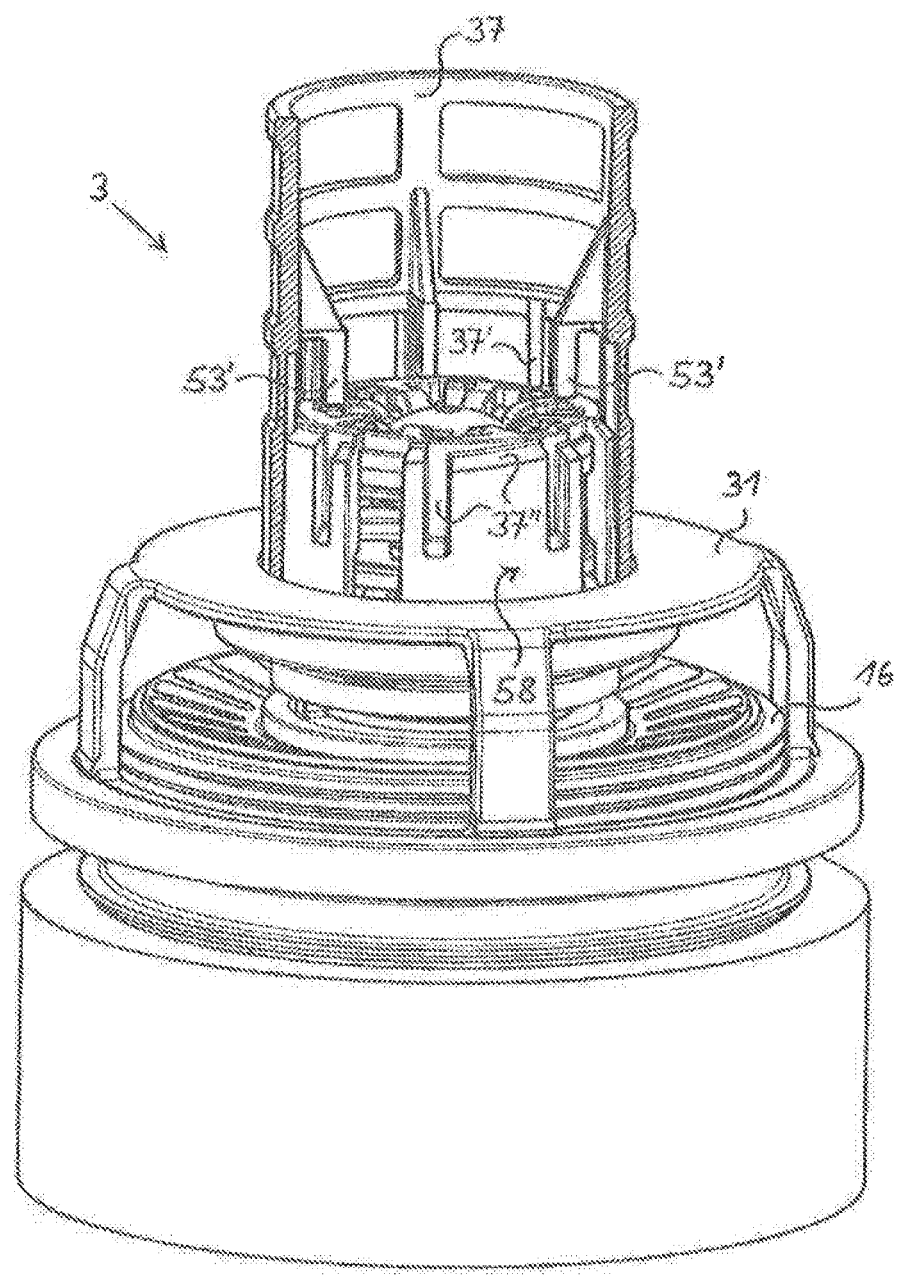
FIG. 79 shows the filter of FIG. 78 in the same representation, in a second phase of the assembly on the coupling flange.

FIG. 79 shows the subject matter of FIG. 78 in the same representation, here in a second phase of the installation of filter insert 3. Here, filter insert 3 is moved further downward relative to valve holder 58, causing first positioning elements 37' to come into contact with second positioning elements 37". Here, first positioning elements 37' abut, with their downward-pointing end surface, seen in the circumferential direction, on some point of the bevels forming a part of second positioning elements 37", at the top on valve holder 58.

Figure 80:
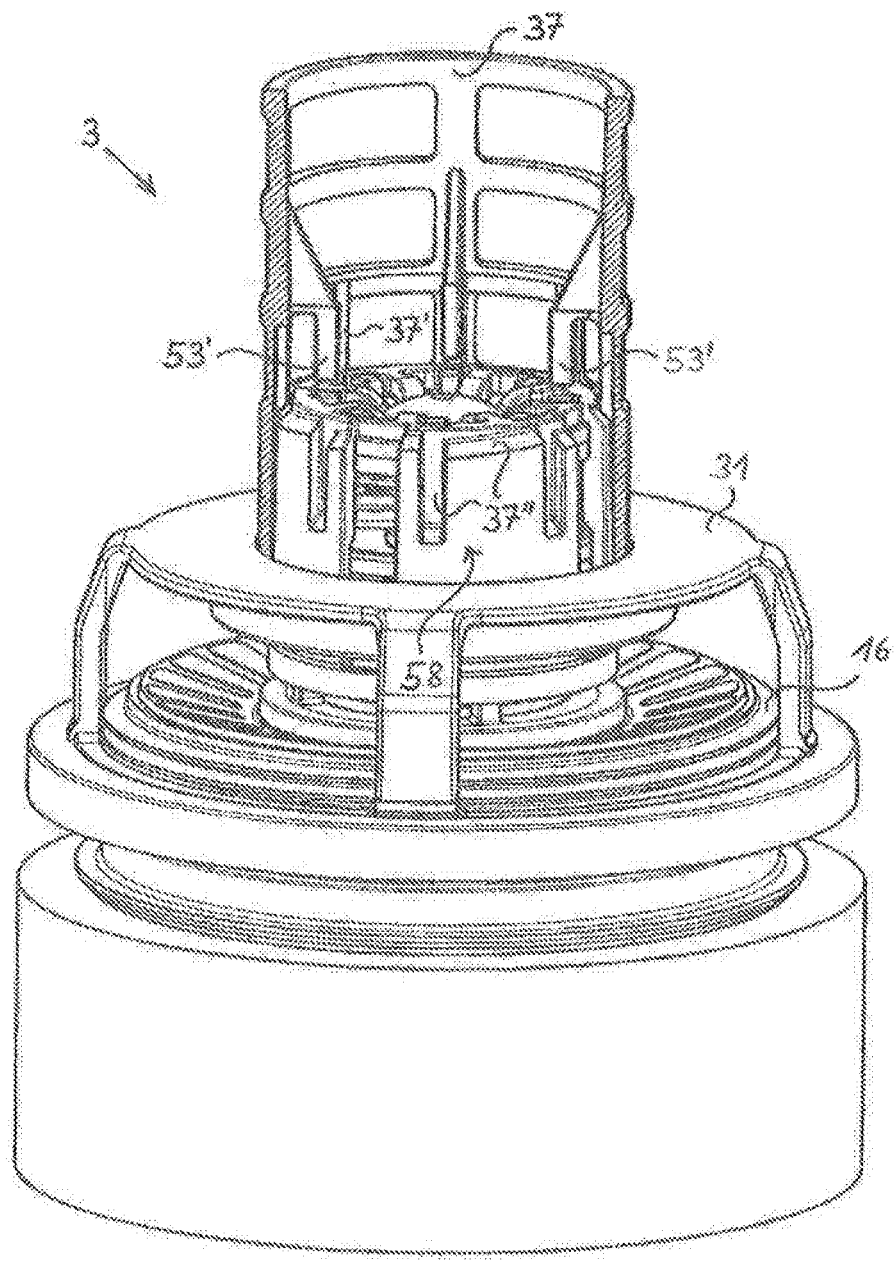
FIG. 80 shows the filter of FIG. 78 in the same representation, in a third phase of the assembly on the coupling flange.

FIG. 80 shows the subject matter of FIGS. 78 and 79 in the same representation, here in a third phase of the installation of filter insert 3. Here, as a result of a rotation in the circumferential direction usefully carried out together with the rotational movement of the filter housing 2 (not shown here) when it is screwed onto base plate 16, filter insert 3 has now reached a position in which first positioning elements 37' have arrived at the lower end of the bevels of second positioning elements 37", and now, seen in the axial direction, are positioned exactly over the vertical groove as second part of second positioning elements 37". A further rotation of supporting element 37 with first positioning elements 37' relative to valve holder 58 is now no longer possible. For this reason, supporting element 37 is here situated so as to be capable of rotation in filter insert 3 relative to lower end plate 31 of filter insert 3.

Figure 81:
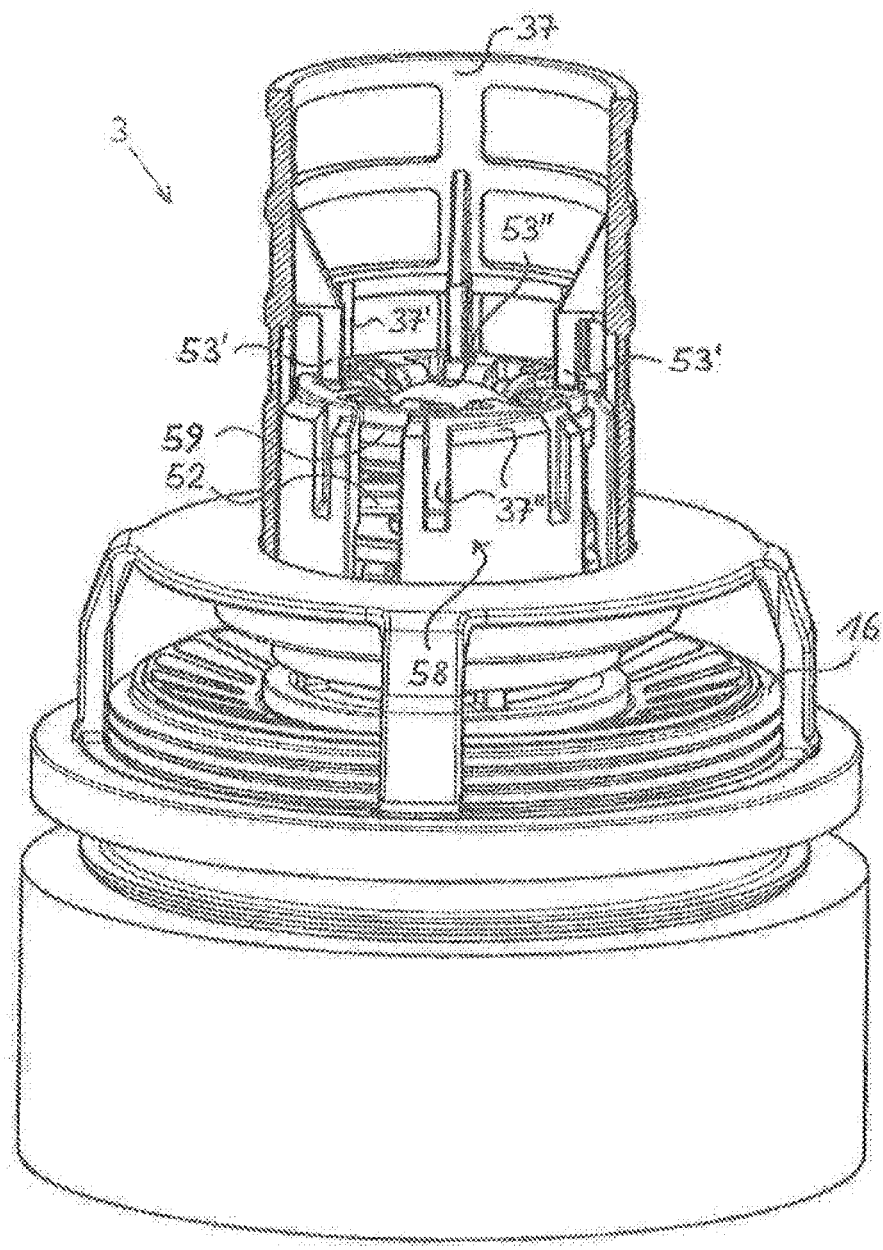
FIG. 81 shows the filter of FIG. 78 in the same representation, in a fourth phase of the assembly on the coupling flange.

FIG. 81 shows the subject matter of FIGS. 78 through 80 in the same representation, here in a fourth phase of the installation of filter insert 3. First positioning elements 37' now enter into the axial grooves, forming part of second positioning elements 37", on the outer circumference of valve holder 58. At the same time, support arms 53' of spring support 53 enter, through introduction openings 53" provided for them, into the interior of valve holder 58, and move covering body 59 situated there and explained above downward, thus prestressing valve spring 52 of filter bypass valve 5. The mutually fitting finding of supporting element 37 and valve holder 58 is thus brought about automatically, without requiring particular attention on the part of maintenance personnel with regard to the mutual positioning of the named parts.

Due to the fact that separate positioning elements 37' are provided on filter insert 3, support arms 53' of spring support 53 are relieved of all forces connected with the positioning, in particular forces acting in the circumferential direction.

Figure 82:
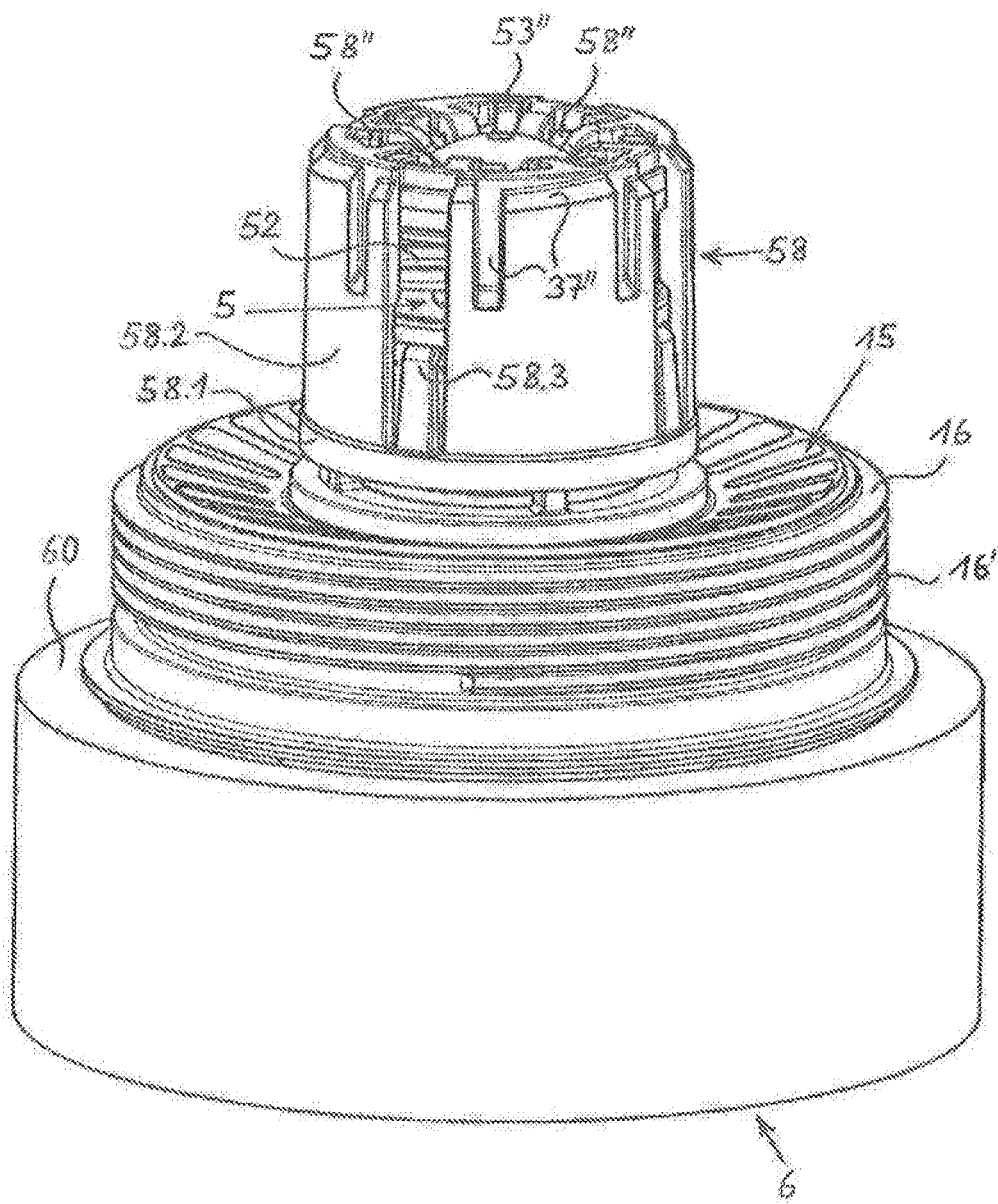
FIG. 82 shows the coupling flange together with a constructive unit, including a filter bypass valve and a return check valve, of the filter of FIG. 76, after the removal of filter housing and filter insert, in a front view.

FIG. 82 shows filter coupling flange 60 with base plate 16 of filter 1 screwed thereon, and with valve holder 58, in a front view, without filter insert 3 and without filter housing 2. At bottom in FIG. 82, a part of device 6 having filter 1 is shown with coupling flange 60, to which base plate 16 of filter 1 is connected. Base plate 16 has on its outer circumference outer threading 16', used to screw on filter housing 2 (not shown here). Return check valve 15 is situated radially externally on the upper side of base plate 16. Valve holder 58, with filter bypass valve 5 housed therein, is attached centrally on base plate 16. Valve holder 58 is made up of the two holder parts 58.1 and 58.2, connected to one another via locking connections 58.3. On the upper side of valve holder 58 there can be seen introduction openings 53" for support arms 53' of spring support 53, as well as liquid passage 58" for filtered liquid. The above-described second positioning elements 37" are situated in the upper region of the outer circumference of valve holder 58.

In the example shown, four support arms 53' and four first and second positioning elements 37' and 37" are provided; however, a smaller or larger number is also possible.

Figure 83:
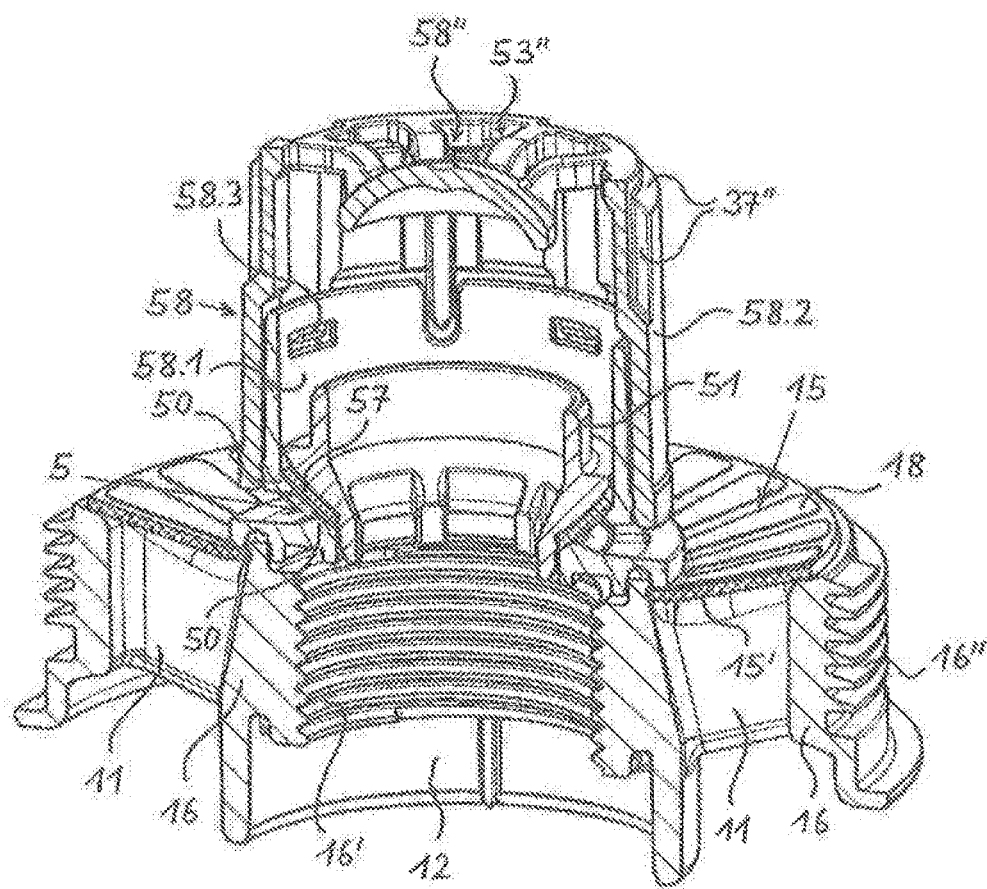
FIG. 83 shows the constructive unit of FIG. 82, without spring and without covering element of the return check valve, in a longitudinally sectioned view.

FIG. 83 shows base plate 16 of filter 1 with valve holder 58 and valve body 51 and having return check valve 15, but without valve spring 52 and covering body 59, in a sectioned view. Base plate 16, visible at bottom in FIG. 83, has on its inner circumference inner threading 16', which is used to screw base plate 16 onto coupling flange 60 (not shown here).

On its outer circumference, base plate 16 has outer threading 16", which is used to screw on filter housing 2, also not shown here. Underneath outer threading 16", there runs a radially outward-protruding outer edge projection of base plate 16.

Openings for the supply of liquid to be filtered run through the region of base plate 16 situated between inner threading 16' and outer threading 16". At the upper side, inlet 11 is covered by return check valve 15. Valve membrane 15' of return check valve 15 is mounted at its inner edge region on base plate 16, in that a lower edge region of the valve holder 58 clamps the edge region from above. Outlet 12 runs centrally through base plate 16.

Valve holder 58 is fixedly connected to the upper side of base plate 16. Valve holder 58 is made up of the two holder parts 58.1 and 58.2, which are connected to one another via locking connections 58.3. In the interior of valve holder 58, valve body 51 of filter bypass valve 5 is guided movably in the axial direction. Valve body 51 works together with valve seat 50 fashioned at the bottom on valve holder 58.

In the upper end face of valve holder 58, introduction openings 53" for support arms 53' and liquid passage 58" for filtered liquid can be seen. On the axially upper end region of the outer circumference of valve holder 58, at right in FIG. 83 one of the two positioning elements 37" is visible.

Figure 84:
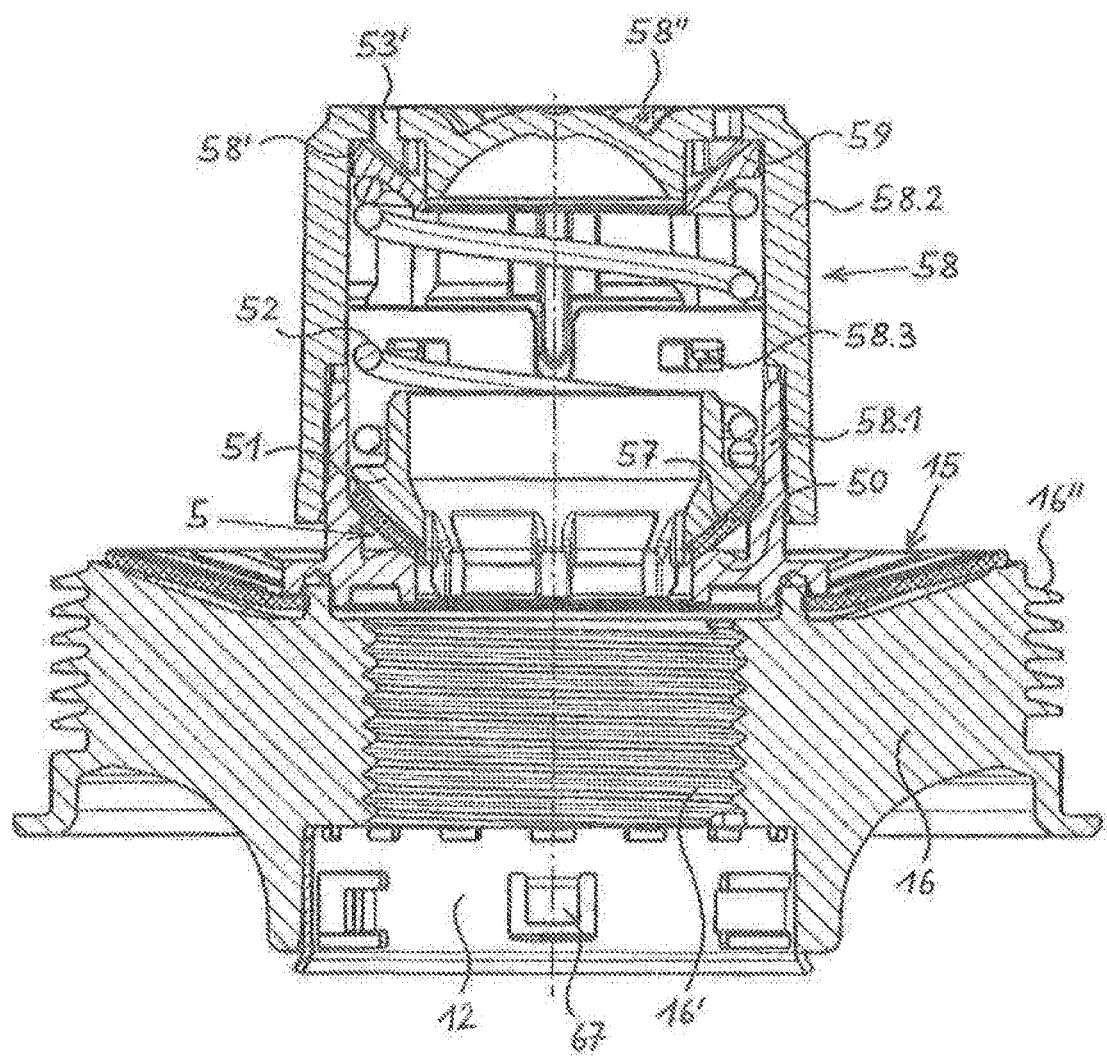
FIG. 84 shows the complete constructive unit of FIG. 82 in longitudinal section.

FIG. 84 shows base plate 16 of filter 1 with the parts according to FIG. 83, and in addition having valve spring 52 and covering body 59, in longitudinal section. Here a state is shown that arises when filter insert 3 is removed. In this state, valve spring 52 is not prestressed by spring support 53 with its support arms 53', so that valve spring 52 can extend to its maximum length provided by valve holder 58. This has the result that now covering body 59 has moved into an upward-displaced position in which it abuts a stop 58' at the upper end of valve holder 58. In this position, covering body 59 closes all the openings forming liquid passage 58" in the upper end face of the valve holder 58. In this way, it is ensured that in this state a disturbing or damaging falling in of dirt particles, through liquid passage 58" into outlet 12 for filtered liquid, during a filter maintenance is not possible.

Outlet 12, and inner threading 16' situated therein, are again visible in the center of base plate 16. In the lower region of outlet 12, elements of anti-rotation lock 67 are visible, which ensures that base plate 16, after being screwed onto threaded nipple 63 of coupling flange 60 during first assembly of filter 1, is fixed thereto and can no longer be screwed off.

Return check valve 15 is again visible on the radially outer part of the upper side of base plate 16.

Figure 85:
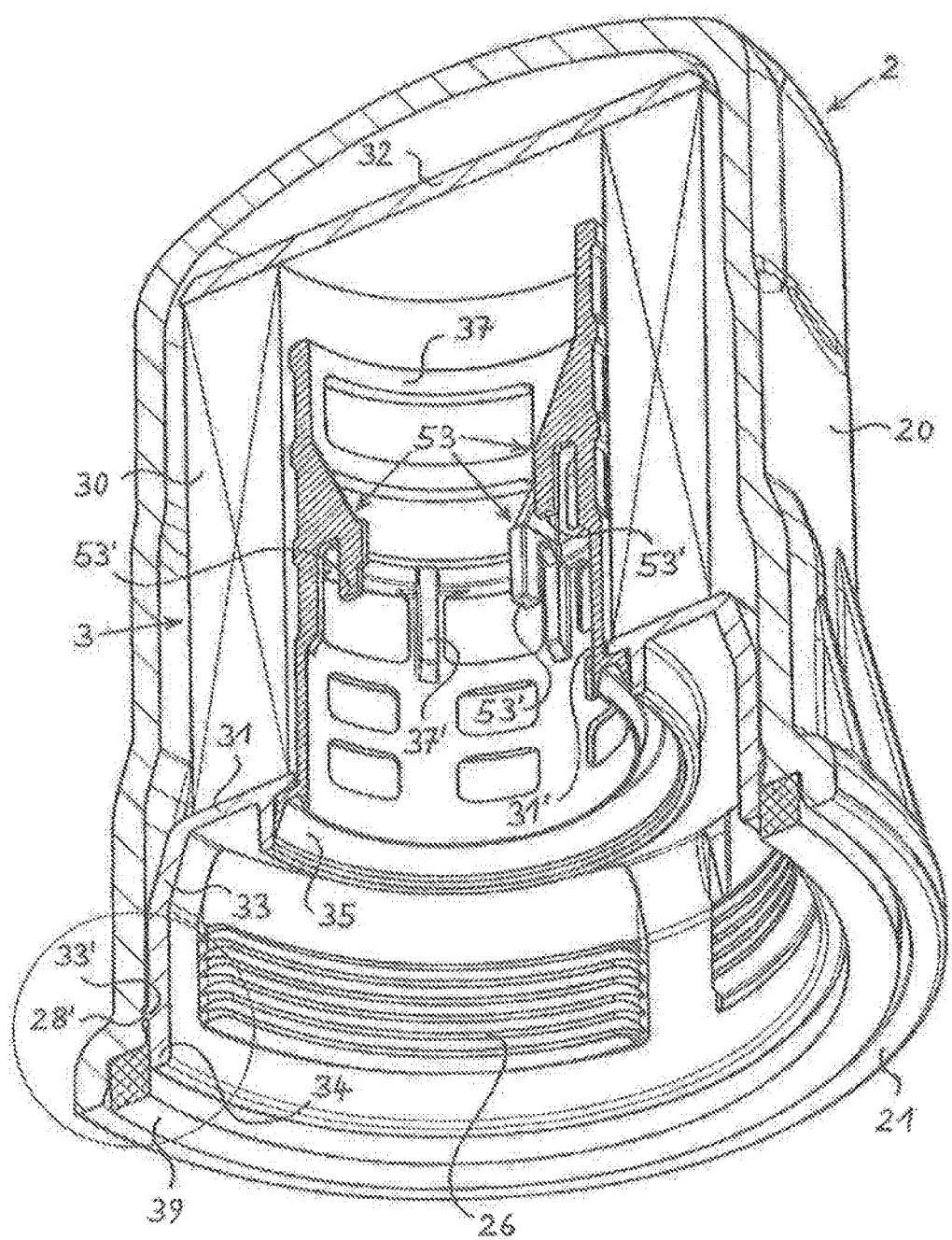
FIG. 85 shows the filter housing and the filter insert situated therein, in a longitudinally sectioned view.

FIG. 85 shows filter housing 2 with filter insert 3 placed therein, in a longitudinal section. Radially outwardly, screw housing 2 of filter 1, with circumferential wall 20, can be seen. In the interior of filter 1, filter insert 3 is situated with its above-described individual parts. In the interior of filter material body 30 of filter insert 3, there is situated supporting element 37, having on its inner circumference spring support 53 having support arms 53' distributed in the circumferential direction and having first positioning elements 37' integrally formed thereon in one piece. Here, supporting element 37 is introduced from below, through central opening 31' in lower end plate 31, into the interior of filter insert 3 and of filter material body 30, and, during operation of filter 1, supports filter material body 30 radially inwardly against collapse. Here, supporting element 37 terminates at a distance from upper end plate 32; alternatively, however, it could also be realized extending up to this end plate 32.

The four connecting webs 33, spaced uniformly from one another in the circumferential direction, extend downward in the axial direction from the radially outer edge of lower end plate 31 of filter insert 3. Inner threading 26 is provided on the inner circumference of circumferential wall 20 of filter housing 2, close to its lower end face 21. On the radially outward-oriented surface of connecting webs 33, a respective bulge or locking cam 33' is integrally formed, somewhat above circumferential sealing bearer 34, which bulge or cam provides an easily detachable locking of filter insert 3 in filter housing 2 in interaction with a locking recess 28' on the inner circumference of circumferential wall 20. In this way, filter insert 3 is determined in a defined manner in its position relative to screw housing 3, by means of its connecting webs 33.

At their axially lower end, connecting webs 33 go over into circumferential sealing bearer 34, here made in one piece with the webs, on which bearer sealing ring 39 is situated.

The unit shown in FIG. 85 of filter housing 2 and filter insert 3 is screwed off from coupling flange 60, or from base plate 16 permanently attached thereon, when there is a filter maintenance. All parts of filter bypass valve 5, with the exception of spring support 53, remain on base plate 16, and are thus elements fixed to the filter. Subsequently, used filter insert 3 can be withdrawn from housing 2 and replaced by a fresh filter insert 3. Because seal 39 is part of filter insert 3, seal 39 is here automatically also replaced. After screwing the unit made up of housing 2 and fresh filter insert 3 onto base plate 16, filter 1 is again ready for operation.

With regard to the further individual parts and reference characters shown in FIG. 85, reference is made to the preceding description.

Figure 86:
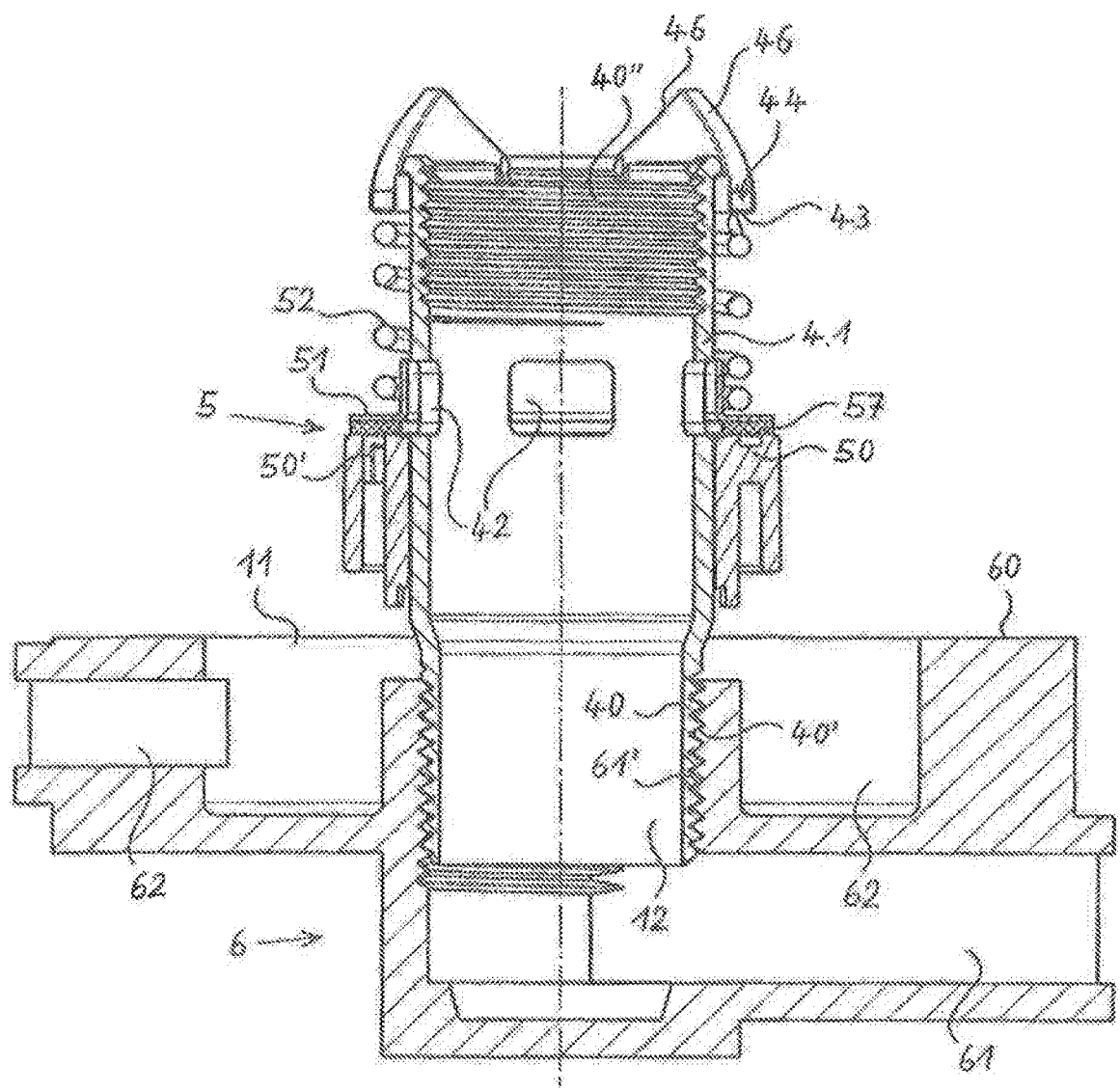
FIG. 86 shows a filter bypass valve in a modified embodiment, together with the coupling flange, in longitudinal section.

FIG. 86 shows a filter bypass valve 5 of filter 1 in a modified embodiment, together with a coupling flange 60, in longitudinal section. This filter bypass valve 5 is provided for filter 1 having a central pipe socket 4 made up of two pipe socket segments 4.1 and 4.2, as described above. In FIG. 86, only flange-side pipe socket segment 4.1 is visible, here provided in its lower end region 40 with an outer screw threading 40' with which pipe socket segment 4.1 is permanently screwed into an inner threading 61' centrally in coupling flange 60. A threaded nipple, as provided in some exemplary embodiments described above, is thus not present here.

On a center region, seen in the longitudinal direction, of pipe socket segment 4.1, annular valve seat 50 is seated so as to be non-displaceable in the axial direction, the valve seat having through-openings 50' that run parallel to the longitudinal direction of pipe socket segment 4.1. On the upper side of valve seat 50 there is situated the also annular valve body 51, guided in displaceable fashion on pipe socket segment 4.1, in the axial direction thereof. On its side facing the valve seat 50, valve body 51 has an elastomeric coating 57 for improving the sealing effect in the closed state of filter bypass valve 5. Above valve body 51 is situated spring 52 surrounding pipe socket segment 4.1, which spring here abuts stop 43 with its upper end, in the absence of filter insert 3. At the upper side, stop 43 has a plurality of roof-shaped introductory bevels 46 situated in the circumferential direction of pipe socket segment 4.1, between which there are respectively situated intermediate spaces 44 for guiding through support arms 53' of spring support 53.

As FIG. 86 further illustrates, in its depicted closed position valve body 51 covers perforations 42 made in pipe socket segment 4.1. When valve body 51 is in its open position, i.e., is displaced upward relative to valve seat 50, perforations 42 are at least partly released, whereby a very short immediate flow path from inlet 11 to outlet 12 is released, bypassing filter insert 3.

Figure 87:
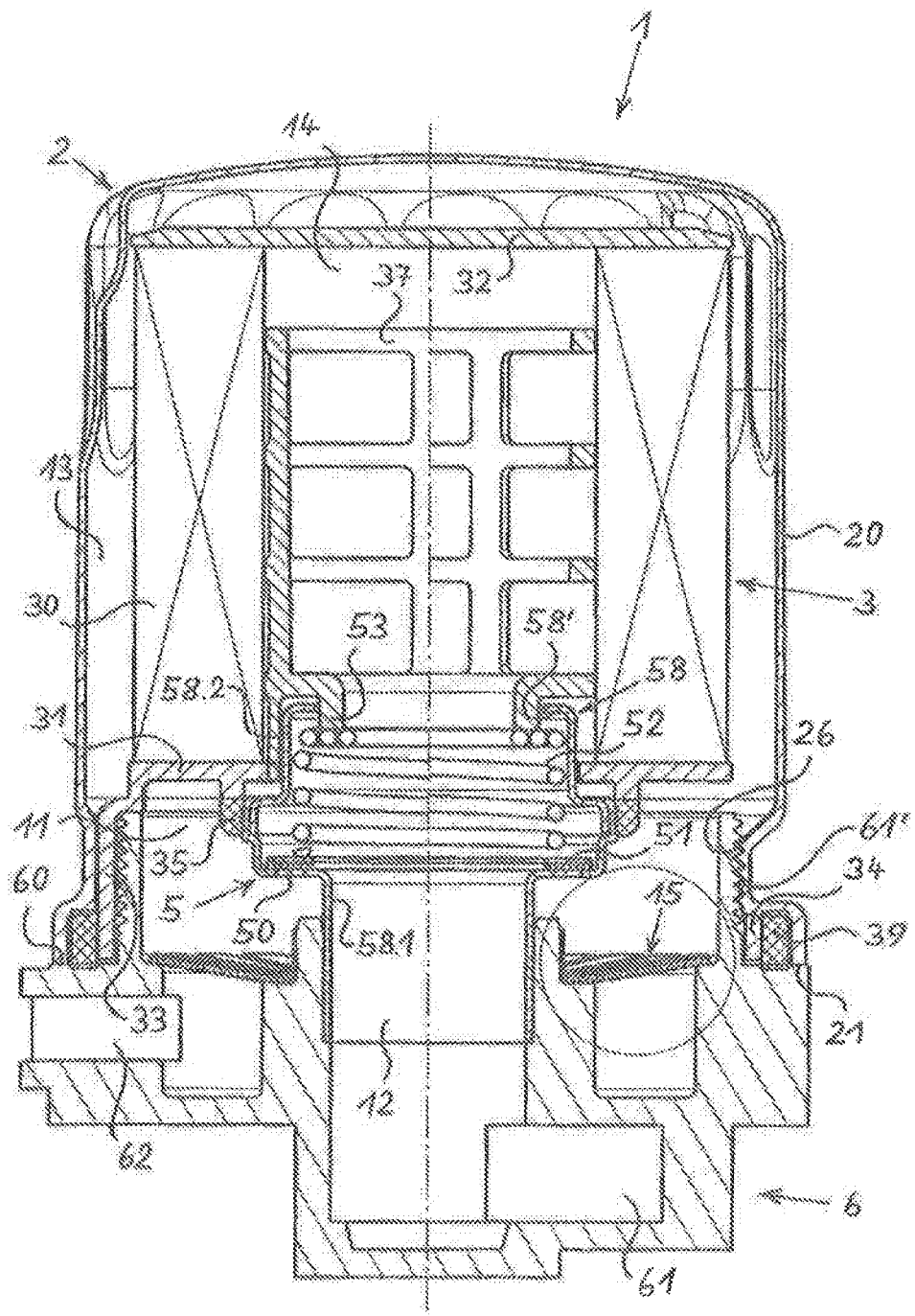
FIG. 87 shows the filter in a further embodiment, in longitudinal section.

FIG. 87 shows filter 1 in a further embodiment, in longitudinal section. In large part, filter 1 corresponds to the exemplary embodiment according to FIG. 66; in particular, filter housing 2 and filter insert 3 are identical in the two examples. Different in these two exemplary embodiments is that filter 1 according to FIG. 87 does not have a base plate, and is designed for a coupling flange 60 not having a central threaded nipple. Instead of central threaded nipple, coupling flange 60 in FIG. 87 has a collar having an outer threading 61' onto which an inner threading 26 on filter housing 2 can be screwed. This screw connection is sealed by sealing ring 39.

As do all other exemplary embodiments, filter 1 according to FIG. 87 also has a filter bypass valve 5, here again situated in a valve holder 58. Valve holder 58 is here again realized in two parts, having a first, lower holder part 58.1, and a second, upper holder part 58.2, which here are for example sheet metal parts. Lower holder part 58.1 has a downward-protruding hollow cylindrical segment that forms outlet 12 and is pressed into a fittingly shaped and dimensioned opening in the center of coupling flange 60. After first assembly, valve holder 58 is thus seated in a press-fit seating in coupling flange 60, from which it is then no longer detached in normal operation of filter 1. In its remaining parts and functions, filter bypass valve 5 in FIG. 87 corresponds to filter bypass valve 5 as already described in FIG. 64. With regard to the other parts and reference characters in FIG. 87, reference is made to the preceding description.

A return check valve 15 is here attached immediately on coupling flange 60, and is thus here not an integral component of filter 1.

Figure 88:
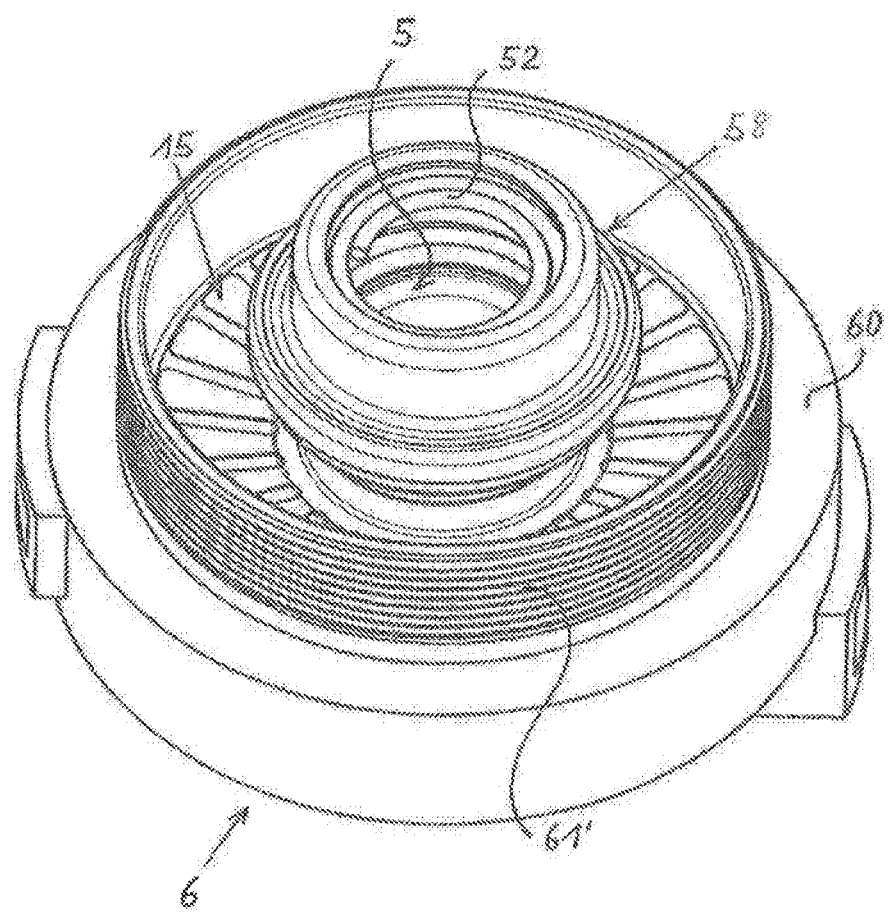
FIG. 88 shows a constructive unit, including a filter bypass valve and a return check valve, of the filter of FIG. 87, in the state connected to a coupling flange, in an oblique view from above.

FIG. 88 shows filter bypass valve 5 and return check valve 15 of FIG. 87 in the state connected to coupling flange 60, in an oblique view from above; here filter housing 2 and filter insert 3 are unscrewed from coupling flange 60. On the upper side of coupling flange 60, the collar thereof, with an outer threading 61', is radially outwardly visible. Radially inwardly therefrom, return check valve 15, here attached immediately on coupling flange 60, is visible. In the center of coupling flange 60, valve holder 58 is attached, with filter bypass valve 5 situated therein, of which only spring 52 is immediately visible.

Figure 89:
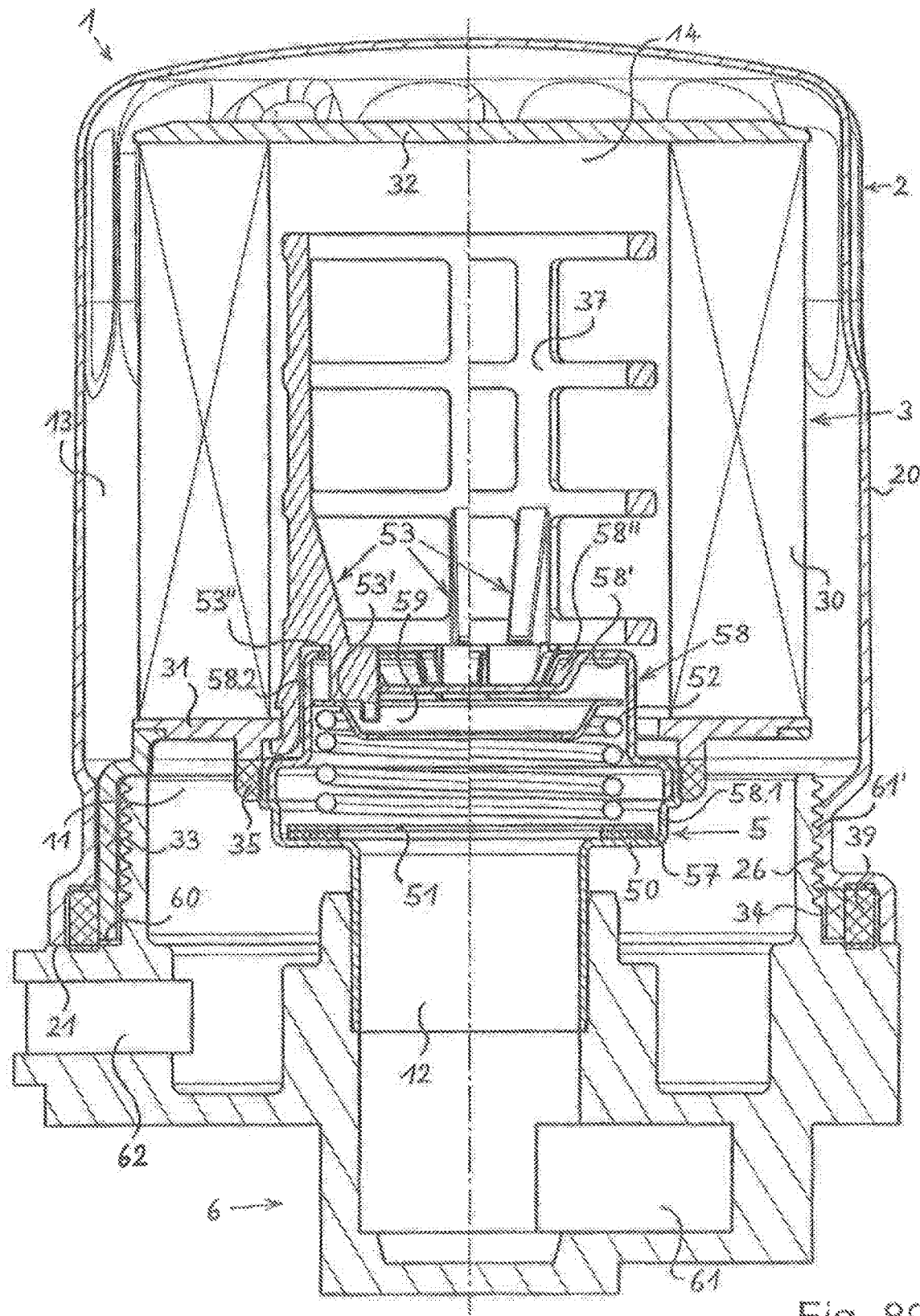
FIG. 89 shows the filter in a further embodiment, in longitudinal section.

FIG. 89 shows filter 1 in a further embodiment in longitudinal section, this filter 1 corresponding in large part to the exemplary embodiment according to FIG. 87. Differing from the example according to FIG. 87, in the example according to FIG. 89 a covering body 59 is additionally situated in valve holder 58. Covering body 59 is situated between the upper end of spring 52 of filter bypass valve 5 and the underside of upper end face of the valve holder 58. In the assembled state ready for operation of filter 1, as shown in FIG. 89, support arms 53' of spring support 53 of filter insert 3 engage from above through introduction openings 53" of valve holder 58 into this valve holder, and press onto spring 52 via covering body 59. In this way, spring 52 is prestressed, and exerts a specifiable preloading force on valve body 51 of filter bypass valve 5. At the same time, in this way covering body 59 is held at an axial distance from passages 58" in the upper side of valve holder 58, making possible a flow of filtered liquid from the interior of filter insert 3 through outlet 12 to filtered liquid duct 61 in coupling flange 60 of device 6.

Figure 90:
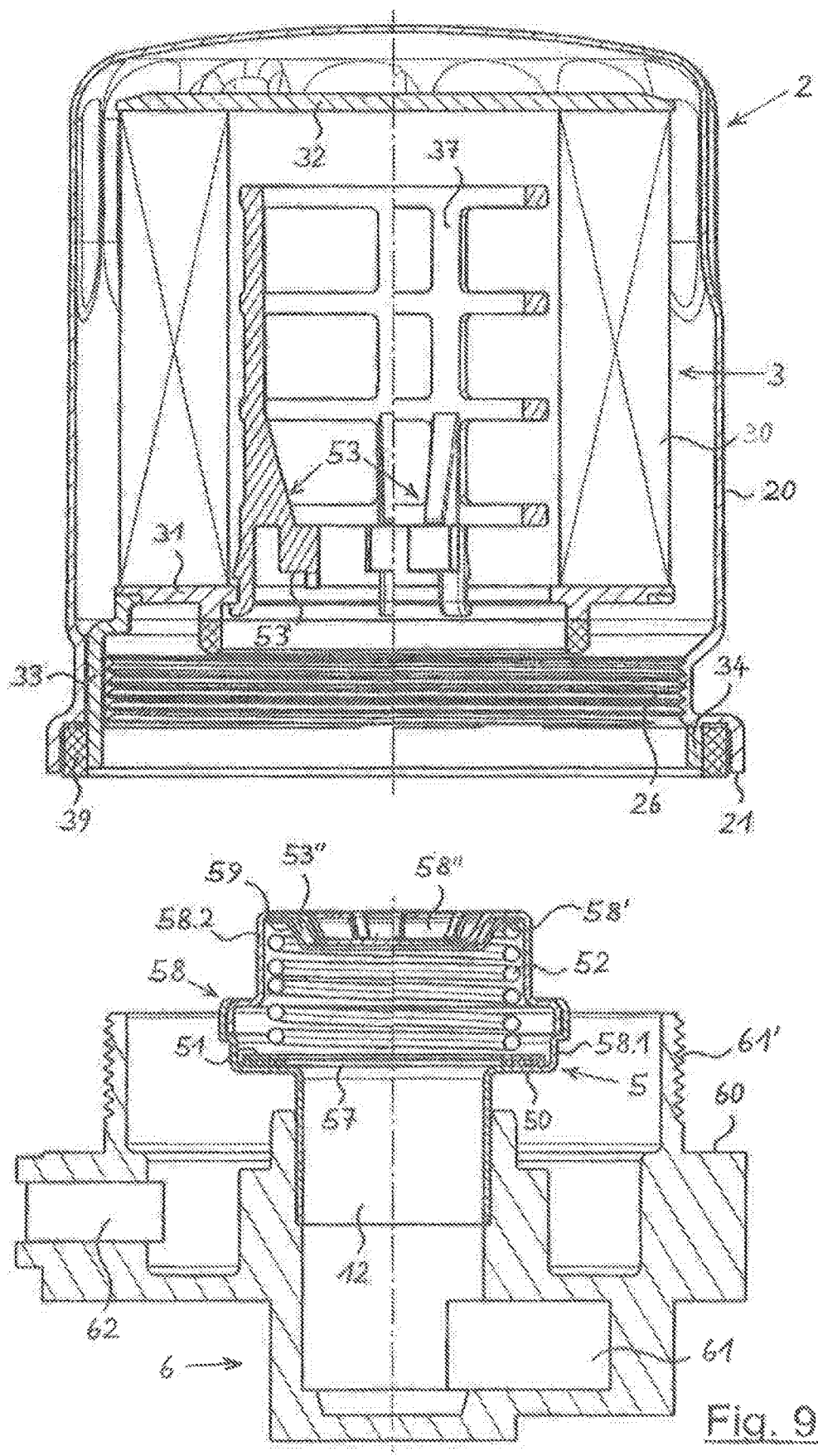
FIG. 90 shows the filter of FIG. 89 in a state with filter housing and filter insert removed from the coupling flange, in longitudinal section.

If, as shown in FIG. 90, filter housing 2 is screwed off from coupling flange 60 together with filter insert 3, then spring 52 presses covering body 59 upward against the underside of the upper end face of the valve holder 58, and then closes passages 58" situated there. In this way, dirt particles are reliably prevented from falling into outlet 12 and into filtered liquid duct 61.

With regard to the further individual parts and functions of filter 1 according to FIGS. 89 and 90, reference is made to the preceding description, in particular of FIG. 87.

Figure 91:
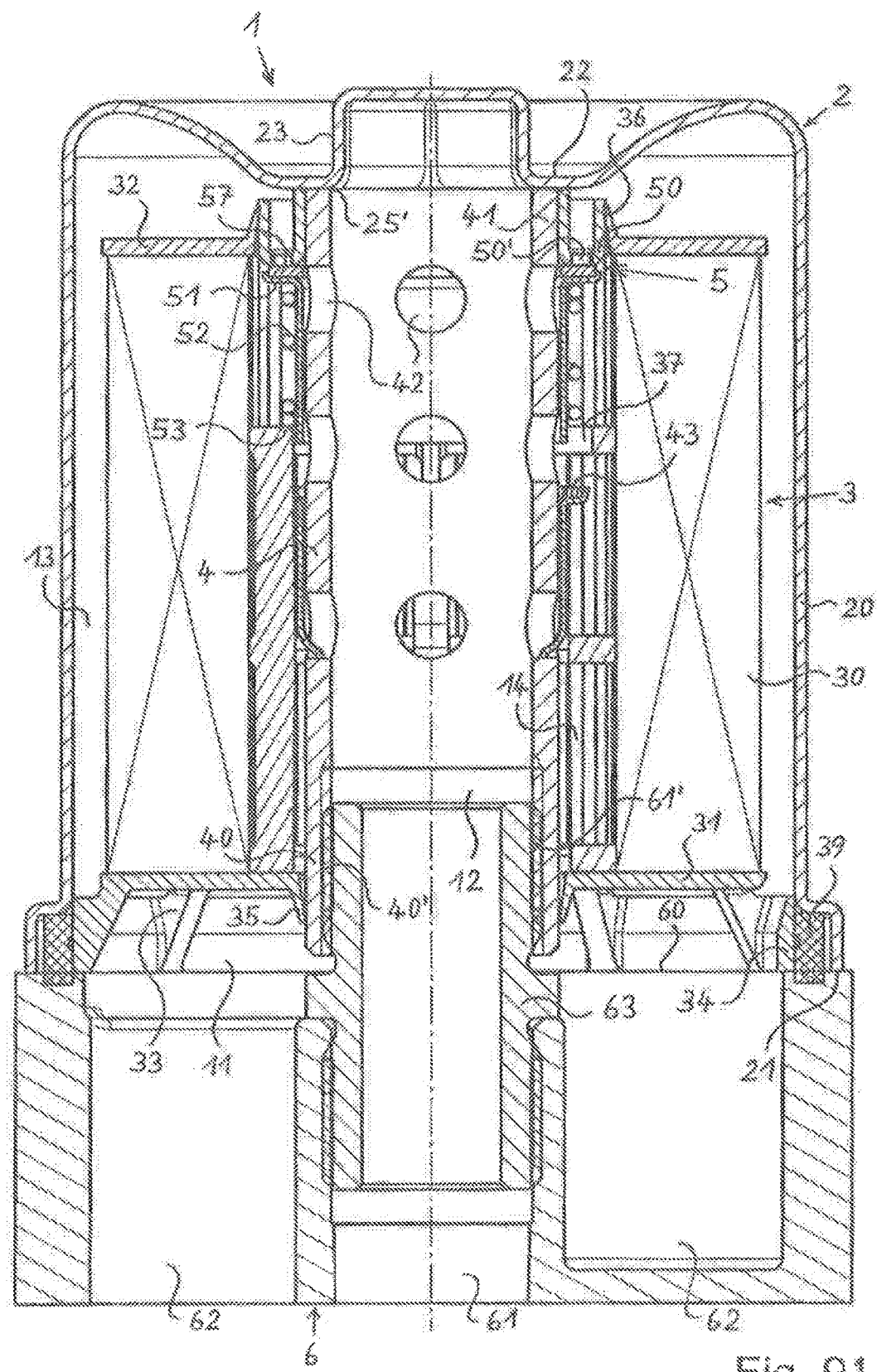
FIG. 91 shows the filter in a further embodiment, in a state in place on a coupling flange, in longitudinal section.

FIG. 91 shows filter 1 in a further embodiment, in a state assembled on a coupling flange 60, in longitudinal section. Filter 1 has a one-piece central pipe socket 4 that is fixedly connected at its upper end region 41 to flange-remote end face 22 of filter housing 2, for example by welding. Characteristic for this exemplary embodiment is that central pipe socket 4 has in its lower flange-side end region 40 an inner threading 40' by which filter housing 2 is screwed onto a fitting outer threading 61' on a threaded nipple 63 attached centrally in coupling flange 60.

Filter bypass valve 5 of filter 1 according to FIG. 91 is situated in the upper region of central pipe socket 4, and corresponds to the embodiment as described above in FIGS. 1 and 4 through 6, to which reference is made in this regard.

Figure 92:
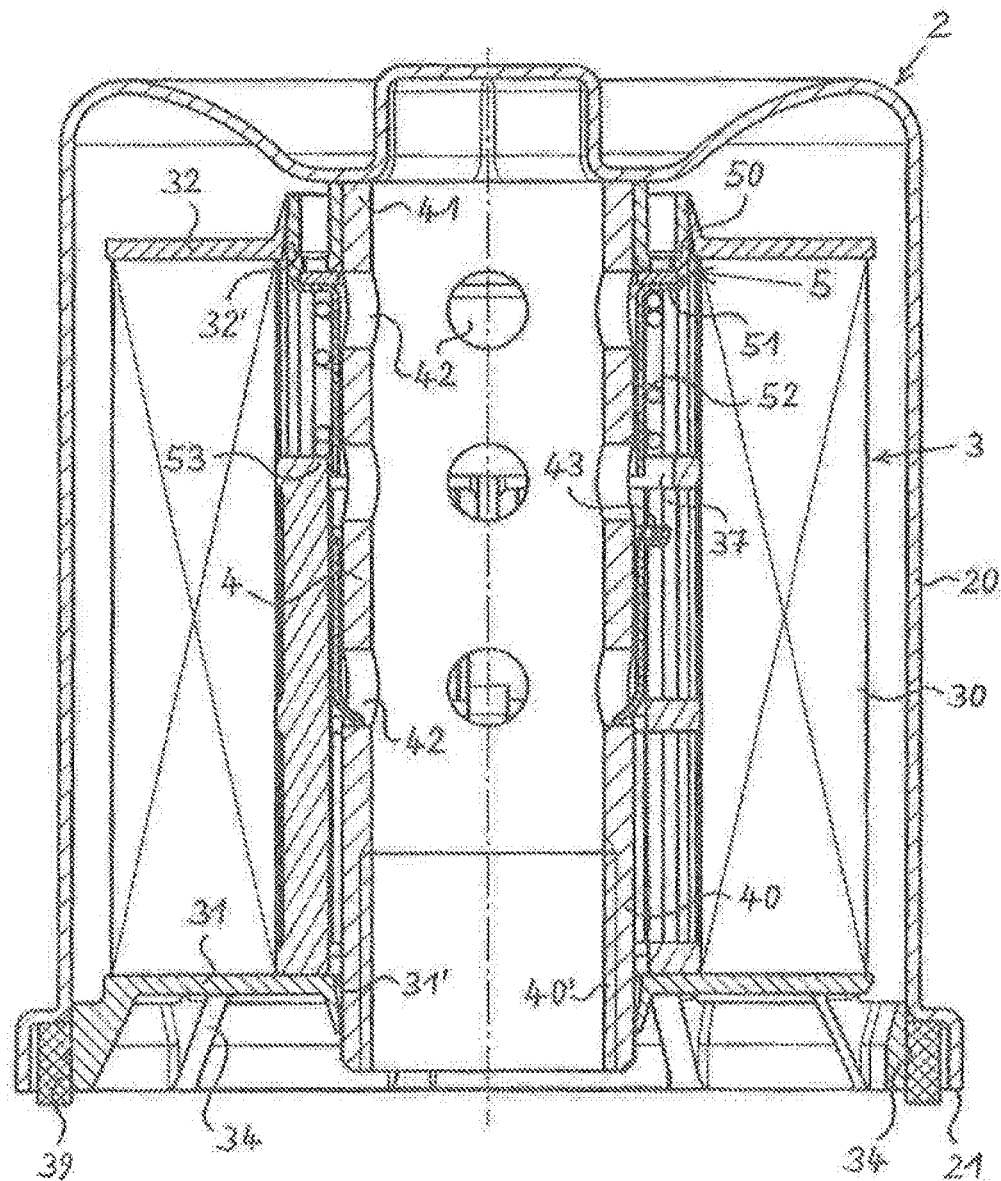
FIG. 92 shows the filter of FIG. 91 in a state disassembled from the coupling flange, in longitudinal section.

Finally, FIG. 92 of the drawing shows filter 1 of FIG. 91 in a state removed from coupling flange 60, in longitudinal section. Filter insert 3 is seated with a frictional fit on central pipe socket 4 in the interior of filter housing 2, so that when filter housing 2 is unscrewed from threaded nipple 63 filter insert 3 is carried along with it. In the state shown in FIG. 92, filter insert 3 can be withdrawn downward from filter housing 2, and replaced by a new, fresh filter insert 3. Spring support 53, which prestresses spring 52 of filter bypass valve 5, is here as well provided on filter insert 3, specifically on its central supporting element 37. When filter insert 3 is withdrawn from filter housing 2, spring 52 is relieved of tension until it abuts stop 43 with its lower end. Stop 43 is here realized in the form of a sheet metal sleeve that is attached in axially non-displaceable fashion on the outer circumference of pipe socket 4, and that is axially supported at its lower end in some of the perforations 42 made in pipe socket 4. Thus, spring 52 and valve body 51 of filter bypass valve 5 are here as well secured against loss.

Here as well, seal 39 is again part of filter insert 3, and is situated on a circumferential sealing ring bearer 34, which is again connected to lower, flange-side end plate 31 of filter insert 3 via connecting webs 33, or is realized in one piece therewith.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 filter
10 connecting flange
11 inlet
12 outlet
13 unfiltered side
14 filtered side
15 return check valve
15' valve membrane
15" membrane bearer
16 base plate
16' screw threading internal on 16
16" screw threading external on 16
17 locking connection between 15" and 50
18 spring tongue plate
2 filter housing
20 circumferential wall
20' screw cover
21 flange-side end face
22 flange-remote end face
23 tool attachment projection
24 inner diameter step
25 threaded connector on 22
25' weld seam
26 screw threading
28 recesses in 25
28' locking recesses internal in 20
3 filter insert
30 filter material body
31 lower, flange-side end plate
31' central perforation in 31
32 upper, flange-remote end plate
32' central perforation in 32
33 connecting webs
33' locking cams on 33
34 sealing ring bearer
35 seal/sealing lip on 31
36 sealed/sealing lip on 32
37 inner support body
37' first positioning means on 3
37" second positioning means on 58
38 axial struts of 37
39 first sealing ring (outer)
39' second sealing ring (inner)
4 central pipe socket
4.1 first, flange-side pipe socket segment
4.2 second, flange-remote pipe socket segment
40 outer end region
40' screw threading on 40
40" threading on 4.1 for 4.2
41 inner end region
41' threading on 41
41" threading on 4.2 for 4.1
42 perforations
43 stop
43.1 stop collar
43.2 stop tongues
43.3 stop tab
44 intermediate spaces
45 longitudinal rib on 4
46 introductory bevels
47 anti-rotation lock
47' anti-rotation lock ring
48 cam on 47'
49 longitudinal guide for 37
5 filter bypass valve
50 valve seat
50' through-opening(s)
51 valve body
52 spring
53 spring support
53' support arms
53" introduction opening(s) for 53' in 58
54 intermediate ring
55 longitudinal groove in 51
56 inner threading in 50
57 elastomeric coating on 50, 51
58 valve holder
58.1 first, lower holder part
58.2 second, upper holder part
58.3 locking connection between 58.1 and 58.2
58' stop for 52 in 58
58" passage
59 covering body
6 device having liquid circuit
6' base
60 coupling flange
61 filtered liquid duct
61' counter-threading in/on 61
62 unfiltered liquid duct
63 threaded nipple
65 stop for 50
67 anti-rotation lock

The invention claimed is:

1. Exchangeable filter insert for a filter, the filter having a filter housing comprising an inlet for liquid to be filtered, an outlet for filtered liquid, a filter bypass valve having a valve seat and a valve body guided so as to be movable in relation to the valve seat and preloaded in a closing direction, the valve seat being situated in the filter so as to be fixed to the filter, the valve body being guided in the filter so as to be fixed to the filter, a filter bypass valve spring configured and arranged to preload the valve body in the closing direction and being guided in the filter so as to be fixed to the filter, the exchangeable filter insert comprising:
- a configuration enabling the filter insert to be positioned to separate an unfiltered side and a filtered side of the filter from one another;
- a filter bypass valve spring prestresser support configured and arranged to compress a filter bypass valve spring of a bypass valve;
- the filter bypass valve spring prestresser support configured, in a state in which the filter insert is positioned in a filter housing, to support and prestress the filter bypass valve spring at an end of the spring oriented away from a body of the valve.

2. Exchangeable filter insert as recited in claim 1, wherein:
- the spring prestresser support is fashioned by a, or on a, supporting element that forms a part of the filter insert.

3. Exchangeable filter insert as recited in claim 1, wherein:
- the filter insert is configured to be manufactured with a different axial length or position of the spring prestresser support; and
- in this way a prestressing of the spring, and thus an opening pressure of the filter bypass valve, is configured to be modified.

4. Exchangeable filter insert as recited in claim 1, further comprising:
- a hollow cylindrical filter material body and two end plates oppositely disposed in relation to the hollow cylindrical filter body;
- one or each of the end plates includes a central opening; and
- an inner grid-shaped support body situated at an inner periphery of the filter material body configured to radially support the filter material body during flow of liquid being filtered in a radial direction from outside to inside.

5. Exchangeable filter insert according to claim 1, wherein:
- the spring prestresser support comprises a plurality of radially inward-protruding ribs.

6. Exchangeable filter insert according to claim 1, further comprising:
- a hollow cylindrical filter material body and two end plates oppositely disposed in relation to the hollow cylindrical filter body; and
- the filter bypass valve spring prestresser support having a support surface positioned entirely between the two end plates.

7. A single exchangeable filter insert configured for use with a filter system that includes the following: a filter housing comprising an inlet for liquid to be filtered, an outlet for filtered liquid, a filter bypass valve having a valve seat and a valve body guided so as to be movable in relation to the valve seat and preloaded in a closing direction, the valve seat being situated in the filter so as to be fixed to the filter, the valve body being guided in the filter so as to be fixed to the filter, a spring configured and arranged to preload the valve body to a desired value in the closing direction and being guided in the filter so as to be fixed to the filter; the filter system further includes a plurality of exchangeable filter insert types, each of said types being configured to preload the valve body to a respectively different desired value, each of said types of the exchangeable filter inserts includes a configuration enabling each exchangeable filter insert to be positioned to separate an unfiltered side and a filtered side of the filter from one another, and a spring prestresser support configured, in a state in which each exchangeable filter insert is positioned in the filter housing, the spring prestresser support of each exchangeable filter insert being configured to support and prestress the spring of the filter bypass valve at an end of the spring oriented away from the valve body, said single exchangeable filter insert consisting of:
- one of said plurality of exchangeable filter insert types.

8. The single exchangeable filter insert as recited in claim 7, wherein:
- the single exchangeable filter insert, as well as each of the plurality of exchangeable filter insert types, is configured to preload the valve body to a desired value different from each of all others of the plurality of exchangeable filter insert types by having been manufactured with a different axial length or a different position of the spring prestresser support.

9. A method of using the single exchangeable filter insert according to claim 8, comprising:
- selecting said single exchangeable filter insert as needed to provide a filter of the filter system with a desired preload value of the valve body;
- installing said single exchangeable filter insert within the filter housing.

10. The method of using the single exchangeable filter insert according to claim 9, further comprising:
- modifying the preload value of the valve body comprising:
  - uninstalling said single exchangeable filter insert from the filter housing; and
  - installing an exchangeable filter insert from among the plurality of exchangeable filter insert types different from a filter type of said single exchangeable filter insert.

11. The method of using the single exchangeable filter insert according to claim 10, wherein:
- the preload value modification is completed by means of the exchange of filter inserts without modifying other parts of the filter.

12. The single exchangeable filter insert as recited in claim 7, wherein:
- said one of said plurality of exchangeable filter insert types comprises:
  - a hollow cylindrical filter material body and two end plates oppositely disposed in relation to the hollow cylindrical filter body; and
  - the spring prestresser support having a support surface positioned entirely between the two end plates.

13. Exchangeable filter insert configured for use in a filter, the filter having a filter housing comprising an inlet for liquid to be filtered, an outlet for filtered liquid, a filter bypass valve having a valve seat and a valve body guided so as to be movable in relation to the valve seat and preloaded in a closing direction, the valve seat being situated in the filter so as to be fixed to the filter, the valve body being guided in the filter so as to be fixed to the filter, a spring configured and arranged to preload the valve body in the closing direction and being guided in the filter so as to be fixed to the filter, the exchangeable filter insert comprising:
- a configuration enabling the filter insert to be positioned to separate an unfiltered side and a filtered side of the filter from one another;
- a spring prestresser support configured, in a state in which the filter insert is positioned in the filter housing, to support and prestress the spring of the filter bypass valve at an end of the spring oriented away from the valve body, the spring prestresser support being located on a supporting element of the filter insert;

a hollow cylindrical filter material body and two end plates oppositely disposed in relation to the hollow cylindrical filter body; and the spring prestresser support having a support surface positioned entirely between the two end plates.

14. Exchangeable filter insert as recited in claim 13, wherein the filter housing of the filter to be used with the exchangeable filter insert includes a central pipe socket, wherein the valve seat is fashioned on or attached to the pipe socket, wherein the valve body and the spring are guided on the pipe socket, wherein a stop is situated on a side of the spring facing away from the valve body having one or more open intermediate spaces distributed around a circumference of the stop, and wherein:

the spring prestresser support of the exchangeable filter insert has a plurality of support arms shaped and configured corresponding to a shape and configuration of open intermediate spaces in the stop or of introduction openings in a valve holder of the filter, such that during positioning of the filter insert into the filter housing the support arms can be guided through the one or more open intermediate spaces or the introduction openings, and such that the support arms form with the one or more open intermediate spaces or with the introduction openings a key-lock coding.

15. Exchangeable filter insert as recited in claim 14, wherein:

the filter insert has, in addition to the support arms forming the spring prestresser support, first positioning elements, and wherein, via the first positioning elements and via second positioning elements that work together therewith and that are provided on the valve holder in addition to the introduction openings, the filter insert, during placement of the filter insert into the filter, is configured to be guided into a position in the circumferential direction ready for engagement of the support arms of the filter insert relative to the introduction openings of the valve holder.

16. Exchangeable filter insert as recited in claim 13, wherein:

the spring prestresser support comprises a ring-shaped element.

17. Exchangeable filter insert as recited in claim 16, wherein:

the ring-shaped element is realized in one piece with a remainder of the spring prestresser support.

* * * * *